US007539637B2

(12) United States Patent
Gatto

(10) Patent No.: US 7,539,637 B2
(45) Date of Patent: May 26, 2009

(54) SECURITY ANALYST ESTIMATES PERFORMANCE VIEWING SYSTEM AND METHOD

(75) Inventor: Joseph G. Gatto, San Francisco, CA (US)

(73) Assignee: StarMine Corporation, San Francisco, CA (US)

(*) Notice: Subject to any disclaimer, the term of this patent is extended or adjusted under 35 U.S.C. 154(b) by 857 days.

(21) Appl. No.: 09/893,460

(22) Filed: Jun. 29, 2001

(65) Prior Publication Data

US 2002/0184131 A1 Dec. 5, 2002

Related U.S. Application Data

(63) Continuation-in-part of application No. 09/722,050, filed on Nov. 27, 2000, now Pat. No. 7,509,277, which is a continuation-in-part of application No. 09/524,253, filed on Mar. 13, 2000, now Pat. No. 7,167,838, which is a continuation-in-part of application No. 09/296,620, filed on Apr. 23, 1999, now Pat. No. 6,510,419.

(60) Provisional application No. 60/082,868, filed on Apr. 24, 1998.

(51) Int. Cl.
*G06Q 40/00* (2006.01)
(52) U.S. Cl. .......................... 705/36 R; 705/35; 705/37
(58) Field of Classification Search ............. 705/35–37, 705/36 R
See application file for complete search history.

(56) References Cited

U.S. PATENT DOCUMENTS 3,270,190 A 8/1966 Lambert ..................... 235/194

| | | | |
|---|---|---|---|
| 4,884,217 A | 11/1989 | Skeirik et al. | 364/513 |
| 4,920,499 A | 4/1990 | Skeirik | 364/513 |
| 4,965,742 A | 10/1990 | Skeirik | 364/513 |
| 5,006,992 A | 4/1991 | Skeirik | 364/513 |
| 5,006,998 A | 4/1991 | Yasunobu et al. | 364/513 |
| 5,132,899 A | 7/1992 | Fox | 364/408 |
| 5,365,425 A | 11/1994 | Torma et al. | 364/401 |

(Continued)

FOREIGN PATENT DOCUMENTS

| JP | 2000090150 A | 3/2000 |
|---|---|---|
| JP | 2004-046454 A | 2/2004 |
| WO | WO94/06103 | 3/1994 |
| WO | WO 01/80124 A2 | 10/2001 |

OTHER PUBLICATIONS

Brown et al., "Composite Analyst Earnings Forecasts: The Next Generation", *Journal of Business Forecasting*, Summer 1990, vol. 9, Issue 2.

(Continued)

*Primary Examiner*—Narayanswamy Subramanian
(74) *Attorney, Agent, or Firm*—Pillsbury Winthrop Shaw Pittman LLP

(57) ABSTRACT

A system and method for measuring, analyzing, and tracking the past performance of security analysts' earnings estimates and recommendations. The present invention provides a database of historical data relating to security analyst earnings estimate predictions wherein a historical model enables users to view the historical data as a time series of earnings estimates for each analyst selected, for a selected period of time, for a predetermined earnings event. Users may define a model to automatically create enhanced composite estimates wherein an improved prediction of the quantity being estimated, such as company earnings, revenue or cash flow is obtained. Users may view performance screens and historical performance data for a particular contributor or various contributors for a given security. Other views may be available.

38 Claims, 58 Drawing Sheets

U.S. PATENT DOCUMENTS

| | | | | |
|---|---|---|---|---|
| 5,500,795 | A | 3/1996 | Powers et al. | 364/401 |
| 5,502,637 | A | 3/1996 | Beaulieu et al. | 364/408 |
| 5,557,513 | A * | 9/1996 | Frey et al. | |
| 5,608,620 | A | 3/1997 | Lundgren | 395/201 |
| 5,613,072 | A | 3/1997 | Hammond et al. | 395/204 |
| 5,675,746 | A | 10/1997 | Marshall | 395/204 |
| 5,701,400 | A | 12/1997 | Amado | 395/76 |
| 5,749,077 | A | 5/1998 | Campbell | 705/36 |
| 5,761,442 | A | 6/1998 | Barr et al. | 395/236 |
| 5,774,880 | A | 6/1998 | Ginsberg | 705/36 |
| 5,774,881 | A | 6/1998 | Friend et al. | 705/36 |
| 5,802,518 | A | 9/1998 | Karaev et al. | 707/9 |
| 5,812,988 | A | 9/1998 | Sandretto | 705/36 |
| 5,819,271 | A | 10/1998 | Mahoney et al. | 707/9 |
| 5,845,285 | A | 12/1998 | Klein | 707/101 |
| 5,852,811 | A | 12/1998 | Atkins | 705/36 |
| 5,864,871 | A | 1/1999 | Kitain et al. | 707/104 |
| 5,893,079 | A | 4/1999 | Cwenar | 705/36 |
| 5,909,669 | A | 6/1999 | Havens | 705/11 |
| 5,911,136 | A | 6/1999 | Atkins | 705/36 |
| 5,918,217 | A | 6/1999 | Maggioncalda et al. | 705/36 |
| 5,930,774 | A | 7/1999 | Chennault | 705/36 |
| 5,946,666 | A | 8/1999 | Nevo et al. | 705/36 |
| 5,948,054 | A | 9/1999 | Nielsen | 709/200 |
| 5,950,176 | A | 9/1999 | Keiser et al. | 705/37 |
| 5,956,691 | A | 9/1999 | Powers | 705/4 |
| 5,961,598 | A | 10/1999 | Sime | 709/224 |
| 5,963,922 | A | 10/1999 | Helmering | 703/35 |
| 6,012,042 | A | 1/2000 | Black et al. | 705/36 |
| 6,012,043 | A | 1/2000 | Albright et al. | 705/36 |
| 6,021,397 | A | 2/2000 | Jones et al. | 705/36 |
| 6,064,984 | A | 5/2000 | Ferguson et al. | 705/36 |
| 6,064,986 | A | 5/2000 | Edelman | 705/36 |
| 6,073,115 | A | 6/2000 | Marshall | 705/35 |
| 6,078,904 | A | 6/2000 | Rebane | 705/36 |
| 6,078,924 | A | 6/2000 | Ainsbury et al. | 707/101 |
| 6,119,103 | A | 9/2000 | Basch et al. | 705/35 |
| 6,125,355 | A | 9/2000 | Bekaert et al. | 705/36 |
| 6,154,732 | A | 11/2000 | Tarbox | 705/36 |
| 6,208,720 | B1 * | 3/2001 | Curtis et al. | 379/114.14 |
| 6,236,980 | B1 | 5/2001 | Reese | 705/36 |
| 6,253,192 | B1 | 6/2001 | Corlett et al. | 705/36 |
| 6,317,726 | B1 | 11/2001 | O'Shaughnessy | 705/36 |
| 6,370,516 | B1 | 4/2002 | Reese | 705/36 |
| 6,381,635 | B1 | 4/2002 | Hoyer et al. | 709/207 |
| 6,510,419 | B1 | 1/2003 | Gatto | 705/36 |
| 6,606,615 | B1 | 8/2003 | Jennings et al. | 706/45 |
| 6,748,389 | B1 | 6/2004 | Cesare et al. | 707/100 |
| 6,792,399 | B1 * | 9/2004 | Phillips et al. | 705/36 R |
| 7,016,872 | B1 | 3/2006 | Bettis et al. | 705/36 R |
| 7,249,080 | B1 | 7/2007 | Hoffman et al. | 705/36 |
| 7,251,624 | B1 | 7/2007 | Lee et al. | 705/35 |
| 2002/0002524 | A1 | 1/2002 | Kossovsky et al. | 705/36 |
| 2002/0019791 | A1 | 2/2002 | Goss et al. | 705/36 |
| 2002/0022988 | A1 | 2/2002 | Columbus et al. | 705/11 |
| 2002/0082966 | A1 | 6/2002 | O'Brien et al. | 705/36 |
| 2002/0169701 | A1 | 11/2002 | Tarbox et al. | 705/36 |
| 2003/0004766 | A1 | 1/2003 | Sandoval et al. | 705/7 |
| 2003/0023686 | A1 | 1/2003 | Beams et al. | 709/205 |
| 2003/0065600 | A1 | 4/2003 | Terashima et al. | 705/36 |
| 2003/0084059 | A1 | 5/2003 | Kelley et al. | 707/102 |
| 2004/0024656 | A1 | 2/2004 | Coleman | 705/27 |
| 2004/0117286 | A1 * | 6/2004 | Charnley, Jr. | 705/36 |
| 2004/0172353 | A1 * | 9/2004 | Charnley, Jr. | 705/36 |
| 2006/0178918 | A1 | 8/2006 | Mikurak | 705/7 |
| 2007/0162365 | A1 * | 7/2007 | Weinreb | 705/35 |
| 2007/0162973 | A1 | 7/2007 | Schneier et al. | 726/22 |
| 2008/0120129 | A1 * | 5/2008 | Seubert et al. | 705/1 |

OTHER PUBLICATIONS

Ho et al., "Market Reactions to Messages from Brokerage Ratings Systems", *Financial Analysts Journal*, Feb. 1998, vol. 54, Issue 1.

LaMonica, "The Best and Worst: Bloomberg's Second Annual Analysts Survey, and the Top Analysts Top Picks", *Financial World*, Jan. 30, 1996, vol. 165, Issue 2.

http://interactive.wsj.com/public/current/summaries/best00.htm (Jan. 5, 2001).

http://interactive.wsj.com/public/current/articles/SB963945297966625438.htm (Jan. 5, 2001).

http://interactive.wsj.com/public/current/articles/SB963945742428637569.htm (Jan. 5, 2001).

http://interactive.wsj.com/public/current/articles/SB963945478117361937.htm (Jan. 5, 2001).

http://interactive.wsj.com/public/current/articles/SB963944657420928118.htm (Jan. 5, 2001).

http://interactive.wsj.com/public/current/articles/SB963945615772798263.htm (Jan. 5, 2001).

Herzberg et al., "Enhancing Earnings Predictability Using Individual Analyst Forecasts", *The Journal of Investing*, Summer 1999.

Charles Schwab: Schwab Introduces Analytics Funds; Utilizes Quantitative Techniques to Seek Above-Market Returns.

Mozes et al., "Modeling Earnings Expectations Based on Clusters of Analyst Forecasts", *The Journal of Investing*, Spring 1999.

https://www.investars.com./home.asp, printed Mar. 26, 2001, 5 pages.

"I/B/E/S Active Express", I/B/E/S International Inc., 1999, 2 pages.

Lawrence D. Brown et al., "The Superiority of Analyst Forecastes as Measures of Expectations: Evidence from Earnings", *The Journal of Finance*, vol. XXXIII, No. 1, Mar. 1978, pp. 1-16.

Lawrence D. Brown et al., "The Predictive Value of Interim Reports for Improving Forecasts of Future Quarterly Earnings", *The Accounting Review*, vol. LIV, No. 3, Jul. 1979, pp. 585-591.

Lawrence D. Brown, "Analyst Forecasting Errors and Their Implications for Security Analysis: An Alternative Perspective", *Financial Analysts Journal*, Jan.-Feb. 1996, pp. 40-47.

Lawrence D. Brown et al., "Analysts can Forecast Accurately!", *The Journal of Portfolio Management*, Spring 1980,pp. 31-34.

L. D. Brown et al., "Perspectives on Forecasting Research in Accounting and Finance", *Journal of Forecasting*, vol. 2, 1983, pp. 325-330.

Robert E. Hoskin et al., "Evidence on the Incremental Information Content of Additional Firm Disclosures Made Concurrently with Earnings, "*Journal of Accounting Research*, vol. 24 Supplement 1986, pp. 1-32.

Lawrence D. Brown, "Earnings Surprise Research: Synthesis and Perspectives", *Financial Analysts Journal*, Mar./Apr. 1997, pp. 13-19.

Charles M. C. Lee et al., "What is the Intrinsic Value of the Dow?", *The Journal of Finance*, vol. LIV, No. 5, Oct. 1999, pp. 1693-1741.

Charles M. C. Lee, "Market Integration and Price Execution for NYSE-Listed Securities", *The Journal of Finance*, vol. XLVIII, No. 3, Jul. 1993, pp. 1009-1038.

Charles M. C. Lee et al., "Volume, Volatility, and New York Stock Exchange Trading Halts", *The Journal of Finance*, vol. XLIX, No. 1, Mar. 1994, pp. 183-214.

Navin Chopra et al., "Summing Up", *The Journal of Finance*, vol. XLVIII, No. 2, Jun. 1993, pp. 811-812.

Navin Chopra et al., "Yes, Discounts on Closed-End Funds are a Sentiment Index", *The Journal of Finance*, vol. XLVIII, No. 2, Jun. 1993, pp. 801-808.

Charles M. C. Lee et al., "Spreads, Depths, and the Impact of Earnings Information: An Intraday Analysis", *The Review of Financial Studies*, vol. 6, No. 2, 1993, pp. 345-374.

Sati P. Bandyopadhyay et al., "Analysts' Use of Earnings Forecasts in Predicting Stock Returns: Forecast Horizon Effects", *International Journal of Forecasting*, vol. 11, No. 3, 1995, pp. 429-445.

Lawrence D. Brown, "Influential Accounting Articles, Individuals, Ph.D. Granting Institutions and Faculties: A Citational Analysis", *Accounting, Organizations and Society*, vol. 21, No. 7/8, Oct./Nov. 1996, pp. 723-754.

Lawrence D. Brown et al., "Security Analyst Superiority Relative to Univariate Time-Series Models in Forecasting Quarterly Earnings", *Journal of Accounting and Economics*, vol. 9, 1987, pp. 61-87.

Lawrence D. Brown et al., "An Evaluation of Alternative Proxies for the Market's Assessment of Unexpected Earnings", *Journal of Accounting and Economics*, vol. 9, 1987, pp. 159-193.

Lawrence D. Brown et al., "The Impact of Annual Earnings Announcements on Convergence of Beliefs", *The Accounting Review*, vol. 67, No. 4, Oct. 1992, pp. 862-875.

Lawrence D. Brown, "Analyst Forecasting Errors: Additional Evidence", *Financial Analysts Journal*, Nov./Dec. 1997, pp. 81-88.

Praveen Sinha et al., "A Re-Examination of Financial Analysts Differential Earnings Forecast Accuracy", *Contemporary Accounting Research*, The Journal of Canadian Academic Accounting Association, vol. 14, No. 1, Spring 1997, pp. 1-42.

Leonard C. Soffer et al., "Post-Earnings Announcements Drift and the Dissemination of Predictable Information", *Contemporary Accounting Research*, The Journal of Canadian Academic Accounting Association, vol. 16, No. 2, Summer 1999, pp. 305-331.

Jacob K. Thomas, Discussion of Post-Earnings Announcements Drift and the Dissemination of Predictable Information, *Contemporary Accounting Research*, The Journal of Canadian Academic Accounting Association, vol. 16, No. 2, Summer 1999, pp. 333-340.

Lawrence D. Brown, "Comment on "Post-Earnings Announcement Drift and the Dissemination of Predictable Information"", *Contemporary Accounting Research*, The Journal of Canadian Academic Accounting Association, vol. 16, No. 2, Summer 1999, pp. 341-345.

Lawrence D. Brown et al., "Univariate Time-Series Models of Quarterly Accounting Earnings per Share: A Proposed Model", *Journal of Accounting Research*, vol. 17, No. 1, Spring 1979, pp. 179-189.

Lawrence D. Brown, "Earnings Forecasting Research: Its Implications for Capital Markets Research", *International Journal of Forecasting*, vol. 9, 1993, pp. 295-320.

J. O'Hanlon, "Commentary on: Lawrence D. Brown "Earnings Forecasting Research: Its Implications for Capital Markets Research"", *International Journal of Forecasting*, vol. 9, 1993, pp. 321-323.

Jacob K. Thomas, "Comments on 'Earnings Forecasting Research: Its Implications for Capital Markets Research'", *International Journal of Forecasting*, vol. 9, 1993, pp. 325-330.

Philip Brown, "Comments on 'Earnings Forecasting Research: Its Implication for Capital Markets Research'", *International Journal of Forecasting*, vol. 9, 1993, pp. 331-335.

Mark E. Zmijewski, "Comments on 'Earnings Forecasting Research: Its Implications for Capital Markets Research' by L. Brown", *International Journal of Forecasting*, vol. 9, 1993, pp. 337-342.

Lawrence D. Brown, "Reply to Commentaries on Earnings Forecasting Research: Its Implications for Capital Markets Research", *International Journal of Forecasting*, vol. 9, 1993, pp. 343-344.

Lawrence D. Brown, "A Test of the Reliability of Current Cost Disclosures", *ABACUS—A Journal of Accounting, Finance and Business Studies*, vol. 30, No. 1, Mar. 1994, pp. 2-17.

Lawrence D. Brown, "The Impact of Announcement Timing on the Informativeness of Earnings and Dividends", *Journal of Accounting, Auditing & Finance*, vol. 9, No. 4, Fall 1994, pp. 653-674.

Lawrence D. Brown et al., "The Familiarity with and Perceived Quality of Accounting Journals: Views of Senior Accounting Faculty in Leading U.S. MBA Programs", *Contemporary Accounting Research*, The Journal of Canadian Academic Accounting Association, vol. 11, No. 1-1, Summer 1994, pp. 223-250.

Adrian P. Fitzsimons, et al., "Harmonizing GAAP Differences Among the NAFTA Countries", *The CPA Journal*, May 1995, pp. 43-44.

Lawrence D. Brown, "Book Review of M. Metcalf's 1995 *Forecasting Profit*", *International Journal of Forecasting*, vol. 12, No. 1, 1996, pp. 176-177.

Lawrence D. Brown et al., "An Information Interpretation of Financial Analyst Superiority in Forecasting Earnings", *Journal of Accounting Review*, vol. 25, No. 1, Spring 1997, pp. 49-67.

Lawrence D. Brown, "Forecast Selection When All Forecasts are not Equally Recent", *International Journal of Forecasting*, vol. 7, No. 3, 1991, pp. 349-356.

Lawrence D. Brown et al., "Capsules and Comments", *Journal of Accounting Research*, vol. 29, No. 2, Autumn 1991, pp. 382-385.

Lawrence D. Brown et al., "Applying Citation Analysis to Evaluate the Research Contributions of Accounting Faculty and Doctoral Programs", *The Accounting Review*, vol. LX, No. 2, Apr. 1985, pp. 262-277.

Lawrence D. Brown, "Can ESP Yield Abnormal Returns?", *The Journal of Portfolio Management*, vol. 23, No. 4, Summer 1997, pp. 36-43.

Lawrence D. Brown et al., "Do Stock Prices Fully Reflect the Implications of Current Earnings for Future Earnings for *ARI* Firms?", *Journal of Accounting Research*, vol. 38, No. 1, Spring 2000, pp. 149-164.

Lawrence D. Brown et al., "The Association Between Nonearnings Disclosures by Small Firms and Positive Abnormal Returns", *The Accounting Review*, vol. 68, No. 3, Jul. 1993, pp. 668-680.

Lawrence D. Brown et al., "Adaptive Expectations, Time-Series Models, and Analysis Forecast Revision", *Journal of Accounting Research*, vol. 17, No. 2, Autumn 1979, pp. 341-351.

Lawrence D. Brown et al., "Does the FASB Listen to Corporations?", *Journal of Business Finance & Accounting*, vol. 19, No. 5, Sep. 1992, pp. 715-731.

Lawrence D. Brown et al., "Using Citation Analysis to Assess the Impact of Journals and Articles on Contemporary Accounting Research (CAR)", *Journal of Accounting Research*, vol. 23, No. 1, Spring 1985, pp. 84-109.

Kaushik I. Amin et al., "Option Trading, Price Discovery, and Earnings News Dissemination", *Contemporary Accounting Research*, The Journal of Canadian Academic Accounting Association, vol. 14, No. 2, Summer 1997, pp. 153-192.

Charles M. C. Lee et al., "Investor Sentiment and the Closed-End Fund Puzzle", *The Journal of Finance*, vol. XLVI, No. 1, Mar. 1991, pp. 75-109.

Carolyn M. Callahan et al., "Accounting Information and Bid-Ask Spreads", *Accounting Horizons*, vol. 11, No. 4, Dec. 1997, pp. 50-60.

Charles M. C. Lee, "Accounting-Based Valuation: Impact on Business Practices and Research", *Accounting Horizons*, vol. 13, No. 4, Dec. 1999, pp. 413-425.

Richard Frankel et al., "Accounting Valuation, Market Expectation, and Cross-Sectional Stock Returns", *Journal of Accounting and Economics*, vol. 25, No. 3, Jun. 1998, pp. 283-319.

Ronald King et al., "Corporate Disclosure and Price Discovery Associated with NYSE Temporary Trading Halts", *Contemporary Accounting Research*, The Journal of Canadian Academic Accounting Association, vol. 8, No. 2, Spring 1992, pp. 509-531.

Charles M. C. Lee, "Discussion of "Corporate Disclosure and Price Discovery Associated with NYSE Temporary Trading Halts"", *Contemporary Accounting Research*, The Journal of Canadian Academic Accounting Association, vol. 8, No. 2, Spring 1992, pp. 532-539.

Charles M. C. Lee, "Measuring Wealth", *CA Magazine*, Apr. 1996, pp. 32-37.

Charles M. C. Lee et al., "Inferring Trade Direction from Intraday Data", *The Journal of Finance*, vol. XLVI, No. 2, Jun. 1991, pp. 733-746.

Charles M. C. Lee et al., "Price Momentum and Trading Volume", *The Journal of Finance*, vol. LV, No. 5, Oct. 2000, pp. 2017-2069.

Charles M. C. Lee et al., "Valuing the Dow: A Bottom-Up Approach", *Financial Analysts Journal*, vol. 55, No. 5, Sep./Oct. 1999, pp. 4-23.

Charles M. C. Lee, "Earnings News and Small Traders", *Journal of Accounting and Economics*, vol. 15, No. 2/3, Jun./Sep. 1992, pp. 265-302.

Terry D. Warfield et al., "Response to the FASB Exposure Draft, "Proposed Statement of Financial Accounting Standards—Accounting for Transfers and Serviving of Financial Assets and Extinguishment of Liabilities"", *Accounting Horizons*, vol. 10, No. 3, Sep. 1996, pp. 178-181.

Terry D. Warfield et al., "Response to the FASB Exposure Draft, "Proposed Statement of Financial Accounting Standards—Accounting for Certain Liabilities Related to Closure or Removal of Long-Lived Assets"", *Accounting Horizons*, vol. 10, No. 4, Dec. 1996, pp. 137-141.

Terry D. Warfield et al., "Response to the FASB Exposure Draft, "Proposed Statement of Financial Accounting Standards—Consolidated Financial Statements: Policy and Procedures"", *Accounting Horizons*, vol. 10, No. 3, Sep. 1996, pp. 182-185.

Lawrence D. Brown et al., "Profiting from Predicting Earnings Surprise", *The Journal of Financial Statement Analysis*, Winter 1998, pp. 57-66.

Martin M. Herzberg et al., "Enhancing Earnings Predictability Using Individual Analyst Forecasts", *The Journal of Investing*, Summer 1999, pp. 15-24.

Susan D. Krische et al., "The Information Content of Analyst Stock Recommendations", First Draft: Aug. 8, 2000, Current Draft: Sep. 25, 2000, 40 pages.

www.findarticles.com/m4PRN/1999_Oct_14/56284107/pl/article.jhtml, printed Feb. 5, 2001, 2 pages.

http://my.zacks.com/?ALERT=www.zacks.com, printed Feb. 2, 2001, 6 pages.

http://www.cianet.com/, printed Feb. 5, 2001, 14 pages.

http://www.factset.com/, printed Feb. 5, 2001, 10 pages.

http://www.iexchange.com/, printed Feb. 5, 2001, 5 pages.

http://www.validea.com/home/home.asp, printed Feb. 5, 2001, 26 pages.

http://www.bulldogresearch.com/default.asp, printed Feb. 5, 2001, 28 pages.

Lawrence D. Brown, "Predicting Individual Analyst Earnings Forecast Accuracy", Sep. 29, 1999, pp. 1-60.

The Hulbert Financial Digest, Jan 20, 2000, vol. XX, No. 5, 11 pages.

De Aenlle, Conrad, "Short-Sellers' Puzzle: Not Whether, but Which?", *International Herald Tribune*, Feb. 12, 1994, 2 pages.

White, Ron, "How Computers Work, Fourth Edition", Que Corporation, Sep. 1998, pp. 159 and 42-49 (12 pages).

Downes, John, "Dictionary of Finance and Investmant Terms, Sixth Edition", Barron's Educational Series, Inc., 2003, pp. 594, 674, and 678 (5 pages).

"Dictionary of Business", Peter Collin Publishing, Credo Reference, Capitalization, 2001, 1 page.

"The Motley Fool", The Record, Bergen County, NJ, May 30, 1999, pp. b.03, (2 pages).

"Dow Jones Global Titans Indexes", Dow Jones & Company, Dec. 17, 2000, 1 page.

Unknown, Quote.com, Inc., May 7, 1998, http://web.archive.org/web/20000701-19960101re_/http://www.quote.com, 2 pages.

Unknown, Webster's New World Computer Dictionary, definition of "logarithmic graph", http://www.credoreference.com/entry.do?pp=1&id=348463&secid=., © 2003, Wiley.Publishing, Inc., 1 page.

Unknown, Academic Press Dictionary of Science and Technology, definition of "logarithmic scale", http://www.credoreference.com/entry.do?pp=1&id=3124817&secid=., © 1992, Academic Press., 1 page.

Ross, Stephen A., et al., "Fundamentals of Corporate Finance", Third Edition, © 1995, Richard D. Irwin, Inc., pp. 332-357.

Ross, Stephen A., et l., "Fundamentals of Corporate Finance", Third Edition, © 1995, Richard D. Irwin., pp. 0-8 through 0-14.

Bodie, Zvi, et al., "Investments", Third Edition, © 1996, Richard D. Irwin, Inc., pages are the inside front and back covers, page Nos. 1-4 were added, 6 pages.

Davis, Mark, "Trying to Find the Newsletter That's Right for You can be Daunting", *Buffalo News*, Mar. 2, 1999 (p. A7), 3 pages.

Hagstrom, Jr., Robert G., "The Warren Buffet Way; Investment Strategies of the World's Greatest Inventor", © 1995, John Wiley & Sons, Inc., p. 4.

* cited by examiner

STARMINE
FOR THE SELL SIDE

Analyst: [-Select One- ▼]   Firmwide

Current Data | Performance | Mine-ders    Performance | Mine-ders
Firmwide          Lookup Analysts by Stock Home | Options | Help | Log Out

Donaldson, Lufkin & Jenrette Securitie
BETA
Feedback to StarMine

△ Mine-ders Summary
Data Through Jun-30-00

# Mine-ders by Analyst

| Analyst | Today ▼ | Last 7 Days | All |
|---|---|---|---|
| Potamianos, P. | 20 | 32 | 35 |
| Drewry, W. | 15 | 26 | 29 |
| Roth, S. | 14 | 31 | 31 |
| Sanger, A. | 14 | 27 | 32 |
| Klugman, R. | 11 | 22 | 29 |
| Launer, C. | 8 | 28 | 30 |
| Scott, T. | 7 | 16 | 16 |
| Cohen, D. | 7 | 24 | 27 |
| Orenbuch, M. | 7 | 17 | 18 |
| Passoni, S. | 6 | 8 | 9 |
| Blair, K. | 6 | 16 | 22 |
| Hartman, B. | 5 | 17 | 17 |
| Kipgen, J. | 5 | 24 | 43 |
| Leach, W. | 5 | 29 | 32 |
| Solotar, J. | 5 | 21 | 22 |
| Zandi, R. | 4 | 6 | 7 |
| Balter, J. | 4 | 20 | 25 |
| Mccarthy | 4 | 15 | 19 |
| Ossad, S. | 4 | 8 | 10 |
| Ruschmeier, P. | 3 | 30 | 40 |
| Bradshaw, D. | 3 | 23 | 32 |
| Dobson, J. | 3 | 30 | 44 |
| Higgins, J. | 3 | 15 | 16 |
| Hindelong, J. | 3 | 22 | 28 |
| Karaoglan, A. | 3 | 8 | 10 |
| Morrison, S. | 2 | 24 | 26 |
| Bedekar, M. | 2 | 7 | 8 |
| Blackstock, J. | 2 | 7 | 7 |
| Buck, E. | 2 | 16 | 19 |
| Comeau, E. | 2 | 16 | 20 |
| Farley, J. | 2 | 12 | 18 |
| Halper, S. | 2 | 15 | 21 |
| Hopkins, B. | 2 | 5 | 5 |
| Imam, H. | 2 | 2 | 2 |
| Kulju, K. | 2 | 13 | 25 |

| Trigger Date | # Mine-ders |
|---|---|
| Jun-30-00 | 213 |
| Jun-29-00 | 687 |
| Jun-28-00 | 1 |
| Jun-27-00 | 2 |
| Jun-26-00 | 7 |
| Jun-22-00 | 5 |
| Jun-21-00 | 5 |
| Jun-20-00 | 1 |
| Jun-19-00 | 17 |
| Jun-16-00 | 6 |

FIG. 35

STARMINE
FOR THE SELL SIDE

Analyst: [–Select One–] ▼

Current Data | Performance | Mine-ders | Lookup Analysts by Stock | Firmwide Performance | Firmwide Mine-ders Donaldson, Lufkin & Jenrette Securitie
BETA
Feedback to StarMine

[Home] [Options] [Help] [Log Out]

Mine-ders Triggered on Jun-30-00
Data Through Jul-04-00

◁ Previous Day  Next Day ▷

| Ticker | Analyst | Period | Alert Description | Est. Age | Latest EPS Estimate | IBES Mean |
|--------|---------|--------|-------------------|----------|---------------------|-----------|
| AHC | Potamianos, P. | FQ 09-00 | Estimate 2.2SD below the mean | 4 | $1.10 | $1.83 |
| AHP | Blair, K. | FY 12-00 | Estimate older than 100 days | 105 | 1.90 | 1.92 |
| ASO | Roth, S. | FY 12-00 | Estimate older than 100 days | 105 | 1.75 | 1.74 |
| ASO | Roth, S. | FY 12-01 | Estimate older than 100 days | 105 | 2.00 | 1.99 |
| ATG | Launer, C. | FQ 09-00 | Estimate older than 100 days | 56 | 0.20 | 0.21 |
| AWA | Higgins, J. | FY 12-00 | Estimate older than 100 days | 105 | 2.30 | 2.23 |
| AZR | Egger, B. | FQ 06-00 | Estimate 2.1SD below the mean | 76 | 0.25 | 0.27 |
| BK | Roth, S. | FQ 09-00 | Estimate older than 100 days | 127 | 0.48 | 0.48 |
| BK | Roth, S. | FY 12-00 | Estimate older than 100 days | 392 | 1.90 | 1.91 |
| BLC | Drewry, W. | FQ 06-00 | Estimate older than 100 days | 148 | 0.27 | 0.25 |
| BLC | Drewry, W. | FQ 09-00 | Estimate older than 100 days | 148 | 0.16 | 0.16 |
| BLC | Drewry, W. | FY 12-00 | Estimate 2.2SD above the mean | 68 | 0.83 | 0.84 |
| BLS | Klugman, R. | FQ 06-00 | Estimate older than most recent cluster (5 days) | 78 | 0.58 | 0.56 |
| BLS | Klugman, R. | FQ 06-00 | Estimate older than most recent cluster (71 days) | 78 | 0.58 | 0.56 |
| BLS | Klugman, R. | FQ 09-00 | Estimate older than 100 days | 166 | 0.56 | 0.56 |
| BLS | Klugman, R. | FY 12-00 | Estimate older than 100 days | 399 | 2.20 | 2.22 |
| BLS | Klugman, R. | FY 12-01 | Estimate older than 100 days | 145 | 2.45 | 2.50 |
| BPA | Manley, R. | FY 12-01 | Estimate older than most recent cluster (56 days) | 81 | 2.50 | 2.87 |
| BSYS | Ossad, S. | FQ 06-00 | Estimate older than 100 days | 256 | 0.79 | 0.79 |
| BSYS | Ossad, S. | FY 06-00 | Estimate older than 100 days | 335 | 2.45 | 2.45 |
| BSYS | Ossad, S. | FY 06-01 | Estimate older than 100 days | 256 | 2.95 | 2.93 |
| BYND | Kiggen, J. | FQ 06-00 | Estimate older than most recent cluster (56 days) | 68 | -0.36 | -0.34 |
| BYND | Kiggen, J. | FQ 09-00 | Estimate older than most recent cluster (56 days) | 68 | -0.33 | -0.32 |
| BYND | Kiggen, J. | FY 12-00 | Estimate older than most recent cluster (56 days) | 68 | -0.99 | -1.13 |
| BYND | Kiggen, J. | FY 12-01 | Estimate older than most recent cluster (14 days) | 19 | 0.68 | 0.66 |
| COC | Potamianos, P. | FQ 09-00 | Estimate older than most recent cluster (15 days) | 82 | 0.60 | 0.58 |
| COF | Orenbuch, M. | FQ 09-00 | Estimate 2.3SD above the mean | 263 | 2.30 | 2.25 |
| COF | Orenbuch, M. | FY 12-00 | Estimate 3.0SD above the mean | 263 | 2.30 | 2.25 |
| COF | Orenbuch, M. | FY 12-01 | Estimate older than 100 days | 168 | 2.85 | 2.80 |
| COVD | Scott, T. | FQ 06-00 | Estimate older than most recent cluster (15 days) | 76 | -1.08 | -0.98 |
| COVD | Scott, T. | FQ 09-00 | Estimate older than most recent cluster (15 days) | 76 | -1.12 | -1.10 |
| COVD | Scott, T. | FY 12-00 | Estimate older than most recent cluster (15 days) | 76 | -4.08 | -3.96 |
| COVD | Scott, T. | FY 12-01 | Estimate older than most recent cluster (15 days) | 76 | -4.56 | -4.52 |
| DABR | Cohen, D. | FQ 06-00 | Estimate older than 100 days | 105 | 0.22 | 0.23 |
| DABR | Cohen, D. | FQ 09-00 | Estimate older than 100 days | 105 | 0.16 | 0.16 |

FIG. 36

STARMINE FOR THE SELL SIDE

Home | Options | Help | Log Out

Analyst: Sanger, A.
Current Data | Performance | Mine-ders | Lookup Analysts by Stock | Firmwide Performance | Mine-ders Sanger, A. | Donaldson, Lufkin & Jenrette Securitie
BETA
Feedback to StarMine ◁ Previous Analyst  Next Analyst ▷  Mine-ders Summary Data Through Jun-30-00

| Ticker | Period | Trigger Date | Alert Description | Est. Age | Latest EPS Estimate | I/B/E/S Mean |
|---|---|---|---|---|---|---|
| ESV | FQ 06-00 | Jun-30-00 | Estimate older than most recent cluster (67 days) | 72 | $0.11 | $0.10 |
| ESV | FQ 09-00 | Jun-30-00 | Estimate older than most recent cluster (67 days) | 72 | 0.18 | 0.18 |
| GLM | FQ 06-00 | Jun-30-00 | Estimate older than most recent cluster (24 days) | 74 | 0.15 | 0.14 |
| GLM | FQ 09-00 | Jun-30-00 | Estimate older than most recent cluster (24 days) | 74 | 0.14 | 0.16 |
| GLM | FY 12-00 | Jun-30-00 | Estimate older than most recent cluster (22 days) | 74 | 0.60 | 0.61 |
| GRP | FQ 06-00 | Jun-30-00 | Estimate older than 100 days | 163 | 1.35 | 1.26 |
| GRP | FQ 06-00 | Jun-30-00 | Estimate older than most recent cluster (38 days) | 99 | 0.02 | 0.01 |
| GRP | FQ 09-00 | Jun-30-00 | Estimate older than most recent cluster (38 days) | 99 | 0.02 | 0.01 |
| GRP | FY 12-00 | Jun-30-00 | Estimate older than most recent cluster (30 days) | 64 | 0.09 | 0.07 |
| GRP | FY 12-01 | Jun-30-00 | Estimate older than 100 days | 99 | 0.25 | 0.20 |
| PGO | FQ 06-00 | Jun-30-00 | Estimate older than 100 days | 99 | 0.25 | 0.20 |
| PGO | FY 12-00 | Jun-30-00 | Estimate older than 100 days | 49 | 0.90 | 0.91 |
| CAM | FY 12-01 | Jun-29-00 | Estimate older than most recent cluster (24 days) | 169 | 0.24 | 0.27 |
| MDR | FQ 06-00 | Jun-29-00 | Estimate older than most recent cluster (46 days) | 169 | 1.10 | 1.25 |
| NTG | FQ 06-00 | Jun-29-00 | Estimate older than 100 days | 63 | 1.61 | 1.58 |
| NTG | FQ 09-00 | Jun-29-00 | Estimate older than 100 days | 63 | 0.80 | 0.80 |
| RIG | FQ 06-00 | Jun-29-00 | Estimate older than most recent cluster (24 days) | 119 | 0.16 | 0.14 |
| RIG | FQ 09-00 | Jun-29-00 | Estimate older than most recent cluster (22 days) | 119 | 0.21 | 0.20 |
| RIG | FY 12-00 | Jun-29-00 | Estimate older than most recent cluster (24 days) | 65 | 0.15 | 0.13 |
| SCSW | FQ 05-00 | Jun-29-00 | Estimate older than most recent cluster (24 days) | 42 | 0.27 | 0.21 |
| SCSW | FQ 08-00 | Jun-29-00 | Estimate older than most recent cluster (3 days) | 42 | 0.90 | 0.79 |
| SESI | FY 12-01 | Jun-29-00 | Estimate older than 100 days | 37 | -0.11 | -0.15 |
| VTS | FY 07-01 | Jun-29-00 | Estimate older than 100 days | 37 | 0.05 | 0.06 |
| WFT | FQ 06-00 | Jun-29-00 | Estimate 2.2SD above the mean | 10 | 0.55 | 0.47 |
| DRQ | FQ 09-00 | May-29-00 | Estimate older than 100 days | 143 | 0.75 | 0.78 |
| BHI | FQ 09-00 | May-29-00 | Estimate older than 100 days | 150 | 0.13 | 0.12 |
| BHI | FY 12-01 | May-29-00 | Estimate older than 100 days | 150 | 0.22 | 0.20 |
| GW | FQ 09-00 | May-10-00 | Estimate older than 100 days | 112 | 0.20 | 0.19 |
| NBR | FY 12-01 | May-10-00 | Estimate older than 100 days | 133 | 0.15 | 0.14 |
| | | | | 133 | 1.00 | 1.04 |
| | | | | 247 | 0.15 | 0.14 |
| | | | | 253 | 1.75 | 1.54 |

DISCLAIMER

| Name | Rating | Count |
|---|---|---|
| Ossad, S. | 61 ★★★★★ | 10 |
| Looby, R. | 61 ★★★★★ | 12 |
| Nichols, M. | 60 ★★★★★ | 12 |
| Sulam, M. | 59 ★★★★★ | 18 |
| Egger, B. | 58 ★★★★★ | 11 |
| Kiggen, J. | 58 ★★★★★ | 37 |
| Bedekar, M. | 57 ★★★★★ | 11 |
| Bhutani | 56 ★★★★★ | 1 |
| Buck, E. | 55 ★★★★★ | 15 |
| Hindelong, J. | 54 ★★★★★ | 26 |
| Galvin, T. | 54 ★★★★ | 2 |
| Mcmurry, D. | 53 ★★★★ | 5 |
| Blount, H. | 53 ★★★★ | 13 |
| Neimeh, G. | 53 ★★★★ | 23 |
| Scott, T. | 53 ★★★★ | 8 |
| Passoni, S. | 52 ★★★★ | 10 |
| Ross, E. | 50 ★★★★ | 3 |
| Micciche, M. | 49 ★★★★ | 3 |
| Imam, H. | 49 ★★★★ | 2 |
| Schaeffer, P. | 46 ★★★★ | 10 |
| Karaoglan, A. | 44 ★★★ | 10 |
| Halper, S. | 44 ★★★ | 22 |
| Smith, D. | 43 ★★★ | 2 |
| Blackstock, J. | 42 ★★★ | 14 |
| Comeau, E. | 39 ★★★ | 10 |
| Carpenter, S. | 38 ★★★ | 12 |
| Solotar, J. | 38 ★★★ | 13 |
| Kuliu, K. | 37 ★★★ | 15 |
| Leibowitz, D. | 37 ★★★ | 2 |
| Longley, A. | 37 ★★★ | 18 |
| Cohen, D. | 35 ★★★ | 27 |
| Jones, G. | 28 ★★ | 1 |
| Balter, J. | 27 ★★ | 32 |
| Orenbuch, M. | 23 ★★ | 9 |
| Bhutani, J. | 21 ★★ | 1 |
| Meyer, J. | 19 ★ | 12 |
| Launer, C. | 17 ★ | 21 |
| Weinstein, E. | 10 ★ | 1 |
| Halper | 10 ★ | 2 |
| Potamianos, P. | 0 | 14 |
| Petersik, B. | 0 ★ | 3 |
| Mccarthy | 0 ★ | 19 |
| Bradshaw, D. | 0 | 20 |

FIG. 45B

SECURITY ANALYST ESTIMATES PERFORMANCE VIEWING SYSTEM AND METHOD

CROSS-REFERENCE TO RELATED APPLICATION

This application is a continuation-in-part of U.S. application Ser. No. 09/722,050, filed Nov. 27, 2000 now U.S. Pat. No. 7,509,277, which is a continuation-in-part of 09/524,253, filed Mar. 13, 2000 now U.S. Pat. No. 7,167,838, which is a continuation-in-part of U.S. application Ser. No. 09/296,620, filed Apr. 23, 1999 (which issued as U.S. Pat. No. 6,510,419 on Jan. 21, 2003), which claims priority from U.S. provisional application Ser. No. 60/082,868, filed Apr. 24, 1998, which are incorporated by reference.

FIELD OF THE INVENTION

The invention relates to a system and method for managing and viewing historical data including security analysts' predictions (e.g., earnings estimates and buy/sell recommendations) and actual reported data; for measuring, analyzing, and tracking the historical performance of security analysts' predictions; and creating, managing, back testing, and using models that use such historical and performance data, attributes and other information to automatically produce better predictors of future events (e.g., corporate earnings or stock-price performance).

BACKGROUND OF THE INVENTION

Many individuals and institutions analyze financial data, financial instruments, such as equity and fixed-income securities, and other things, at least in part to predict future economic events. Such individuals may include, for example, security analysts. The role of the security analyst is generally well-known and includes, among other things, issuing earnings estimates for securities, other financial estimates concerning future economic events (e.g., revenue), recommendations on whether investors should buy, sell, or hold financial instruments, such as equity securities, and other predictions. Security analyst estimates may include, but are not limited to, quarterly, semi-annual, and annual earnings estimates for companies whether or not they are traded on a public securities exchange.

Security analysts generally predict a stock's quarterly or annual earnings well in advance of the time the actual earnings are announced, and from time to time, update their predictions. These predictions are recorded, for example, in the Institutional Brokers Estimates Service ("IBES") database and other commercial databases. The IBES Detail History is complete in its record of estimates and actuals, but limited in its summaries and reports. While IBES provides a summary history database with summary-level information per security per fiscal period (or month), it does not provide daily summaries.

Many investors use the simple average of analysts' estimates, often referred to as the "consensus," to predict a stock's earnings, and to make investment decisions based on the consensus earnings estimate. However, this consensus is a naive average created by placing equal weight on each analyst's estimate, regardless of whether the estimate was created recently or months ago, regardless of whether the analyst is a seasoned veteran with a great track record or a rookie, regardless of any historical bias, and regardless of other factors that may be relevant.

Usually more than one analyst follows a given security. Analysts often disagree on earnings estimates and recommendations and, as a result, analysts' earnings estimates and recommendations often vary.

A number of financial information services providers ("FISPs") gather and report analysts' earnings estimates and recommendations. At least some FISPs report the high, low, and mean (or consensus) earnings estimates, as well as mean recommendations for equity securities (as translated to a FISP's particular scale, for example, one to five). In addition, FISPs may also provide information on what the earnings estimates and recommendations were seven and thirty days prior to the most current consensus, as well as the differences between the consensus (e.g., consensus growth or consensus P/E) for a single equity security and that of the relevant industry. Moreover, for some clients, FISPs provide earnings estimates and recommendations on an analyst-by-analyst basis. An advantage of the availability of analyst-level estimates and recommendations is that a client may view the components of the mean estimate or recommendation by analyst. Various drawbacks exist, however, with these approaches and other known techniques.

For example, prior approaches include a software program that displays all current estimates. For a particular fiscal period, for a particular security, the software provides the ability to simply "include" or "exclude" each estimate or recommendation from the mean. This is problematic for several reasons. First, commercially available databases of estimates and recommendations contain "current" data on thousands of stocks. Each stock may have estimates from 1 to 70 or more analysts. In addition, each analyst may provide estimates for one or more periods. The data may be updated throughout the day. Manually dealing with this volume of information may be time consuming and tedious.

A second drawback is that with current techniques, if an individual were inclined to determine which estimates (or recommendations) should get more weight, and which estimates should get less or no weight, the large volume of analysts makes it extremely difficult to determine which analysts provide more useful information than others. Current techniques lack sufficient ability to intelligently measure historical analyst performance and beneficially use such measurements.

A third drawback is that while it is possible to imagine various weighting systems or algorithms, it is difficult to effectively implement or test them. Current systems do not provide the ability to effectively devise new estimate (or recommendation) weighting algorithms; nor do they provide the ability to easily test a historical performance.

A fourth drawback with current techniques is that there are limited tools for easily and effectively analyzing historical estimates and recommendations. While the data is available, often times unique code is written to conduct a specific analysis. Changing the analysis often requires rewriting code.

These and other drawbacks exist with existing systems.

SUMMARY OF THE INVENTION

An object of the invention is to overcome these and other drawbacks with existing systems and methods.

Another object of the invention is to provide an improved computer implemented system and methods for use with a database of historical data relating to security analyst earnings estimates or other predictions.

Another object of the invention is to include within such a system and methods, a history view module to enable users to view the historical data for a given security either: i) as a time series of earnings estimates and revisions for each analyst selected, for a selected period of time, for a selected earnings event; or ii) in a "snapshot" view with calculated metrics as of a given date.

Another object of the invention is to provide a computer implemented system and methods to enable a user to custom define a model that can be applied to current estimates from a plurality of selected sources to generate an enhanced composite estimate, and to enable a user to manage, backtest and view results of such models.

Another object of the invention is to provide a computer implemented system and methods that enable a user to view, measure and analyze the past performance for a particular contributor (e.g., a broker, an analyst or a broker/analyst pair), or for a given security the various contributors that have qualifying estimates. Other views may also be available.

These and other objects of the invention are accomplished according to various embodiments and aspects of the invention, as described below. The various features and functions of the invention may be used alone or in combination to form a system and method for managing, viewing and analyzing historical security analyst data, and generating enhanced composite estimates to better predict future earnings, stock-price performance, or other events.

According to one embodiment, the invention uses a modular design, including one or more of the following modules: Contributors, Stocks, Models, History, and Performance. Other modules may also be used. Under the Contributors module, the user may select an analyst, broker, security, and other categories and view relationships there between. Under the Stocks module, the user may define stock filters and group stocks into stock sets. The stock sets may be used, for example, to facilitate testing and use of user-defined models, and for other purposes. Under the Models module, the user may create, manage and edit models, backtest the models against the historical database, view results of the backtest and perform other functions. Under the History module, historical estimate and actual data may be viewed in chart or in grid format. For example, a chart view may display estimates and actual data graphically and allow for visually backtesting models and analyst performance. The snapshot view displays detailed data in tabular format for a selected "As Of Date." Other historical data and formats may also be used. Under the Performance module, the user may create and display metrics for analyzing analyst performance, analyst and/or broker accuracy reports, aggregated by analyst, broker, ticker, any combination thereof, or in other aggregations. In each of the above identified modules, other options may be available to the user.

According to one aspect of the invention, a software tool and methods are provided (e.g., a graphical user interface (GUI)) to enable a user to easily view historical data relating to earnings estimates (and other information) from a plurality of sources (e.g., analysts). The historical data is stored in a database and is commercially available from one or more vendors such as First Call, IBES, etc. The invention also calculates and selectively displays daily summary-level statistics such as Calculated Low, Calculated Mean, Calculated High, and Number of Analysts. The software tool preferably includes a graphical user interface that enables the historical data to be presented in the form of a chart, a graph, or other format.

The graphical view preferably comprises a time series view (e.g. estimate values on the y-axis, time on the x-axis) of each selected analyst's estimates and revisions for a selected security, and earnings event over a selected period. Other information may be simultaneously displayed, such as actual reported earnings.

Sources of estimates (or other predictions) may include analysts, brokers, analyst broker pairs and other sources. The software may also treat the high estimate, low estimate, consensus estimate, enhanced composite estimates (detailed below) and other calculated or derived values as sources, and enable a user to selectively show each as a time series display. Preferably, a user control portion of the GUI enables a user to selectively cause the display to show or hide the time series for any one or more or all sources, by selecting and deselecting individual sources, or through a select all or deselect all feature. Other features and options may also be available to the user. Through the display, the user may simultaneously view a time series of earnings estimates and revisions for one or more selected sources for a selected security, for a selected earnings events.

According to another aspect of the invention, a stock price time series may be juxtaposed with or overlaid on the selected sources time series. This is particularly useful to see if there is a correlation between one or more analysts' estimates or revisions, as displayed in a time series, and stock price movement. Other stock performance metrics, such as normalization, may also be compared.

Another feature of the display is a user selected "As-of Date" which may be displayed as a vertical bar, for example. The user may view historical data as of a user selected date and simultaneously display summary estimate data and other information as of that date. Summary estimate data may comprise, for example, data derived from a distribution of estimates and enhanced composite estimates. The user may select the snapshot view to view detailed information for each activated analyst as of the selected date.

Another aspect of the invention enables individuals to create models that give more weight to analyst predictions that are more likely to be accurate and less weight to those less likely to be accurate. When the models are applied to current estimates, the present invention produces earning estimates that may more accurately predict earnings than a consensus estimate (or other estimate), depending on the accuracy of the model created. The present invention enables the user to develop, test and refine models by comparing the estimates of the models with the historical estimate data.

According to another embodiment of the present invention, a Model module enables users to create, backtest, and manage a model. Other functions are also available. The model may comprise user defined rules that are applied to selected data for a plurality of contributors to create an enhanced composite prediction. The user may specify certain rules or factors by which to exclude one or more data items, contributors, or other criteria. In addition, the user may assign weights to various factors involved in contributors' predictions to obtain an enhanced composite.

A user may create a model by identifying various factors to be taken into account in the model. For each factor, a user specifies rules by which each non-excluded analyst is assigned an N-score (normalized). Such factors may include, for example, accuracy, All Star (or other) rating, broker list, experience, estimate age, and other factors. Each factor is assigned a weight to enable a user to place greater emphasis on one or more factors for a given model. For each model, the analyst's N-score for each factor is multiplied by the factor weight and those weighted N-scores are summed for each analyst. The actual emphasis placed on an analyst's current estimate is determined by taking the sum of the analyst's weighted factor scores divided by the sum of the weighted factor scores for all analysts.

The user may specify certain exclusion factors. For example, exclusion factors may include excluding estimates that are older than a particular number of days and estimates that are more than a user specified number of standard deviations from the mean. In addition, an exclusion may be specified for estimates older than a user-specified amount of time before or after a company's last earnings report date. Exclusion factors can exclude an entire group or class of estimates from being considered, such as all estimates that are older than 100 days.

The present invention enables the user to view, in a single display screen, current analyst data commingled with analyst performance data and attributes, values and elements of models on an analyst-by-analyst basis. For example, the snapshot view details analyst estimate data, such as the current estimate, the current estimate date, the age of the estimate in days, the previous estimate, the date of the previous estimate, the change between the two most recent estimates, and other data. The user may readily compare the current analyst data for each analyst for a given stock and simultaneously view values and elements that comprise a selected model, such as factors, N-scores, exclusions, weights, and other elements.

Through these and other tools, the user may intelligently develop models that more accurately predict estimates by viewing and analyzing the components of a model. For example, a user may determine where particular groupings of estimate revisions (e.g., a cluster) exist and more intelligently create accurate models taking clusters into account. The present invention enables a user to easily compare actual current estimates with enhanced composite estimates that are a result of a model. Various algorithms for comparing these values may be used and various alerts may be issued when the difference satisfies user specified criteria.

The present invention enables the user to view a model as a "clear box", as opposed to a "black box". In other words, the user may easily view factors, N-scores, factor weights and other information that comprise a model. For example, by viewing the specific weights and N-scores, along with other information, the user may readily determine why an enhanced composite deviates from a consensus estimate. Specific detailed numerical values relating to analysts performance and attributes are also provided to the user for comparing, sorting, and ranking. Through the snapshot view, the user may view detailed analyst estimate data, including historical and current data, that informs the user what factors, weights, and N-scores comprise a model. The ability to analyze models on a detailed level enables the user to identify important factors, values, and trends to develop more accurate models.

Another aspect of the invention includes a Performance module to further assist the user in developing more accurate models. The Performance module also enables the user to measure and compare analysts' performance, in absolute terms and relative to other analysts, sources or other data in estimating stock earnings. This feature is useful for determining how well analysts in a particular brokerage are doing, or which analyst has the best performance for a particular ticker. For example, information regarding a particular stock and multiple contributors; one particular contributor and multiple stocks; and a unique contributor-stock pair may be displayed. This enables a business model that provides the ability to rank analysts based on user-selected objective criteria.

In displaying a particular stock and multiple contributors, each contributor who made an estimate in the selected fiscal period or periods for a selected security may be displayed. Summary performance metrics; aggregate performance metrics; and other information may be displayed for each contributor. Further, a portion of the display may display period-by-period performance for a selected security for each period in the selected fiscal periods. The user may also elect to filter the displayed list of contributors who made an estimate in the selected fiscal period or periods to those contributors who have a current estimate, so that either all contributors, only current contributors or some other group may be shown.

In displaying a particular contributor and multiple stocks, each security for which that contributor has made an estimate for a selected contributor, in a selected fiscal year may be shown. Further, aggregate performance metrics may be displayed for the selected contributor and each displayed security. The aggregate performance metrics may be displayed for a selected time frame and aggregated over each period in the selected period. In addition, a portion of the display may display period-by-period performance for the selected contributor, for one or more securities for each period in the selected fiscal periods.

In displaying a unique contributor-security pair, the user may select a contributor-security pair where period-by-period performance metrics for each period in the selected fiscal periods may be shown.

The present invention provides a graphical environment for quantitative researchers and other entities, to create, investigate, backtest and apply models to create more valuable estimates. Individuals, such as portfolio managers, may easily apply these models to assist with stock selection strategies and measure the performance of analysts. The present invention also provides research departments, for example, regular and objective reports on the performance of individual analysts compared to other analysts following the same stocks (or other benchmarks), as well as the performance of the research department as a whole. Individual investors may also receive information generated by models (e.g., enhanced composite estimates) through a web-site implementation of the present invention, through internet finance portals, and other portals. Additionally, subscribers may receive information alerts, e.g., when an enhanced composite estimate changes, when it differs from the consensus estimate by certain user specified or other criteria or at other times. Various other business methods may be implemented using the technology described herein.

The present invention provides an efficient system and method for monitoring analyst's estimates, reviewing past performance, and viewing estimate trends. In addition, the present invention provides a system and method for predicting earnings surprises through objectively measuring analyst estimates.

The present invention may measure each analyst based on the accuracy of earnings predictions. The present invention implements a Relative Accuracy Score ("RAS") to measure earnings estimate accuracy over a selected time period where analysts are compared against other analysts. RAS calculations take into account the absolute accuracy of the individual analyst, the accuracy relative to other analysts, the variance among the analysts, and the time horizon until the actual earnings announcement. Rather than taking the simple average of performance across all time periods, the present invention implements an algorithm that accounts for the length of time a stock was covered during a predetermined period (e.g., quarter or year) and the number of stocks covered as well as other factors and considerations for obtaining comprehensive and representative relative accuracy scores.

RAS values may be calculated as a fraction where the numerator gives the basis for comparison and the denominator dictates the scaling of the numerator value. The numerator may be a measure of an analyst's absolute error compared to the average absolute error among all analysts providing estimates for the stock on a given day. The denominator may be a function of a number of values of which one may be chosen. For example, the largest (or maximum) value may be selected as the denominator. There may be instances where one or more possible denominator values may be inappropriate because the values are too small to scale the scores meaningfully. According to an embodiment of the present invention, possible denominators may include standard deviation, average absolute error, constant multiplied by an actual amount, and a predetermined constant.

The present invention assigns a relative accuracy rating to analysts. Accuracy ratings are a visual method of representing relative analyst performance. For example, different ranges of scores may be assigned corresponding symbols or other indicators of relative accuracy. According to one example, a higher number of symbols may signify high accuracy. Thus, symbols or other identifiers may be assigned to a score that falls within a defined range to indicate varying degrees of accuracy and overall performance.

The present invention may provide a mechanism for highlighting and flagging potential issues with estimates. This feature of the present invention provides a method and system for reviewing accuracy of estimates. A user may track estimates by checking for outdated forecasts, view forecasts that significantly vary from the mean, and monitor how estimates compare to other measures, such as high, low and mean estimates.

The present invention enables a user to view current data associated with an analyst. Current data may include stocks covered by an analyst, the analyst's current estimates and recommendations, the analyst's EPS estimates, and other information. "Mine-ders" alerts, which show estimates that are flagged as potentially incorrect or outdated, may also be viewed for a selected analyst. Overall performance on multiple stocks by a particular analyst may be viewable for a selected analyst where analyst's EPS forecast performance across various time periods for stocks covered are highlighted. Firmwide information may also be available. For example, firmwide performance information may display rankings of all analysts across selected time periods and firmwide Mine-ders information may highlight all the potential forecast issues for all analysts in a firm or other entity.

According to another embodiment, the present invention measures the performance of an individual analyst's stock picks to determine a profitability score. Stock picks may be classified into one of several categories, such as Strong Buy, Buy, Hold, Sell, Strong Sell. Simulated portfolios may be compared to the performance of other analysts covering the same stocks or industry. Other variations may exist.

BRIEF DESCRIPTION OF THE DRAWINGS

FIG. 35 is an example of alert summary information according to an embodiment of the present invention.

FIG. 36 is an example of list of alerts triggered on a selected date according to an embodiment of the present invention.

FIG. 37 is an example of a summary of alerts for a selected analyst according to an embodiment of the present invention.

FIG. 38 is an example of current data summary information for a selected analyst according to an embodiment of the present invention.

FIGS. 45*a* and 45*b* are an example of performance data for a firm or other entity according to an embodiment of the present invention.

DETAILED DESCRIPTION OF THE PREFERRED EMBODIMENTS

Figure 1:
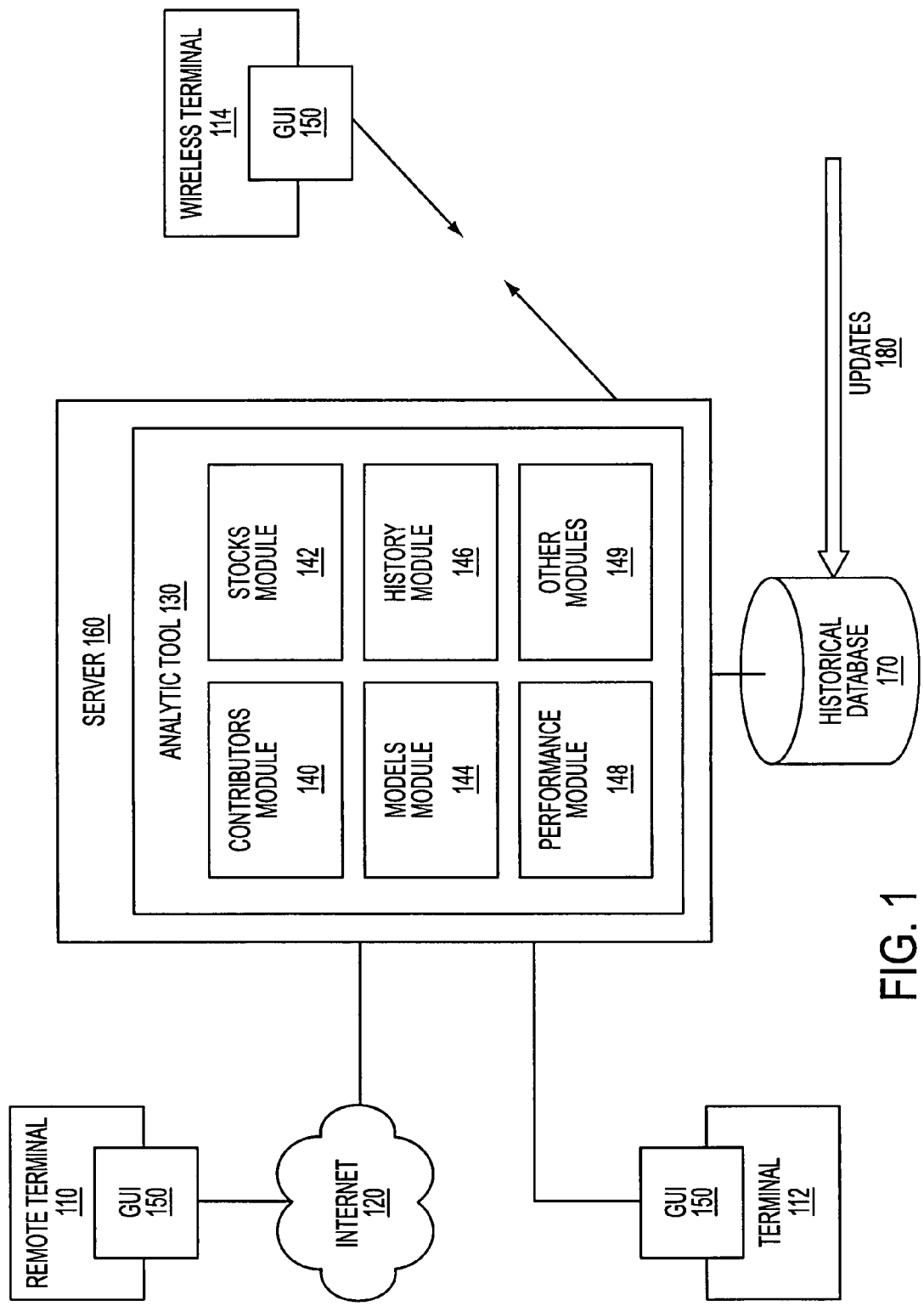
FIG. 1 illustrates a block diagram overview of an embodiment of the present invention.

With reference to FIG. 1, one embodiment of the invention comprises a computer implemented system and method for use with a historical database pertaining to predictions from a plurality of sources. The predictions may include one or more of analysts or broker estimates of earnings for a security, buy/sell/hold recommendations, revised estimates, stock price target estimates, and other predictors. The sources may include security analysts, institutions (e.g., brokerages), combinations thereof, calculations and other sources. For simplicity, in many cases, this specification refers to analysts estimates. It is to be understood that the invention is not so limited.

As shown in FIG. 1, an example of such a system may include at least one historical database 170 operatively connected to server 160. Historical database 170 may receive updates 180 so that the most recent information and estimates are maintained by the system. Historical data relating to predictions from a plurality of sources related to securities (or other items) are stored in database 170. The predictions may include earnings estimates, revisions to such estimates, and other information, along with actual reported earnings. Preferably, server system 160 is programmed with software that implements the various features and functions described herein. In operation, one or more users may access the system through an interface.

By way of example, the server may be a web server and the user interface may comprise a web browser. Other client/server and network configurations may be used. According to one embodiment, the interface comprises a graphical user interface (GUI) 150. Preferably, the GUI may display various modules and functions available to the user. The GUI 150 may be displayed via a terminal 112, such as a PC or other user terminal, networked to the server 160. The user may also access server 160 through GUI 150 displayed on remote terminal 110 via the Internet 120. Also, the user may access server 160 through GUI 150 displayed on wireless terminal 114, such as a wireless phone, PDA, or portable computer.

Analytical tool 130 comprises software that enables the user to perform various functions and features described herein. It enables analysis, use and display of the data in database 170. The analytical tool 130 preferably comprises a processor.

Analytical tool 130 may include Contributors module 140, Stocks module 142, Models module 144, History module 146, Performance module 148 and other modules 149. In another embodiment of the invention, a Lookup module may be used in place of a Contributors module. One or more of the modules can be combined. For some purposes, not all modules are necessary.

Figure 2:
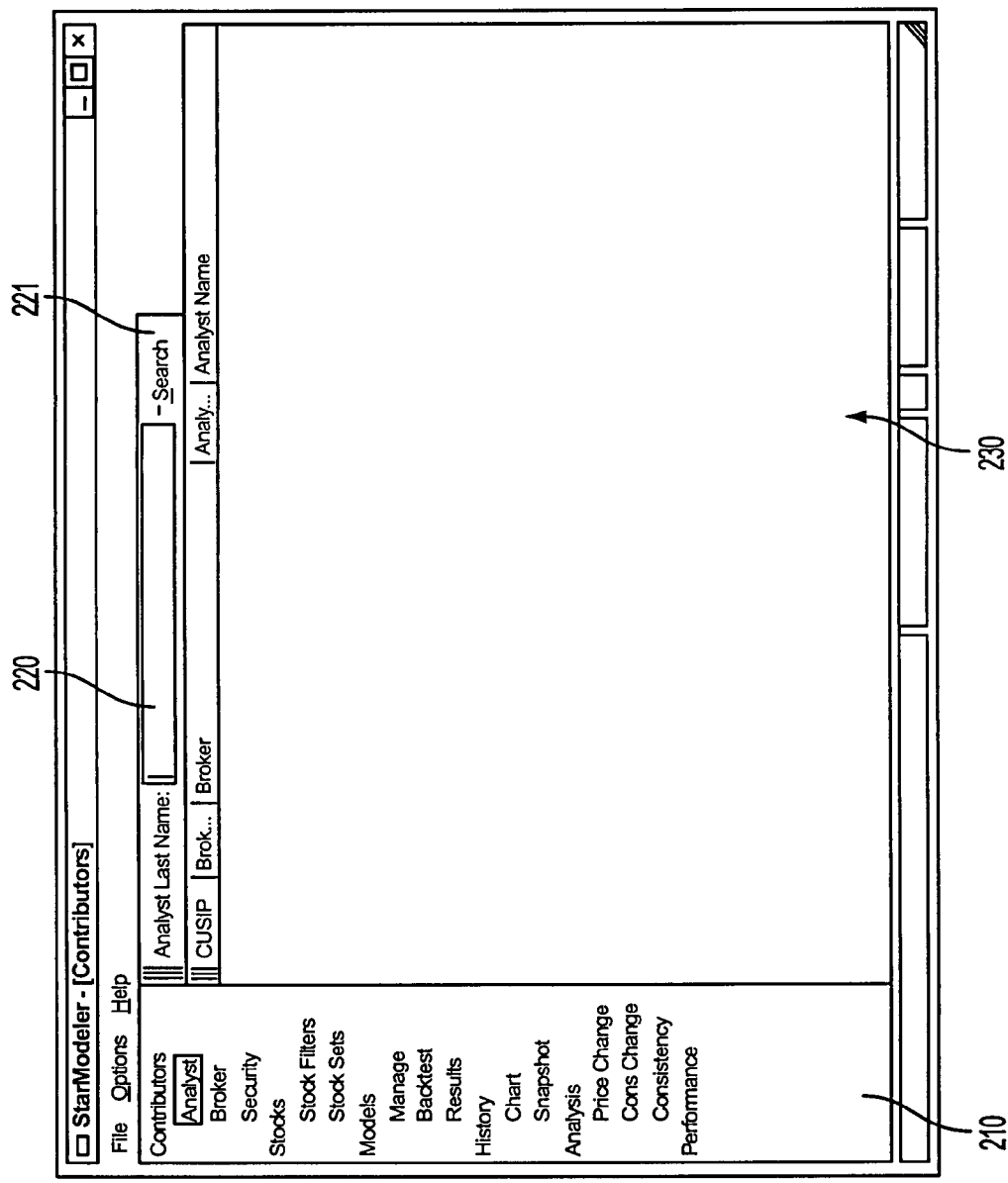
FIG. 2 illustrates an example of a Contributor/Analyst module according to an embodiment of the present invention.

FIG. 2 illustrates an example of a screen display that a user may see in GUI 150 according to one aspect of the invention. The display screen comprises a Navigator pane 210 that provides various options to the user. For example, as shown the options may include the ability for the user to select from among a plurality of modules. Under the Contributors module, the user may select a contributor from one or more of an analyst, broker, security, or other categories.

Under the Stocks module, the user may define stock filters and group stocks into stock sets to facilitate testing of models and for other purposes. Under the Models module, the user may create, manage, edit and perform other functions for models. The models may be used to generate enhanced composite estimates, backtest the model using the historical database, and view results of the backtest.

Under the History module, historical estimate and actual data may be viewed in chart format, snapshot format, or otherwise. For example, according to one embodiment, the chart view displays user selected estimates and actual data (e.g., earnings) graphically as time series data. The snapshot view displays detailed data in tabular format for a selected "As Of Date." Under the Analysis module, the user may analyze estimates according to price change, consensus change, and consistency. Under the Performance module, the user may analyze analyst and/or broker accuracy and performance, aggregated by analyst, broker, ticker, or any combination thereof. In each of the above identified modules, other options may be available to the user.

Under the Contributors module, the user may locate analysts, brokers and stocks and review their associations with each other and for other purposes. The Contributor module may be used to review information about analysts, brokers, and stocks in a general way. For example, a user may select the Contributors/Analyst module in Navigator 210, as shown in FIG. 2. The user may search by analyst and view the stocks covered by that analyst, and the brokerages for which the analyst has worked. The user may enter an Analyst's Name in analyst name bar 220 and select (e.g., click on) the search button 221. Also, when entering an analyst's name, the user may select a search option where the system will search an analyst name that begins with, contains, ends with, or exactly matches the entered string. The user may also use wild cards when searching for analysts. Main Display window 230 will display the results.

Figure 3:
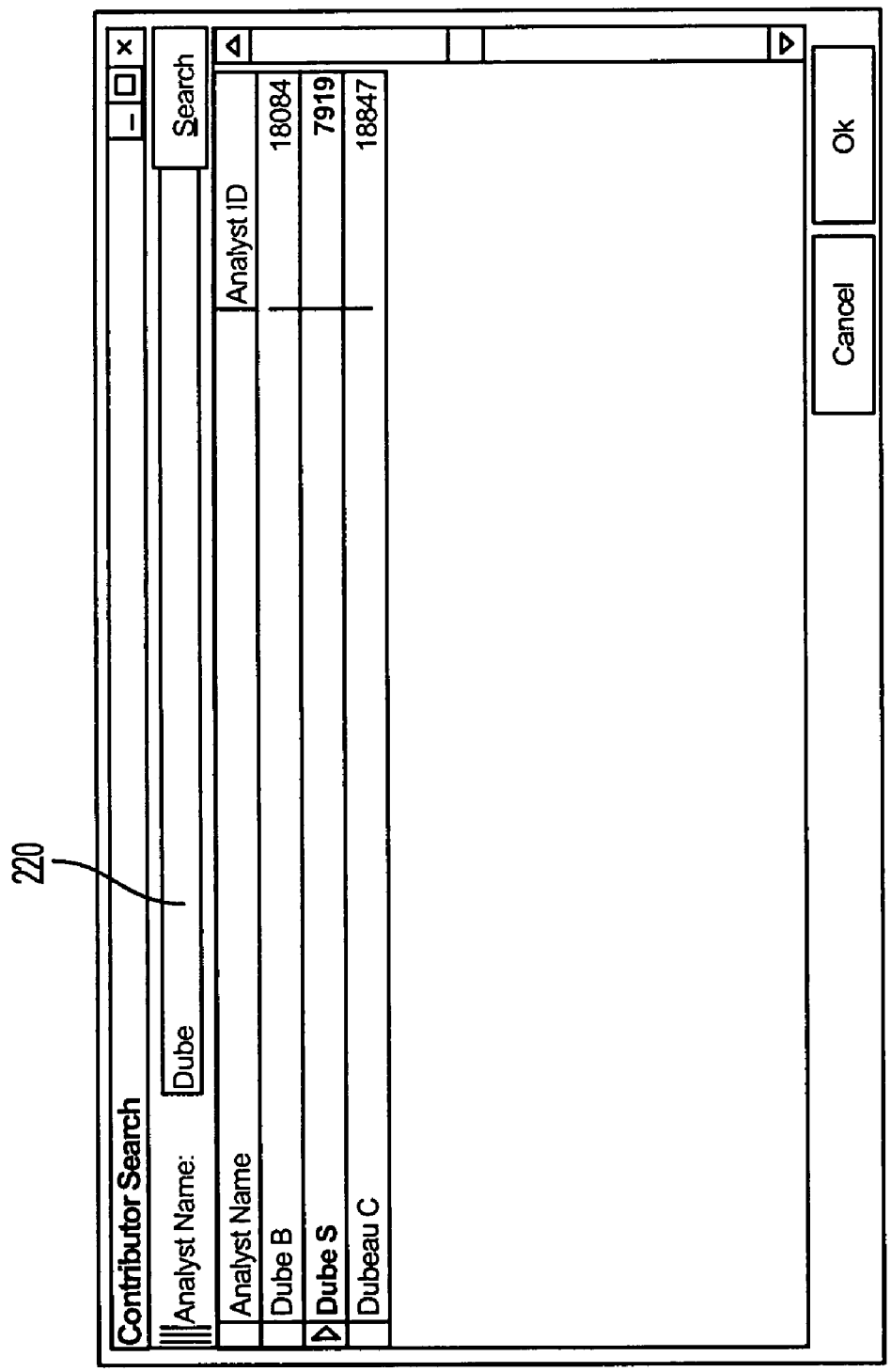
FIG. 3 illustrates an example of a Contributor search screen according to an embodiment of the present invention.

With reference to FIG. 3, for example, if the user enters a name that has more than one match, such as "Dube", preferably all names that correspond to the entered string 220 and their analyst ID will be displayed. The user may then select the desired analyst from the list of matches (e.g., by clicking on the desired analyst).

Figure 4:
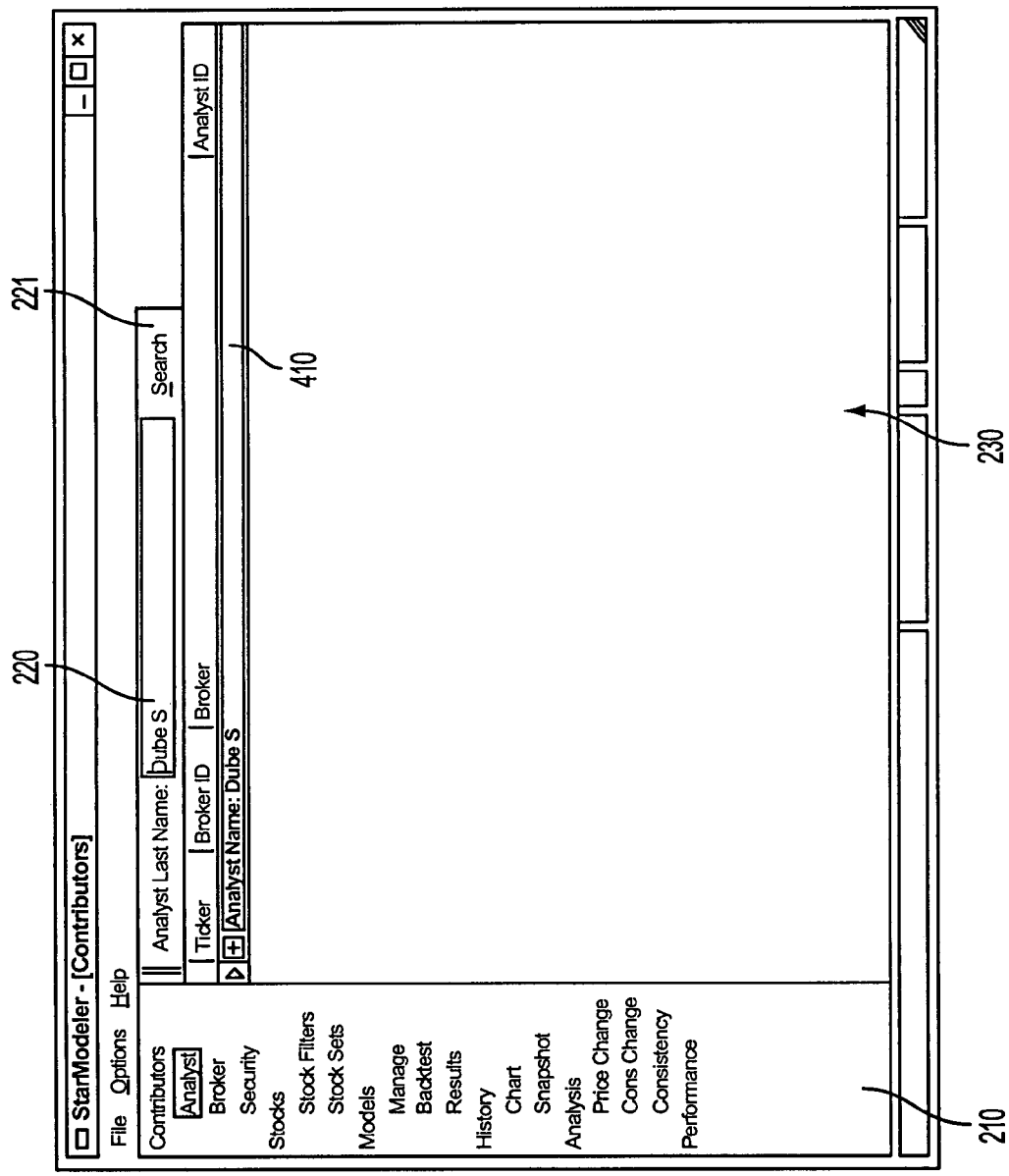
FIG. 4 illustrates another example of a Contributor/Analyst module according to an embodiment of the present invention.
Figure 5:
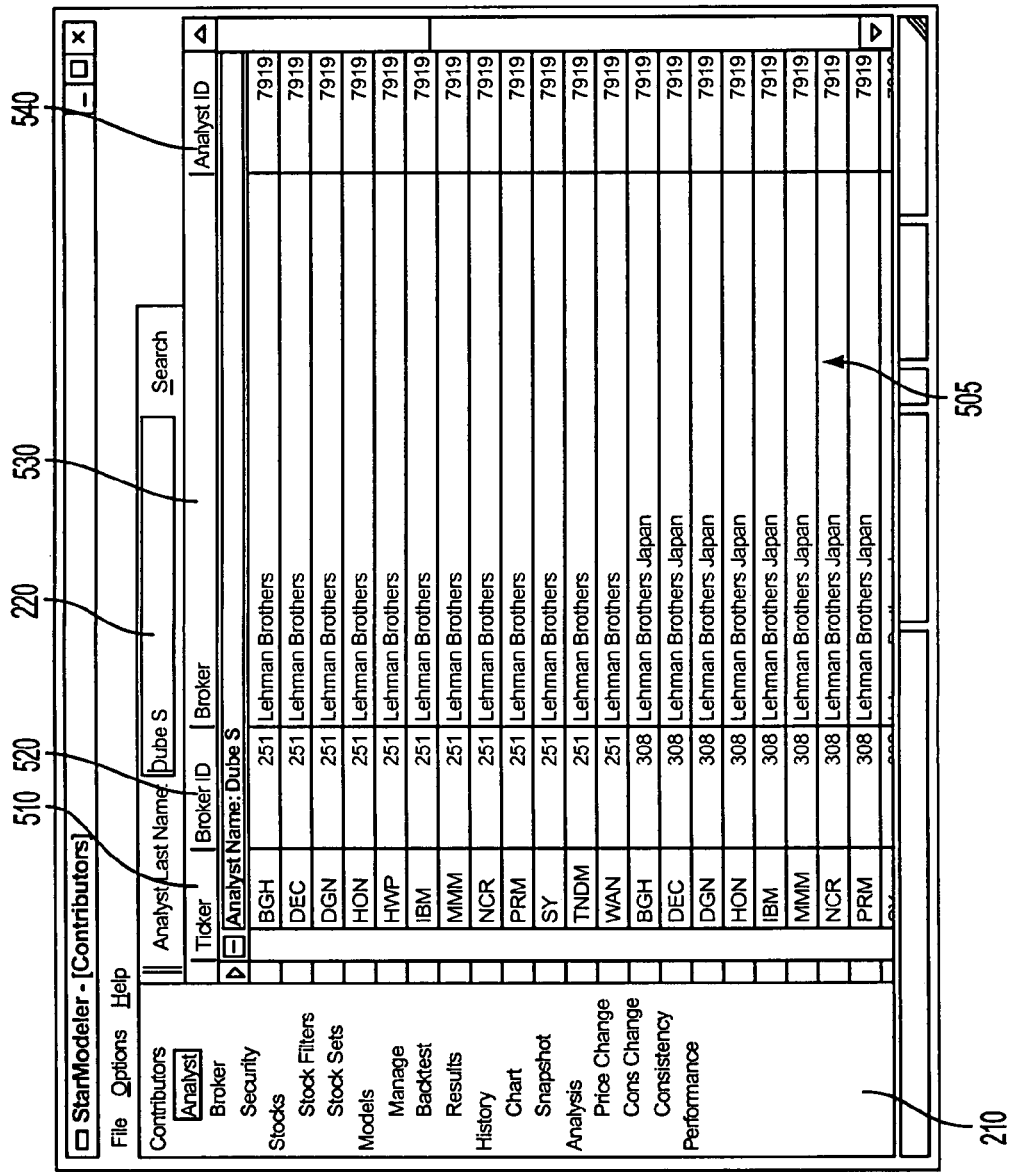
FIG. 5 illustrates an example of results of a Contributor/Analyst module according to an embodiment of the present invention.

As shown in FIG. 4, a resulting grid displays the selected analyst matching the search criteria in Main Display window 230. Clicking the plus-sign button next to the analyst's name in line 410 (or through other selection mechanisms) causes the system to display the analyst's record, as shown in FIG. 5. The grid 505 displays a list of the stocks for which estimates have been created by the selected analyst (in this example "Dube S") and other information. For example, grid 505 may include a list of stocks by Ticker 510, Broker ID 520 and Broker name 530 for brokers with which the analysts is or has been associated when estimates were made, the analyst ID 540, and other desired information. A user can click any column head to sort the table, then click again to reverse-sort. The Contributor/Analyst module thus enables a user to search by analyst and find the stocks and brokers associated with that analyst.

Figure 6:
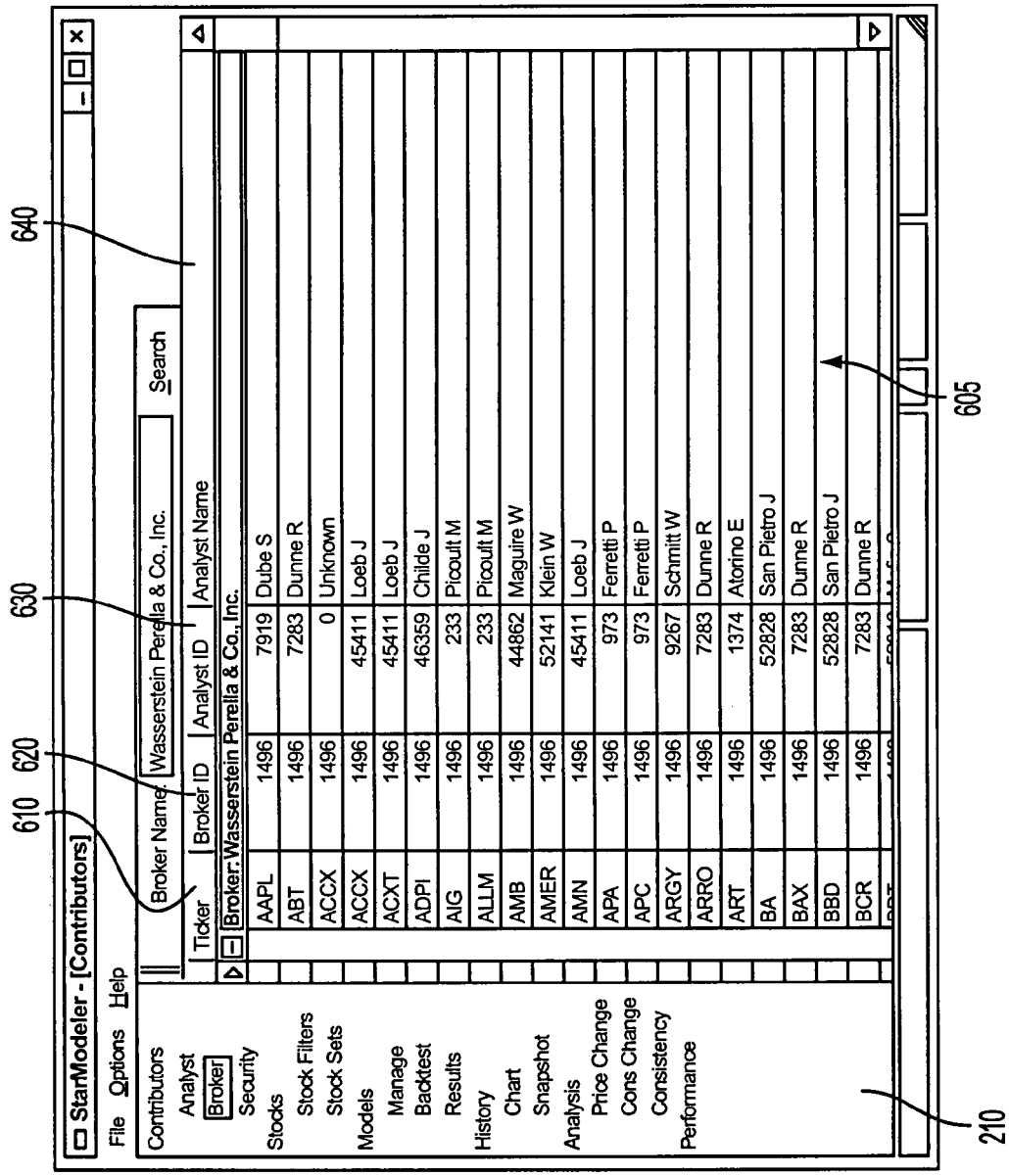
FIG. 6 illustrates an example of a Contributors/Broker module according to an embodiment of the present invention.

Similarly, the user may choose to search by broker. For example, as shown in FIG. 6, a user may select the Contributors/Broker module in Navigator 210, search by broker and view a list of analysts associated with the selected broker, as well as other information, as shown in grid 605. For example, grid 605 may display a list of the stocks for which estimates have been created by the selected broker. The grid includes a list of stocks by Ticker 610, Broker ID 620, Analyst ID 630, analyst name 640, and other desired information. A user can click any column head to sort the table, then click again to reverse-sort. Thus, the Contributor/Broker module enables a user to search by broker and find the stocks and analysts associated with that broker.

Figure 7:
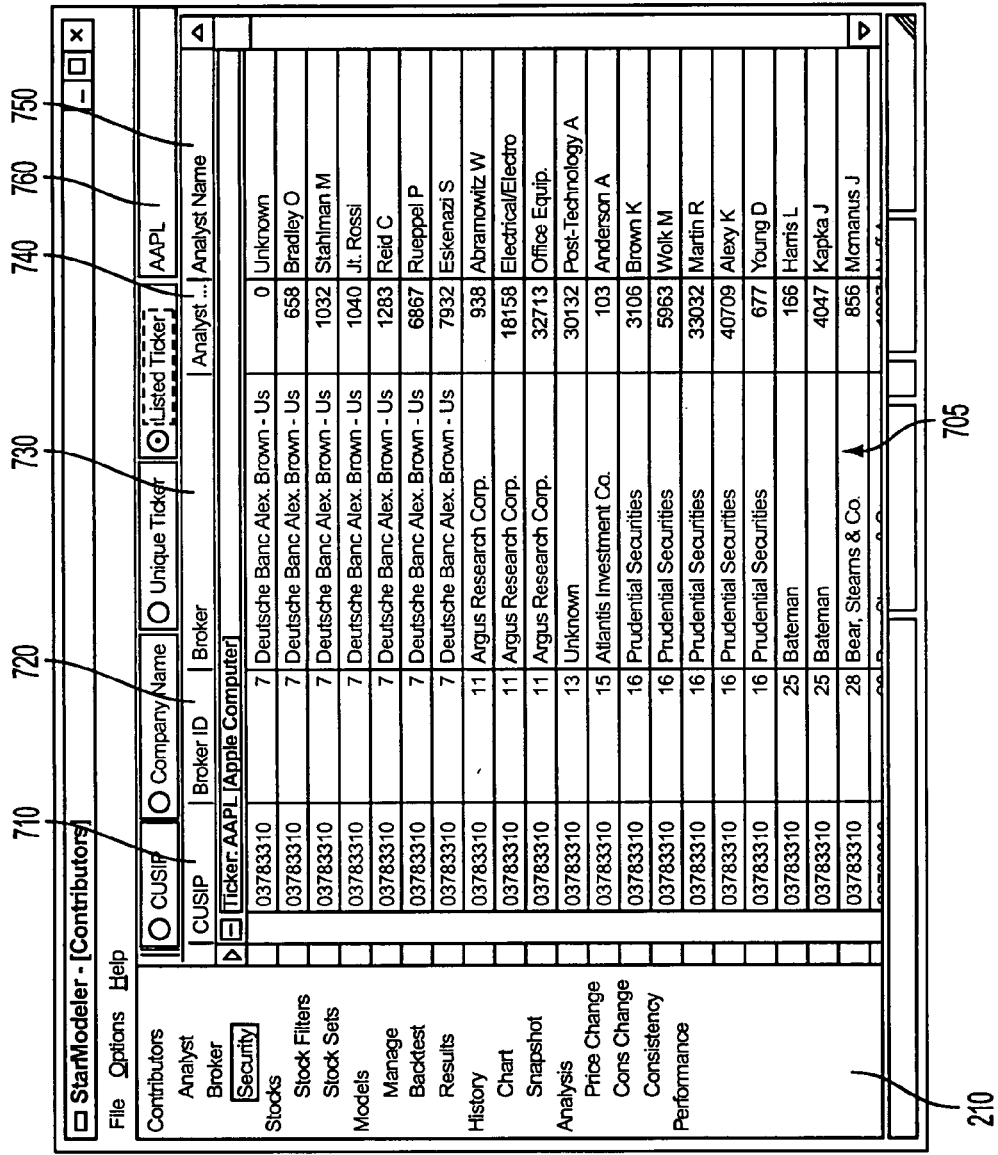
FIG. 7 illustrates an example of a Contributors/Security module according to an embodiment of the present invention.

As shown in FIG. 7, by selecting the Contributors/Security module in Navigator 210, a user can search for a particular security via text box 760. Once a user selects a stock (or other security), a list of the analysts and brokers who have issued estimates for this stock may be displayed along with other information, as shown in gird 705. The search can be done by CUSIP, Company Name, Unique Ticker (e.g., FISP Identification), or Listed Ticker. If a company has changed ticker symbols it is useful to aggregate over a unique ticker. For example, when America OnLine moved from the NASDAQ to the NYSE, its ticker symbol changed. Other modes of searching for a ticker are also available. Clicking the plus-sign button next to the stock (not shown) will cause the system to display estimate details and show a minus sign next to the security. The system will display in grid 705, for example, a list of all analysts and brokers that have made estimates for that stock and other information. For example, the system may display CUSIP number 710, Broker ID 720, Broker Name 730, Analyst ID 740, analyst name 750, and other information.

In another embodiment of the invention, a Lookup Module enables the user to call up analysts, brokers and stocks, and review their associations with each other. For example, when an analyst is selected from a Lookup/Analyst module, the resulting grid displays the analyst's association with brokers, and the stocks for which the analyst has created estimates. When a broker is selected from a Lookup/Broker module, list of stocks estimated by that broker and the analysts who estimated each stock will be displayed. When a stock is selected from a Lookup/Security module, a list of analysts and brokers who have prepared estimates for this stock will be displayed. Also, start date, end date, id numbers, and other information may be available in each view.

Under the Stocks module, the user may create and apply Stock Filters and Stock Sets. A Stock Filter is a set of screening rules specified by a user to identify a group of stocks satisfying the rules. For example, a stock filter may include rules specifying stocks with a market capitalization in the top 500 of all stocks and a PE ratio less than 20. Stock filters may be used to update the list of stocks to be included in an analysis on a periodic basis. A stock set is a group of stocks, determined by a stock filter, manually or otherwise, that is saved under an assigned name. A user creates stock sets by creating a stock set name and adding stocks to it. A user can copy another stock set under a new name, and make changes to the list of stocks. Stock sets are stored on a system server. According to one embodiment, in a multi-user environment, stock sets may be created by an Owner and only accessible to that owner (e.g., a company) or others who are given access to a company's stock sets.

When a user wants to test a model against a group of stocks in the Models/Backtest module, the user calls up the name of the stock set they want to use. The model is tested against all stocks in the set in a single operation.

Figure 8:
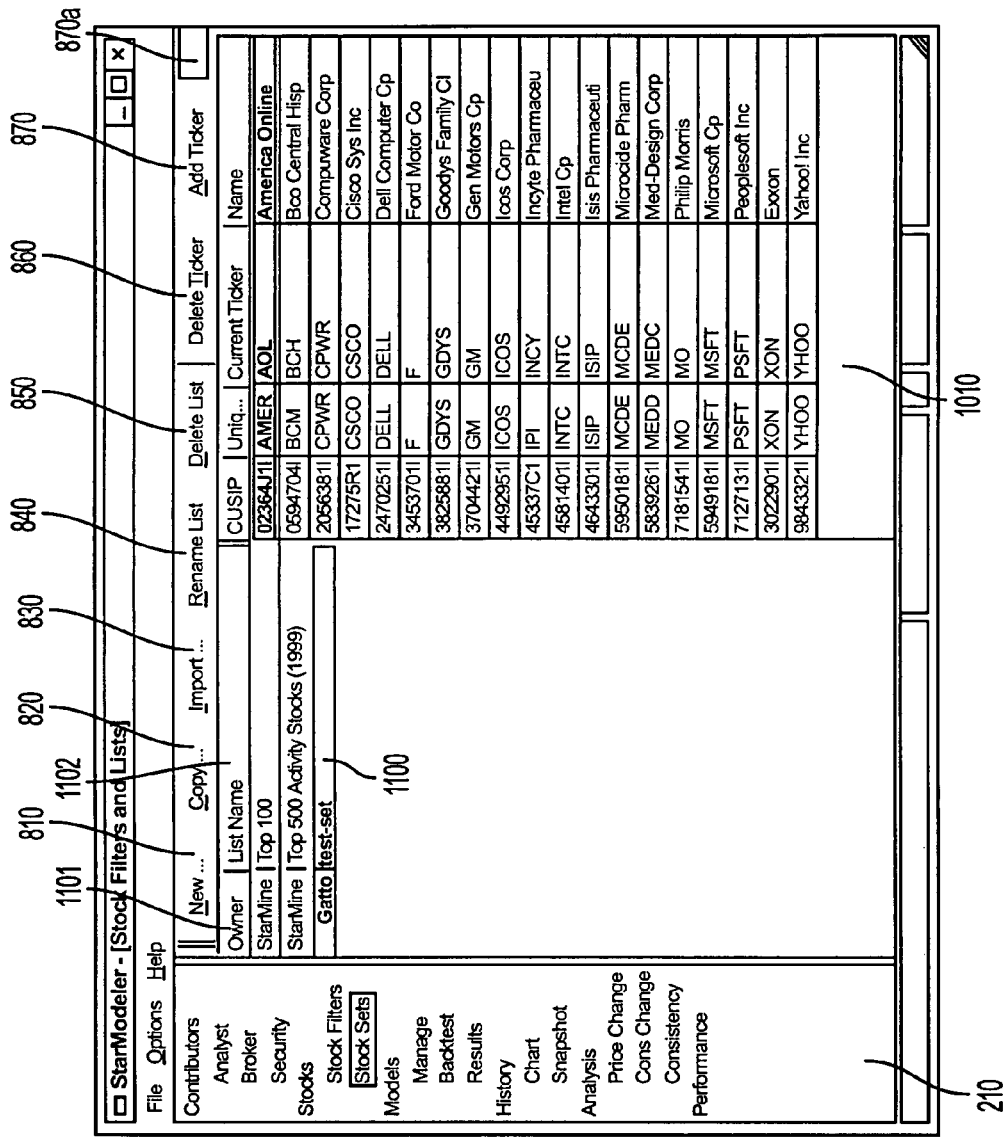
FIG. 8 illustrates an example of a Stocks/Stock Sets module according to an embodiment of the present invention.

FIG. 8 illustrates a screen display illustrating an example of what a user may see when the Stocks/Stock Sets module is selected. A portion of the display may list stock sets by owner names (1101) and stock set names (1102). For example, as shown, all or some stock sets owned by the web-site operator (e.g., Starmine) may be available to all users or certain users. Stock sets created by the user (e.g., Gatto) may also be available. In the example, the user has selected the "test-set" list 1100. This causes the Stock Display window 1010 to display the stocks of stock set "test-set." The displayed information may include, for example, the CUSIP, unique ticker, current ticker, name and other desired information.

Among other things, the Stock Set feature makes it easy for a user to group stocks into "sets" and call up those sets during the backtesting process or for other purposes. Thus, a model can be tested against all the stocks in the set, in one operation.

To create a stock set:

1. From the Navigator 210, a user can select Stocks/Stock Sets.

2. By clicking New 810 on the menu bar, a New Stock Set Name dialog box will appear.

3. By typing the name of the new stock set, the new Stock Set list name will be displayed with the owner's name.

4. With a stock set name selected, the user can type into the text box 870*a* or otherwise add the tickers the user wants to add to the stock set. By clicking Add Ticker 870 after entering a stock name, the added tickers will be displayed in the list shown in Stock Display window 1010. To delete a ticker, the user can select it and click the Delete Ticker 860 button.

The user also has the option to rename a stock set under Rename List 840, copy a stock set under Copy 820, import a list from another source under Import 830, and delete a list under Delete List 850. Other options to customize stock sets and filters are also available.

Figure 9:
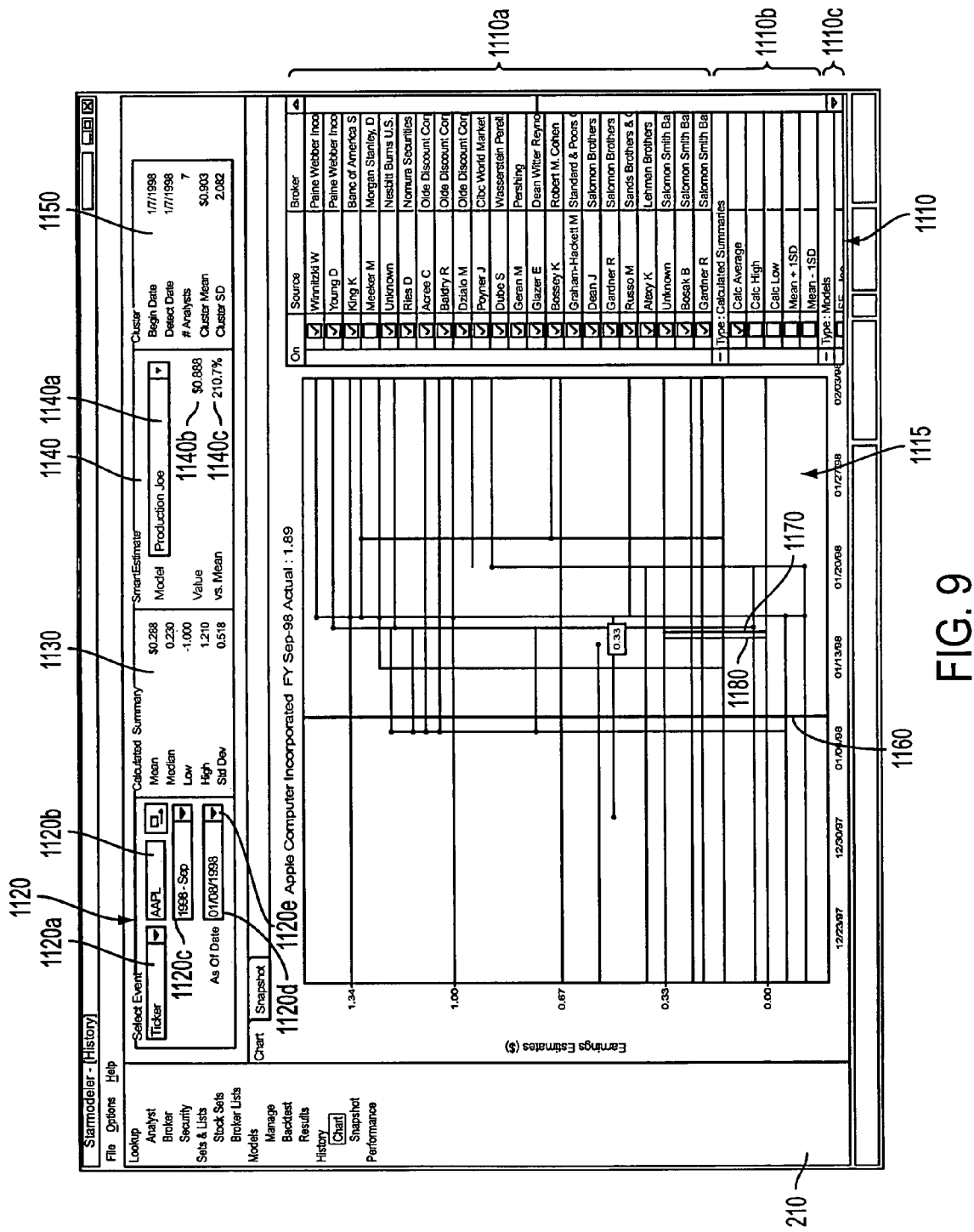
FIGS. 9 and 10 illustrates an example of a historical chart view according to an embodiment of the present invention.

As shown for example in FIG. 9, another aspect of the invention is the History module. The History module includes at least a History/Chart module and a History/Snapshot module. The History/Chart module displays for a selected stock and event, a graphical representation of historical estimates (and other information) as a time series over a selected time period. The History/Snapshot module displays in a grid format details of estimates (and other information) for the selected stock and event for a selected "As Of Date". A user may easily toggle back and forth between chart and snapshot view. In both views, the software provides the user great flexibility in controlling the data to be included in the view, including the analyst or analysts data to be displayed, the calculated or derived values (e.g. high estimate, low estimate, mean), any enhanced composite estimates or other sources. Various other user selections described herein give the user powerful analytic ability.

The History/Chart module displays a graphical representation of the historical performance of a selected security including selected analysts' estimates and revisions, actual reported earnings and other information. When the user selects a stock, an earnings event, an event period (e.g., annual or quarterly) and an event date, estimates and revisions are charted as a time series display, preferably along with the actual reported earnings of the selected stock for the event. The chart enables the user to visually analyze historical data for an event along with different analysts' estimates for an event. It enables a user to graphically identify analyst's whose estimates were close to the actual earnings and, importantly, how soon before the reported earnings an analyst made that estimate. The chart view also allows the user to simultaneously display calculated or derived values for display as a time series. For example, a user can select a model and view estimates generated by applying the model at any point in time prior to the period report date. Thus, a user can visually compare the model estimates to a consensus estimate or other source. The user also may selectively view one or more analysts' estimates simultaneously with one or more of an average, high or low estimate.

Figure 10:
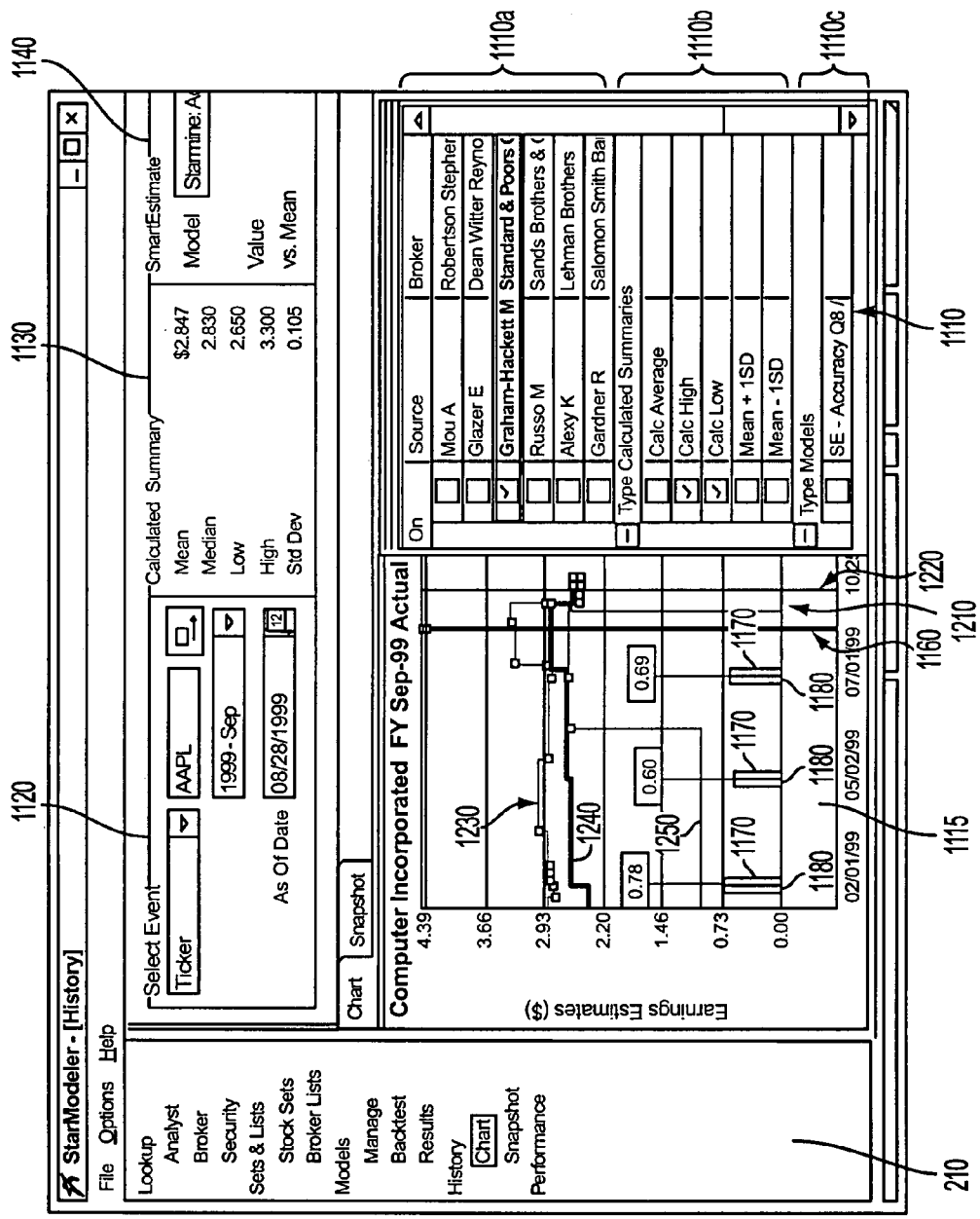
Figure 12:
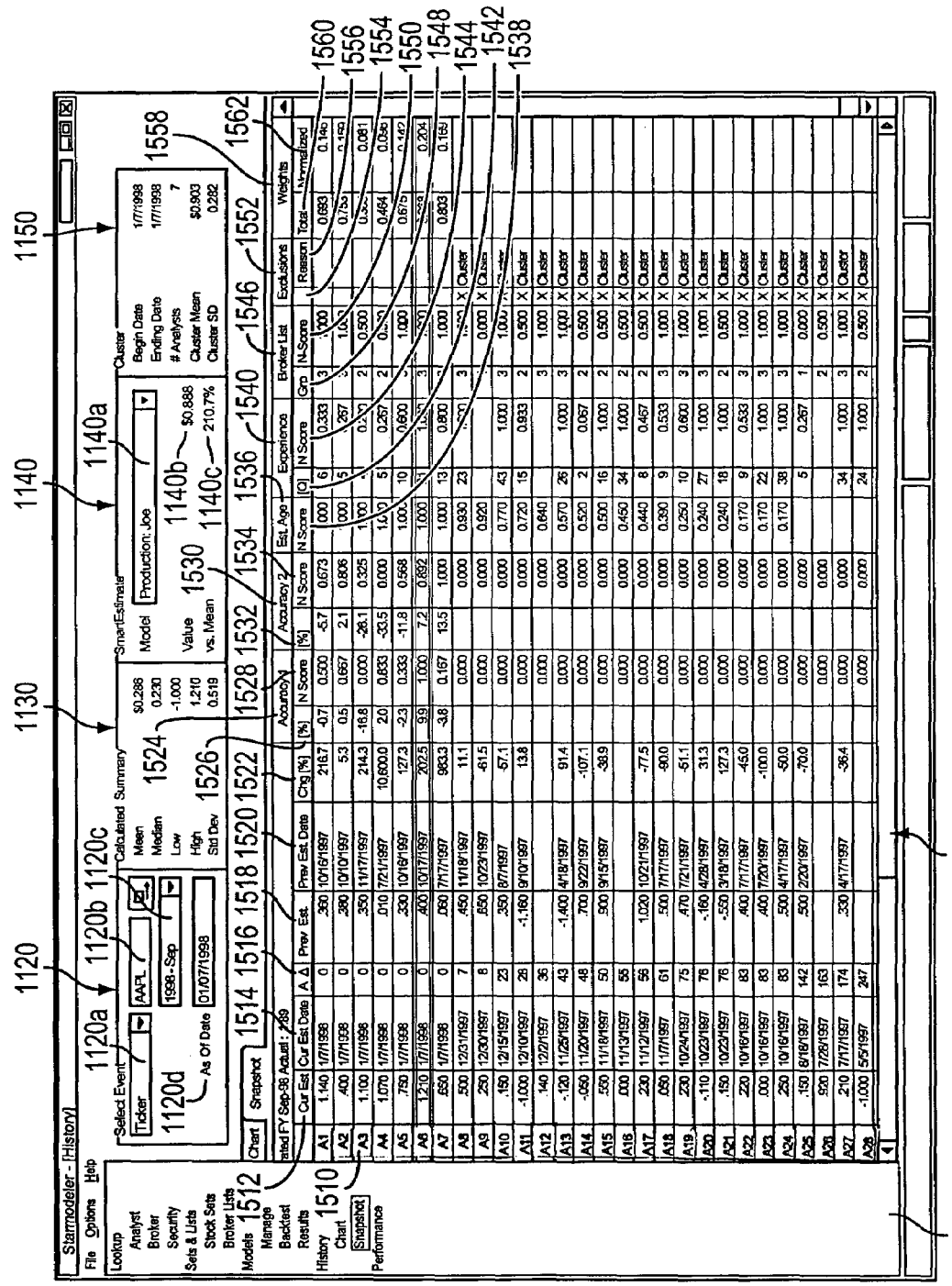
FIG. 12 illustrates an example of a snapshot view according to an embodiment of the present invention.

FIGS. 9 and 10 illustrate examples of History/Chart modules. FIG. 12 illustrates an example of a History/Snapshot module. According to one embodiment, both views may have certain common display elements. For example, both views may include the Navigator 210. Both may also include a Selected Event area 1120, a Calculated Summary area 1130, a Model Selection area 1140, a Cluster area 1150, a Main Display window 1115, and other desired information.

In Select Event area 1120, the user may select a security and earnings event, the security may be selected by Ticker, Unique Ticker (e.g., FISP Identification), Company Name, CUSIP number, or other category using text box/drop down list 1120a. In FIG. 9, the user has chosen to select the security by ticker, for example. In text box 1120b, the user may enter the ticker (or other information to identify the security). In this example, the user has selected Apple Computer by entering AAPL. In box 1120c, the user may select the event period type (e.g., annual or quarterly) and event date (e.g., a year or quarter-ending June-99). In this example, the user has selected the quarter ending September 1998. The user may also select an "As Of Date" at 1120d. As detailed elsewhere herein, calculated and derived values are calculated and displayed as of the "As Of Date".

The user may select the "As Of Date" in various ways. For example, under the Select Event area 1120, the user may click the Calendar icon 1120e to display a Calendar and pick a date by clicking double arrows for years, single arrow for months, and finally a day of the month from the displayed month. Alternatively, the user may manually type a date in the "As Of Date" box 1120d. In the History/Chart module, the user may drag an "As Of Date" bar (e.g., 1160) to a desired date displayed in Main Display window 1115. Bar 1160 graphically indicates the "As Of Date". Also, the user may simply click on the X-axis on the desired date and the "As Of Date" bar 1160 will move to that date. Other ways of changing the "As Of Date" may also be available. In each case, the displayed "As of Date" will be changed to the selected date.

In the example of FIG. 9, the "As Of Date" is Jan. 18, 1998, as shown by vertical bar 1160 and indicated in box 1120d. The "As Of Date" enables the user to specify a specific date for detailed analysis, e.g., the date for which historical information is calculated and displayed in the snapshot view. Summary information as of the "As Of Date" may be calculated and displayed in Calculated Summary area 1130. For example, Calculated Summary area 1130 may display summary information such as the mean estimate, median estimate, low estimate, high estimate, standard deviation, or other calculated or derived information with respect to the estimates, as of the "As Of Date".

In Model Selection area 1140, a user may select a model (created using the Models module described elsewhere herein) which when applied against analyst estimate data, creates an enhanced composite estimate that can be displayed in the chart or snapshot view. This enables a user to analyze, test, and compare the results of the selected model with selected analysts, consensus and other estimates or other information. In Model Selection area 1140, the user may select a model from a model list shown by clicking on a drop down window at 1140a. At 1140b, the value of the selected model's estimate as of the "As of Date" may be shown and the deviation from the mean may be shown at 1140c (e.g., as a %, actual or other difference). Other comparisons and information may be used and displayed to assist the user in analyzing the selected model's estimates and identify the significance of it.

Cluster information may be displayed in Cluster area 1150. As detailed below, a cluster is a group of estimates satisfying user specified criteria. When new information about a company becomes available, some analysts may promptly revise their estimates. A group of such revisions may constitute a cluster. Such revised estimates tend to be more accurate than estimates made before the clusters. Cluster information displayed in Cluster area 1150 may include a begin date, detect date, number of analysts, cluster mean, cluster standard deviation, and other information. Clusters assist users in identifying potentially significant trends and changes in estimates.

Main Display window 1115 may display estimate data in either chart or snapshot format, as selected by the user. Where the user selects a chart format, Source Selection panel 1110 may display a list of sources, or group of sources, which may include analysts, brokers and other potential sources in Source section 1110a, calculated averages, calculated high, calculated low, and other calculated summaries in Calculated Summaries section 1110b, and selected models in Models section 1110c. Other sections may also be available to display other relevant information.

With reference to FIG. 9, for example, once a stock, event and time frame are selected, the selected analyst's estimates and revisions are charted as a time series display along with actual reported earnings for the stock. Other features and options may also be selectively displayed. For example, using Source Selection panel 1110, the user may conveniently select and deselect individual sources, including analysts, calculated or derived summary data (e.g., high, low, and consensus estimate) and enhanced composite estimates generated by one or more models. Thus, the user may simultaneously view a times series of earnings estimates for one or more selected analysts or other sources for a selected security and predetermined earnings event.

From the Source Selection panel 1110, the user can select, in Source section 1110a, a check box of the analyst whose estimate history the user wants to display. For example, the user may click on the check box to activate the source. Preferably, a unique identifier for each analyst or source is used for that source's time series. For example, according to one embodiment, each check box in source selection panel has a semi-unique color and a line the same color as the check box area appears on the chart, showing the analyst's estimate history for that stock. The user can select/deselect as many analysts as the user want individually, or as a group. To select all analysts, or to deselect them, the user may right-click anywhere in the Analyst list and use a Show/Hide command that enables a user to show all or hide all analysts.

The user can select a calculated estimate, for example, to compare an analyst's estimate record with the consensus or other calculated estimate, in Calculated Summaries section 1110b. For example, the user may compare analysts' estimates with a calculated average, a calculated high, a calculated low, a mean plus standard deviation, a mean minus standard deviation, and other calculated estimates.

The time series is generally displayed as a step function comprising a plurality of nodes, data points or data markers, connected by horizontal lines. The nodes, data points or data markers represent start dates, revision dates, or end dates. The selection of a node (e.g., by clicking on it) may cause a display of data associated with that node, data point, or data marker, including one or more of the sources, the value of the estimate corresponding to that node, data point or data marker and other information. Discontinuities in a time series may be graphically displayed.

A discontinuity may occur if an analyst stops covering a security then restarts. The discontinuities may be displayed as a gray mark, for example, in the time series. To facilitate reading and interpreting the graph, each source's earnings estimate may be displayed in different colors (or other designator, such as symbols, different line type or line width, etc.) and a legend to correlate the various time series to the corresponding source.

When two or more time series are displayed (e.g., a contributor's time series and a calculated estimate time series) the present invention may provide a mechanism to ensure the visibility of both when for a given time period the numbers are the same value. For example, the graphical interface user may display one of the time series (e.g., consensus) as a thicker line than the other, where the thicker line is in the background and the thinner line is in the foreground. In this way, even if the values are the same for a given time period, both lines will be visible. Additionally, a selected source's time series may be displayed as a thicker line to easily focus on that source's time series. In the example of FIG. 9, calculated average is shown as a thicker line thereby indicating that this feature was selected.

Various display control features may be provided to enable a user to control the display in Main Display window 1115. For example, the user may select from various viewing options by right clicking in the chart view. For example, the user may use the right click option to select a different time frame in Main Display window 1115. The user may display data corresponding to selected time intervals before the report date in increments of one month to two years, or Maximum for the longest available time frame. For example, Vertical Max view displays the widest discrepancies of the lines on the y-axis. The chart will then redraw the Main Display window 1115 to display the time period the user selected. The right click option may also provide Get High Analyst and Get Low Analyst options. The user may view an Analyst Name, Broker Name, Estimate Date, Estimate Value, and other information regarding the high analyst and low analyst. The user may also select to view the mean on the report date as well as the mean value. Other options include the ability to export the history to a file, save the chart to a clipboard, print the chart, and other options. The user may also select to view a corresponding price chart that may appear as a separate chart directly below and time correlated to the chart view of estimate data, as discussed in greater detail below in FIG. 11. The options available through the right click mouse button may also be made available through other selection means.

The user also has the ability to narrow in on a section of Main Display window 1115. For example, the user may box a portion of the Main Display window 1115 (e.g., by holding down the left mouse button to draw a box around an area) to view estimate data in greater detail in chart format. This feature is useful when estimate data from different sources are displayed closely together so that it becomes difficult to differentiate the estimates in chart format.

Additionally, other information may also be displayed, such as actual reported earnings, which may be shown through vertical Earnings bar 1170 on the corresponding dates the earnings were reported. Previously reported earnings may also be shown as a vertical bar indicating the actual reported earnings. Mean estimate bar 1180 indicates the mean value of the previously reported earnings on the report date. The value of the bar may be shown above the Earnings bar 1170 and/or Mean bar 1180.

FIG. 10 illustrates a chart view of an identified analyst compared to a calculated high and calculated low. In this example, analyst Graham-Hackett M has been selected as indicated by the checked box in Source section 1110a to display this analyst's estimates for AAPL stock, as shown in Select Event area 1120. FIG. 10 displays a calculated high shown by line 1230, a calculated low shown by line 1250, and estimates provided by the identified analyst, shown by line 1240. In this example, the user may visually compare Graham-Hackett's estimates with the actual reported amount as indicated by Actual bar 1210. A Period bar 1220 may be displayed as a thinner line or other indicator. The Period bar 1220 signifies the end of a period. In this example, the position of the Period bar 1220 indicates that the period for that quarter has ended just after the actual earning was calculated, as shown by the Actual bar 1210. Earnings bars 1170 indicate previous reported earnings for each quarter. When the height of Mean bars 1180 are compared to the height of Earnings bars 1170, the user may easily see that the mean values were slightly lower than the actual earnings in this particular window of time. The "As Of Date" bar 1160 indicates a date of Aug. 28, 1999. The Calculated Summary data in area 1130 along with the Value, vs. Mean in area 1140, and Cluster information (not shown) are displayed to the user where these values are current as of the "As Of Date".

Figure 11:
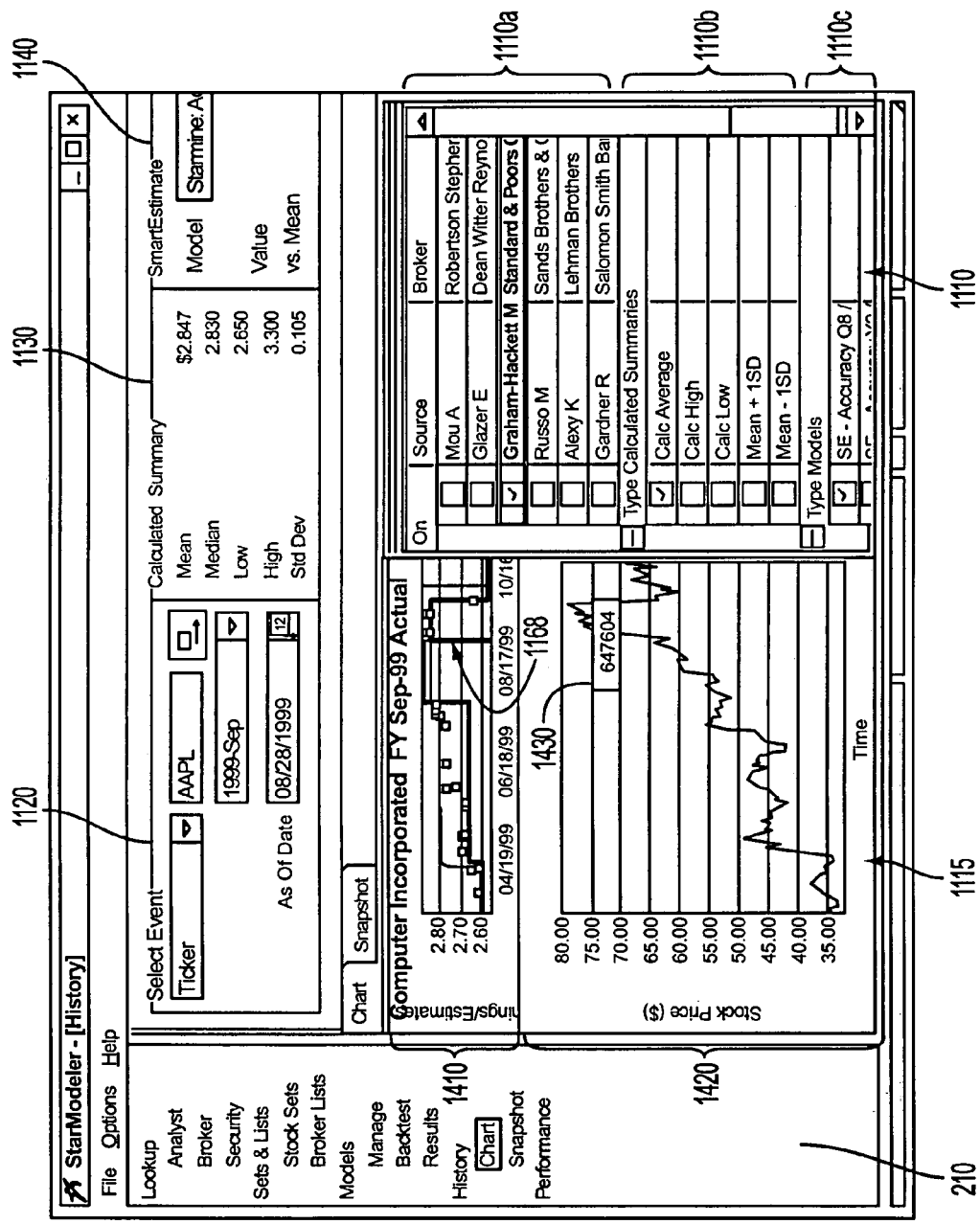
FIG. 11 illustrates an example of a Price Chart view according to an embodiment of the present invention.

FIG. 11 illustrates a Price Chart option that may be invoked through a right click option or other selection means. FIG. 11 illustrates that a time series display of the price of the security in juxtaposition with the time series of earning estimates for the security. This is particularly useful to see if there is any correlation between estimates and revisions thereto, and stock price movement. By selecting the Price Chart option, estimate data displayed in chart format is displayed in Chart window 1410 and the corresponding stock prices are displayed in Price Chart 1420, in Main Display window 1115. The user may drag the Chart window 1410 by holding down the right mouse button (or other dragging mechanism) to view estimates of other time frames thereby changing the times series view. The stock prices shown in Price Chart 1420 correspond to the time series estimates in Chart window 1410. Thus, as the user drags the Chart window 1410 to change the time frame, the stock prices displayed in Price Chart 1420 accordingly follow the user's change in time frame. In addition, the stock price for the "As Of Date" may be displayed in Stock Price box 1430 in Price Chart 1420. When the user selects a new "As Of Date", the stock price of the new "As Of Date" will be displayed in Stock Price box 1430.

FIG. 12 illustrates an example of a snapshot view. In contrast to the chart view which provides a time series view, the snapshot view enables the user to focus on a single date (the "As Of Date"). For that date, the user may view various data, metrics, and other information associated with the estimates current on that date.

The snapshot view is a powerful tool that provides significant detail for a given date in one view. Among other things, the view provides a clear breakdown of estimate data, source performance and attribute information and other information on an analyst by analyst basis. Detailed data regarding various factors e.g., factors used to calculate weights assigned to each analyst's estimate may also be displayed on a factor by factor basis.

For example, FIG. 12 shows a display wherein a snapshot view shows source, current data, historical data, factor-related data and other information. Under source column 1510, analyst information may be displayed as represented by A1–A28, which may include analyst's name, broker information and other source information. The snapshot view may also show current and historical estimate data as well as other information. For example, under current estimate data, the snapshot view may show current estimates column 1512, current estimate date column 1514, estimate age column 1516 and other current estimate data. Historical estimate data may also be displayed including previous estimate column 1518, previous estimate date column 1520, change from last estimate to current column 1522 and other historical information.

The snapshot view simultaneously displays performance, attribute data, exclusion data and factor weights on a source by source basis. For example, performance data may be provided under Accuracy 1 column 1524, Accuracy 2 column 1530, Estimate Age column 1536, and other forms of performance data. Under each performance column, the actual score attributed to that performance as well as an N-score may be displayed. For example, under Accuracy 1 column 1524, the percentage of accuracy is displayed in column 1526 and an N-score is displayed in column 1528. In another example, under Accuracy 2 column 1530, the percentage of accuracy is displayed in column 1532 and an N-score is displayed in column 1534. In another example, under Estimate Age column 1536, the N-score assigned by user-defined criteria may be displayed in column 1538.

Attribute data may be provided under Experience column 1540, Broker List column 1546, and other types of attribute data. Under each attribute data, attribute information and an N-score may be displayed. For example, under Experience column 1540, the number of periods (e.g., quarters) an analyst has provided an estimate is displayed in column 1542 and the score assigned to the number of periods an analyst has provided an estimate is provided in column 1544. In another example, under Broker List column 1546, the group that the broker has been assigned to is displayed under column 1548 and the N-score assigned to that group is displayed in column 1550.

Exclusion data is also displayed in the snapshot view. For example, the user may view which analysts were excluded as clusters by examining Exclusion column 1552. In this example, the user may easily see the estimates excluded by a model and the reason for the exclusion. The example of FIG. 12 shows a cluster has been detected. Thus estimates outside the cluster are excluded under the clusters exclusion factor as indicated by an "x" mark, or other identifying mark in column 1554. Other estimates may be excluded for other reasons where the reasons are displayed under the reason column 1556.

The snapshot view as shown in FIG. 12, enables the user to view current analyst data commingled with a plurality of data values and N-scores for a selected model on an analyst-by-analyst (or source-by-source) basis. The user may readily compare the current analyst data for each analyst for a given stock with the elements that comprise the model, such as factors, N-scores, Exclusions and Weights. The user may also sort by the factors that are of particular interest to the user in defining and refining a model. For example, by sorting the estimates in the order of most recent estimate, the user may view estimates in the order of recency.

It will be appreciated that viewing the historical estimates of a plurality of analysts in the manner described above may often provide a context within which an individual source's estimates and revisions may be better understood, such as by providing insight into an analyst's estimate revision patterns and the relative accuracy of those revisions over time as they relate to a company's actual reported earnings. As such, this historic information may be valuable in appraising future revisions made by an analyst to his current estimates, and in deciding whether to act, or to not act, based upon the revisions. The visual display in chart view can clearly illustrate a bias error pattern of individual analysts such that, patterns, if any, in an analyst's earnings estimations may be investigated and analyzed. Other advantages exist.

According to another embodiment of the present invention, the user may create a model that can be applied to analysts' estimates for one or more stocks or stock sets to create an enhanced composite estimate for the stock or stocks. The enhanced composite often improves the ability to predict a quantity being estimated, such as company earnings, revenue, cash flow, buy/sell/hold recommendations or other predictions. According to one embodiment, the model preferably comprises one or more of user defined exclusions, rules, selected factors with user specified rules for assigning a factor score (N-score) to each source or non-excluded source, and Factors Weights that are applied to each factor. Preferably, the user can identify certain exclusions by which certain data items (e.g., estimates), contributors (e.g., analysts and brokers), or other sources are excluded from consideration for a particular model (e.g., if a source's estimate is older than a certain number of days, or if an analyst has not covered a stock for a minimum number of periods). Based on the exclusions, factors, rules, and Factor Weights, the model is applied to current estimates to create an enhanced composite estimate. The model may be backtested against historical data (visually and/or analytically), refined, and when desired put in production mode. In production mode, the model is run against current data to generate current enhanced composite estimates (e.g., nightly or other frequencies). Various analysis of the current enhanced composite estimate may be made to identify significant situations (e.g., where the enhanced composite estimate generated by a model deviates from the consensus estimate (or other bench mark) by certain user specified criteria.

Figure 13:
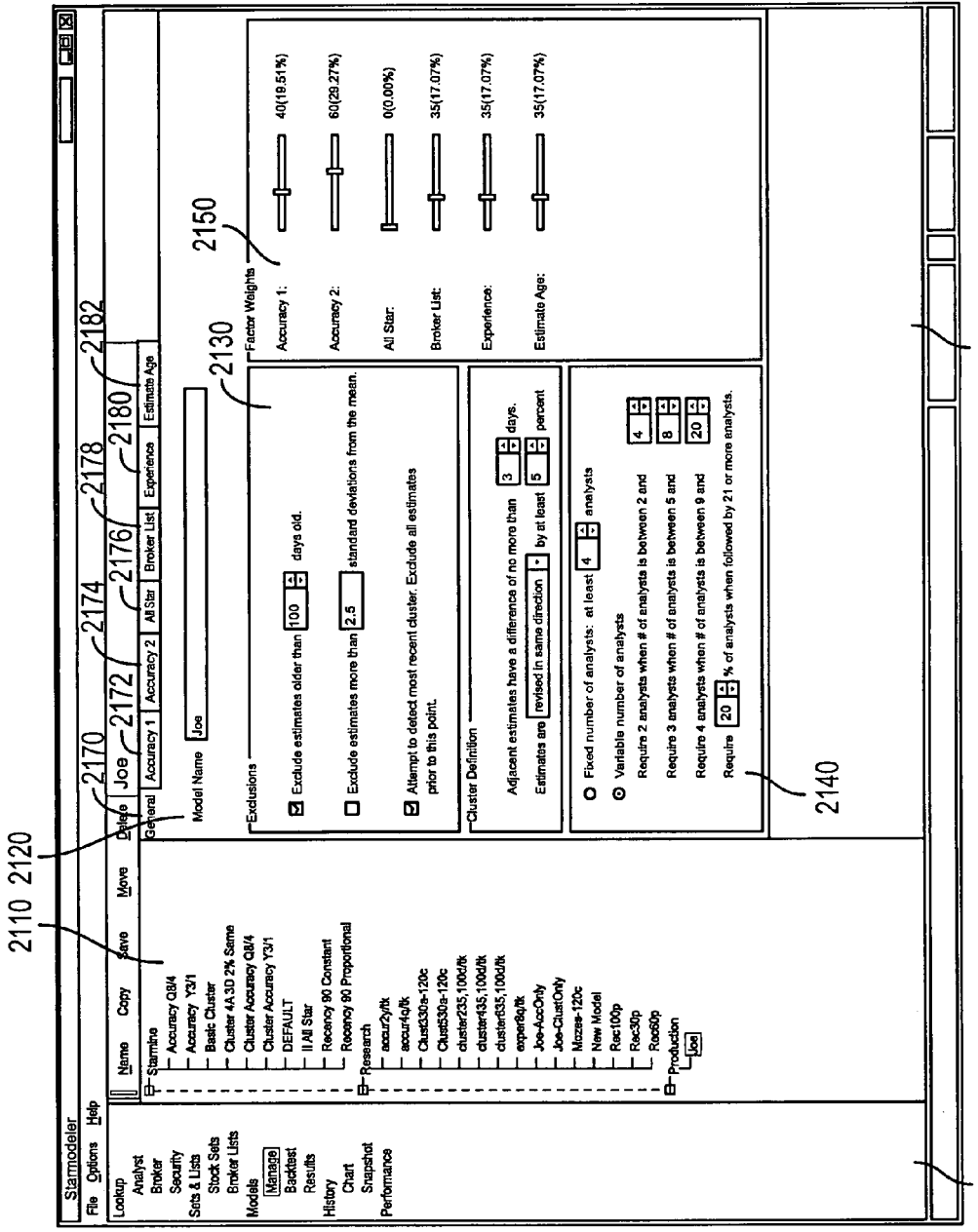
FIG. 13 illustrates an example of a Model/Manage module according to an embodiment of the present invention.

With reference to FIG. 13, Models functions are accessed from the Models/Manage module in Navigator 210, as shown, includes options to manage models, backtest models and show results. The Models/Manage module enables a user to create, edit, move, copy, delete or perform other functions on a model. As user creates a model by naming the model, specifying exclusion rules (including cluster definitions), identifying model factors, defining scoring rules, and assigning factor weights to the factors. The user may also perform other model managing functions such as saving a model, copying a model, moving a model and deleting a model.

A Models Folder window 2110 preferably contains model libraries and model names. Other organizational techniques and systems may be used. Models Folders window 2110 displays the available models to the user. Models classified under Research may be in the process of being tested. Models classified under Production are in actual use to calculate enhanced composite estimates. Other categories are also available to the user for classification.

The Models/Backtest module enables a user to test and refine models for accuracy and other criteria. The Models/Results module displays the results of the Backtests to the user. In addition, the user may visually test models through the History/Chart and History/Snapshot modules.

An example of how a user may create a model and how the model is used will now be explained. A user may create a model by identifying various exclusions and factors to be taken into account in the model and the Factor Weight to be assigned to each factor. Other steps and options may be used. According to one embodiment, the user may specify exclusions using an exclusions template 2130 as shown in FIG. 13. For each selected factor, a user may specify rules by which each non-excluded analyst is assigned an N-score (normalized score). The user can assign a Factor Weight to each factor to place greater emphasis on one or more factors for a given model. For each model, the analyst's N-score for each factor is multiplied by the Factor Weight to generate a Weighted N-score. These Weighted N-scores are summed for each analyst to generate a Total Factor Score for each analyst. The actual Total Weight for an analyst's current estimate is determined by normalizing the analyst's Total Factor Score, i.e., dividing it by the sum of the Total Factor Scores for all analysts. In this way, the sum of the Total Weights will equal 1.

For example, in one model a user may specify certain exclusions that will exclude certain analysts or estimates. Then assume the user selects three factors F1, F2, and F3 to use in the to model. Next, the user may specify rules for each factor to assign N-scores for each non-excluded analyst. Then the user assigns Factor Weights to each of the three factors. For exemplary purposes, assume that based on these rules, three analysts A1, A2, and A3 are assigned the following N-scores and Factor Weights as detailed below.

| FACTOR | ANALYST | ANALYST N-SCORE BY FACTOR (N) | FACTOR WEIGHT (W) |
|---|---|---|---|
| F1 | A1: | N1 = 0.7 | F1W = 0.6 |
|    | A2: | N2 = 0.2 |          |
|    | A3: | N3 = 0.1 |          |
| F2 | A1: | N1 = 0.5 | F2W = 0.3 |
|    | A2: | N2 = 0.5 |          |
|    | A3: | N3 = 0.5 |          |
| F3 | A1: | N1 = 1.0 | F3W = 0.1 |
|    | A2: | N2 = 1.0 |          |
|    | A3: | N3 = 1.0 |          |

Factor Weights ("FW") may be assigned for each factor depending on the relative importance as determined by the user. For example, for this model, the user determined Factor 1 to be most important and assigned it a Factor Weight of 0.6. Factor 2 was assigned Factor Weight of 0.3 and Factor 3 was assigned a Factor Weight of 0.1. The analysts' N-scores for each factor is then multiplied by the Factor Weight and those Weighted N-scores are summed for each analyst to generate a Total Factor Score for each analyst.

For $A1$, Total Factor Score=$(0.7 \times 0.6)+(0.5 \times 0.3)+(1.0 \times 0.1)=0.67$ For $A2$, Total Factor Score=$(0.2 \times 0.6)+(0.5 \times 0.3)+(1.0 \times 0.1)=0.37$ For $A3$, Total Factor Score=$(0.1 \times 0.6)+(0.5 \times 0.3)+(1.0 \times 0.1)=0.31$ The Total Factor Score for each analyst is then divided by the sum of the Total Factor Scores for all analysts to determined a Total Weight. In this example, the sum of the Total Factor Scores for all analysts is: $0.67+0.37+0.31=1.35$ Thus, the Total Weight for analyst is calculated as follows:

For $A1$, Total Weight=$0.67/1.35=0.496$

For $A2$, Total Weight=$0.37/1.35=0.274$

For $A3$, Total Weight=$0.31/1.35=0.230$

To generate the enhanced composite estimate in this model, these analysts' current estimates are multiplied by the analysts' Total Weight.

For example, assume A1 has a current estimate of 1.50, A2 has a current estimate of 1.20 and A3 has a current estimate of 1.25. The calculated mean equals $(1.50+1.20+1.25)/3=1.317$. However, if the model described above is applied to the estimates, the enhanced composite estimate equals $(1.50 \times 0.496)+(1.20 \times 0.274)+(1.25 \times 0.23)=1.36$. Thus, the enhanced composite estimate differs from the consensus by 0.11 or nearly 10%. This may signal that the stock is undervalued.

With reference to FIG. 13, a more detailed explanation of how models are created will now be provided.

To create a model, from the Navigator 210, the user can select Models/Manage. The general appearance of the display will include the Navigator 210, a Models folders section 2110, a Main Display window 2160 including an Exclusions area 2130 (or other mechanism to enable selection display of various factors and other criteria relating to models) and a Factor Weights display and selection mechanism 2150. A tool bar (or other mechanism) will also be displayed to enable a user to select one or more of New, Copy, Save, Move, Delete or other functions.

By clicking New on the menu bar, a dialog box will appear with a text box for entering the name of the user's new model. The user can type the name of the new model. As shown, the user has entered the name "Joe". The model name appears in a model name header in box 2120.

The user can define the factors for the new model, as detailed below.

By clicking Save, the new model is saved to the server (or elsewhere). By default, the new model may be saved in the Research Library as shown in Models Folders window 2110.

One aspect of the invention is the great flexibility offered to users in defining the factors for a model. For example, FIG. 13 illustrates an example of a screen for defining a model according to one embodiment. According to an embodiment, for each factor that the user may select from, a corresponding tab number is provided. When the user selects a tab, a factor template is displayed in Main Display window 2160. The user may also define Factor Weights in Factor Weights area 2150. For example, a user may assign Factor Weights for a given model for various factors such as one or more of Accuracy, All Star rating, Broker List, Experience, Estimate Age, and other factors attributes or performance metrics (e.g., Accuracy 1 and Accuracy 2, or other metrics). The user may assign relatively greater or lesser importance or weight to a Factor. One mechanism for doing this is sliding scale bars as shown in Factor Weights area 2150. By sliding scale bars to the right (for more importance) or left (for less importance). By assigning a zero weight to a factor, the user can effectively exclude a factor from a particular model.

The factors are elements of a model that enables a user to filter out or place less weight on weak analyst estimates and include or place more emphasis on ones which based on historical data, likely will be more accurate. Factors may be based on known predictors of estimate accuracy. For each factor, the user may define the rules for assigning a value for each factor. For example, the user may define rules for determining relative error percentage with respect to Accuracy 1. In addition, the user may also assign an N-score to each factor. For example, in assigning an N-score to an All Star factor, the user may assign an N-score of 1.00 to an analyst with All Star status while providing 0.25 to an analyst with non-All Star status.

In the example of FIG. 13, the user has defined a model by first assigning a model name (e.g., "Joe") under General tab 2170. The user may specify certain exclusion factors in Exclusion area 2130. For example, various exclusion factor options may be presented to the user. The user can select (e.g., by check box) exclusion factors to be used and can customize each option by specifying user selected exclusion factor criteria on a model-by-model basis. For example, as shown in FIG. 13, the displayed exclusion factors include: (1) estimates that are older than a user-specified number of days; and (2) estimates that are more than a number of standard deviations from the mean. This system may also give a user an option to detect clusters (detailed below). Other exclusion factors may be provided or created by a user. For example, an exclusion may be provided for estimates older than a user-specified amount of time before or after a company's last earnings report date. In the example of FIG. 13, as shown in Exclusions area 2130, the user has selected the exclude days old factor and cluster detection. In the exclude days old factor, the user has specified 100 days as the cut-off. One advantage of the modular nature of the invention is that in creating models a user can view estimate data while creating a model to assist in deciding on user-specified values. In this example, the user has not selected the exclude standard deviations factor in Exclusion area 2130, so it is not used in this model.

Another aspect of the invention is the ability to define and use cluster detection factors. The user may define clusters and cluster factors in Cluster Definition area 2140. A cluster is a grouping of estimates or revisions made by one or more different contributors satisfying certain conditions, e.g., estimates or revisions made within a certain interval of time or other conditions. Clusters can assist users in identifying potentially meaningful trends, changes in conditions, or other occurrences. For example, if a number of analysts suddenly revise estimates, those estimates may be based on recent news. Clusters can be used to help identify more meaningful estimates. Preferably, a user may define the criteria by which the user wants to define a cluster. For example, the user may specify the maximum time between one estimate and another estimate of another analyst for the two estimates to be considered part of the same cluster or cluster candidate. In FIG. 13, for example, a cluster definition template is displayed to facilitate the definition of a cluster. As shown, the time between estimates has been defined as 3 days in Cluster Definition area 2140. Further parameters may be specified by the user in qualifying a cluster candidate as a cluster. For example, parameters may include enabling a user to specify restrictive, qualifying criteria on revisions including the condition that only revisions in the same direction (or any direction) qualify, or that only revisions of at least a user-specified magnitude qualify. In addition, the user may specify the minimum number of new estimates or qualifying revisions that are required to define a cluster. The number of new estimates or qualifying revisions may either be a fixed number of analysts or a variable number of analysts, for example, depending on the number of analysts with active estimates for the event as of the day for which the enhanced composite estimate is being calculated. The user may specify the number of analysts needed to define a cluster as a function of the number of analysts, or a percentage of analysts, following the stock. Further, an exclusion factor may include a user-selectable option to exclude estimates that are older than the date of the last-detected user-defined cluster.

FIGS. 14–18 further illustrate examples of how a user can select factors for inclusion in a model, define rules and N-score criteria for the factor and other features. For example, with reference to FIG. 14, the user may specify various selections associated with a first performance metric, referred to as Accuracy 1, by clicking on the Accuracy 1 tab 2172. The factor's potential components and other information will appear in Main Display area 2160. The user can select details in the text boxes, check boxes, etc. Preferably, a template is displayed including a performance Metric Definition area 2210 and a N-score definition area 2220.

As shown, the Accuracy 1 metric may be used to calculate each analyst's (or source's) average Relative Error % according to user specified criteria. For example, as shown, the user may select: the number and type of fiscal periods (e.g., years, quarters, etc.); the minimum number of periods of coverage for an estimate to be included; and a window of time (e.g., number of months) prior to a report date to limit the estimates to be included for this metric. The algorithm for the average Relative Error % (and other metrics used as factors) may be created and stored in the Performance Module, described elsewhere herein.

Based on these user specified parameters, each non-excluded analyst's average relative error percentage may be calculated. This metric may be converted to an N-score for this factor based on user specified rules as set forth in the N-score Definition area 2220. The N-score area 2220 enables certain analysts to be excluded (or give a zero score for this factor) and allows other analysts to be given a score by error rank.

In this example, an N-score may be assigned by Error Score, Error Rank, equally to all or a user specified number of top qualifying analysts (based on relative error percentage), or other options in N-Score area 2220.

Figure 14:
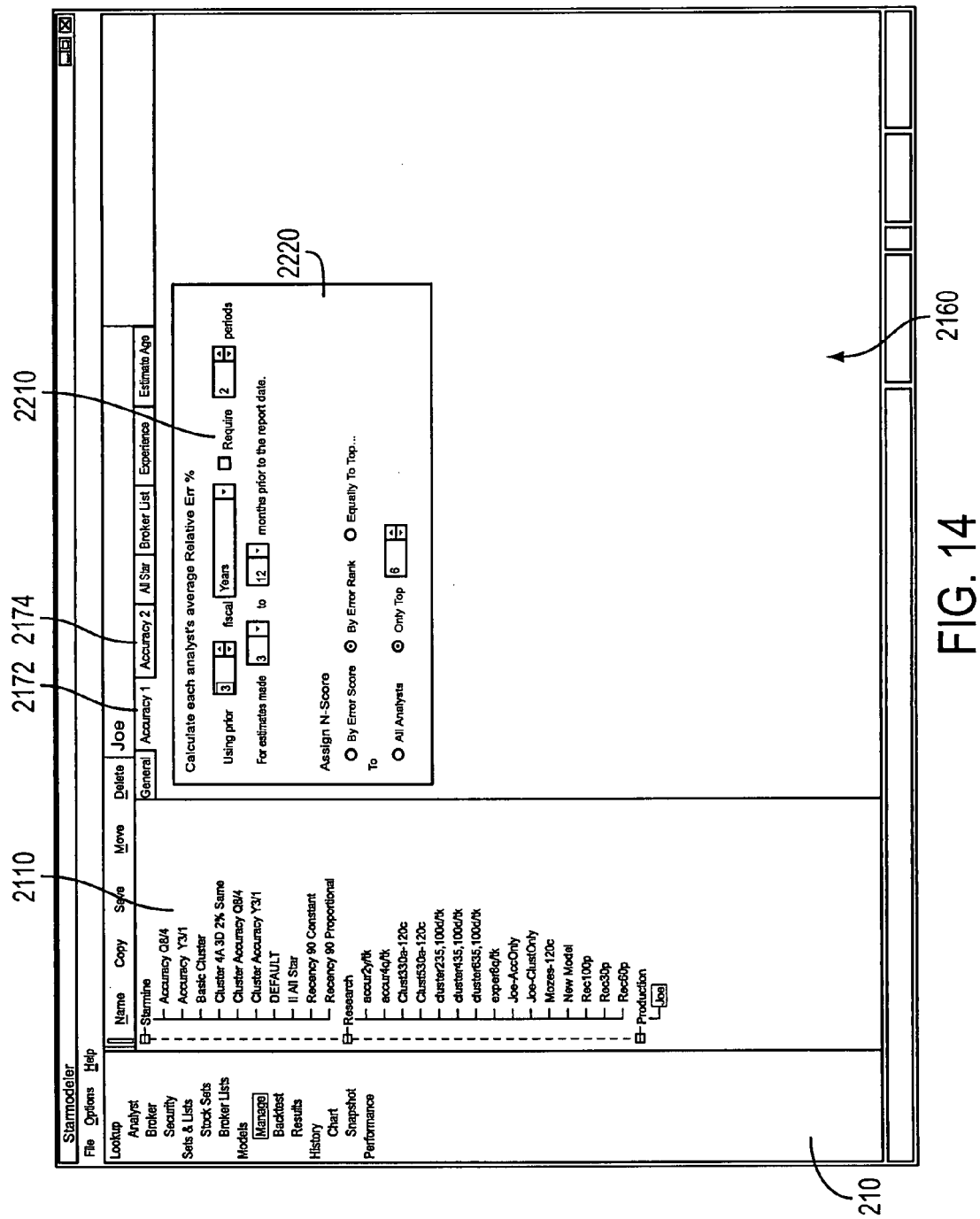
FIG. 14 illustrates an example of an Accuracy factor according to an embodiment of the present invention.

In the example of FIG. 14, a user has the option to use other performance metrics or evaluation parameters (e.g., a second accuracy metric as shown by Accuracy 2 tab 2174. Elsewhere in this application is a description of Performance metrics. One or more of these metrics and other metrics may be used in creating models. Preferably, each has a corresponding tab that when selected displays a template similar to that shown in FIG. 14 but customized for the particular metric.

Figure 15:
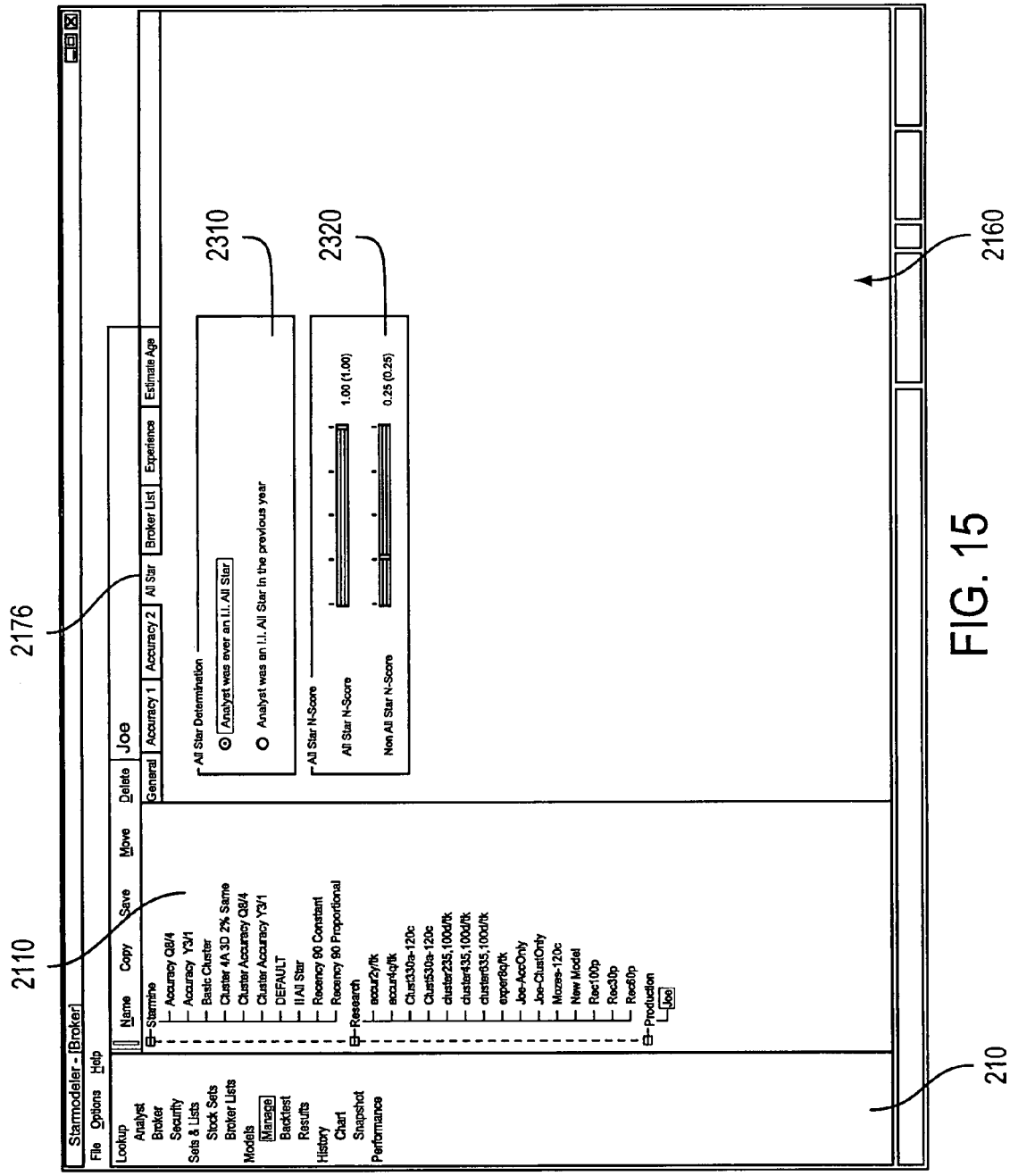
FIG. 15 illustrates an example of an All Star factor according to an embodiment of the present invention.

In addition to performance metrics, a model may include one or more analyst and/or broker attributes. Examples of such attributes may include All Star qualification, Broker List affiliation, Experience, and Estimate Age. Other attributes that may bear on estimate performance may be used. As shown in FIG. 15, for example, a user may include as a Factor Weight an All Star (or other) rating, by selecting All Star tab 2176. An All Star rating is a known rating given to some analysts by Institutional Investors based on a published analyst survey. If this factor is used, in All Star Determination area 2310, the user may specify the criteria relating to an All Star rating. As shown, the criteria may include whether the analyst was ever an All Star or whether the analyst was an All Star the previous year. Specific N-score may be assigned to All Stars and non-All Stars based on the parameters selected in All Star N-Score area 2320. For example, analysts meeting the All Star criteria specified in All Star Determination area 2310 may be given an N-score of 1 for this factor and those not meeting the criteria may be given a lower score (e.g., 0 or 0.25).

Figure 16:
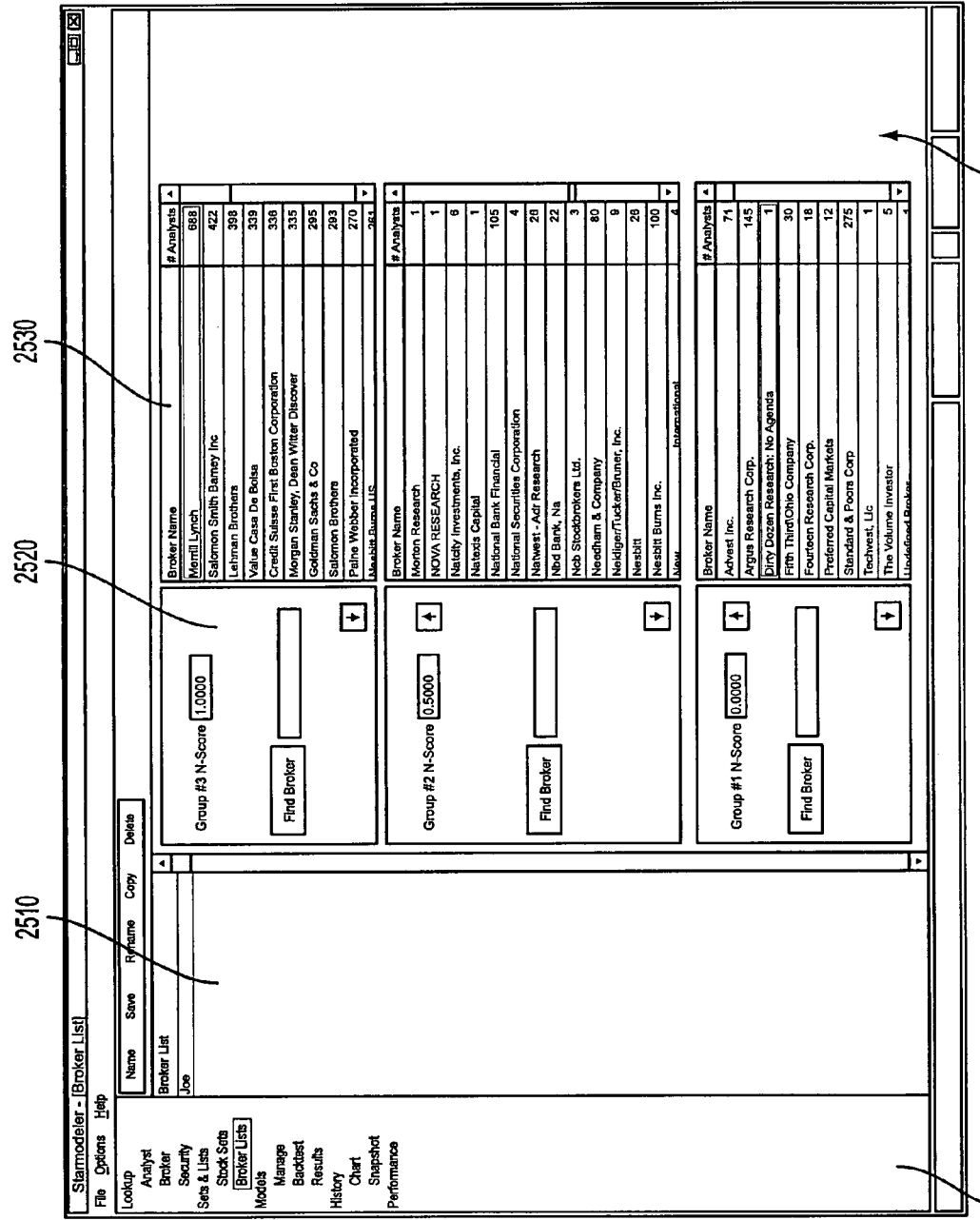
FIG. 16 illustrates an example of a Broker List factor according to an embodiment of the present invention.

As shown in FIG. 16, the user may include a Broker List factor in a model by selecting Broker List tab 2178 (FIG. 13). The Broker List attribute takes into account attributes of a particular broker (e.g., a broker with whom an analyst works). As shown, a user may create and store multiple broker lists (e.g., in Broker List Folders area 2510). Each broker list includes a list of brokers selected by a user, grouping criteria for grouping brokers in the list of brokers and rules for assigning an N-score to each group. A user may divide broker lists by size, reputation, historical accuracy, affiliation with a stock (e.g., market maker, etc.), or other criteria. FIG. 16 illustrates a Broker List definition screen including Broker List Folders area 2510 from which a user may select a broker list or to which a newly created list may be saved. In Group N-Score area 2520, the user may designate N-score values for each group. In Broker Name/Info area 2530, the user may view the brokers and other information (e.g., size, status, historical metrics, etc.). User specified rules may be created to group brokers or it can be done manually. Other techniques may also be used. In the example of FIG. 16, the brokers in Group #3 are assigned an N-score of 1.000, the brokers in Group #2 are assigned an N-score of 0.5000, and the brokers in Group #1 are assigned an N-score of 0.0000.

For example, larger brokerage firms or firms with better reputations may be classified in Group #3 and given a higher N-score. The user may assign N-scores to each broker or group of brokers and store the set of N-scores in a broker list for use in other models.

Figure 17:
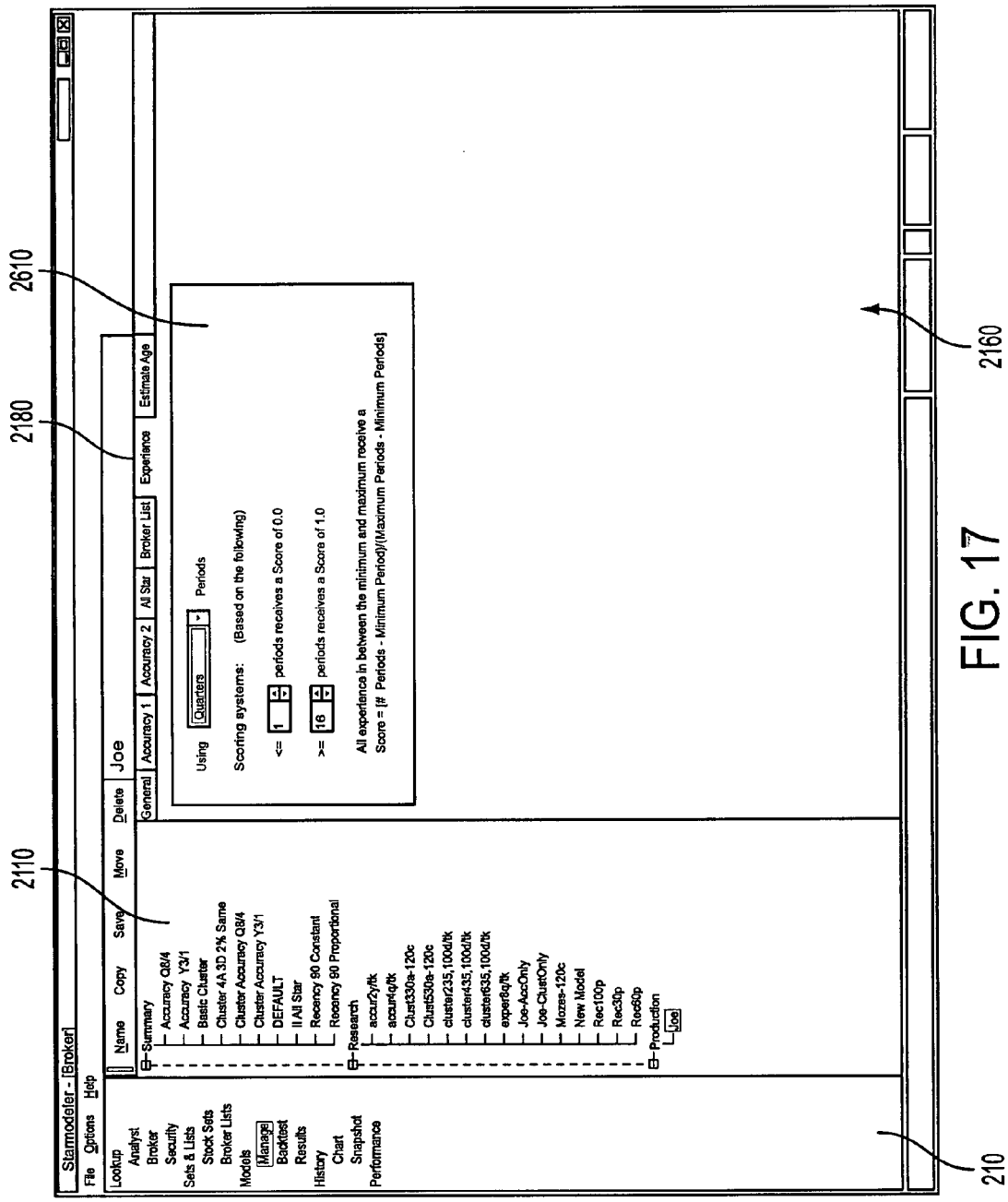
FIG. 17 illustrates an example of an Experience factor according to an embodiment of the present invention.

Another factor that may be used in creating a model is an analyst's experience (generally, with a particular stock, within a particular industry or other criteria), by selecting Experience tab 2180 (FIG. 13). As shown in FIG. 17, through Experience Definition area 2610, the user specify rules and criteria to assign an N-score to analysts based on the analyst's experience. For example, the score can be based on a designated period type, such as number of years or quarters for which the analyst has made estimates for a particular security. For example, the user may define a scoring system based on the amount of time an analyst has followed a stock, whereby if an analyst has estimates for less than a first selected number of periods, the analyst receives a score of 0.0 for this factor and if the analyst has estimates for greater than a second selected number of periods, the analyst receives a score of 1.0 for this factor. Optionally, analysts with experience between the first and second numbers of periods may be assigned a pro-rated score. For example, the N-score for each analyst may be defined as using the following formula:

$$N\text{-score} = (\#\text{Periods} - \text{Minimum Periods})/(\text{Maximum Periods} - \text{Minimum Periods}).$$

In this case, the #Periods is the number of periods for which the analyst has covered the stock, Minimum and Maximum periods correspond to the first and second user-selected number of periods. Other functions for converting the number of periods of analyst coverage for a security into an N-score for the contributor experience factor for each analyst may also be used.

Figure 18:
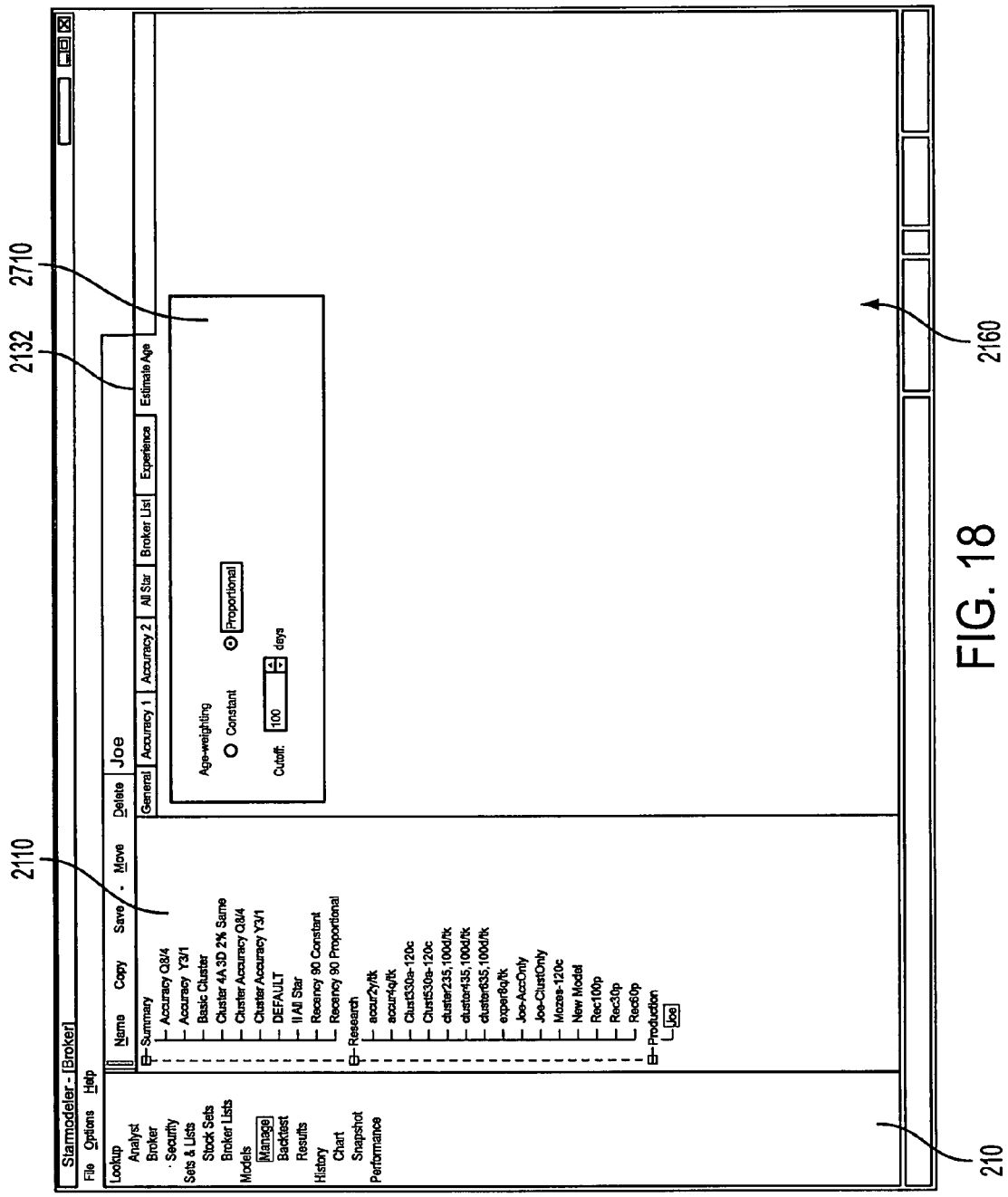
FIG. 18 illustrates an example of an Estimate Age factor according to an embodiment of the present invention.

As shown in FIG. 18 the user may include Estimate Age (or recency) as a factor, by selecting Estimate Age tab 2182. For example, a recency factor may exclude estimates from earnings calculations if they are older than a specified number of days. This may be based upon the assumption that a more recent estimate is likely to be based upon relatively new and accurate information which may affect a company's earnings potential and, therefore, is more likely to be predictive of a company's actual earnings. When applying the model with the recency factor to historical data, the resulting estimate typically is more accurate in predicting a stock's earnings because it has excluded old, less reliable, estimates. Age-weighting may be defined as constant or proportional with a user-defined cutoff in Estimate Age area 2710. Thus, the user may filter out estimates that are older than the number of days specified. By choosing constant age weighting, the same or similar weight is given to all non filtered estimates, for this factor. By choosing proportional age weighting, less weight may be assigned to older estimates on a sliding scale.

Other factors may be assigned user-defined weights for more accurate results. For example, a leadlag score factor may be assigned a weight by the user. The leadlag score factor is the number of leading estimates minus the number of lagging estimates over the total estimates. The scoring system may involve assigning a score of 0.0 or 1.0 depending on whether an analyst's leadlag score is lower or greater than a user defined number. In addition, the mean time between revisions may be included as a factor. This factor filters out estimates of analysts who revise estimates infrequently or relatively infrequently compared to other analysts. For example, an analyst with a mean time between revisions of less than 80 days may receive a score of 1.0 while an analyst with a mean time between revisions of more than 120 days may receive a score of 0.0.

A user may specify adjustments to be made to one or more non-excluded estimates, where the adjustments are based on one or more factors, such as historical analyst bias, historical aggregate analyst bias as a function of time prior to period report date, analyst's firm's relationship with the security's issuer, the security's historical performance relative to consensus estimates, or other factors.

Based on the historical information for each analyst, an adjustment factor may be calculated. The adjustment factor may represent an analytical "bias" which may or may not be incorporated into each analyst's earnings estimate, for a particular security, over a given period of time. For example, an analyst who has, over a specified time period, issued earnings estimates for a particular company that were, in hindsight, on average 5% too high, might be assigned an adjustment factor of 0.95, such that the analyst's issued estimate over the specified time period is reduced by five percent. Conversely, an analyst who has historically issued estimates over a specified time period that were, in hindsight, on average too low might be assigned an adjustment factor of 1.10 for that performance analysis set, such that his actual reported estimate for that time period is effectively increased by ten percent.

Although the adjustment factor calculated for any given performance analysis set may be stored in the system's database, adjustment factors may be generated in real time in response to user-defined inputs. As indicated above, the calculation of an adjustment factor may be based, at least in part, upon a comparison of the historical earnings estimates issued by an analyst, for a given security followed by that analyst, over a particular time period. A user may define analysis parameters and metrics such that the determination of an adjustment factor may take into account an analyst's historical percentage error as compared to actual earnings, generally available consensus earnings estimates, custom composite adjusted earnings estimates, or other metrics.

The user may also assign a scaling factor to be applied in the calculation of the adjustment factor for a given performance analysis set. For example, a user may define a performance analysis set such that, for that analysis set, a particular analyst is shown to have issued estimates that were on average 20 percent greater than actual earnings. The user may then assign a scaling factor, such as 0.5, to be multiplied by the 20 percent error. Thus, the effective adjustment factor for that user-defined performance analysis set reflects a 10 percent and not a 20 percent adjustment—i.e., an adjustment factor of 0.9, rounded to the nearest tenth. Thus, in this particular example, the user "discounted" the analyst's earnings estimate bias as indicated by the system's calculations. A formula for the calculation of the adjustment factor is set forth below:

[1/(1+(Error metric*Scaling factor))]

The adjustment and weighting factors described above may be used alone or together to calculate a custom composite estimate to arrive at a more accurate estimation of a company's earnings. According to one embodiment, a custom composite estimate is calculated by multiplying an analyst's current earnings estimate (for a given security, and event) by its corresponding adjustment and weighting factors for that given performance analysis set. The results for each estimate for each analyst of interest may then be summed to arrive at the custom composite estimate. Thus, the calculation of a custom composite estimate provides investment managers and others with an improved method for determining the accuracy of an analyst's earnings estimates and predicting the actual earnings of a company over any given period of time.

Under the Models/Manage module, the user may perform managing functions to maintain models. Such managing functions include for example, saving, copying, editing, moving, and deleting models.

The user can save models using commands in the Models/Manage module. The user can use the Save function to save changes in an existing the model, or save new models. To save a model:

1. From the Navigator 210, the user can select Models/Manage.

2. The user can select a model from Models Folder window 2110, or create a new model.

3. The user can create a new model or make the desired changes.

4. The user can click Save on the menu bar to save the selected model to a desired folder.

Models may be stored on a server so that authorized colleagues and other individuals may access these models. When a user runs a model against the historical database, the server applies the factors to the estimates specified by the user and produces an estimate based on the model. In addition, once a model has been designed, the user may apply the model to a range of stocks, such as a defined stock set. The user may then be provided with a full listing of performance metrics for analysis of the model's accuracy. Because historical data where the actual earnings are known is being used, accuracy is easily determinable.

In another embodiment of the invention, once one or more models are created, these models may be backtested against historical data. Resulting performance analysis sets and corresponding custom composite estimates may then be stored in the system's database for later retrieval. In this way, a user may test such models by applying them over any previous time period, thereby essentially creating a "virtual analyst" whose hypothetical prospective performance may be compared with the historical performance of a single or plurality of analysts, or even the average historical consensus estimates for any previous time period. By conducting such tests a user may refine a model to better predict earnings.

The backtesting capability verifies a model's viability against a range of stocks, analysts, and historical periods. The backtesting capability enables the user to measure the estimating performance of one or more models by calculating an extensive range of error metrics for the model. Over specified time periods and individual or groups of stocks, the user may measure the accuracy of the model using relative error percentages and by a variety of additional metrics. When performing a backtest, the present invention calculates what the estimates would have been at each sampling point in time against the stocks in the user's set, calculates the error metrics, then presents the results in grid format so that accuracy, consistency, and availability may be easily assessed, compared to each other and compared to the calculated average of the then-current estimates.

Figure 19:
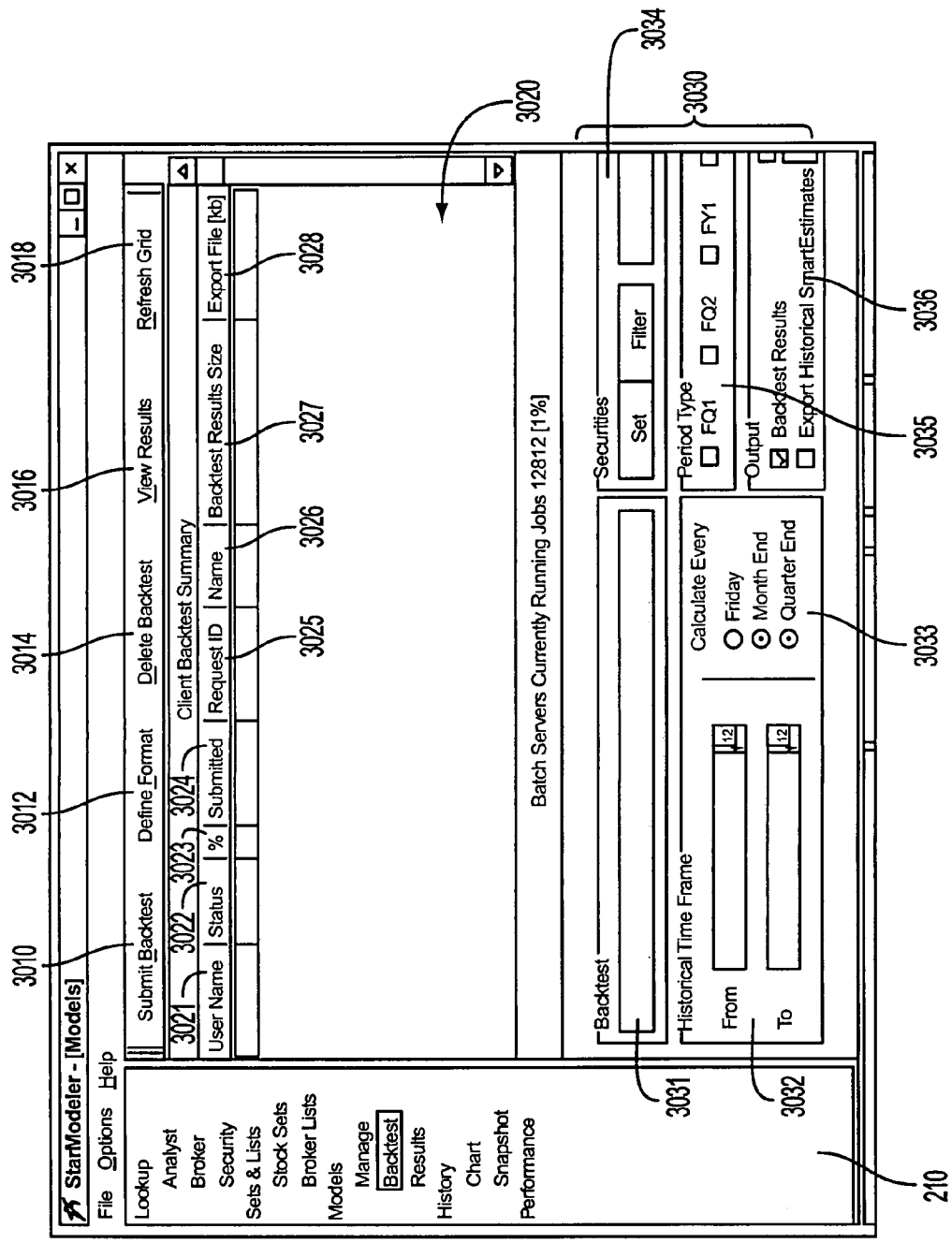
FIG. 19 illustrates an example of a Models/Backtest module according to an embodiment of the present invention.

With reference to FIG. 19, the backtester provides details about what models the user wants to test, on which stocks, and over what historical time frame. Other criteria may also be specified. Once a user has created a model and stock sets to test them against, the Models/Backtest module may be used to submit the models for testing on the server using the historical database. Testing may be a batch operation at system location so each job will be queued with others. The grid in this screen shows the user the progress of the job and status of the batch server. Test results are saved on the server. To download the results, the user may select a test row and click View Results.

In FIG. 19, a user may run a backtest by selecting Models/Backtest module from Navigator 210. Various options are available to the user. For example, the user may select Submit Backtest 3010, Define Format 3012, Delete Backtest 3014, View Results 3016, Refresh Grid 3018, and other options. Backtest Summary area 3020 displays backtest information such as the name of the user who has submitted the test in User Name column 3021, the status of the job in Status column 3022, percentage of the job that is completed in % Completed column 3023, date and time the job was submitted in Submitted column 3024, an identifier assigned by the server to the job in Request ID column 3025, the name assigned to the particular backtest in Name column 3026, the file size (e.g., in KB) of the backtest in Backtest Results Size column 3027, and if the export option was used, the size of the TXT file created for export in Export file column 3028. Other information may also be available.

Backtest Summary area 3030 provides details about the currently selected backtest. This area may be read-only. To resubmit a backtest with changes, the user may right click on the backtest name and select Resubmit. The Backtest Summary area 3030 provides the information such as the backtest name in bar 3031, Historical time frame in area 3032, how often the backtest is calculated in area 3033, and the stock set or filter used, if any in area 3034. In addition, the period type in area 3035, output details in area 3036, and other information are displayed.

Figure 20:
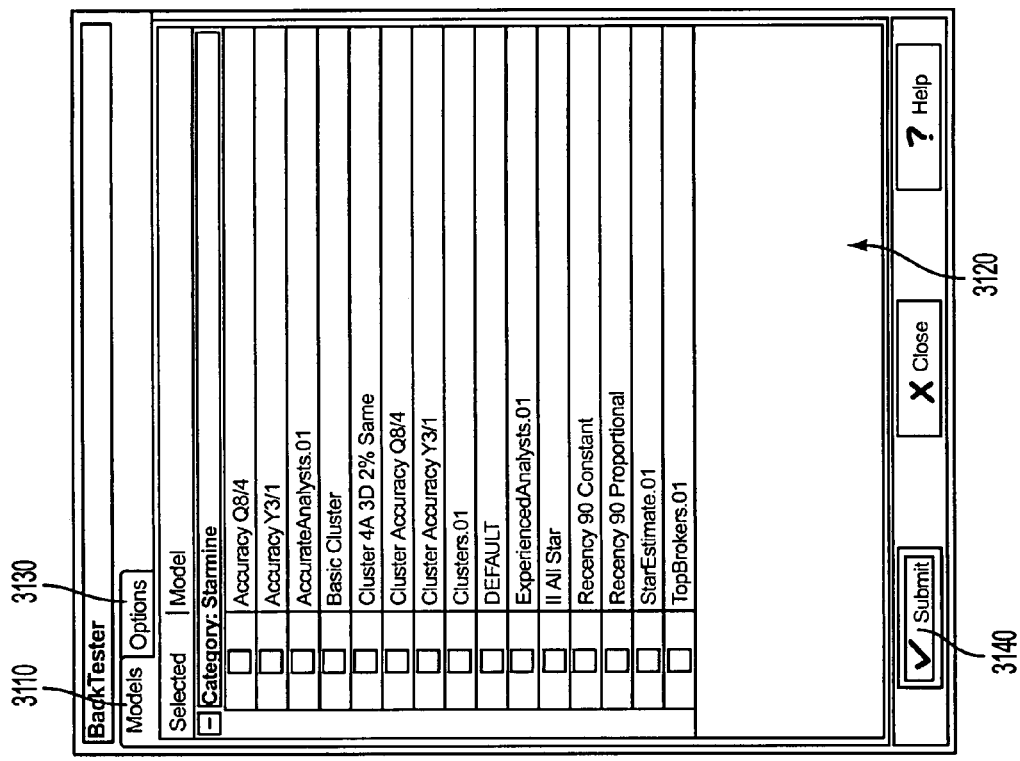
FIGS. 20–21 illustrate an example of a Backtester according to an embodiment of the present invention.
Figure 21:
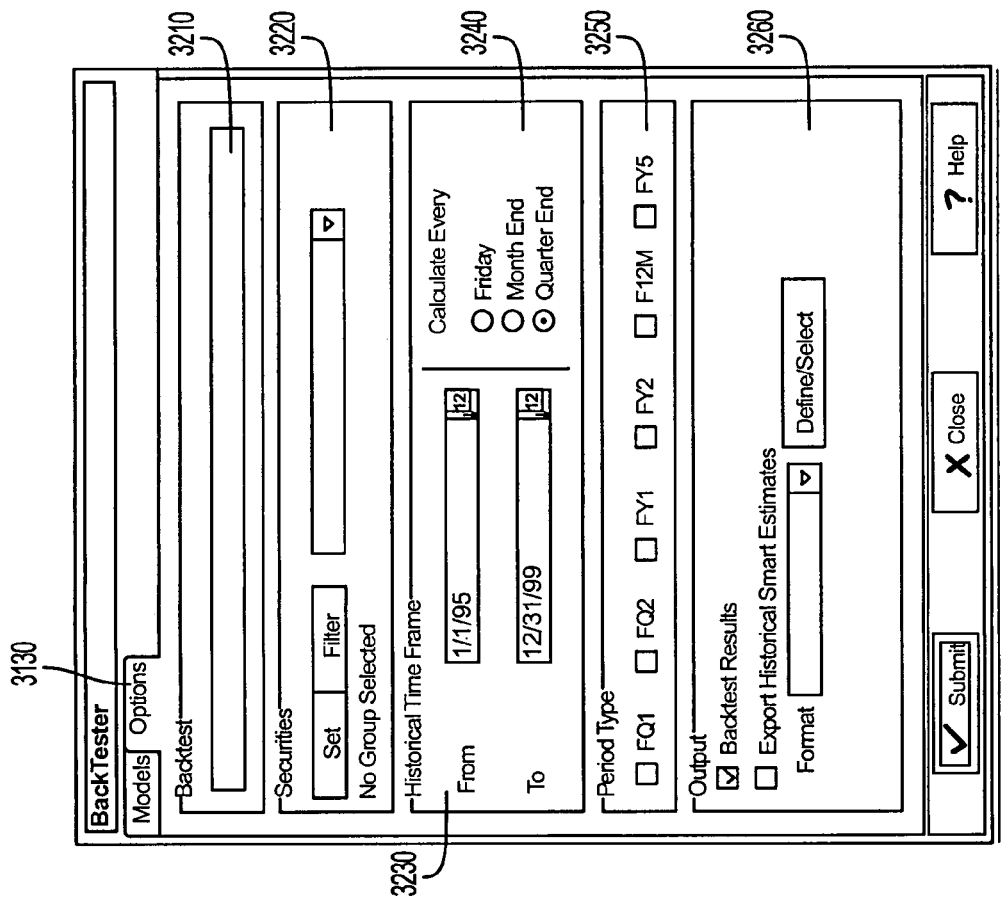

To run a backtest, the user may select Submit Backtest 3010 to display Backtester screen as shown for example, in FIG. 20, where the user may enter parameters of the test. Under Models tab 3110, the user may select the model to backtest in Backtester display 3120. By selecting the Options tab 3130, an Options screen as shown in FIG. 21 will be displayed. The user may enter a name for the backtest in Backtest bar 3210. If a name is not entered, the system will create one. In Securities area 3220, the user may select a stock set or filter to be used in the backtest. In Historical Time Frame area 3230, the user may specify the range of the backtest. In Calculate Every area 3240, the user may select how frequently the error statistics are to be sampled. The backtester will calculate enhanced composite estimates between the time frame identified in Historical Time Frame 3230 for every "As Of Date" on Friday, the calendar month end, or the calendar quarter end, or other period. In Period Type area 3250, the user may select the fiscal period type for the backtest. At a given "As Of Date", the backtester can create enhanced composite estimates for the next reported fiscal quarter after the "As Of Date" (FQ1), the next reported fiscal quarter after FQ1 (FQ2), the next reported fiscal year after the "As Of Date" (FY1), the next reported fiscal year after FY1 (FY2), other period types or period aggregations may also be available. In Output area 3260, the backtest results may be automatically stored in the server. When the user chooses to review the results, the results are automatically copied to the data directory on the user's workstation. The user may create a tab- or or comma-delimited flat file for analysis by the user's own software by selecting the Export box in Output area 3260. This enables the user to further analyze the data in spreadsheet, database, or other software applications. The user may click on the Define/Select button to bring up a Field Specifier window, where the user may select the fields and format for an export file of backtest results.

Returning to FIG. 20, after the user has specified the parameters of the backtester under Models tab 3110 and Options tab 3130, the user may click the submit button 3140. The backtest parameters and data are then submitted to the server. When the test has been run, a Complete message will appear under Status column 3022 when the test is complete. The user may view the test results by right-clicking on the test summary row in Backtest summary area 3020 (FIG. 19).

Figure 22:
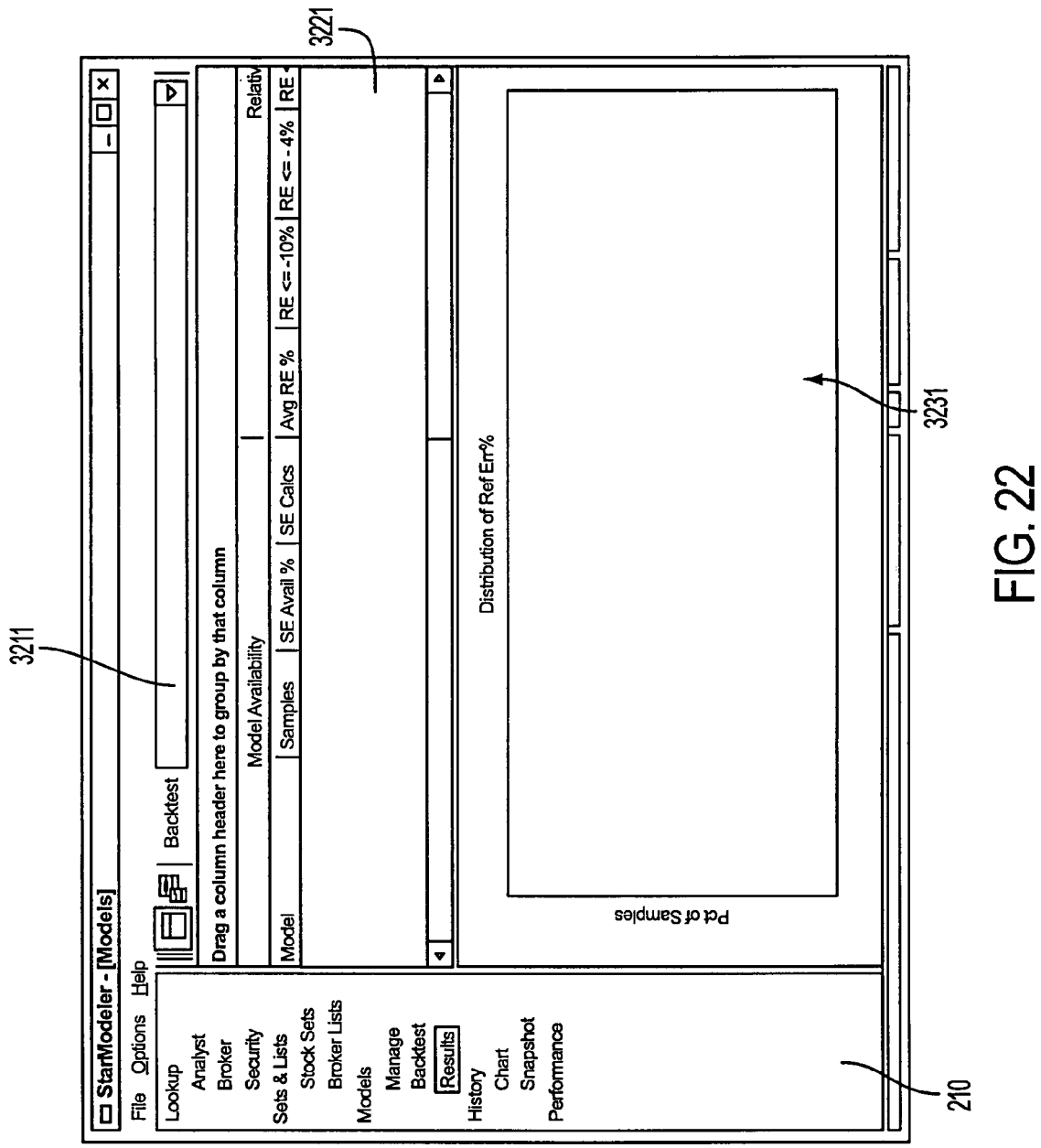
FIG. 22 illustrates an example of a Models/Results module according to an embodiment of the present invention.

To view the results of a backtest, the user may select Models/Results module in Navigator 210. In another example, the user may select View Results 3016 from Models/Backtest module as shown in FIG. 19. The name of the backtest is displayed in Backtest box 3211 (FIG. 22). From a View Format drop down list (not shown), the user may select viewing options of the results. For example, the user may select Summary Form where summary information of the models and data are displayed. The user may select to view the results by model which groups the results by model with lists of securities and data. The user may select to view the results by stock where the stocks are grouped with lists of models and data. The user may view the results in an ungrouped format which provides a sortable list of models and stocks. In Data area 3221, the user may view result information regarding Model Availability, Relative Error %, Outlier Performance, and other information. For example, under Model Availability, the user may view Number of samples, Estimate Availability, Number of Estimate Calculations, and other information. Under Relative Error %, the user may view the Average Relative Error Percentage and the percentage of model samples that have a Relative Error % in a defined range (e.g., less than or equal to −10%). Under Outlier Performance, the user may view the percentage, number of model samples where the estimate is 0.5 standard deviations from the mean and of these samples, the percentage that were eventually closer to the reported earnings than the mean. Other information may also be displayed. The user may also view the results in a chart format in Distribution chart 3231 which shows distribution of the current stock's or model's error metrics.

To find out quickly whether the user's new model is more accurate than the consensus, the user can test it against historical data for a single stock and compare its accuracy with the consensus in the History Chart.

Figure 23:
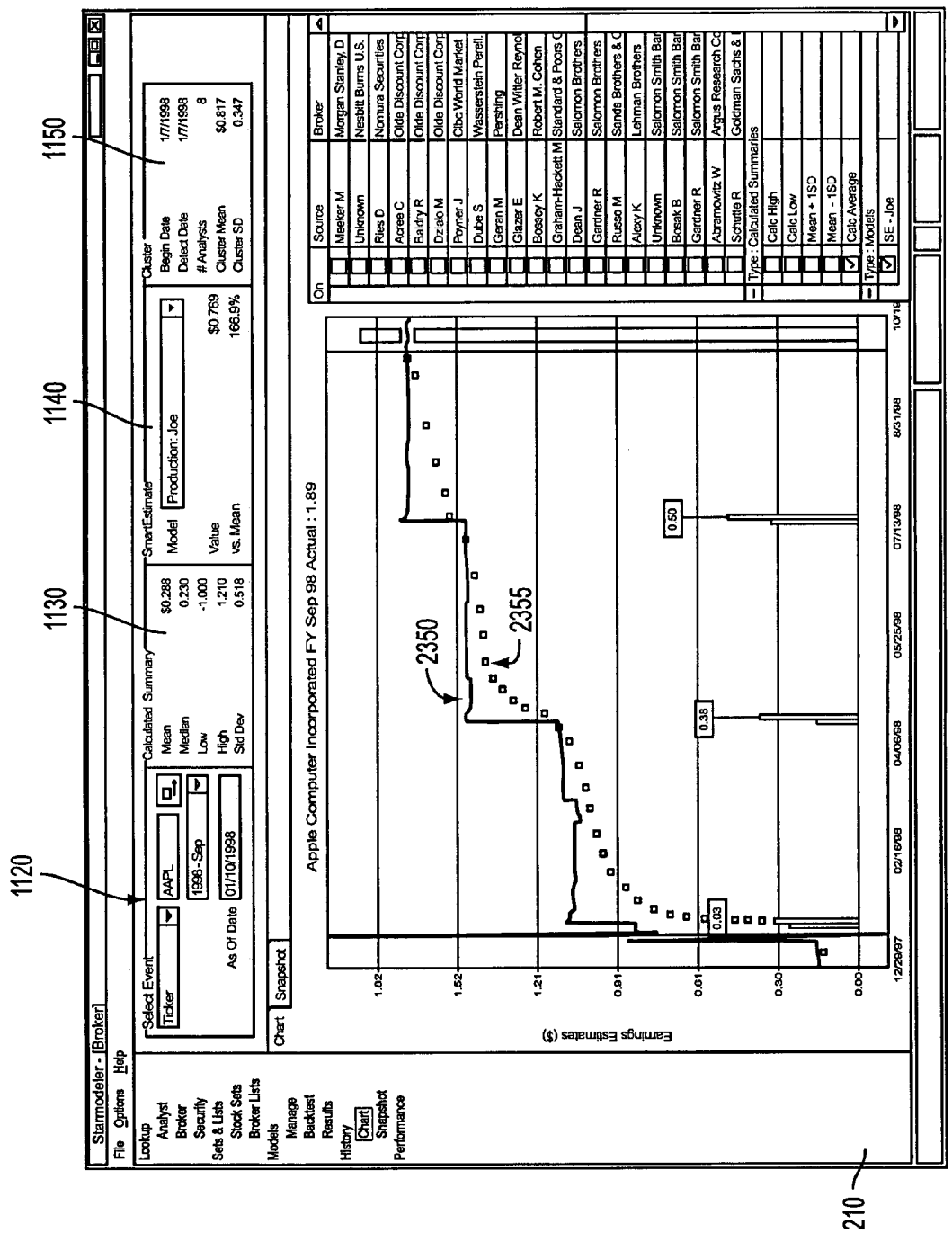
FIG. 23 illustrates an example of a model applied to historical data according to an embodiment of the present invention.

The present invention enables a user to visually test a model as applied to historical data. FIG. 23 illustrates a model applied to historical data. In this example, the user has selected "Production: Joe" as the model, as shown in Model Selection area 1140. The results of the model as applied to the time frame indicated by the chart are shown in a designated color (the bolder line 2350 in FIG. 23). The user may compare the model with the calculated average (shown as line , or other estimate, shown in the chart by a different color (the lighter line 2355 in FIG. 23). Although the two lines are similar in trend, appearance and final estimate, the model as applied to the historical data provides valuable information to the user. For example, the model as applied to the historical data shows increases (or jumps) in estimates before the increases in the calculated average. In other words, the model leads the consensus in estimate increases. In the example of FIG. 23, the model estimate jumped to 1.50 close to Apr. 6, 1998 while the calculated average estimate jumped to 1.50 close to Jul. 13, 1998. Similarly, the model estimate jumped to 1.65 shortly after Jul. 13, 1998 while the calculated average estimate jumped close to October, 1998. Thus, estimate and prediction information may be made available to the user several months in advance.

When developing a model, the user may chart its estimate record for any stock's historical data and find out instantly if the model is outperforming the consensus. By examining the chart lines closely, weak areas in the model may be detected. The user may then go back and refine the model, and chart again.

In another embodiment of the invention, alert services may be available to users. A user may define alert conditions and parameters to enable the system to inform the user of the occurrence of events and conditions. For example, when a model is applied and an estimate exceeds the calculated average, or other factor, by a user-defined amount, the user may receive an alert or notification of such an event. Alert criteria may be entered by the user; selected from a list of possible conditions; created and defined through the use of templates and filters or any combination thereof. Alert duration may also be defined where the user may select a time period of activation. For example, the user may select to activate a particular alert for one fiscal quarter or for different fiscal periods within a fiscal year.

At the occurrence or fulfillment of user defined conditions and parameters, the system of the present invention may process the user defined alerts and inform the user through various mechanisms. For example, alerts may be sent to the user by wireless communication (e.g., electronic mail) or other mechanisms. Other modes of communication may include cell phone, fax, PDA, and Internet. The present invention when applied to stock estimates may serve to alert and inform the user of events that may persuade a user to purchase or sell a particular stock. According to one embodiment, a web site operator using the software of the present invention may offer a subscription service based on issuance of alerts. Other uses may be made of the enhanced composite estimates.

Figure 24:
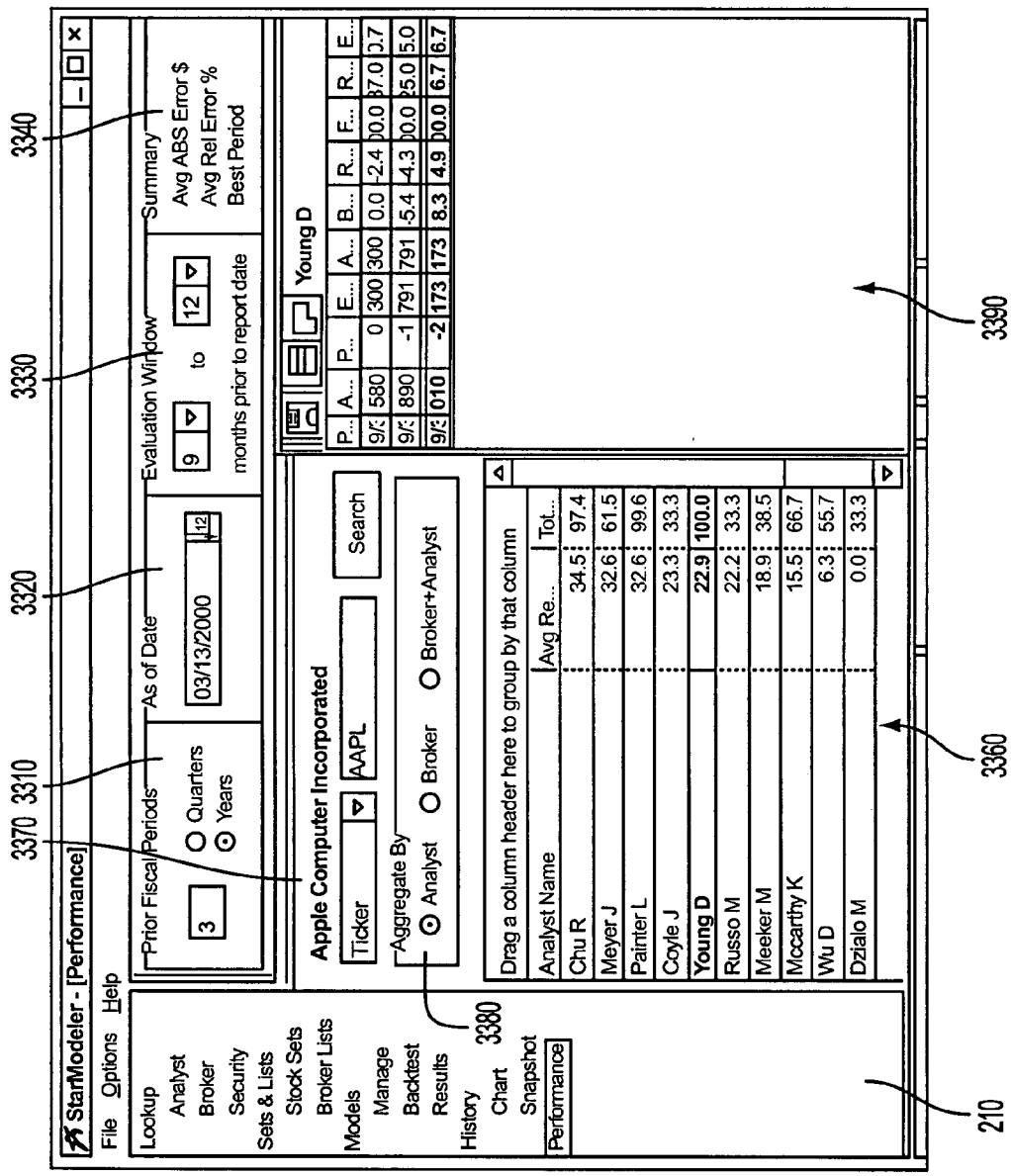
FIG. 24 illustrates an example of a Performance module aggregated by Analyst according to an embodiment of the present invention.

With reference to FIG. 24, the performance module enables a user to measure and compare analysts' performance, in absolute terms, and relative to other analysts, in estimating stock earnings. This feature is particularly useful when a user wants to determine how well the analysts in a brokerage house are doing, or which analyst has the best performance for a ticker, industry or other stock set. The performance module also provides error metrics in summary and detailed form for the analyst whose performance is being measured. The error metrics may include, for example, a raw error metric, a relative error metric, a bias error metric, a user-defined error metrics and other metrics.

A user can search by analyst or company (by ticker, company name, CUSIP, or unique ticker), and aggregate by ticker, broker and broker/ticker—or analyst, broker, and broker/analyst, respectively. Results may be displayed in a grid containing various error metrics and may further be sorted by any column head with a click on the title. The graphic display of performance may be shown on a color chart.

A hierarchical sorting facility lets a user group summary or detail search results. Detail search results can be saved for further analysis.

An overview of FIG. 24 is described below.

1. From the Navigator 210, the user can select the Performance module.

2. From Search area 3370, the user can select a security for which to search. In this example, the user has elected to aggregate results by analyst.

3. If desired, the user can update search criteria at the top of the screen: Number and type of prior Fiscal Periods in Periods area 3310, "As Of Date" in Date area 3320 and a time frame in Evaluation area 3330. The invention will update the Summary Grids 3360 based on the new criteria. For the selected "As Of Date," summary metric details will appear at Summary area 3340.

4. The user can aggregate the findings in Aggregation area 3380 by selecting Analyst, Broker, or Broker+Analyst. The Summary Grid 3360 will update accordingly.

5. The user can select an analyst (e.g., D. Young) for further study in Data Screen 3390. The user can examine the detailed calculations that created them. Details behind selected summary calculations appear in Data Screen 3390. The user can rearrange the detail grid by moving its column headings. The user can right-click on a detail line for further options.

A user can aggregate the summary information by analyst, broker, or a combination of the two. When a user selects a summary line (e.g., an analyst), a complete range of error metrics is displayed in the Data Screen 3390 for further analysis.

One example of the significance of the aggregation feature is typified when an analyst switches from one brokerage firm to another. If a user selects to aggregate by analyst, all of the analyst estimates, regardless of which brokerage team the analyst is affiliated with at the time the estimates is made, may be sampled. In other circumstances, a user may wish to aggregate by broker, particularly if the user is trying to discern any pattern or trends with respect to broker bias with respect to a particular security. The ability to aggregate by broker/analyst pair is also a useful and powerful tool in that users may determine different historical performance characteristics for a particular broker/analyst pair. For example, if a particular analyst moves from one brokerage to another, any institutional bias that creeps into the analyst's estimates may be more readily discerned.

Figure 25:
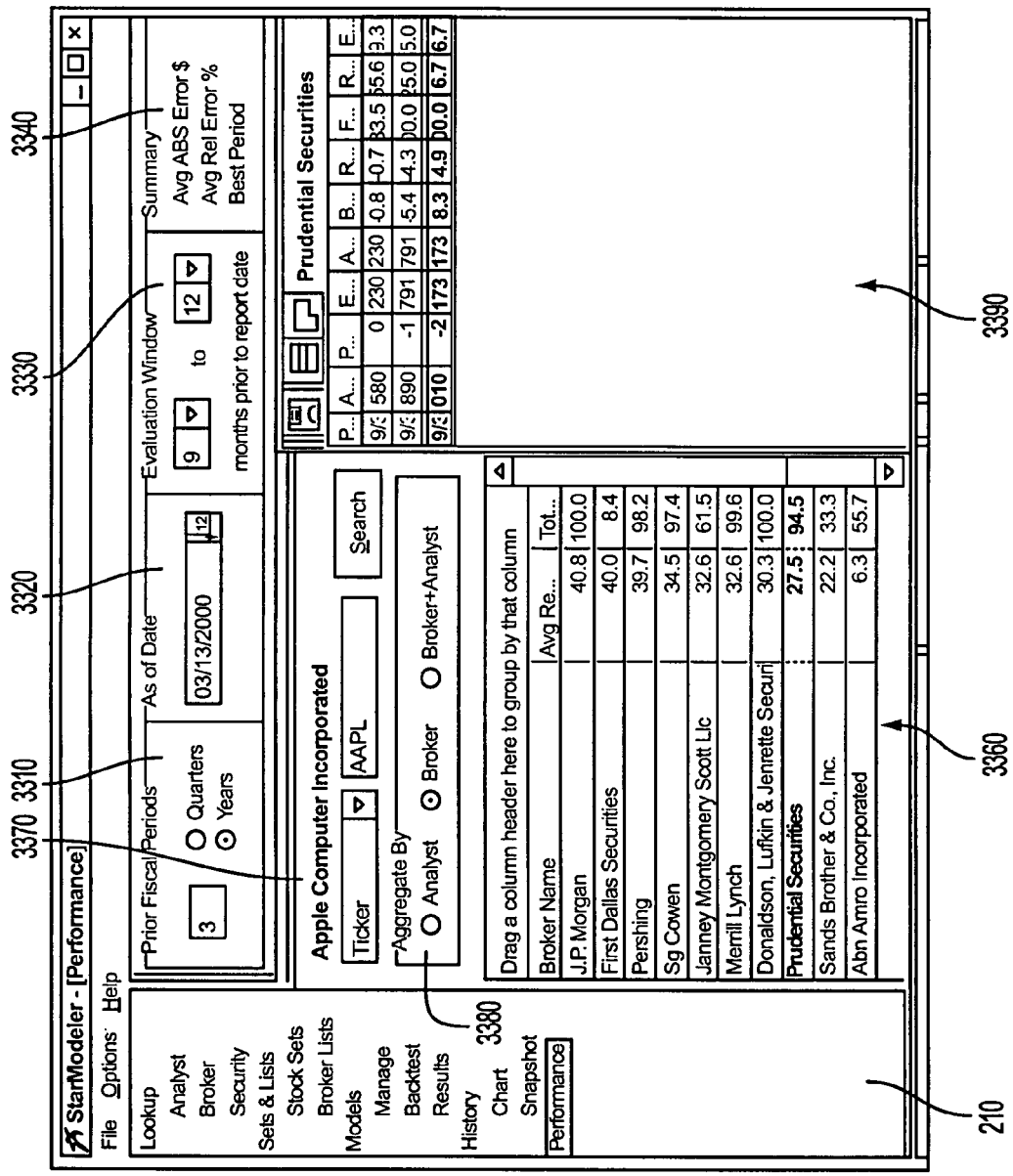
FIG. 25 illustrate an example of a Performance module aggregated by Broker according to an embodiment of the present invention.
Figure 26:
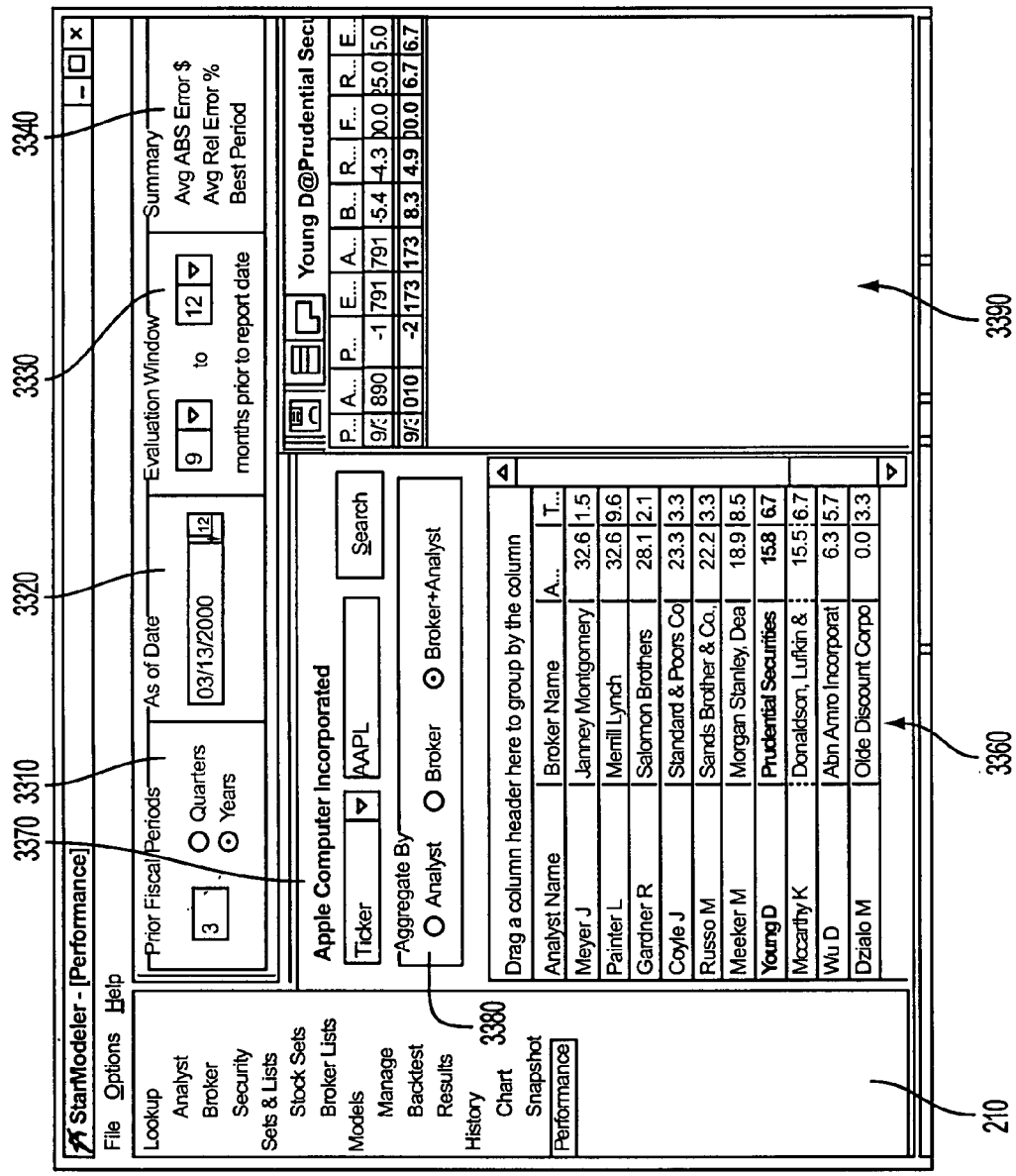
FIG. 26 illustrate an example of a Performance module aggregated by Broker and Analyst according to an embodiment of the present invention.

FIGS. 24–26 illustrate examples of performance screens and historical performance data where data related to the selected ticker or analyst may be aggregated by analyst (FIG. 24); broker (FIG. 25); or broker and analyst combination (FIG. 26). Other views are also available. By selecting the Performance module in Navigator 210, the user may view the performance of particular analysts, brokers, and other combinations. For example, the user may select a particular security (e.g., as shown AAPL) in Search area 3370. To provide great flexibility in the type and amount of data viewed, the user may select the number and type of fiscal periods to be analyzed as well as the type of fiscal periods, such as quarterly estimates or fiscal year estimates, in Periods area 3310. The user may select the "As Of Date" in Date area 3320. Other options may be applicable to other securities.

The number of prior fiscal periods enable a user to specify over how many periods the data should be viewed prior to the "As Of Date." For example, the user may set the numbers sufficiently high to enable a meaningful sampling of periods. However, the flexibility provided enables the user to review as many or as few periods as desired. The "As Of Date" enables the user to specify a cut-off period for an individual performance analysis.

Another useful feature that provides flexibility is the Evaluation Area 3330. A user may elect the time frame prior to the reporting dates over which to view data. In the example shown, the evaluation area goes from a beginning date selected by the user of 9 months to an end date selected by the user of 12 months. Therefore, in this case, estimates from 9 to 12 months prior to the report date will be analyzed. This enables a user to analyze performance by selected time bins to see if some analysts are more accurate farther out or closer in to when earnings are reported.

The user may view summary data information in Summary area 3340. This information may include, for example, Average Absolute Error, Average Relative Error percentage, and other relevant summary information. A Summary Metric box (not shown) may enable a user to select summary metrics to be displayed (e.g., it may be set to Relative Error percentage).

Once the user has selected the number and type of fiscal quarters, the "As Of Date," a ticker and the aggregation method, various types of information may be displayed, preferably on a single screen. For example, as shown in FIG. 24, each analyst with estimates satisfying the criteria specified by the user for a given security are displayed in Aggregation Display 3360. In the performance view shown, out of the list of analysts displayed, a user may select one to obtain more detailed information in Aggregation Display 3360. For example, in FIG. 24, analyst "The Young D" is selected, as shown highlighted. As a result, the detailed data for "The Young D" is simultaneously displayed under a Data Screen 3390. Various fields and types of information displayed in association with the analyst's name may be user specified, such as Period End Date, Actual Reported Earnings/Share, Period Number, Error in Dollars, Absolute Error in Dollars, Bias Error Percentage, Relative Error Percentage, Analyst's follow percentage for the selected ticker, Relative Error Percentile, Error Percentile, and other information. As shown, the period end date, the number of previous periods, earnings information (e.g., actual) in various performance matrix.

In FIG. 25, the user may elect to aggregate by broker in Aggregate area 3380. A list of brokers for the selected ticker is displayed in Aggregation Display 3360. By selecting a broker, detailed data for that broker is displayed in Data Screen 3390. In FIG. 26, the user may elect to aggregate by broker and analyst pair in Aggregate area 3380. A list of broker and analyst pairs for the selected ticker is displayed in Aggregation Display 3360. By selecting a specific pair, detailed information for that pair is displayed in Data Screen 3390.

Some advantages of the features discussed above are that it enables a user to view performance data over one or a number of periods. When viewing performance over a number of periods, the user may view aggregate metrics over those periods and/or metrics on each period individually. Thus, if a user desires to view for one stock the multiple contributors, the user can select the stock and see each contributor (analyst, broker or analyst/broker pair) who has estimated earnings for this stock in the selected fiscal periods (e.g., the last 3 fiscal years). Alongside each contributor is summary or aggregate performance measures. If the user clicks on one of the contributors for selected stock, the graphical user interface displays the contributor's period by period performance for that stock for each of the periods in the designated set of periods.

When displaying a list of contributors who have published estimates for a stock over the given time period and time frame (e.g., contributors who have made at least one estimate in the last 3 fiscal years), it is often convenient to limit display to only those analysts who have current estimates. The option to toggle between showing all contributors with an estimate and only those with the current estimate may be provided. If, on the other hand, the user desires to analyze a particular contributor's performance over each of the securities followed by that contributor, the system provides the flexibility to do this as well.

For example, in FIG. 26, for the selected contributor/stock pair, the information pertaining to Mr. Young's performance for AAPL while at Prudential Securities can be shown in Data Screen 3390.

According to another embodiment of the present invention, a Relative Accuracy Score ("RAS") may be used to measure the performance of one or more equity analysts' earnings estimates. The performance of other sources may also be measured. Performance measurements may include the accuracy of one or more analyst (or other source) in making predictions for one or more earnings event (e.g., stock predictions) where predictions may include earnings estimates, buy/sell recommendations and other forecasts.

The RAS of the present invention is a relative measure wherein analysts (or other sources) may be compared against each other (or other predetermined sources). One or more sources may be compared to a predetermined number of other sources, which may include one or more analysts and other sources of estimates, for a defined earnings event (e.g., a stock or a set of stocks) for a defined period of time. A user may selectively determine one or more sources for comparison. For example, a single analyst may be selected to compare estimates for a single stock event over various periods of time. A user may selectively determine one or more earnings event. For example, one or more analysts (or other sources) may be selected to compare the performance of one or more analysts over various stock events. Stock events may further include an industry, sector or other defined categories. A user may also selectively determine a period of time. For example, one or more analysts (or other sources) may be selected to compare the performance of one or more earnings events over a defined period of time. The defined period of time may include a single day, a single fiscal quarter, a defined number of past fiscal quarters or years, a comparison of selected fiscal quarters or periods, or other one or more user defined time periods.

Analysts may be compared against other analysts or other sources where the RAS may take into account one or more of the relative error of analysts, the variance of errors, the average error of analysts, the value of actual earnings for a predetermined period (e.g., a particular date, period, fiscal year), and other considerations. The RAS may be applied to an earnings estimate on a stock (or other earnings event) at a given point in time; to an analyst on a given stock (or other earnings event) over a period of time (e.g., one or more of fiscal quarters or years); to multiple fiscal periods; to multiple stock/analyst/period triples, or other defined periods. Analysts or other sources may also be compared with respect to an industry, for a single an earnings event (e.g., stock), for some or all stocks (or earnings events) covered by one or more analysts or sources.

According to one example, RAS may be defined for a single point in time for a single analyst on a single stock. The RAS calculation may further be applied to other time periods, analyst (or source) groupings, and other earnings events. According to an embodiment of the present invention, the RAS may be calculated as a fraction where the numerator gives the basis for comparison and the denominator dictates the scaling of the numerator value.

The numerator of the RAS may measure the accuracy in predicting one or more actual earnings of an analyst (or other source) as compared to the average accuracy of some or all analysts (or sources) covering an earnings event for a defined period of time. The denominator of the RAS may be a scale against which to measure the accuracy of an analyst (or other source) relative to some or all analysts (or sources) covering an earnings event for the defined period of time. The denominator may be a function of one or more values where one (e.g., the maximum) may be selected. Other criteria may also be used for other applications. There may be instances where the denominator may be too small to provide for a meaningful calculation or measure of accuracy. In this case, the denominator may be the largest value within the selection of denominators. In addition to a numerator and a denominator, the RAS of the present invention may also include an adjustment factor. The adjustment factor may be used to adjust the scores to fit within a defined range of values. This provides clear and easy comparison of RAS values. For instance, if a scale of 0 to 100 is used, it is easily determined that a RAS value 98 represents good accuracy. Other scales and adjustment factors may be implemented as well.

For example, a RAS calculation may be comprised of the following components:

numerator=AvgAbsErr($t$)−AbsErr(Estimate, $t$)

denominator=Max (Standard Deviation($t$), AvgAbsErr ($t$), |Actual|, constant divisor)

adjustment= . . . +k)/2k

A detailed discussion of the components of the RAS is presented below.

The adjustment is meant to fit analysts onto a scale where a median value (such as 0.5 in a scale of 0 to 1), is the average score, with k as a scaling factor. In other instances, the fraction may be scaled in order to be centered around a predetermined value, such as 5, 50 or other value. For example, scores that originally range from −1 to 1 may be scaled to a range from 0 to 1, in the case where k=1. In other instances, the score may be scaled to a range from 0 to 10, 0 to 100, or other defined ranges.

The numerator may be the difference between an analyst's absolute error and the average absolute error among some or all analysts providing estimates for the stock (or other earnings event) during a defined time period (e.g., a day). The RAS may be a measure of analysts relative to one another where the score is normalized against average analyst scores. According to another embodiment, the RAS may be normalized against the consensus. The RAS value may be normalized against other measures, such as a single analyst score, an average or other measure of a defined number of analysts (or sources), an average or other measure of predetermined analysts or sources, one or more user defined values, or other calculated or defined measures.

In particular, the numerator may comprise the difference between AbsErr(Estimate, t) and AvgAbsErr(t) where the AbsErr(Estimate, t) is an analyst's absolute error for a given time period, t, and the AvgAbsErr(t) is the average error of some or all analysts (or sources). This formula provides for analysis of the performance of an analyst (or other source) as compared to the performance of other analysts (or sources) for one or more earnings event during a defined time period. A relative accuracy measure of performance enables a user to more accurately assess the performance of one or more analysts (or sources).

AbsErr(Estimate, t) may include an analyst's Absolute Error for a defined time period (e.g., day t), defined as the absolute value between an analyst's estimate for a given day subtracted from the actual estimate for that given day. In other words, it is the distance of the analyst's estimate on a given day from the fiscal period's actual earnings that is being measured. The smaller the Absolute Error, the more accurate the estimate. For example, Analyst A may have an estimate of $0.94 on day t, for a fiscal period with actual earnings of $1.00. Then Analyst A has an Absolute Error of $0.06 where AbsErr(A, t)=|$0.94−$1.00|=$0.06. Similarly, Analyst A would also have an Absolute Error of $0.06 on day t if Analyst A's estimate had been $1.06 on that day. The distance between each analyst's estimate and the actual estimate in both examples is $0.06.

AvgAbsErr(t) may be defined as the Average Absolute Error during a defined time period, (e.g., day t). Average Absolute Error may be defined as the average of some or all estimates where the absolute value of the difference between one or more estimate for a defined time period (e.g., a given day) and the actual estimate are averaged. In other words, the AbsErr(Estimate, t) scores are averaged over some or all estimates available during a defined time period (e.g., on day t) in order to calculate the average error across analysts (or sources). The average distance from the actual may be measured by the Average Absolute Error. According to another embodiment, the distance of a consensus from the actual may be measured by the Average Absolute Error. The consensus during a time period (e.g., on a given day) may be defined as the simple average of some or all available estimates during the time period (e.g., on that day). As discussed below, there may be instances where using the consensus may lead to inaccurate results.

For example, there may be four analysts covering a stock where the actual announced earnings for a quarter was $1.00. Assuming the analysts' estimates on a day t prior to the announcement were as indicated below, the individual Absolute Errors and Average Absolute Error would be as follows:

| Analyst | Estimate (t) | Actual | Error (t) | Absolute Error (t) |
|---|---|---|---|---|
| A | $ 0.94 | $ 1.00 | $ (0.06) | $ 0.06 |
| B | $ 0.97 | $ 1.00 | $ (0.03) | $ 0.03 |
| C | $ 1.03 | $ 1.00 | $ 0.03 | $ 0.03 |
| D | $ 1.06 | $ 1.00 | $ 0.06 | $ 0.06 |
| | | Sum of Absolute Errors | | $ 0.18 |
| | | Number of Analysts | | 4 |
| | | Average Absolute Error | | $ 0.045 |

In the above illustration, the Average Absolute Error is the average distance from the actual, rather than the distance of the consensus from the actual. In certain instances, metrics which compare an analyst's estimate accuracy to the accuracy of the consensus estimate may be flawed. For example, since the consensus may be more accurate than any single analyst, it may not serve as a reasonable benchmark against which to measure one or more analysts. In particular, using the consensus allows errors in opposite directions to cancel each other out, as shown in the example below.

| Analyst | Estimate (t) | Actual (t) | Error | Absolute Error (t) |
|---|---|---|---|---|
| A | $ 0.94 | $ 1.00 | $ (0.06) | $ 0.06 |
| B | $ 0.97 | $ 1.00 | $ (0.03) | $ 0.03 |
| C | $ 1.03 | $ 1.00 | $ 0.03 | $ 0.03 |
| D | $ 1.06 | $ 1.00 | $ 0.06 | $ 0.06 |
| Consensus | $ 1.00 | $ 1.00 | $ — | $ — |

The consensus in this case has an Absolute Error of zero, which is less than the Absolute Error of any single analyst. Therefore, in certain instances, metrics which measure analyst errors relative to the consensus may unfairly represent analysts. Using the Average Absolute Error overcomes this problem in these and similar situations.

The numerator provides a measure of the accuracy of one or more analysts (or sources) in projecting actual earnings for one or more earnings events for a defined time period relative to the average accuracy of some or all analysts covering the one or more earnings events for the defined time period. As discussed in detail below, the denominator may be used to dictate the scaling of the numerator value.

According to an embodiment of the present invention, the denominator may be selected from a number of values where the largest value may be selected as the working denominator. Other criteria for selecting a denominator may also be implemented. There may be instances where a particular denominator is inappropriate due to the distribution of analysts' estimates, among other things. For example, if the value of the denominator is too small, the relative accuracy score may misrepresent the relative accuracy of one or more analysts (or sources). While the analysts may differ by a small amount, such as a penny, relative accuracy scores computed with a small denominator may show large discrepancies among the analysts' accuracy scores. Thus, large differences among relative accuracy scores computed with a small denominator may not correspond correctly to the actual small differences among analyst estimates. The present invention enables a selection of denominator values where the largest value may be selected to avoid skewed relative accuracy scores. Also, the present invention may provide a hierarchical order of preference in selecting a denominator. For example, if the first denominator is below a predetermined value, a second denominator may be used. Similarly, if the second denominator is below a predetermined value, a third denominator may be used instead and so on.

According to an example of the present invention, the denominator may be a function of a number of values (e.g., four), of which one (e.g. the maximum) may be chosen. As discussed above, there may be instances where one or more of these values may be inappropriate, e.g., one or more of these values may be too small to scale the scores meaningfully. According to an embodiment of the invention, the number of values may comprise one or more of s*Standard Deviation(t) where s is a predetermined constant; m*AvgAbsErr(t) where m is a predetermined constant; a*|Actual| where a is a predetermined constant; and d where d is a predetermined constant. Other values and/or calculations may also be used as possible denominators.

The Standard Deviation is a measure of the variance of estimates around their mean where more disperse estimates lead to a higher standard deviation. According to an embodiment, the population standard deviation may be defined as follows:

$$\text{Standard Deviation}(t) = Sqrt\left[\frac{Count(Est(t)) * Sum(Est(t)^2) - Sum(Est(t))^2}{Count(Est(t))^2}\right]$$

In general, using standard deviation for the divisor means that, assuming a scaling factor of s=1, a certain percentage (e.g., about 16%) of analysts may receive an RAS score of 1 or better and a similar percentage (e.g., about 16%) of analysts may receive a score of zero or worse on a given day, regardless of the particular variance of estimates. Therefore, good and bad analysts may receive well differentiated scores by this measure. One advantage of using the standard deviation is that it systematically accounts for the uncertainty in earnings estimates. On days with a high standard deviation, there is great uncertainty among analysts. For example, an analyst who is correct may be simply lucky. On the other hand, on days with a low standard deviation all analysts may have similar estimates, indicating agreement among analysts. Therefore, dividing by the standard deviation may differentiate between accurate and inaccurate analysts. By using the standard deviation measure, the scores may be scaled by the level of difficulty in predicting that stock.

| Analyst | Estimate | | Absolute Error | | Relative Accuracy Score |
|---|---|---|---|---|---|
| A | $ | 0.94 | $ 1.00 | $ 0.06 | 0.36 |
| B | $ | 0.97 | $ 1.00 | $ 0.03 | 0.64 |
| C | $ | 1.03 | $ 1.00 | $ 0.03 | 0.64 |
| D | $ | 1.06 | $ 1.00 | $ 0.06 | 0.36 |
| | Sum of Absolute Errors | | | $ 0.18 | |
| | Number of Analysts | | | 4 | |
| | Average Absolute Error | | | $ 0.045 | |
| | Standard Deviation | | | $ 0.054 | |

However, the standard deviation as the denominator may not prove to be the most accurate choice in some instances. For example, when the standard deviation is very small, extremely large or small RAS values may result. The standard deviation may be zero if all estimates are equal, thereby resulting in an undefined RAS score. In some instances, scores are not generally truncated each day, but rather after the period is finished. Therefore, an extremely accurate or inaccurate score for a defined time period resulting from a small denominator may affect an analyst's score for the rest of the quarter or other time period.

In the following example, a standard deviation may be considered too small to be useful.

| Analyst | Estimate | | Absolute Error | | RAS Using Standard Deviation |
|---|---|---|---|---|---|
| A | $ | 0.49 | $ 1.00 | $ 0.51 | 0.3 |
| B | $ | 0.49 | $ 1.00 | $ 0.51 | 0.3 |
| C | $ | 0.49 | $ 1.00 | $ 0.51 | 0.3 |
| D | $ | 0.50 | $ 1.00 | $ 0.50 | 1.3 |
| | Sum of Absolute Error | | | $ 2.03 | |
| | Number of Analysts | | | 4 | |
| | Average Absolute Error | | | $ 0.508 | |
| | Standard Deviation | | | $ 0.005 | |

In the above example, three of the four estimates are identical and the fourth is only a penny different. Intuitively, when a stock reports a dollar of earnings, being one penny more accurate is only a marginally better estimate. Yet, the Relative Accuracy Score computed for the four analysts using the Standard Deviation as the denominator indicates that Analyst D appears to be substantially more accurate (RAS=1.3) than the other analysts (RAS=0.3).

As shown, a very small denominator in the Relative Accuracy Score formula may magnify differences among analysts where these differences should intuitively be small. Similarly, a very large denominator may minimize the significance of substantial differences among analysts in other instances. Therefore, in addition to the standard deviation, the RAS formula of the present invention may compute additional divisors where a divisor is selected according to a defined methodology. For example, the highest value for the denominator may be selected. In addition, a hierarchical method may be implemented for denominator selection. For example, the hierarchical method may include steps where if the first denominator is below a predetermined value, a second denominator may be considered and so on. Other methods of selection may also be implemented in selecting a denominator based on defined criteria.

In cases with small standard deviations relative to the AvgAbsErr(t), there is more likely agreement among analysts. However, the circumstances may be such that some or all of the analysts may be incorrect in their estimates. In this case, assigning the best analyst an RAS value significantly better than the median value may be overly generous. Similarly, assigning the worst analyst an RAS score significantly worse than the median value may be overly harsh. According to an embodiment of the invention, the denominator may be adjusted to equal the AvgAbsErr(t) multiplied by a constant, such as ½. Other constants or variables may also be used as multipliers. This enables analyst scores to be closer to a median (or other defined) value than they would be with the standard deviation denominator, since differentiating strongly between good and bad analysts may not prove to be meaningful if some or all analysts are incorrect.

| Analyst | Estimate | Actual | Absolute Error | RAS Using Standard Deviation | RAS Using Average Absolute Error |
|---|---|---|---|---|---|
| A | $ 0.49 | $ 1.00 | $ 0.51 | 0.25 | 0.496 |
| B | $ 0.49 | $ 1.00 | $ 0.51 | 0.25 | 0.496 |
| C | $ 0.49 | $ 1.00 | $ 0.51 | 0.25 | 0.496 |
| D | $ 0.50 | $ 1.00 | $ 0.50 | 1.25 | 0.516 |
| Sum of Absolute Error | | | $ 2.03 | | |
| Number of Analysts | | | 4 | | |
| Average Absolute Error | | | $ 0.508 | | |
| Standard Deviation | | | $ 0.005 | | |
| Average Absolute Error/2 | | | $ 0.254 | | |

As illustrated in the above example, the Average Absolute Error may serve as the denominator in cases where the standard deviation is below a predetermined number, e.g., when the standard deviation is too small to provide a meaningful calculation. However, there may exist instances where the Average Absolute Error is counter-intuitive as well. For example, this may occur when there is little differentiation among analyst estimates and therefore little meaningful use for the standard deviation. Also, there may be little absolute error from the actual thereby making the Average Absolute Error too small to use as well, as illustrated in the following example.

| Analyst | Estimate | Actual | Absolute Error | RAS Using Standard Deviation | RAS Using Average Absolute Error |
|---|---|---|---|---|---|
| A | | $ 0.99 | $ 1.00 | $ 0.01 | 0.8 | 0.75 |
| B | | $ 0.99 | $ 1.00 | $ 0.01 | 0.8 | 0.75 |
| C | | $ 0.99 | $ 1.00 | $ 0.01 | 0.8 | 0.75 |
| D | | $ 0.98 | $ 1.00 | $ 0.02 | -0.2 | -0.08 |
| Sum of Absolute Errors | | | $ 0.05 | | |
| Number of Analysts | | | 4 | | |
| Average Absolute Error | | | $ 0.013 | | |
| Standard Deviation | | | $ 0.005 | | |
| Average Absolute Error/2 | | | $ 0.006 | | |

In this case, both the Standard Deviation and the Average Absolute Error/2 values may be deemed too small thereby resulting in counter-intuitive RAS scores. Denominator values may be considered too small if the values fall below a predetermined value. For example, values below 0.009 may be considered too small to make a meaningful calculation. Other threshold values may be used as well.

It is possible that both the AvgAbsErr(t) and the Standard Deviation(t) may be very small, as illustrated above. In this case, all analysts may be correct and close together. For example, this may occur with closely followed stocks (or other earnings events) for which management provides very accurate guidance. In these cases, the estimate may be scaled by the absolute value of the actual earnings, multiplied by a constant. For example, the constant may be set at 0.02. Other constants and/or variables may be used as well.

| Analyst | Estimate | Actual | Absolute Error | RAS Using Standard Deviation | RAS Using Average Absolute Error | RAS Using Actual |
|---|---|---|---|---|---|---|
| A | $ 0.99 | $ 1.00 | $ 0.01 | 0.8 | 0.75 | 0.58 |
| B | $ 0.99 | $ 1.00 | $ 0.01 | 0.8 | 0.75 | 0.58 |
| C | $ 0.99 | $ 1.00 | $ 0.01 | 0.8 | 0.75 | 0.58 |
| D | $ 0.98 | $ 1.00 | $ 0.02 | -0.2 | -0.08 | 0.33 |
| | | Sum of Absolute Errors | $ 0.05 | | | |
| | | Number of Analysts | 4 | | | |
| | | Average Absolute Error | $ 0.013 | | | |
| | | Standard Deviation | $ 0.005 | | | |
| | | Average Absolute Error/2 | $ 0.006 | | | |
| | | .02*|Actual| | $ 0.020 | | | |

In this case, the Actual-based metric yields a more intuitive RAS than a score which uses the standard deviation or the Average Absolute Error as denominators. There are, however, instances in which the actual-based metric is sufficiently small to make all three of the above denominators counter-intuitive, as illustrated below.

| Analyst | Estimate | Actual | Absolute Error | RAS Using Standard Deviation | RAS Using Average Absolute Error | RAS Using Actual-based metric |
|---|---|---|---|---|---|---|
| A | $ 0 | $ 0.02 | $ 0.02 | 0.26 | 0.36 | −2.5 |
| B | $ 0 | $ 0.02 | $ 0.02 | 0.26 | 0.36 | −2.5 |
| C | $ 0 | $ 0.02 | $ 0.02 | 0.26 | 0.36 | −2.5 |
| D | $ 0.010 | $ 0.02 | $ 0.01 | 1.26 | 0.93 | 10.0 |
| | | | Sum of Absolute Errors | | $ 0.05 | |
| | | | Number of Analysts | | 4 | |
| | | | Average Absolute Error | | $ 0.013 | |
| | | Standard Deviation | $ 0.0050 | | | |
| | | Average Absolute Error/2 | $ 0.0088 | | | |
| | | .02*|Actual| | $ 0.0004 | | | |

When the previous three metrics discussed above have proven to be insufficient, a constant may be used instead. In this case, the constant value may be set at $0.02. Other values, variables, or variable and constant combinations may also be used. As with the previous example, a denominator of $0.02 may yield the following:

| Analyst | Estimate | Actual | Absolute Error | RAS Using Standard Deviation | RAS Using Average Absolute Error | RAS Using Actual | RAS Using $0.02 |
|---|---|---|---|---|---|---|---|
| A | $ 0.000 | $ 0.02 | $ 0.02 | 0.26 | 0.36 | −2.63 | 0.44 |
| B | $ 0.000 | $ 0.02 | $ 0.02 | 0.26 | 0.36 | −2.63 | 0.44 |
| C | $ 0.000 | $ 0.02 | $ 0.02 | 0.26 | 0.36 | −2.63 | 0.44 |
| D | $ 0.010 | $ 0.02 | $ 0.01 | 1.26 | 0.93 | 18.75 | 0.69 |
| | Sum of Absolute Errors | | $ 0.05 | | | | |
| | Number of Analysts | | 4 | | | | |
| | Average Absolute Error | | $ 0.013 | | | | |
| | Standard Deviation | | $ 0.0050 | | | | |
| | Average Absolute Error/2 | | $ 0.0088 | | | | |
| | .02*|Actual| | | $ 0.0004 | | | | |
| | $0.02 | | $ 0.0200 | | | | |

Figure 27:
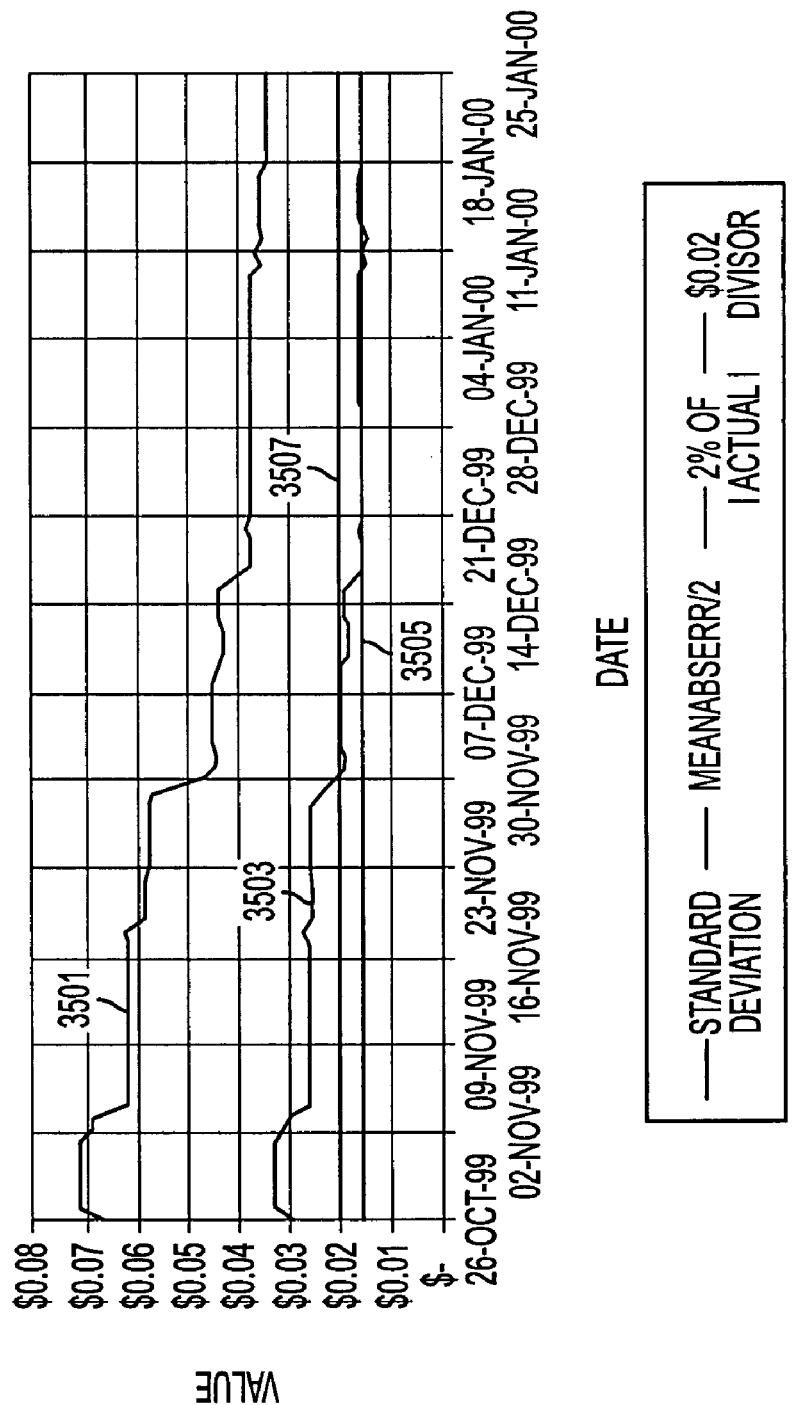
FIGS. 27–30 illustrate a series of charts where various denominators are displayed according to an embodiment of the present invention.

FIG. 27 illustrates an example of divisors for a single stock (or earnings event) according to an embodiment of the present invention. This figure shows a chart of possible denominators for a predetermined time period for a specific stock (or earnings event). According to this example, a number of divisors may be plotted for analysis. As shown, the divisor type and values may change over time within a period for a single stock (or earnings event). By plotting the possible denominators (in this example, four denominators are plotted), the user may determine which denominator has the maximum value throughout the defined period. A denominator may be selected based on other criteria as well. As discussed above and according to an embodiment of the present invention, denominator of a maximum value out of other possible denominators may be selected for an accurate scaling of relative accuracy measures.

In this example, the standard deviation 3501 exceeds the MeanAbsErr 3503, a percentage of the absolute value of the actual 3505 and a fixed denominator 3507. In this example, the MeanAbsErr may be multiplied by a constant, such as ½. Other constants and/or variables may also be used by the present invention. Thus, as the largest value, the standard deviation as shown by 3501 may be used as the denominator throughout the defined period.

Figure 28:
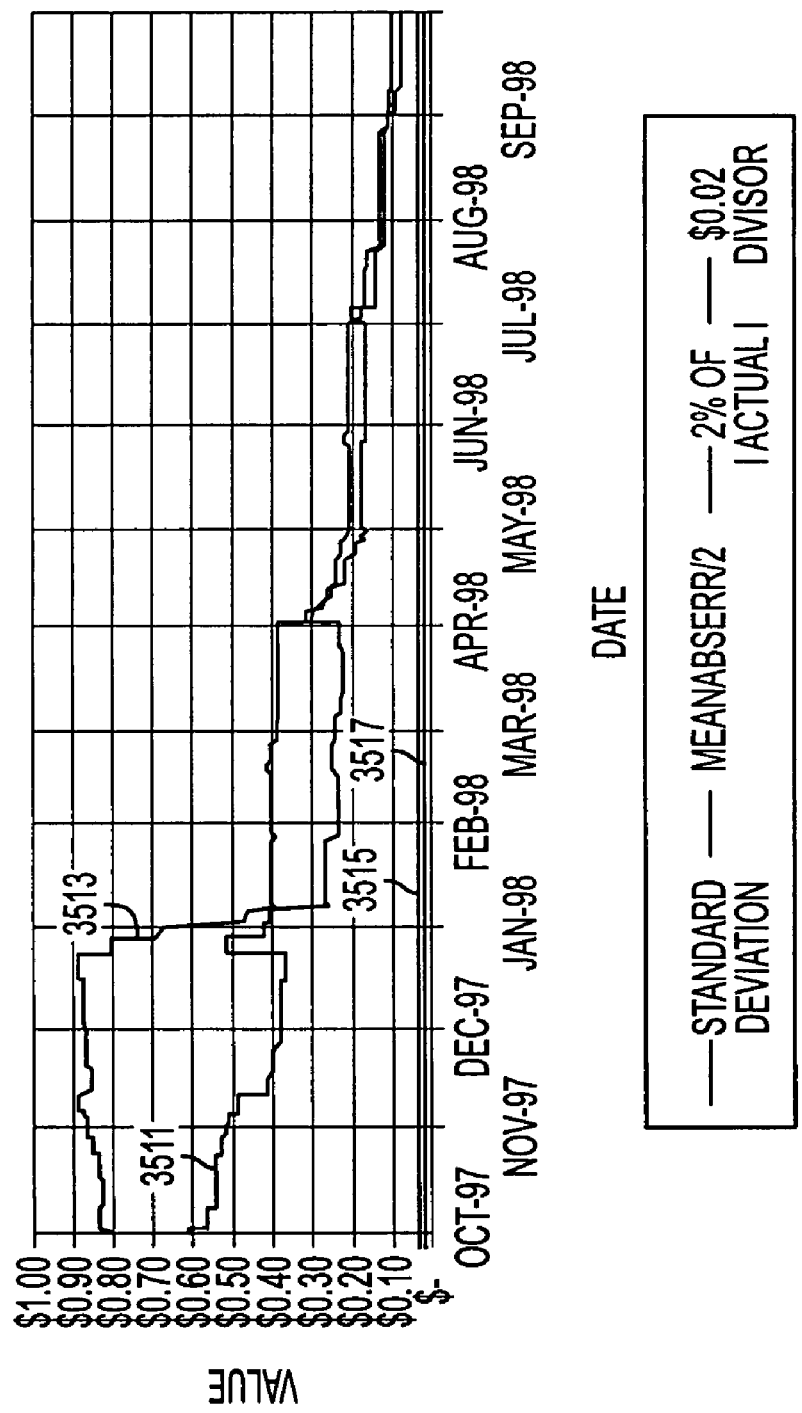

In another example, the denominator may switch over time between two or more possible denominators as shown in FIG. 28. For example, the denominator may switch between the MeanAbsErr 3513 and the standard deviation 3511 where the greater value may be used as the denominator during time periods when each denominator is greater. Other criteria for denominator selection may also be implemented. The other denominators, a percentage of the absolute value of the actual 3515 and the fixed denominator 3517, may not be selected as denominators because these value are consistently lower than the other two values, as shown in FIG. 28. As illustrated in this example, some analysts were fairly inaccurate during various time periods. As a result, the MeanAbsErr divisor shown by 3513 may be used for most of the period. The standard deviation shown by 3511 may be used briefly several times following the stock's quarterly reports in January, April, and July, when clusters of analyst revisions resulted in estimates on average being more accurate with the MeanAbsErr 3513 suddenly dropping. These cluster dates were also times of added uncertainty in this stock's estimates, since many analysts were slow to revise their estimates. Thus, the drop in the MeanAbsErr 3513 may have been accomplished by temporary jumps in the variance of estimates, as measured by standard deviation.

Figure 29:
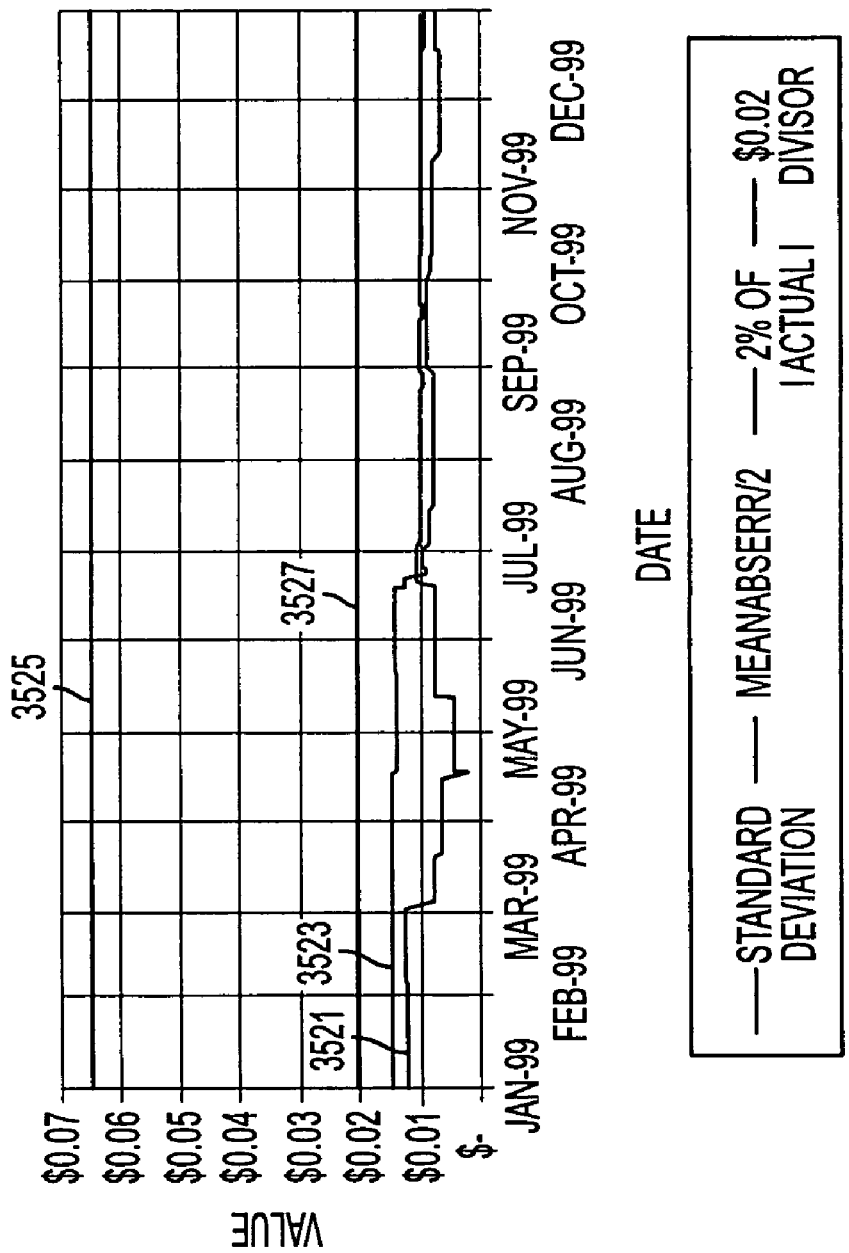

FIG. 29 illustrates an example where a percentage of the absolute value of the actual may be used as a divisor, according to an embodiment of the present invention. For example, some stocks may have very little uncertainty in terms of earnings. A stock with well established earnings may be predictable so that all estimates tend to be grouped together. As a result, the standard deviation may be low, as shown by 3521. Furthermore, the estimates may also be quite accurate, so that the MeanAbsErr function is small, as shown by 3523, and may not be used as a divisor either. In this case, one of the two remaining divisors may be used. As shown in FIG. 29, a percentage of the absolute value 3525 may be used as the denominator for the fiscal year ending in December 1999 since this value is higher than the fixed divisor 3527. In this example, the percentage may be set at 2%. Other percentage values or multipliers may also be implemented.

Figure 30:
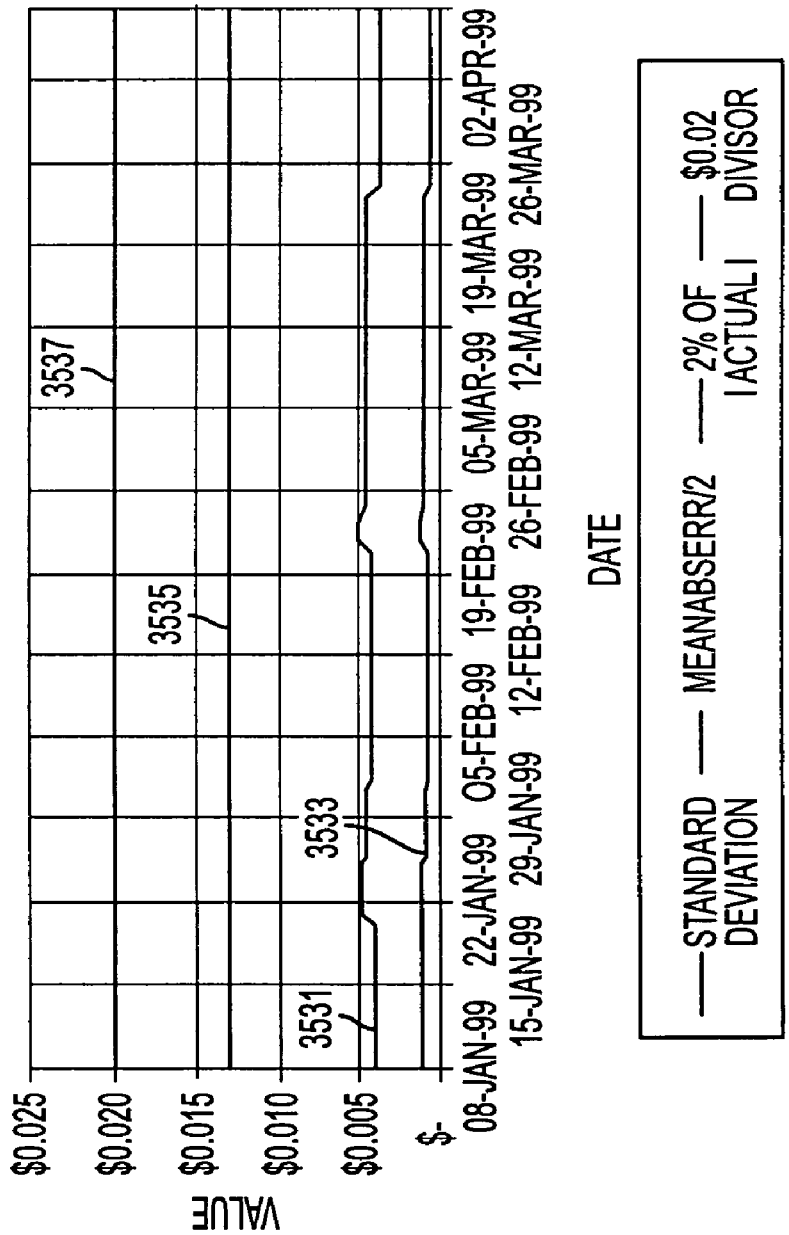

According to another example, a fixed divisor may be used, as shown in FIG. 30. For a stock (or other earnings event) during a defined time period (e.g., a single quarter or a fiscal quarter ending in March 1999), a percentage of the absolute value 3535 may be deemed too small to provide a meaningful calculation of accuracy (or other performance metrics). In this case, a fixed divisor 3537 may be used as the denominator. In this example, the fixed divisor has been set to equal $0.02. Other values for the divisor may be used in other applications. As illustrated in FIG. 30, the standard deviation 3531 and MeanAbsErr 3533 are both smaller than the fixed divisor 3537.

According to another embodiment of the present invention, RAS values may be aggregated over a period for various stock/analyst pairs or other combinations. The accuracy of one or more analyst's estimates of a specific stock or stock sets may be evaluated for a predetermined period of time, within a fiscal period, fiscal year or other time frame. While an analyst's accuracy with respect to a particular stock on a single day is useful for evaluation and analysis, an analyst's accuracy over a period of time may serve as valuable indication of long-term accuracy. For example, an analyst may have an accurate estimate for a given day preceded by a string of inaccurate estimates. By evaluating the single day at which the analyst provided an accurate estimate, the analyst's overall accuracy is misrepresented. However, by evaluating accuracy over a period of time, an analyst's performance may be more realistically determined.

There may be instances where an analyst may make a small amount of estimates during a long period of time. For example, a first analyst may have provided 3 estimates during an entire fiscal year. A second analyst may have consistently made estimates on a weekly basis for the same fiscal year. However, comparing the first analyst with the second analyst for the same period would not accurately represent the relative accuracy where the number of estimates drastically vary between the two analysts.

In a similar instance, there may be certain days where a small number of estimates are provided for a particular stock. For example, on a single day, there may be 100 estimates from various analysts based on certain events in the market. On another day, there may only be a single estimate, which may be an indication of inactivity. In such instances, it may be advantageous for efficiency and effectiveness purposes to require a minimum number of analysts to have estimates on any day before measuring analysts on that day. A very small number of estimates for analysts may be an indication of inactivity or other trend.

Furthermore, once relative accuracy scores are obtained using the above rules and equations, the scores may be truncated so that the scores lie within a defined range of values. By truncating scores, extreme scores to outliers may be avoided. By defining a clear range of values at which relative accuracy scores may lie, comparisons and evaluations may be properly and accurately made.

Figure 31:
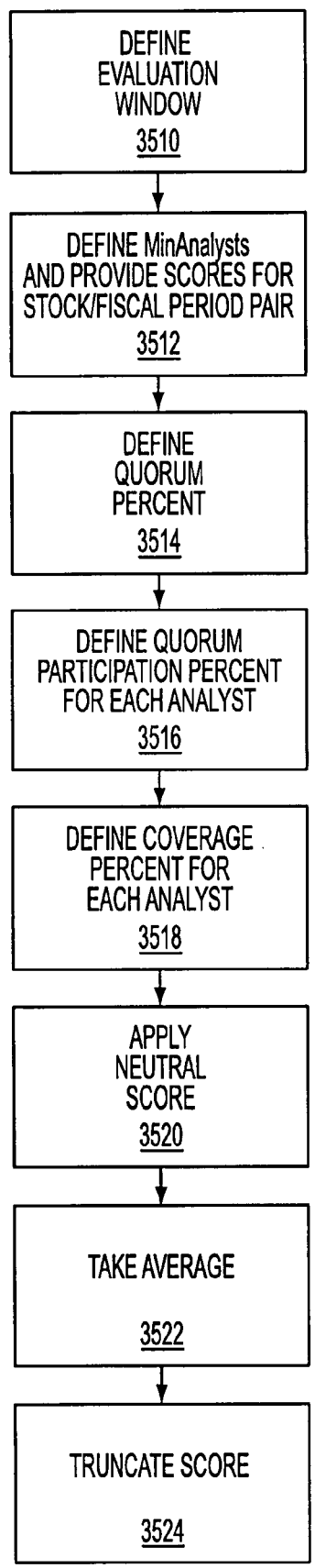
FIG. 31 is a flowchart illustrating a method for aggregating RAS scores over a period for a stock/analyst pair according to an embodiment of the present invention.

FIG. 31 is a flowchart illustrating a method for aggregating RAS values over a period for a stock/analyst pair, according to an embodiment of the present invention. In this embodiment, accuracy scores may be aggregated over the course of a fiscal period to create a single score for a given analyst and fiscal period. At step 3510, an evaluation window EW(P) may be defined as the number of days leading up to the report date for fiscal quarters or fiscal years. Other definitions of the evaluation window may also be used. For example, in instances where the report date is more than 200 days after the end of the fiscal period, 92 days (for quarters) or 365 days (for years) leading up to the day that is 200 days after the end of the fiscal period may be used. Other values may also be used. For example, |EW(P)| may equal the number of days in the Evaluation Window. At step 3512, evaluation of stock/fiscal period pairs may be analyzed for those that have at least a minimum number of analysts with estimates, available on at least one day in the Evaluation Window. MinAnalysts may include the minimum number of analysts that are needed on a given day to make a meaningful calculation. For example, a minimum number of analysts may be set at three analysts for a given day. Other limitations may also be used.

At step 3514, a Quorum Percent QP(P) may be defined as the number of days in the Evaluation Window with at least a minimum number of analysts with estimates, divided by |EW(P)|. At step 3516, each analyst may receive a Quorum Participation Percent QPP(P) score for the period, which may be defined as the number of days within days with at least a minimum number of analysts with estimates, divided by |EW(P)|. At step 3518, each analyst may receive a Coverage Percent CP(P), which may be defined as the number of days in the Evaluation Window in which the analyst had an estimate, divided by |EW(P)|. At step 3520, a neutral score (e.g., 0.5) may be used on days in the Evaluation Window in which the analyst had no estimate available or days on which there were fewer than MinAnalysts estimates available. Therefore, when a score for an analyst is not obtainable, the best estimate for that analyst may be a neutral score (e.g., an average score). This adjustment also takes into account those cases in which analysts had spuriously good or bad scores for a small portion of the period. Other values for the neutral score may also be used. At step 3522, an average of the analyst's RAS scores for a predetermined number of days may be taken. The scores may then be truncated to lie between a defined range, at step 3524. In this example, the range has been defined as between 0 and 1.

$$RAS(P) = Min(Max([(\Sigma_t dw_t * RAS(t)] * QPP(P) + 0.5 * (1 - QPP(P)), 0), 1)$$

where $dw_t = 1/|EW(P)|$ for all t, is a weighting function that, in this case, represents equal weighting across all days under consideration. This formula takes the average score on days during which the analyst had estimates and there were at least a minimum number of analysts with estimates. It then multiplies that number by the percentage of days in the Evaluation Window on which the analyst had coverage. Also, a neutral score may be substituted on days on which the analyst did not have coverage, or on days on which there were fewer than a set minimum number of analysts with estimates. It then multiplies that number by the percentage of such days in the Evaluation Window. The RAS scores may then be truncated to fit on a defined scale. Examples of scales may include 0 to 1, 0 to 10, 0 to 100. Other ranges may also be defined in order to avoid giving extreme scores to outliers.

When an estimate is not available or not meaningfully calculable on a given day or set of days, a neutral score may be assigned to those days. A neutral score may be a value in the middle of a defined range. For example, for a range of 0 to 1, a neutral score may be 0.5. Since not all analysts follow the stock for the whole period, it may be desirable to compensate for days during which no estimate is given. Also, there may be instances where new analysts submit an accurate estimate due to beginner's luck or other circumstances. Thus, by evaluating the entire period for each analyst and by compensating for missing days, each analyst receives an accurate relative score despite obscure events, such as beginner's luck. The resulting scores, in accordance with the present invention, are calculated regardless of time coverage of analysts.

For example, a Company ABC may report its actual earnings for the fiscal quarter under consideration within 200 days of the end of that quarter. Of the 92 days preceding the report date for Company ABC's fiscal quarter, there may be 60 days during which at least 3 analysts covered Company ABC. Furthermore, Analyst A may have covered the stock for 45 of the 60 days. Suppose Analyst A's daily RAS score for 30 of the 92 days was 0.7, and his daily RAS score for the other 15 days was 0.25. Then, QPP(P)=45/92=0.49 and |EW(P)|=92. The Period RAS may be calculated as follows:

$$RAS(P) = [(((30*0.7) + (15*0.25))/45)*0.49) + (0.50*(1-0.49))]$$
$$= 0.5247$$

As this RAS is both non-negative and not above 1, it is not truncated and remains at 0.5247 on the 0 to 1 scale.

According to another embodiment of the present invention, RAS may be aggregated over multiple periods for a stock/analyst pair. For example, a single period RAS (as discussed above) may be aggregated over multiple periods of a single type (e.g., quarters or years) to determine overall, multi-period accuracy scores for a given analyst on a given stock, for a defined length of time, such as fiscal quarters or fiscal years. For example, a single analyst on a single stock over the last eight quarterly events may be measured. According to another embodiment, an analyst score over multiple stocks and/or multiple periods may be measured as well. This feature of the invention provides an accurate long-term analysis of an analyst's performance over a defined set of events.

Figure 32:
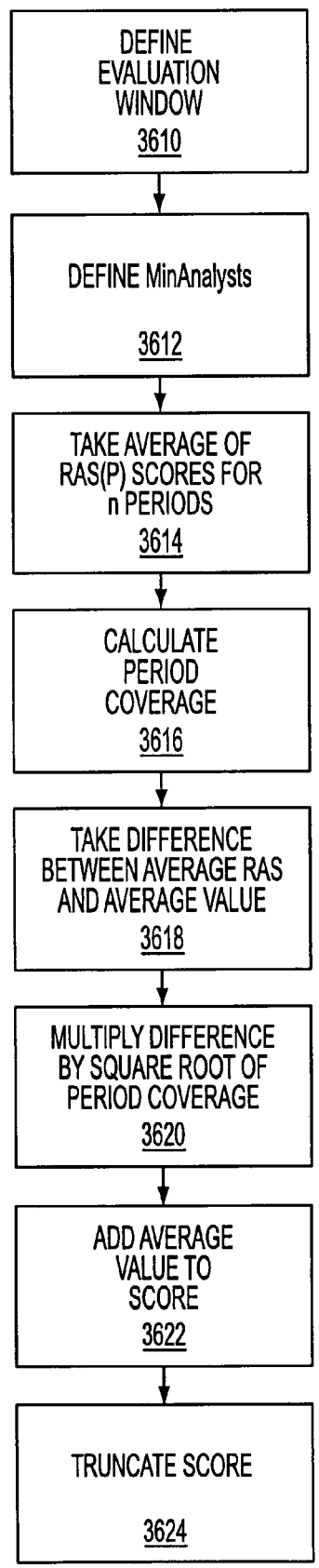
FIG. 32 is a flowchart illustrating a method for aggregating RAS scores over multiple periods for a stock/analyst pair according to an embodiment of the present invention.

FIG. 32 is a flowchart illustrating this embodiment of the present invention. At step 3610, an evaluation window may be defined. For example, a predetermined collection of periods or events may be selected for consideration. At step 3612, a minimum number of analysts for a time period to be evaluated may be defined. For example, the minimum number of analysts may be set at 3. For any analyst with an estimate on at least one day with at least 3 analyst estimates within the Evaluation Windows of any one of these periods, RAS values may be calculated. At step 3614, RAS(P) values for the predetermined collection of periods may be averaged to determine an RAS score for that analyst/stock pair. Periods for which the analyst has no RAS(P) score may be ignored or assigned a neutral score. At step 3616, the analyst Period Coverage (PC) may be calculated (e.g., the number of periods for which the analyst has a score out of the predetermined collection of periods). At step 3618, the difference between the average RAS and a predetermined average value may be calculated to measure the amount by which the analyst was above or below the average. At step 3620, this difference may then be multiplied by a function of the Period Coverage, such as the square root of the Period Coverage. The intuition is that the amount by which an analyst's score differs from the average is more meaningful if that analyst has had more coverage on the stock so that those scores are expanded according to the amount of coverage. The choice of square root of the length of coverage is a result of the additive properties of standard deviations, and is meant to ensure that multi-period aggregated scores demonstrate a distribution that is similar to the scores for single periods. Other functions of the Period Coverage may be used. At step 3622, the score may then be increased by the predetermined average value in order to center the scores around the predetermined average value once again. At step 3624, the score may be truncated so that it lies between a predetermined range, such as 0 and 1, 0 and 10, or 0 and 100. This is desirable so that the expansion may result in scores that exceed the range in which the single-period RAS scores lie.

According to an embodiment of the present invention, any combination of single-event RAS scores may be aggregated over a defined number of periods of events. For example, the average score on periods or events during which the analyst had scores may be calculated. An average or neutral value (e.g., a median value) may then be subtracted in order to measure the amount by which the analyst was above or below the average. This value may be multiplied by the square root of the amount of coverage over the number of periods or events, in order to expand the scores of analysts with more coverage. The average value that was removed from the formula is then added back in order to center scores around the average or neutral value, once again. The resulting RAS score may then be truncated to fit on a predetermined range where the average or neutral value is the median value within the predetermined range.

An aggregation algorithm for RAS for multiple fiscal periods may be calculated as follows:

$$RAS = Min(Max([(\Sigma_{i=0 \ to \ n-1}(pw_i * RAS(P_{-i})) - 0.5] * [PC]^{1/2} + 0.5, 0), 1)$$

where $pw_i = 1/PC$ is the weighting scheme for periods, which in this case represents equal weighting among all periods for which the analyst was scored. Periods in which the analyst was not scored do not contribute to the summation. The subscripts $P_{-i}$ are intended as placeholders for the reported periods that are being considered. For example, if EventType=Q, $P_0$ may be a placeholder for the $FQ_0$ event, i.e., the last reported quarter.

For example, a user may want to rate Analyst A on Company ABC over the last four reported fiscal quarters. In this example, Analyst A covered Company ABC over three of those four quarters. Analyst A's quarterly RAS may be as follows:

| P | RAS(P) |
| --- | --- |
| $Q_0$ | 0.30 |
| $Q_{-1}$ | N/A |
| $Q_{-2}$ | 0.25 |
| $Q_{-3}$ | 0.80 |

Average(RAS(P))=(0.30+0.25+0.80)/3=0.45

PC=3

Aggregated quarterly RAS may be calculated as follows:

RAS=[((0.30+0.25+0.80)/3)−½]*[3]$^{1/2}$+½=0.4134

This score lies between 0 to 1, so there is no need to truncate this value.

According to another example, Analyst A may have a score of 70 for 1 quarter. Analyst B may have an average score of 65 for 8 quarters where the scores for the 8 quarters are 90, 50, 95, 60, 60, 65, 50, and 50. At first glance, since Analyst A has a higher score than Analyst B, it may appear that Analyst A has more accurate estimates. However, the raw average scores may not present a clear assessment of accuracy because the raw average scores fail to take into consideration the length of time (e.g., number of quarters or periods). The present invention calculates the average score with respect to the number of quarters or periods that have been evaluated to provide a better and more realistic score. In accordance with the present invention, Analyst B's score may be calculated as follow. The number of events for which there is a score is 8. The average single event RAS calculated over N events is 65. That value subtracted by the average score, which in this example is 50, equals 15. The square root of the number of events is SQRT(8)=2.8, which is multiplied by the difference, 15, resulting in a value of 42. Other functions of the number of events may also be used to calculate this value. The average value, 50, is then added to 42 to equal 92. This score may then be truncated to fall within the range of 0 to 100. In this case, 92 falls within the range so truncated is not necessary. When comparing 92 to 70, it becomes clear that an average score of 65 over 8 quarters is more accurate than a score of 70 over 1 quarter.

According to another embodiment of the present invention, RAS scores may be aggregated over any combination of analyst/stock/period triples. For example, RAS values may be determined for a single stock across a group of analysts, such as all analysts within a certain set of brokerage firms, scored on a particular stock. Also, a single analyst on a group of stocks, such as all stocks covered by a particular analyst. Another example may include groups of analysts over groups of stocks. As an example, accuracy scores of all analysts at certain brokerages may be rated according to their accuracy on all stocks in particular instances, grouped according to industry/brokerage pairs.

Figure 33:
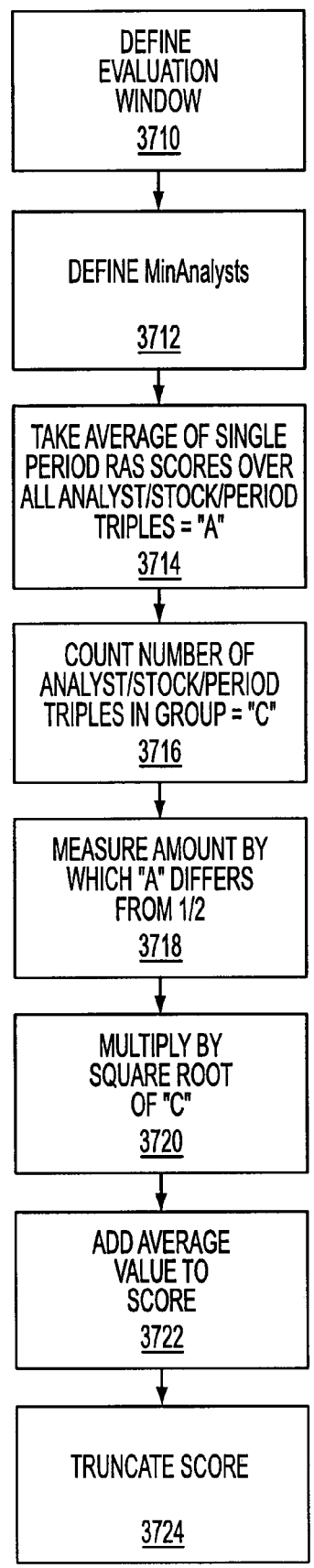
FIG. 33 is a flowchart illustrating a method for aggregating RAS scores over any combination of analyst/stock/period triples according to an embodiment of the present invention.

In order to calculate the RAS scores, a set of analyst/stock/period triples, a grouping method of these analyst/stock/period triples, and the number of analyst/stock/period triples in each group may be defined. Other parameters may also be defined for RAS score calculation. FIG. 33 is a flowchart illustrating an example of this embodiment of the present invention.

At step 3710, an evaluation window may be defined. At step 3712, a minimum number of analysts may be defined for evaluation of stock/fiscal period pairs. At step 3714, an average of the single period RAS scores over all analyst/stock/period triples in the group may be determined. For simplicity, this average may be called "A". At step 3716, the number of analyst/stock/period triples in the group may be referred to as "C". The more analyst/stock/period triples in the group, the more significant the average score for that group. To find out how much better this group's score is than the average value, the amount by which "A" differs from an average value may be measured, at step 3718. This value may then be multiplied by the square root of "C", in order to adjust the score by the significance of that score, at step 3720. To center the scores around a median value, the average value may be added, at step 3722. The value may then be truncated so that the score may lie between a predetermined range, at step 3724.

An aggregation algorithm for RAS for multiple analyst/stock/period triples may be calculated as follows:

RAS(group)=Min(Max((A−½)*C$^{½}$+½, 0), 1)

where A=average RAS over all analyst/stock/period triples in the group and C=the number of analyst/stock/period triples in the group.

In the following example, a single analyst's average RAS score over all stocks covered by that analyst over the last two reported quarters may be calculated. For example, the analyst may have covered fourteen stocks, with RAS scores for the last two quarters as follows:

| Company | Period | RAS |
| --- | --- | --- |
| Apple Computer, Inc. | $FQ_0$ | 24% |
| Apple Computer, Inc. | $FQ_{-1}$ | 79% |
| Unisys Corp. | $FQ_0$ | 52% |
| Unisys Corp. | $FQ_{-1}$ | 79% |
| Compaq Computer | $FQ_0$ | 92% |
| Compaq Computer | $FQ_{-1}$ | 54% |
| Citrix Systems Inc | $FQ_0$ | 47% |
| Dell Computer Corp. | $FQ_0$ | 63% |
| Dell Computer Corp. | $FQ_{-1}$ | 49% |
| Gateway | $FQ_0$ | 44% |
| Gateway | $FQ_{-1}$ | 12% |
| Hewlett Packard Co | $FQ_0$ | 71% |
| Hewlett Packard Co | $FQ_{-1}$ | 22% |
| International Business Machines | $FQ_0$ | 57% |
| International Business Machines | $FQ_{-1}$ | 22% |
| Mercury Computer System | $FQ_0$ | 26% |
| Microsoft Corp. | $FQ_0$ | 80% |
| Microsoft Corp. | $FQ_{-1}$ | 40% |
| Network Appliance Corp. | $FQ_0$ | 56% |
| Network Appliance Corp. | $FQ_{-1}$ | 57% |
| Silicon Graphics, Inc. | $FQ_0$ | 69% |
| Silicon Graphics, Inc. | $FQ_{-1}$ | 45% |
| Sun Microsystems, Inc. | FQ0 | 50% |
| Sun Microsystems, Inc. | $FQ_{-1}$ | 58% |
| Micron Electronics | $FQ_0$ | 50% |
| Micron Electronics | $FQ_{-1}$ | 39% |
| Average | A = | 51.41% |
| Number of events | C = | 26 |
| Sqrt(C) | | 5.1 |

RAS(this analyst) = ((0.5141 − 0.5) * 26$^{½}$) + 0.5 = 0.5719

This scores lies between 0 and 1 so there is no need to truncate it.

According to another embodiment of the present invention, a rating system may be used to rate analysts' performance, based on one or more performance metrics. For example, the rating system may use the RAS values as the basis or at least part of the basis for determining the rating. RAS values may be mapped, either for a single event or aggregated over multiple events or other combination, to a rating system. A range of RAS values may be designated to correspond to a particular rating or grade thereby indicating degrees of accuracy and performance.

The present invention may implement a rating system wherein a percentage of analysts or other sources are assigned a rating, which may be used to signify the analyst's performance for a defined earnings event for a defined time period. Symbols may be used to represent degrees of accuracy or other performance metric. For example, one symbol (out of a possible 5 symbols) may represent low accuracy while five symbols (out of a possible 5 symbols) may represent high accuracy. Varying number of symbols in between one and five may also represent varying degrees of accuracy (or other performance metric). Also, a different symbol or color may be used to represent different degrees of accuracy. For example, a red colored symbol may represent one degree of accuracy while other colors and/or symbols may represent other varying degrees of accuracy. Other symbols, such as letters (e.g., grades), checkmarks, or circles may be used. Also, the scores may be divided into different ranges. For example, RAS values may be divided into smaller groups so that a 10 star rating is available to the most accurate scores. In another example, RAS values may be divided into larger groups, so that a 3 star rating is an indication of an accurate score. Other ratings and ranges may also be used. The number of stars may serve as a visual method of representing relative analyst performance. Other variations and illustrations exist.

For example, RAS values that fall within the range 0 to 19, may be assigned one star. RAS values that fall within the range 20–44, may be assigned two stars. RAS values that fall within the range 45–54, may be assigned three stars. RAS values that fall within the range 55–69, may be assigned four stars. RAS values that fall within the range 70–100, may be assigned five stars so that a five star rating corresponds to a highly accurate performance.

The RAS values may be made to fit on a defined curve, such as a bell curve. For example, 10% may be assigned a 5 star rating, 20% may be assigned a 4 star rating, 40% may be assigned a 3 star rating, 20% may be assigned a 2 star rating, and 10% may be assigned to a 1 star rating. Other distributions may also be used.

According to another embodiment, the present invention provides analysts, directors of research, a firm's external relations departments, brokers, and other entities a set of tools to measure and manage various performance metrics of one or more analysts (or other sources). The quantitative metrics of the present invention may provide objective ratings of analyst performance, which may include the accuracy of earnings estimates, the profitability of buy/sell/hold recommendations, and/or other predictions and performance metrics.

The present invention provides valuable tools for improving, reviewing and analyzing the accuracy of estimates and other indicators of accuracy. A user of the analyst measurement tool may track estimates by checking for outdated estimates, view current and historical estimates (or other predictions) that significantly vary from the mean or other threshold value, and/or monitor how one or more analysts' estimates compare to the high, low, mean and/or other calculated estimates. Also, an analyst may identify and correct errors in the IBES database. After reviewing data, an analyst may alter estimates or other predictions, correct errors, and compare performance to other analysts or sources. In addition, an analyst or other entity may evaluate and learn from historical data, which may be categorized and sorted based on various defined factors. Further, an analyst or other entity may review personal estimates and recommendations using estimate information, accuracy ratings, charts and other tools of the present invention.

The analyst measurement tool of the present invention may be used to view, analyze and calculate various analyst (or source) information, such as current data, historical data, performance metrics, predefined triggers, and other relevant data. Current data may include analyst or source information, which may encompass one or more earnings events followed by an analyst (or source), recommendation data, comparison information, and other current data for one or more analyst (or source). Current data may be displayed according to various defined time periods to enable comparison among different quarters, years, or other defined time periods (e.g., this quarter, next quarter, this year, and/or next year). Current data may also be presented in various chart formats, which may include a graph of one or more selected analyst estimates (or other current data). A graph of calculated measures may also be displayed, such as a high estimate, a median estimate, and/or a low estimate to enable detailed comparisons. Other relevant current data may also be shown.

Performance data may involve various measures of one or more analyst (or source) performance with respect to earnings events estimates or other predictions. Performance data may include calculations based on historical data for one or more analysts (or sources). This may involve calculating and/or determining the accuracy of one or more analysts' predictions of one or more selected earnings events for a defined time period. Accuracy of estimates for one or more analysts may be one factor in determining analyst (or source) performance data. The length of analyst (or source) coverage, among other factors, may also contribute to performance data and analysis. Performance data may be displayed for individual analysts, sets of analysts, user selected analysts, or analysts within a firm or other entity. Other combinations of source data are also available for display and/or analysis. For one or more analysts (or sources), performance data may be displayed for one or more earnings events followed by the selected one or more analysts. Performance data may include an accuracy score, a relative accuracy rating, an accuracy rank, average absolute error, actual earnings, and other accuracy related data. Performance data may be calculated and displayed for one or more selected time periods wherein the time periods may be defined by the user. Performance data may also be displayed in a graphical chart. Furthermore, one or more analysts (or sources) recommendation data with respect to earnings events may be displayed wherein recommendation data may include buy/sell/hold recommendations.

According to another embodiment, the present invention may send alerts or reminders informing analysts of the occurrence of specific events or highlighting potential issues associated with estimates. These alerts or reminders may be referred to as "mine-ders alerts" or "mine-ders" in accordance with an embodiment of the present invention. According to one embodiment of the present invention, mine-ders alerts may serve as a mechanism for flagging potential data issues without requiring the user to daily or periodically check for certain trends or events. By identifying events that are considered important to a user, the user may be automatically notified of one or more mine-ders alerts that indicate that one or more events have occurred. In response, the user may acknowledge the occurrence of the one or more identified events, make modifications to the user's estimate or perform other operations. Various modes of notification may be selected by the user for delivery or notification of mine-ders alerts information. In addition, mine-ders alerts may be displayed to the user when the user accesses the present invention.

Figure 34:
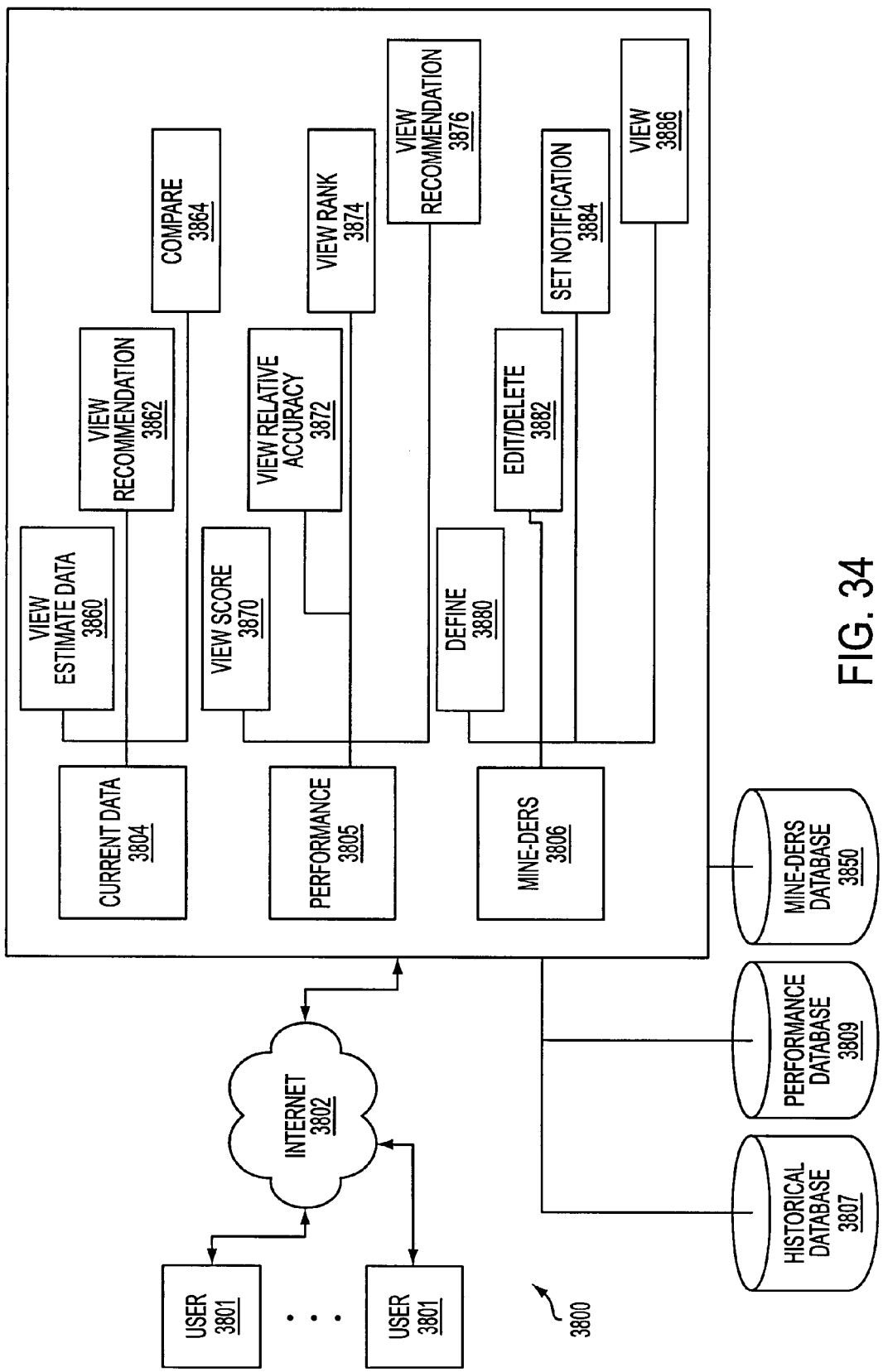
FIG. 34 is an example of a block diagram of an analyst measurement tool system according to an embodiment of the present invention.

FIG. 34 illustrates an example of an analyst measurement tool according to an embodiment of the present invention. One or more users 3801 may access the analyst measurement tool of the present invention through the Internet 3802 or other method. One or more users 3801 may include analysts, individuals or other entities who may desire to view, measure, and/or analyze data from various sources concerning performance and other metrics. Analyst measurement tool 3803 may enable the user to view various information related to individual analysts and other sources concerning current data 3804, performance data and/or metrics 3805, mine-ders alerts 3806, and other information. Databases may include Historical Database 3807, Performance algorithms and calculations Database 3809, and Mine-ders Database 3850. Other databases and information may also be included.

Current Data module 3804 may provide various forms of current estimate and other prediction or financial projection data for one or more analysts or sources. Current data may include estimate data, recommendation data, and other data as of the current date. For example, current data may include estimate data 3860 for one or more selected or defined analysts or sources. Estimate data may encompass estimates for one or more earnings events for a defined period of time, such as a fiscal period, or other time period. A fiscal period may comprise a fiscal quarter, plurality of fiscal quarters, fiscal year, or a plurality of fiscal years. Recommendation data 3862 may include buy/sell/hold recommendations as well as other recommendations. A compare option 3864 enables the user to view one or more analysts' estimates as compared to other estimates, mean values, consensus values for other one or more earnings events, stocks, and/or stock sets for one or more defined periods of time.

Performance data 3805 may include various forms of analysis of historical and other data which may be used to derive performance metrics for one or more analysts with respect to one or more earnings events, for one or more defined periods of time. Performance data may be viewed for one or more selected analysts, sources, a selected firm, entity or other groupings. Performance data may be viewed for various levels of time periods (e.g., fiscal quarters, fiscal years). For example, performance data may include accuracy scores 3870 wherein accuracy scores may be calculated in accordance with relative accuracy score algorithms, as discussed above. Other performance data may also include relative accuracy ratings 3872, performance ranking 3874, analyst recommendation 3876, as well as other performance metrics. Relative accuracy ratings may serve as an indication of an analyst's accuracy as compared to other analysts (or sources). Performance ranking information informs the user of an analyst's rank as compared to a total number of analysts following a particular earnings event. Analyst recommendation information relates to buy/sell/hold and other recommendations for one or more earnings events.

Mine-ders alerts may be defined for various events or conditions where one or more users may be notified of the occurrence of the defined events or conditions. Notification may be established through various methods. For example, notification may be defined or selected by the user or predetermined by the system of the present invention. The user may also view mine-ders based on various factors. For example, a user may view a list of active and/or inactive mine-ders alerts. Further, the mine-ders alerts may be sorted according to various user defined or selected factors or preferences. This feature enables the user to maintain and track current and past mine-ders alerts. At 3880, a user may define various conditions and events for notification. According to one example, Database 3850 may provide the user with a template or list of triggers to select from. Also, users may define personalized mine-ders alerts.

A mine-der alert may, for example, be based on whether an analyst's estimate differs from a summary metric of a plurality of analysts' estimates by a predetermined value. The summary metric may comprise a measure of central tendency such as a mean, median, or mode as will be understood by those having skill in the art. The summary metric may, in some instances, comprise a conditional summary metric that is qualified by at least one qualifying metric. A qualifying metric may comprise a specified time period, or a specified number of securities. Various other qualifying metrics may be used. As an example, when determining whether an analyst's estimate differs from a summary metric (e.g., from a mean of a plurality of analysts' estimates), it may be beneficial to qualify a specific time period within which to evaluate the analyst's estimate (e.g., for a particular fiscal quarter, fiscal year, or other time period).

When determining whether an analyst's estimate differs from a summary metric of a plurality of analysts' estimates by a predetermined value, several possible predetermined values may be used. For instance, a mine-der alert may be triggered when the analyst's estimate is more than a defined number of standard deviations away from a mean estimate. For example, if an analyst's estimate is more than 2 standard deviations away from the mean, a mine-der alert may be triggered and sent to the user. This type of mine-der alert informs the user that an analyst's estimates are straying away from the consensus, which may warrant estimate re-evaluation. Other values, including currency units or percentages may also be used.

A mine-der alert may be sent to an analyst or other assigned entity when the analyst's estimate is more than a defined number of days (e.g., 100 days old). This type of mine-der alert informs the user that it may be time for an update. This feature minimizes the number of outdated and old estimates.

As another example, a user (e.g., an analyst) may be alerted when a cluster (or revision) has occurred and the analyst has not yet revised. Clusters may be defined as the occurrence of a significant number of analysts revising their estimates in a short time period. This often occurs during the release of company news, changes in the industry, earnings releases, and other issues that affect future earnings. A cluster may serve as an indication of the flow of new information into the marketplace characterized by analysts revising as a group. A feature of the present invention provides a method for systematically detecting revision clusters where the cluster's begin date may be used as a filter. Those analysts who have not revised their estimates may then be notified that there is potentially material company-related news, which could affect EPS. This feature also helps clients identify which estimates have been updated since the recent news or other events. Other conditions may be set and other triggers may be used. Mine-ders alerts may be modified by the analyst or other authorized entity for customization.

According to another embodiment of the present invention, mine-ders alerts may be displayed by a symbol for clear identification. As illustrated in detail below, a mine-der alert may be represented by a symbol, such as a yellow triangle, for example. The symbol may provide a hyperlink to more detailed mine-ders information, such as trigger dates, graphical data and other information.

Mine-ders conditions and other related features may be modified by the user at 3882. At 3884, the user may define one or more methods of notification. For example, when an event or condition occurs, the user may be notified via email with a link to the present invention, Internet, an instant messaging system, cell phone, PDA, pager, phone, or other methods of communication. In addition, the user may be notified of mine-ders alerts by accessing the web-site of the present invention. For example, upon accessing the present invention, the user may receive a notification of the occurrence of one or more predetermined mine-ders alerts. Also, the user may access a page or portion of a page of the web-site of the present invention where mine-ders information may be displayed. The user may identify one or more preferred modes of communication for convenience and prompt notification. Also, a user may assign different modes of notification for different mine-ders, as preferred by the user. For example, the user may prefer to be notified via email when a cluster revision has occurred. Thus, varying degrees of importance may dictate the varying types of notification.

At 3886, the user may select to view mine-ders alerts that are associated with one or more selected analysts. Also, mine-ders alerts associated with a firm, a defined entity, or other grouping may be displayed. The user may sort mine-ders through various factors and categories for analysis and comparison.

The present invention may be used to view the EPS forecast performance of a firm, analyst, or other defined group or entity to check the accuracy and timeliness of estimates, and to compare estimates versus the consensus. To view data by analyst, a user may select a particular analyst's name (e.g., from a drop down list). To view the analyst's current estimates and/or recommendations, the user may select the appropriate name and select "Current Data". "Current Data" shows the stocks covered by the analyst, the analyst's current recommendations, the analyst's EPS estimates, and other current data. Greater detail, such as a graphical display, on a particular estimate may be viewed by selecting a hyperlinked icon (e.g., score or number). Mine-ders, which show estimates that are flagged as potentially incorrect or outdated, may also be viewed by selecting an analyst (e.g., from a drop-down list), then selecting on the "Mine-der" link. Overall performance on multiple stocks by a particular analyst may be viewable by selecting an analyst (e.g., from a drop-down list), then selecting "Performance". This option highlights an analyst's EPS forecast performance across various time periods for associated earnings events (e.g., stocks covered by the analyst).

To view firmwide data, a user may select the appropriate link under the "Firmwide" title. The firmwide view enables the user to view, compare and analyze data for one or more analysts (or sources) from a selected entity, such as a firm, group or other collection of sources. For example, the Performance page ranks some or all analysts associated with a firm for various time periods. In another example, the Mine-ders page highlights some or all the potential forecast issues for some or all analysts associated with a firm (or other defined entity). Other firmwide information may also be available.

For each screen shot, the present invention may provide navigational features that display various information, charts, graphs and other displays. For example, as illustrated in FIG. 35, a firm or entity name may be displayed on the screen, at section 3810. A data summary section 3812 may provide a brief description of the presented data (e.g., Mine-ders Summary) and inform the user how current the data is. In this example, the data is current through Jun. 30, 2000. The user may select a specific analyst by name for detailed analysis of performance and other data. For example, the user may select an analyst by selecting a name in Analyst column 3832. Also, the user may select an analyst name by scrolling down a list at a drop down window, at 3814. Other methods of selecting may also be used. Once an analyst is selected, various viewing options are available. For example, the user may view current data, by selecting 3820; performance data, by selecting 3822, mine-ders data, by selecting 3824; and other data views. Also, the user may lookup analysts by stock, by selecting 3816.

The present invention may also provide firmwide information. For example, firmwide performance information may be available, by selecting 3826 and firmwide mine-ders information may be available, by selecting 3828. Performance information may include all analysts associated with a firm including analyst name, score, relative accuracy (in terms of star ratings), number of stocks followed by the analyst, and other information. Mine-ders information may include analyst name, number of mine-ders for each analyst and trigger date information related to mine-ders within the firm. Other firmwide data views may also be available. Section 3830 may display a brief description of the current view (e.g., firmwide, analyst name, stock ticker, etc.).

FIG. 35 is an example of a screen shot providing mine-ders summary information for a firm or other entity, according to an embodiment of the present invention. Mine-ders information for a firm may include a list of analysts, number of mine-ders associated with analysts for various time periods. Further, mine-ders may be first defined on a particular date, known as the trigger date. A trigger date may be defined as the date when the present invention flags a potential data issue thereby creating a mine-der. Analyst may utilize trigger dates to track what mine-ders were created and when the mine-ders were created. The present invention may display trigger dates and the number of mine-ders triggered on those days.

For example, FIG. 35 presents a list of analysts in column 3832 associated with the firm or entity displayed in section 3810. Today column 3834 displays the number of mine-ders associated with each analyst for the current date. In this example, the current date is Jun. 30, 2000, as shown in section 3812. In this example, analyst "Sanger, A" has 14 mine-ders for the current date. Last 7 Days column 3836 displays the total number of mine-ders associated with each analyst for the previous week (or 7 days). In this example, analyst "Sanger, A" has a total of 27 mine-ders for the previous week. All column 3838 displays the total number of mine-ders associated with each analyst. In this example, analyst "Sanger, A" has a total of 32 mine-ders. The analysts may be ranked and sorted according to the number of mine-ders as of the current date, the last 7 days or total number of mine-ders. Other views may also be available.

Further, trigger dates, which may be defined as the date when the present invention flags a potential data issue, and corresponding number of mine-ders triggered on those dates may be displayed for the firm. Analyst may utilize trigger dates to track what mine-ders were created and when the mine-ders were created. For example, Trigger Date column 3840 displays a list of trigger dates and column 3842 displays the total number of mine-ders that are triggered by that date. A user may view a detailed list of mine-ders triggered on a particular date by selecting a desired trigger date in column 3840. For example, a user may select Jun. 30, 2000 as the trigger date to view a list of all mine-ders first triggered on that date for a particular firm or entity. In addition, a mine-der alert may not always be triggered by a change in an analyst's estimate. For instance, while an analyst's estimate may stay the same and within 2 standard deviations from the mean, the consensus may move away from the analyst's estimate thereby triggering an alert even though the analyst has not made any modifications.

FIG. 36 provides a list of mine-ders triggered on a selected date, according to an embodiment of the present invention. In a firm or other entity, various analysts may have identified one or more mine-ders alerts to be triggered at the occurrence of defined events. The present invention enables a user to view all mine-ders alerts triggered on a particular date for an entire firm or entity. Other information may also be displayed, such as ticker symbol, analyst name, period during which mine-der was triggered, mine-der alert description, estimate age, latest EPS estimate, IBES mean and other information.

Figure 39A:
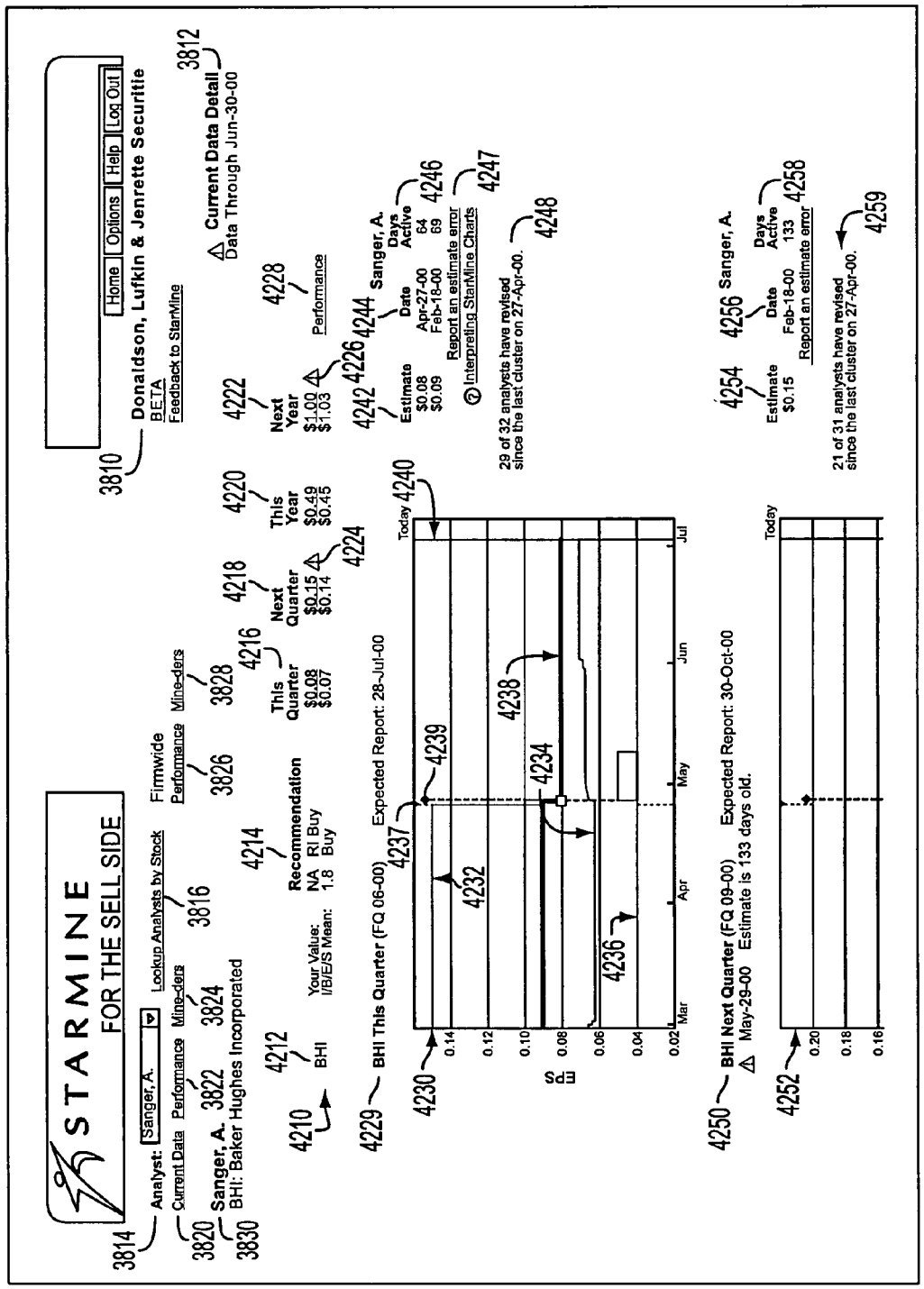
FIGS. 39*a* and 39*b* are an example of current data detail for a selected analyst according to an embodiment of the present invention.
Figure 39B:
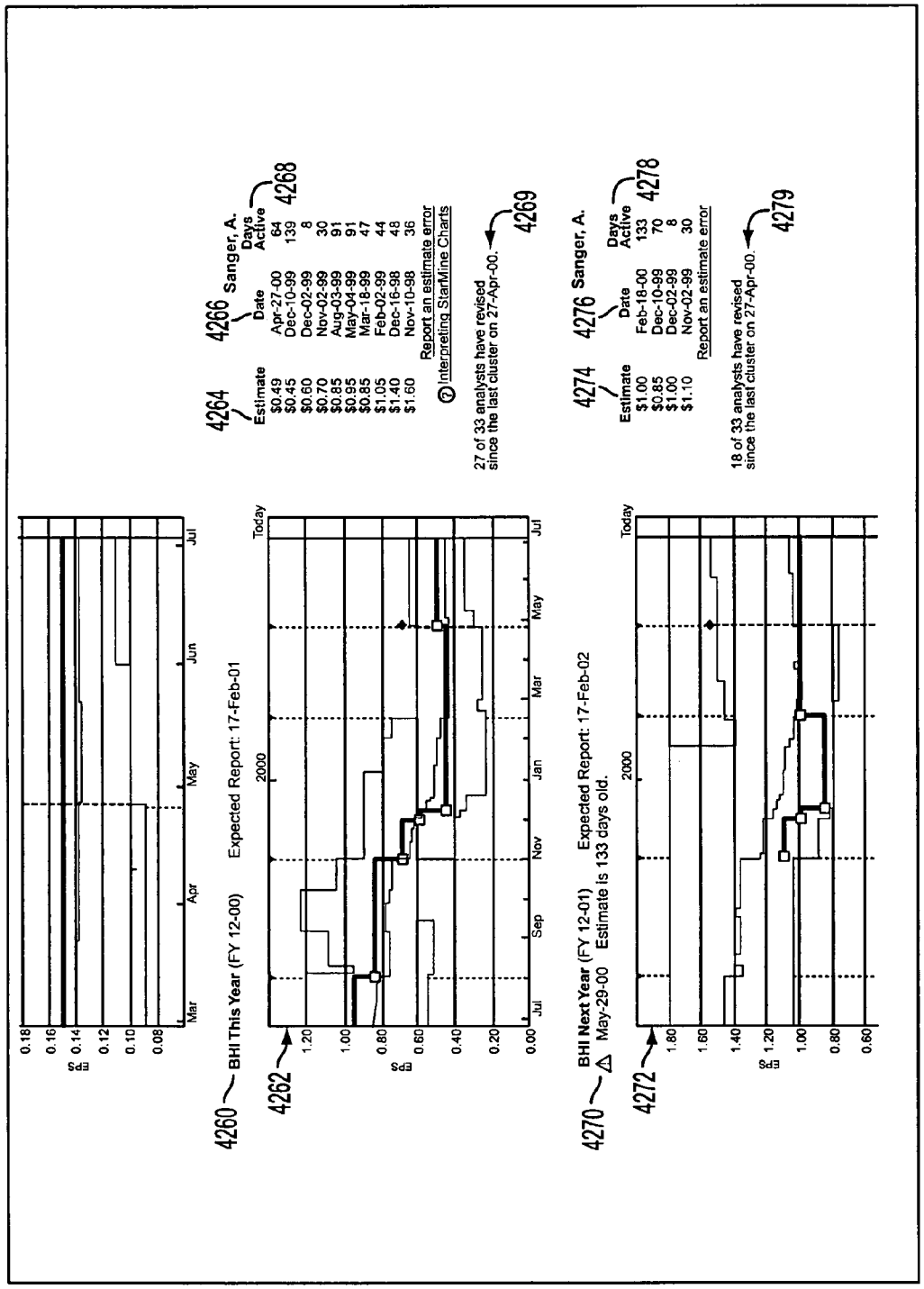

For example, by selecting a specific trigger date under Trigger Date column 3840, mine-der information for the selected trigger date may be displayed in detail, as shown by FIG. 36. Column 3910 lists the stock tickers followed by analysts in a firm. Column 3912 lists the analysts by name. The period may also be listed, in column 3914. A description of each alert that triggered an estimate may be provided in column 3916. The estimate age (e.g., days) may be displayed, in column 3918. The analyst's latest EPS estimate may be displayed, in column 3920, along with the IBES Mean, listed in column 3922. Navigational options may be available to view Mine-ders information triggered on other days, as well. For example, Previous Day as well as Next Day Mine-der information may also be displayed by selecting, 3924 and 3926, respectively. In addition, by selecting an estimate under column 3920, the user may view current data detail, as illustrated in FIGS. 39a and 39b described in detail below.

Mine-der information for a particular analyst may be displayed, according to an embodiment of the present invention. Once an analyst has been selected, a list of mine-ders associated with that analyst may be displayed, as shown in FIG. 37. A user may select an analyst from column 3832 or the user may select an analyst from a scroll down list in 3814 and select Mine-ders at 3824 to view a detailed list of mine-ders for the selected analyst. Mine-ders summary information may include ticker symbol, period, trigger date, alert description, estimate age, latest EPS estimate, IBES mean and other information.

In the example of FIG. 37, analyst "Sanger, A" has been selected. Column 4010 may list the stock tickers having a mine-der alert associated with the stock ticker. The period may also be listed, in column 4012. The date that an alert has been triggered may be listed in column 4014. A description of each mine-der alert may be provided in column 4016. The estimate age may be displayed in days, in column 4018. The analyst's latest EPS estimate may be displayed, in column 4020, along with the IBES Means, as listed in column 4022. Navigational options may be available to view Mine-ders information associated with other analysts. Previous Analyst as well as Next Analyst Mine-ders information may also be displayed by selecting, 4024 and 4026, respectively. In addition, by selecting an estimate under column 4020, the user may then view current data detail, as illustrated in FIGS. 39a and 39b described in detail below. As indicated in section 3830, the mine-ders data may be specific to a selected analyst.

In some instances, there may be situations where an analyst stands by his or her estimate despite receiving notification of the occurrence of certain events. For example, an analyst may receive a mine-der alert informing the analyst that an estimate is more than a defined number of days old, such as 100 days old. However, the analyst may choose to continue to stand by this estimate. In this case, the mine-der alert may indicate analyst confirmation as of the current date so that it is visibly apparent that the mine-der alert has been recognized by the analyst. Also, when a mine-der alert has been received, the analyst may delay the reception of the same mine-der alert for a predetermined number of days or other time period. The analyst may also ignore or dismiss the alert. Alerts may be displayed in different colors or in different symbols depending on the type of action taken. When data has been updated in response to an alert, the alert may disappear until another alert is triggered.

In addition, different entities may acknowledge mine-ders alerts. A mine-der alert may display a change in status (e.g., color or symbol) depending on who reviewed the mine-der alert. For example, if an analyst acknowledged the mine-der alert, the mine-der alert may be displayed as one symbol or color. If a research director or other entity acknowledged the mine-der alert, the mine-der alert may be displayed as a different symbol or color. Other variations may be implemented.

Figure 38:
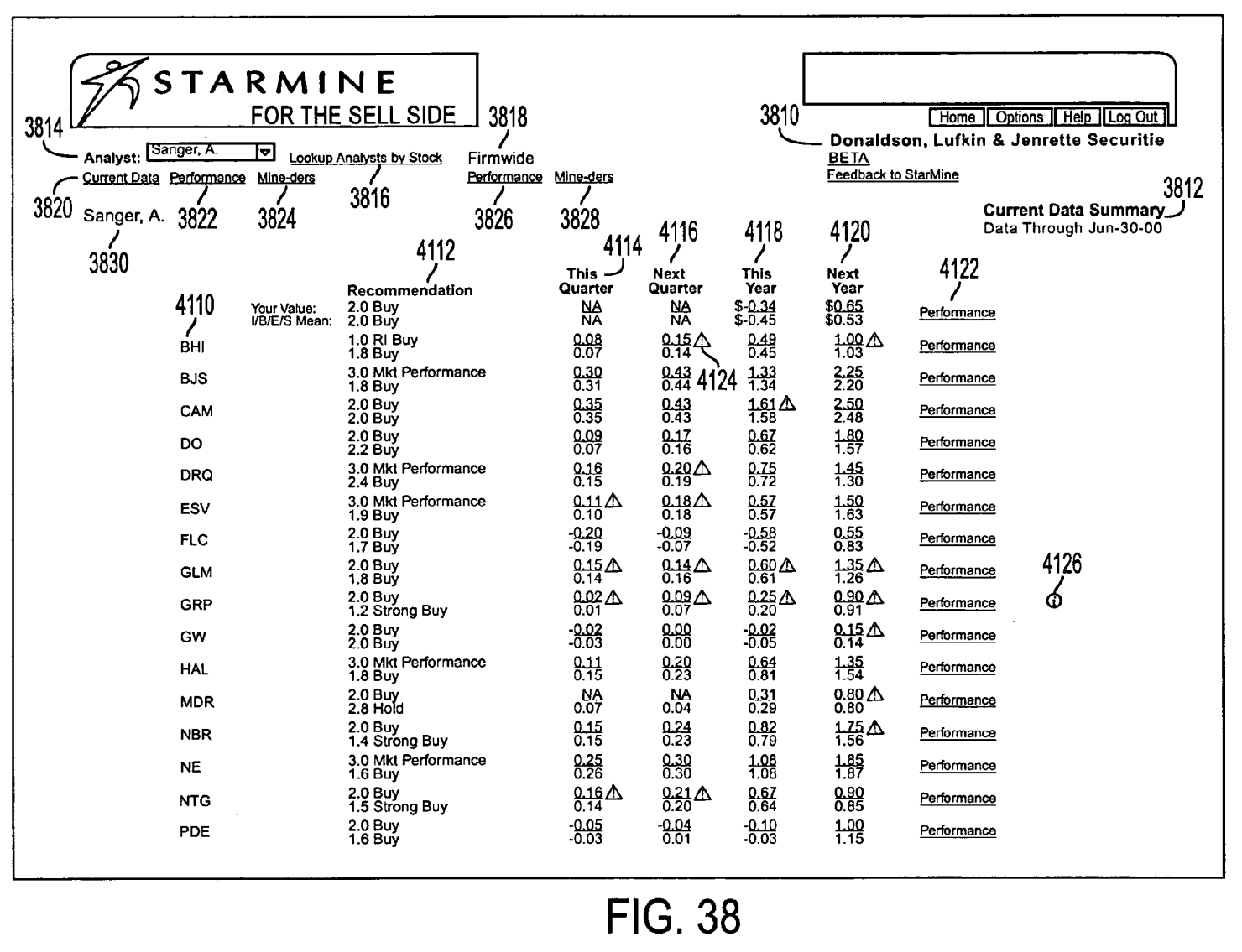

FIG. 38 provides an example of viewing current data of a selected analyst, according to an embodiment of the present invention. The Current Data view for a selected analyst may show the stocks covered by the analyst, the analyst's current recommendations, and the analyst's EPS estimates. The analyst's estimates may be further broken down by time period, such as quarter and year.

The user may select Current Data at 3820 to view data associated with an identified analyst. Current data may include the analyst estimates as compared to the IBES mean for stocks followed by the analyst. The analyst estimates may also be compared to other measures of estimates, such as enhanced composite estimates of the present invention, as discussed above. This view may also display symbols indicating a mine-ders alert associated with an estimate. In this example, analyst "Sanger, A" has been selected. Under column 4110, a list of stock tickers followed by the selected analyst may be displayed. Under column 4112, a set of recommendations may be presented for each stock. Each set of recommendations may include the analyst's value and the IBES mean. The analyst's values may be compared to other measures. In some circumstances, different firms may implement different recommendations and values. To establish standardization, these recommendations may be converted to a standard scale, to indicate positive and negative recommendations. For example, a scale of 0 to 5 may be used. In this example, a lower number may indicate a more positive recommendation while a higher number may indicate a negative recommendation.

For example, for the stock ticker "BHI", the analyst has assigned a recommendation of "1.0 RI Buy" and the IBES mean has assigned a recommendation of "1.8 Buy". Other possibilities may include Strong Buy, Market Performance, Sell, Hold, and other recommendations. Under column 4114, the analyst estimate and the IBES mean may be presented for this quarter. Also, the analyst estimate and the IBES mean may be presented for the next quarter, in column 4116. Under column 4118, the analyst estimate and the IBES mean may be presented for this year. Also, the analyst estimate and the IBES mean may be presented for the next year, in column 4120. Other periods of time may also be used. Column 4122 allows the user to view performance detail data for each stock, as described in FIG. 42 below by way of example.

A symbol 4126 may be used to indicate that a company has recently reported earnings (e.g., within a defined number of days). For example, this company has recently reported earnings for stock GRP within the last 15 days. In addition, another symbol may be used to indicate an associated mine-ders alert for a particular estimate. This symbol may comprise a yellow triangle with an exclamation point. Other symbols may also be used to designate an associated mine-der. In the example of FIG. 38, a mine-der, as indicated by symbol 4124, may be associated with the analyst's estimate of 0.15 for stock BHI under Next Quarter column 4116. Other mine-ders may also be defined and set. By selecting the mine-der 4124 or an analyst estimate, detailed current data may be displayed, as shown in FIGS. 39a and 39b, for the associated stock.

FIGS. 39a and 39b may display current data detail information according to an embodiment of the present invention. A feature of the present invention may display current data in graphical format for defined sets of time periods. Time periods may include the current quarter, next quarter, the current year, next year, and other defined ranges of time. Graphical information may include a time series illustrating a selected analyst EPS estimate, a high EPS estimate, a low EPS estimate, IBES mean and other time series for comparison and analysis of current data.

For example, current data detail regarding the stock BHI as followed by analyst "Sanger, A" may be displayed. In this example, section 4210 displays current data summary information for the selected estimate and stock. For example, column 4212 identifies the stock, column 4214 summarizes the recommendation of the analyst and the IBES mean, column 4216 displays the estimate of the analyst and the IBES mean estimate, column 4218 displays the estimates for next quarter, column 4220 displays the estimates for the current year, column 4222 displays the estimates for next year and 4228 allows the user to view analyst estimate performance information. Other information may also be available in section 4210.

Symbols 4224 and 4226 indicate to the user that these estimates have been assigned mine-ders alerts. By selecting these mine-ders alerts, the user may view current data associated with the mine-der alert. For example, when alert 4224 is selected, the user may view summary section 4250, chart 4252 and a detailed description of the alert. A chart view for each time period (e.g., this quarter, next quarter, this year, next year) shown in section 4210 may be displayed below, as shown by chart 4230, 4252, 4262 and 4272.

Summary section 4229 briefly describes the current data in chart 4230. In this example, chart 4230 displays current data regarding stock BHI for the current quarter (FQ June 2000) with an expected report at Jul. 28, 2000. Chart 4230 may display a high EPS estimate as shown by 4232, a low EPS estimate as shown by 4236, a IBES mean as shown by 4234, and the analyst's EPS estimate as shown by a 4238. Symbol 4237 marks the date of company's previous quarterly earnings. Symbol 4239 marks the begin date of a major estimate revision cluster of several analysts. The current date is shown by vertical line 4240.

Additional detailed current data information may be displayed. For example, estimate information for chart 4230 may be displayed under Estimate column 4242, the associated date under Date column 4244, and the number of days active under column 4246. Other information may also be displayed. Section 4247 enables a user to easily report errors or other data issues to IBES or other entity. By selecting 4247, the user may supply information related to the error, such as the nature of the error, analysts involved, brokerage involved, and quarters/years where the error occurred. Also, in section 4248, detailed cluster information may be presented. In this example, 29 of the 32 analysts have revised since the last cluster on Apr. 27, 2000.

Summary section 4250 and chart 4252 may display current data detail information related to a mine-der alert as indicated by symbol 4224 in section 4210. Summary section 4250 may provide a brief description of the alert including a trigger date (e.g., May 29, 2000). For example, the alert associated with this estimate is that the estimate is over 100 days old, or the estimate is 133 days old. Additional detailed current data information may be displayed. For example, estimate information for chart 4252 may be displayed under Estimate column 4254, the associated date under Date column 4256, and the number of days active under column 4258. Other information may also be displayed. Also, in section 4259, cluster information may be presented. For example, in this example, 21 of the 31 analysts have revised since the last cluster on Apr. 27, 2000.

Similarly, current data detail may be displayed for stock BHI for this year as summarized in summary section 4260 and graphical displayed in chart 4262. Other information may further be displayed under Estimate column 4264, Date column 4266, Days action column 4268 and cluster section 4269.

Also, current data detail may be displayed for stock BHI for the next year as summarized in summary section 4270 and graphical displayed in chart 4272. For example, the alert associated with this estimate is that the estimate is over 100 days old, or the estimate is 133 days old. The existence of an alert for the estimate may be indicated by symbol 4226 in section 4210. Other information may further be displayed under Estimate column 4274, Date column 4276, Days action column 4278 and cluster section 4279.

Another view available to the user is the performance view, according to an embodiment of the present invention. Performance for each analyst may be based on the relative accuracy of the analyst's estimates as compared to reported actuals, the relative accuracy of the consensus as compared to reported actuals, and the aggregate of an analyst performance across multiple stocks and periods. Analysts may be measured according to how far their estimates vary from the reported actual EPS and the consensus on a daily basis (or other time interval). A relative accuracy score may then be calculated for every day an estimate is valid. The scores may then be averaged over the days within a fiscal period (e.g., 91 for quarters and 365 for years) and aggregate over the total number of periods the analyst covered a particular stock in order to obtain an overall score. After applying the scores to an algorithm that accounts for the length of time a stock was covered during a period (by quarter or year) and the number of stocks covered, an overall relative accuracy score may then be mapped to a star rating or other method of assigning symbols indicating an analyst's performance in terms of relative accuracy.

Figure 40:
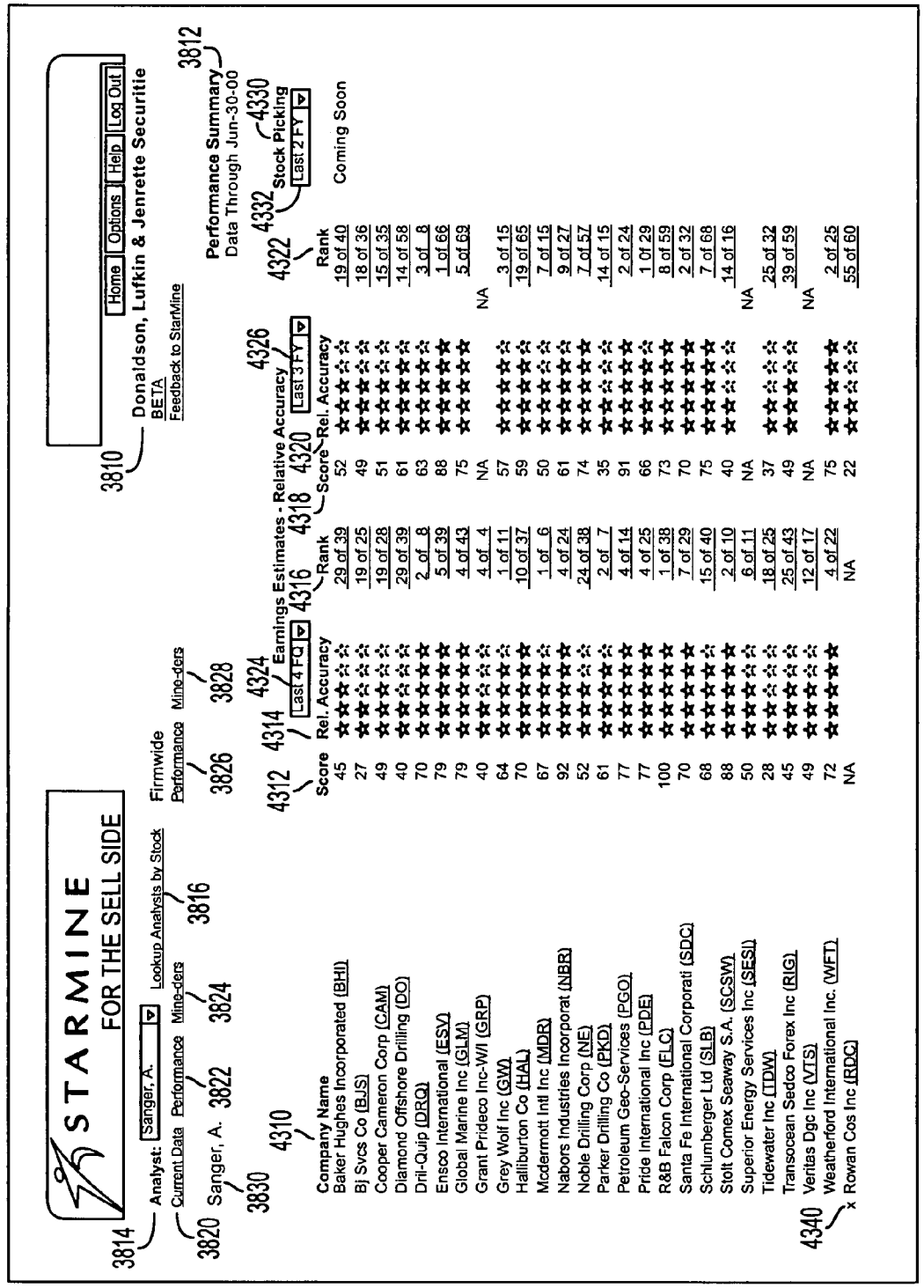
FIG. 40 is an example of performance summary information for a selected analyst according to an embodiment of the present invention.

FIG. 40 displays performance data for a selected analyst, according to an embodiment of the present invention. Performance data may include relative accuracy scores and star ratings which represent the accuracy of the analyst's previous estimates. These scores and star ratings may also take into consideration the length of coverage (e.g., the number of periods). Further, star ratings may involve mapping a range of relative accuracy scores to a number of stars, as a measure of relative accuracy. Other metrics, symbols, and ranges may be used to designate relative accuracy of analysts. Accuracy scores and star rating may be calculated in accordance with the formulas discussed above.

For example, FIG. 40 displays company and associated stock ticker followed by the selected analyst in column 4310. The relative accuracy score information may be displayed for a selected time period, in 4324. A time period for analysis and comparison may be selected. In this example, the selected period is the last 4 fiscal quarters. Other time periods may include the last fiscal quarter, last 8 fiscal quarters, last fiscal year, last 2 fiscal years, last 3 fiscal years, 1999 and 2000. Other time periods may also be identified. Relative accuracy scores for stocks followed by the analyst may be listed in column 4312 for the selected time period. A relative accuracy star rating may be displayed in column 4314. The selected analyst's ranking for each stock may be displayed in column 4316. The analyst's rank and total number of analysts following the stock is shown. In this example, analyst Sanger is ranked $29^{th}$ out of 39 for the stock "BHI".

Another time period may be simultaneously selected for comparison and analysis. In this example, the last three fiscal years has been selected in 4326. Column 4318 displays a relative accuracy score for a second time period (e.g., the last three fiscal years). Relative accuracy star rating 4320 may be displayed for the second time period as well as the ranking of the selected analyst 4322. In addition, a symbol may be used to indicate that there are no currently active estimates or recommendations. This symbol may comprise an "x" or other identifier, as shown by symbol 4340. As illustrated, some analysts from firms may be listed as "N/A". When viewing the performance of analysts by stock, the analysts who are ranked below the mean may be anonymous to outside firms. In order words, according to an embodiment of the present invention, a user may view the performance of all the analysts in the user's firm, but may be restricted in viewing only analysts with better than average performances in other firms.

The stock picking capability of the present invention measures the relative and absolute profitability of analyst's recommendations, as shown by 4330 and 4332.

For example, relative performance data for a stock may be displayed by selecting on a ranking score, according to an embodiment of the present invention. For example, a user may desire to view more detailed performance information in relation to the analyst's score of 100 with an associated 5 star ranking. The selected analyst, Sanger, A, has a ranking of 1 out of 38 for R&B Falcon Corp (FLC). By selecting this analyst's ranking in column 4316, the user may view a rank of all analysts following the associated ticker, as shown in FIG. 41.

Analyst estimates for stock may be ranked in relation to other analysts who follow the same stock. The ranking of relative accuracy may be based on relative accuracy scores calculated for each analyst for each stock that is followed. This feature of the invention provides a useful measure of accuracy and assessment of relative performance for various stock events. While a star rating provides a clear measure of relative accuracy, the analyst rank for a stock provides a more detailed indication of an analyst's standing and performance with respect to other analysts. Also, a relative accuracy score may be given more depth and insight when presented with the analyst's actual rank out of a total number of analysts who follow the stock.

According to another embodiment of the present invention, relative analyst performance data may be obtained for a particular stock. This feature of the present invention may enable users to select a stock followed by an analyst and view the analyst's ranking in relation to other analysts who follow the stock. Other information may include broker affiliation, star rating, relative accuracy scores as well as coverage time. Brokerage affiliation may include a firm name or other identifier. Star rating may include a 0 to 5 star rating, for example, as a measure of accuracy. RAS values may provide a more detailed measure of accuracy for each analyst's performance. The coverage time may represent the percentage of time the analyst has publicized a forecast over an evaluation period. The higher percentage, the longer the forecast has been active.

Figure 41:
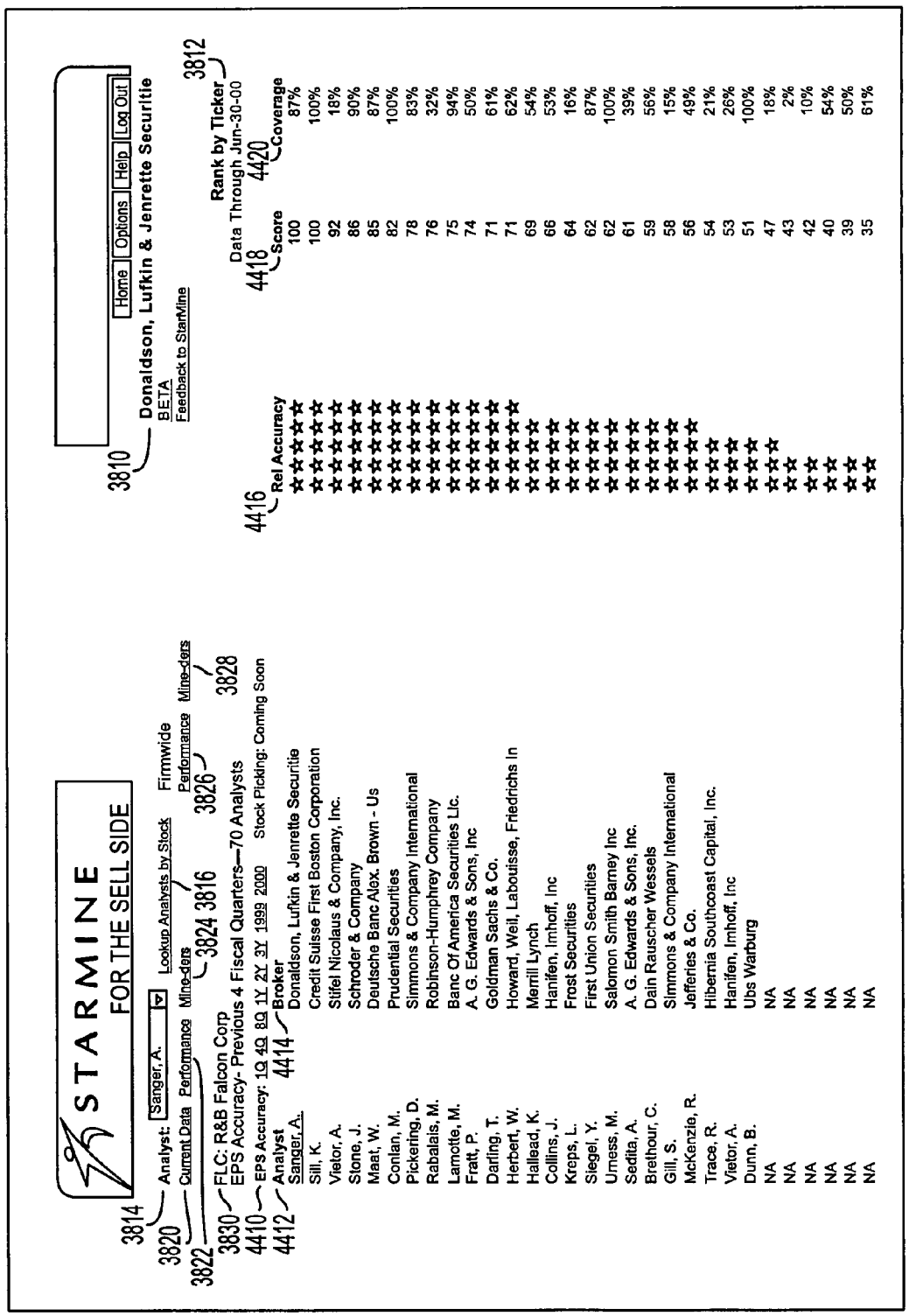
FIG. 41 is an example of ranking of analysts for a selected stock ticker according to an embodiment of the present invention.

FIG. 41 provides an illustration of a ranking of analysts for a selected stock ticker, according to an embodiment of the present invention. This view displays a list of all analysts who have submitted estimates for the stock from all brokerage firms and other entities. Also, this feature of the invention enables the user to view where the selected analyst stands in relation to all other analysts. In this example, analyst "Sanger, A" is ranked first, as shown in column 4412. The affiliated broker or other entity may be displayed in column 4414. The analyst's relative accuracy star ranking may be shown in column 4416 in descending order. Other views may also be available. Also, the score of each analyst may be displayed in column 4418. In addition, the coverage percentage may be shown in column 4420. In this example, analyst "Sanger, A" has been covering this stock for 87% of the time. Section 4410 enables the user to select different time periods. In this example, the selected period is the last 4 fiscal quarters. Other time periods may include the last fiscal quarter, last 8 fiscal quarters, last fiscal year, last 2 fiscal years, last 3 fiscal years, 1999 and 2000. Other time periods may also be identified.

According to another embodiment of the present invention, an analyst's performance with respect to a specific stock may be displayed. Performance data for an analyst's estimates may be displayed by time periods within fiscal periods. This feature of the invention enables a user to view an analyst's performance for a series of time periods for a particular stock. This simplifies comparison within time periods of an analyst's performance. Also, trends in an analyst's earnings estimates may be more easily visible. Performance data may include a relative accuracy score, a relative accuracy star rating, rank (including rank and total number of analysts), coverage time, average absolute error, actual amount and other information. This information may be formatted according to defined time periods. For example, time periods may include fiscal quarters, fiscal years, or other defined time frames.

Figure 42:
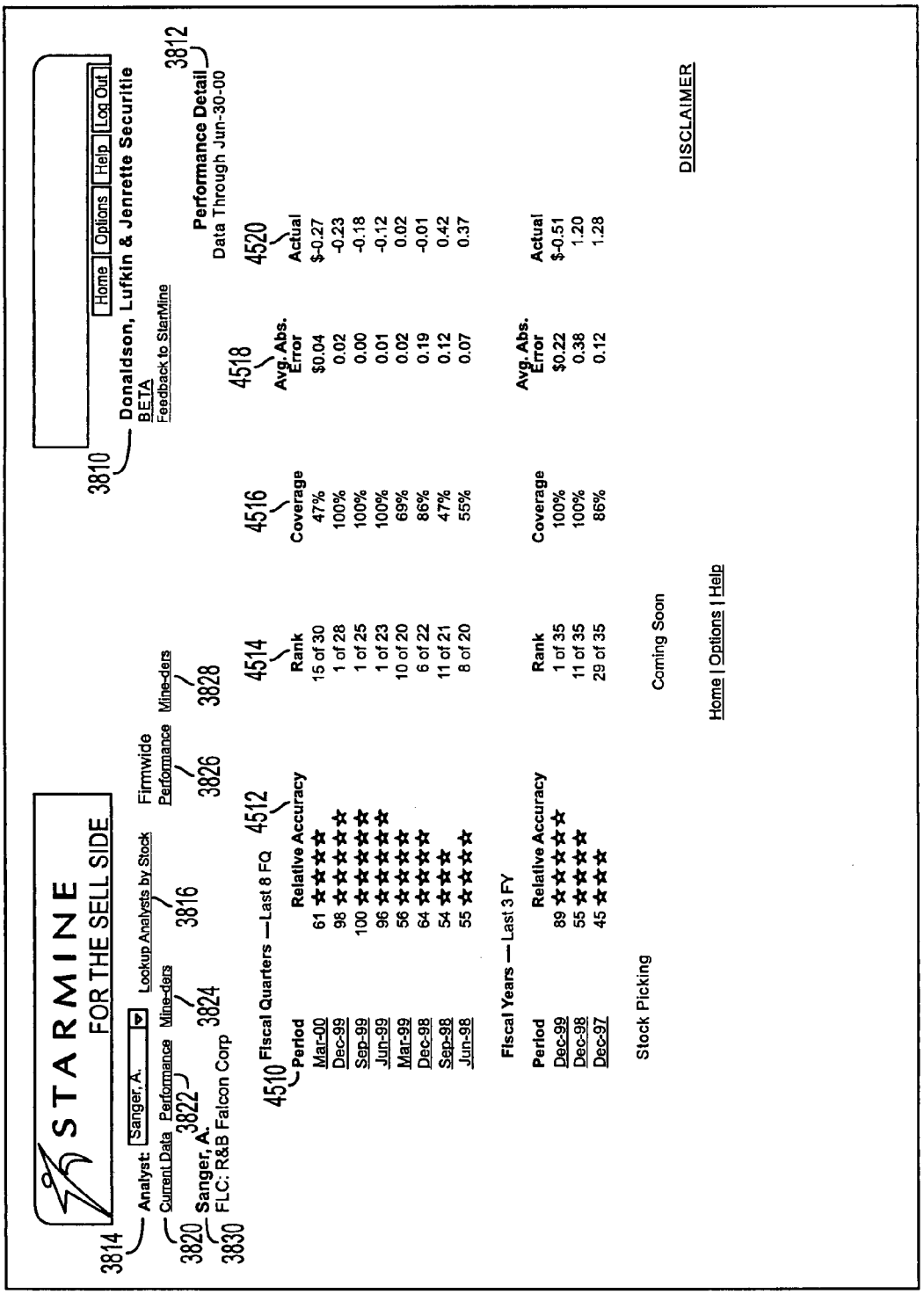
FIG. 42 is an example of performance detail information for a selected analyst and an selected stock ticker according to an embodiment of the present invention.

For more detailed performance information, the analyst "Sanger, A" in column 4412 may be selected in FIG. 41, according to an embodiment of the present invention. FIG. 42 displays performance detail for the selected analyst for defined time periods, such as fiscal quarters and fiscal years. In addition, from FIG. 40, the user may select a stock ticker of interest to view performance detail, as shown in FIG. 42. For example, the user may select (FLC) in column 4310 to view performance detail as shown in FIG. 42.

FIG. 42 displays a breakdown of the selected analyst's performance for a particular stock. In this example, the analyst's performance in predicting a particular stock may be displayed for the last eight fiscal quarters. The periods may be listed in column 4510. The analyst's score and relative accuracy star rating may be displayed in column 4512. The ranking and total number of analysts may be shown in column 4514. The amount of analyst coverage may be shown in column 4516. An average absolute error amount may be calculated and displayed in column 4518 while the actual amount may be shown in column 4520. The average absolute error may be the average of the absolute error of an analyst estimate as compared to the reported actual across the evaluation period. Also, detailed information for the last three fiscal years may be displayed.

The scores displayed in FIG. 42 may be used to calculate accuracy scores for a defined time period. For example, analyst Sanger's score for the last 4 quarters is 100, as shown in FIG. 41. This score may be calculated in accordance with the formulas discussed above where the number of periods is taken into consideration. For example, analyst Sanger was assigned scores of 61, 98, 100 and 96 for last four quarters. In accordance with the formulas discussed above, analyst Sanger's relative accuracy score is 100 for the last four quarters.

Stock recommendation information may be displayed according to another embodiment of the present invention. This feature of the invention may provide analyst recommendations for a particular stock for a period of time. Stock recommendations may include strong sell, sell, hold, buy and strong buy. This feature of the invention enables a user to view recommendations by an analyst as compared to the consensus, mean or other measure, such as high and low estimates. Also, actual earnings for a stock may be graphically shown as well. This feature enables a user to compare the recommendations of an analyst with the actual earnings of the stock for simultaneous time periods.

Figure 43:
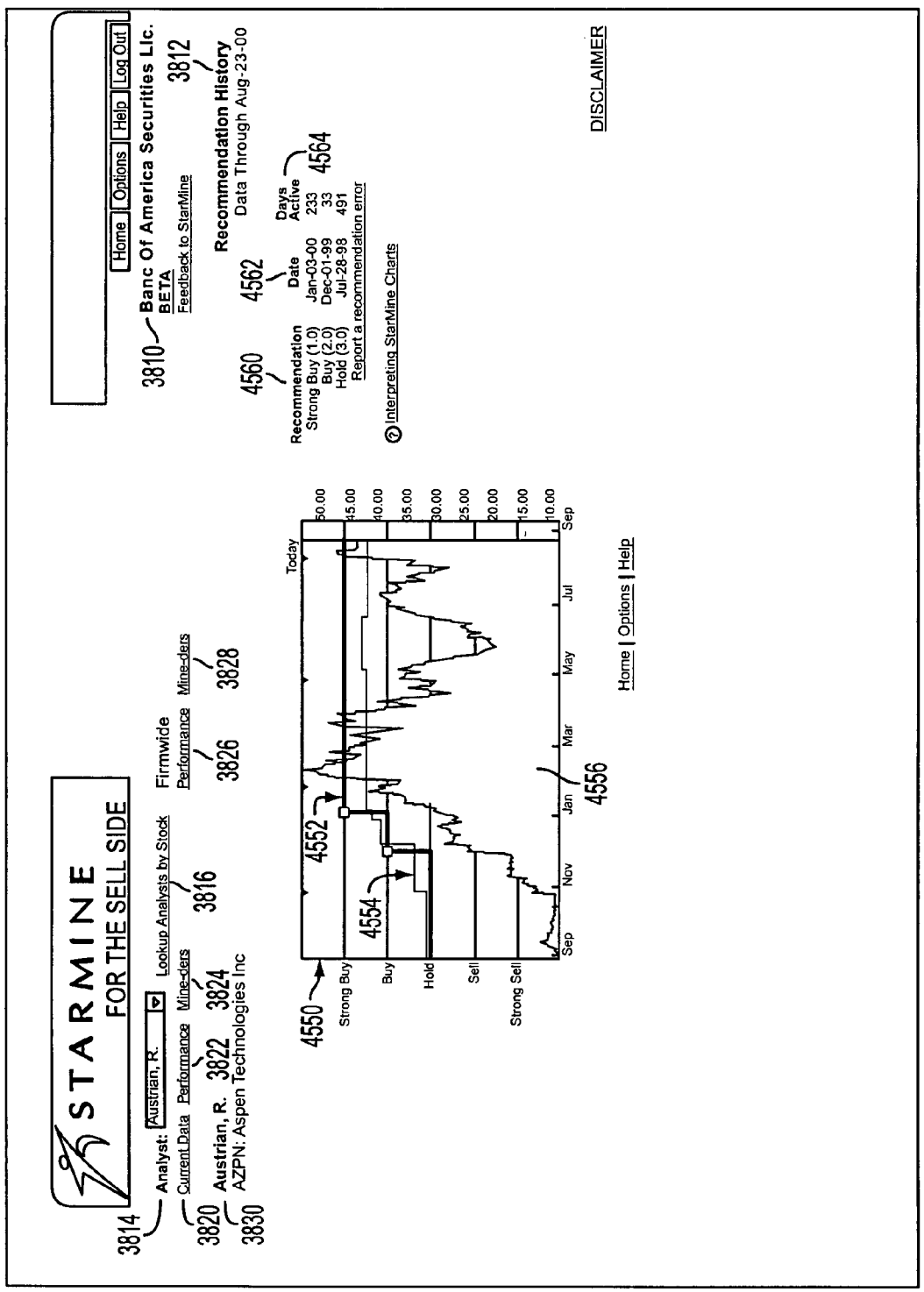
FIG. 43 is an example of a recommendation history for an analyst according to an embodiment of the present invention.

FIG. 43 illustrates an example of stock recommendation data, according to an embodiment of the present invention. In this example, a selected analyst's past recommendations for a particular stock may be graphically displayed, as shown in chart 4550. An analyst's recommendations may be displayed by 4552, which may be compared to a mean recommendation as shown by 4553. Recommendations may be translated by viewing the left side of chart 4550, as strong sell, sell, hold, buy, and strong buy. Other recommendations may be used, such as a numerical scale, symbols or other indicators. The actual performance of the stock may be chart as shown by 4556. The actual earnings may be translated by viewing the right side of chart 4550. In addition, detailed recommendation information may be displayed. For example, column 4560 may provide an analyst's recommendations; column 4562 may display the date at which the recommendations were made, and column 4564 may show the duration of the recommendation.

The present invention may provide a graphical illustration of an analyst's performance for a time period for a particular stock. A chart illustrating the analyst's estimates in relation to a high EPS estimate, a low EPS estimate, a IBES mean may be displayed. Also, the actual reported EPS of the company may also be shown for comparison. Detailed performance information, such as period end date, reported date, star rating, analyst rank, coverage period, average absolute error, and actual amount may be displayed as well. Other performance data may also be included. Further, estimate detail may be shown in conjunction with the graphical display. This performance information enables the user to conduct detailed analysis of individual analysts for specific stock events for a selected time period. Comparisons to mean values may also be graphically analyzed.

Figure 44:
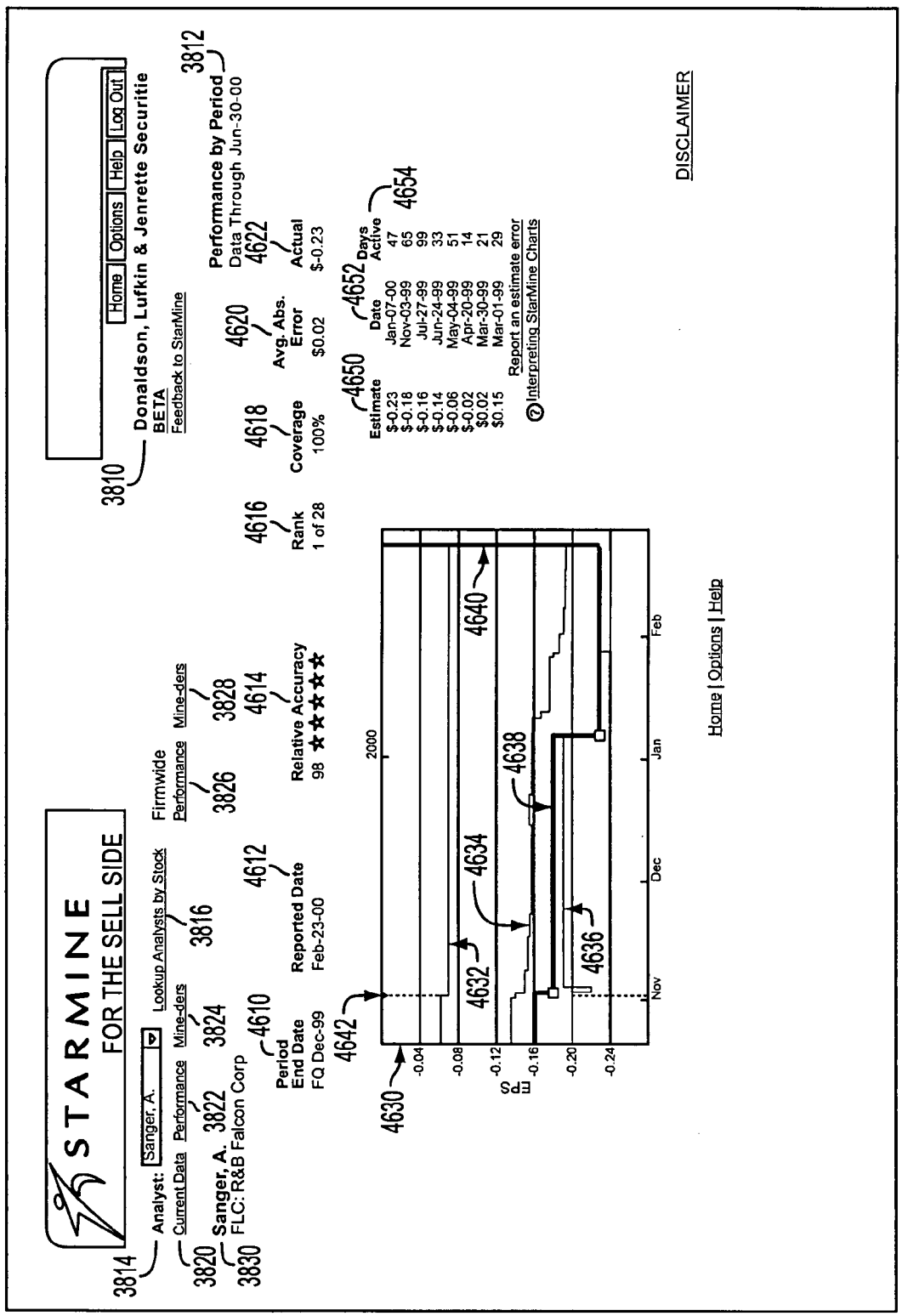
FIG. 44 is an example of detailed performance data for a selected period according to an embodiment of the present invention.

Detailed performance data of a selected period may be displayed in FIG. 44. For example, the period "December 1999" may be selected from FIG. 42 for a more detailed analysis of analyst Sanger's performance during this specific period for the stock "FLC", as shown in FIG. 44. Column 4610 displays the period end date. In this example, the period end date of "FQ December 1999". The reported date is shown in column 4612. The analyst's relative accuracy score and star rating for this period is displayed in column 4614. The analyst's rank is shown in column 4616. The percentage of coverage for the stock is shown in column 4618. The average absolute error is shown in column 4620 and the actual value is shown in column 4622. Chart 4630 graphically displays the analyst's performance in relation to the mean estimate and the high and low estimates as well as the actual value. For example, chart 4630 may display a high EPS estimate as shown by 4632, a low EPS estimate as shown by 4636, a IBES mean as shown by 4634, and the analyst's EPS estimate as shown by a 4638. Symbol 4642 marks the date of company's previous quarterly earnings. The dark vertical line 4640 indicates the actual reported EPS of the company being reviewed on the date reported. As shown in chart 4630, the analyst's estimate 4638 matches the actual reported earnings 4640. In addition, column 4650 presents detailed estimate information. The date for each estimate may be presented in column 4652 along with the number of days active in column 4654.

Performance data for all analysts of a firm or other entity may be displayed. This information may include analyst name (or other identifier), relative accuracy score (or other measure of accuracy), star rating, number of stocks followed and other information. This information may be displayed for various time periods, such as fiscal quarters and years. Firmwide performance data enables a user to analyze relative performance within a group, such as a firm. A relative accuracy score provides a more detailed measure of accuracy. For example, the top 20 analysts may be assigned a rating of 5 stars. However, within the 20 analysts, the relative accuracy scores range from 70 to 100. The number of stocks is another factor that may be considered in evaluating analyst performance. For example, an analyst with a higher number of stocks may be given more weight when considering the analyst's accuracy score and rating.

Figure 45A:
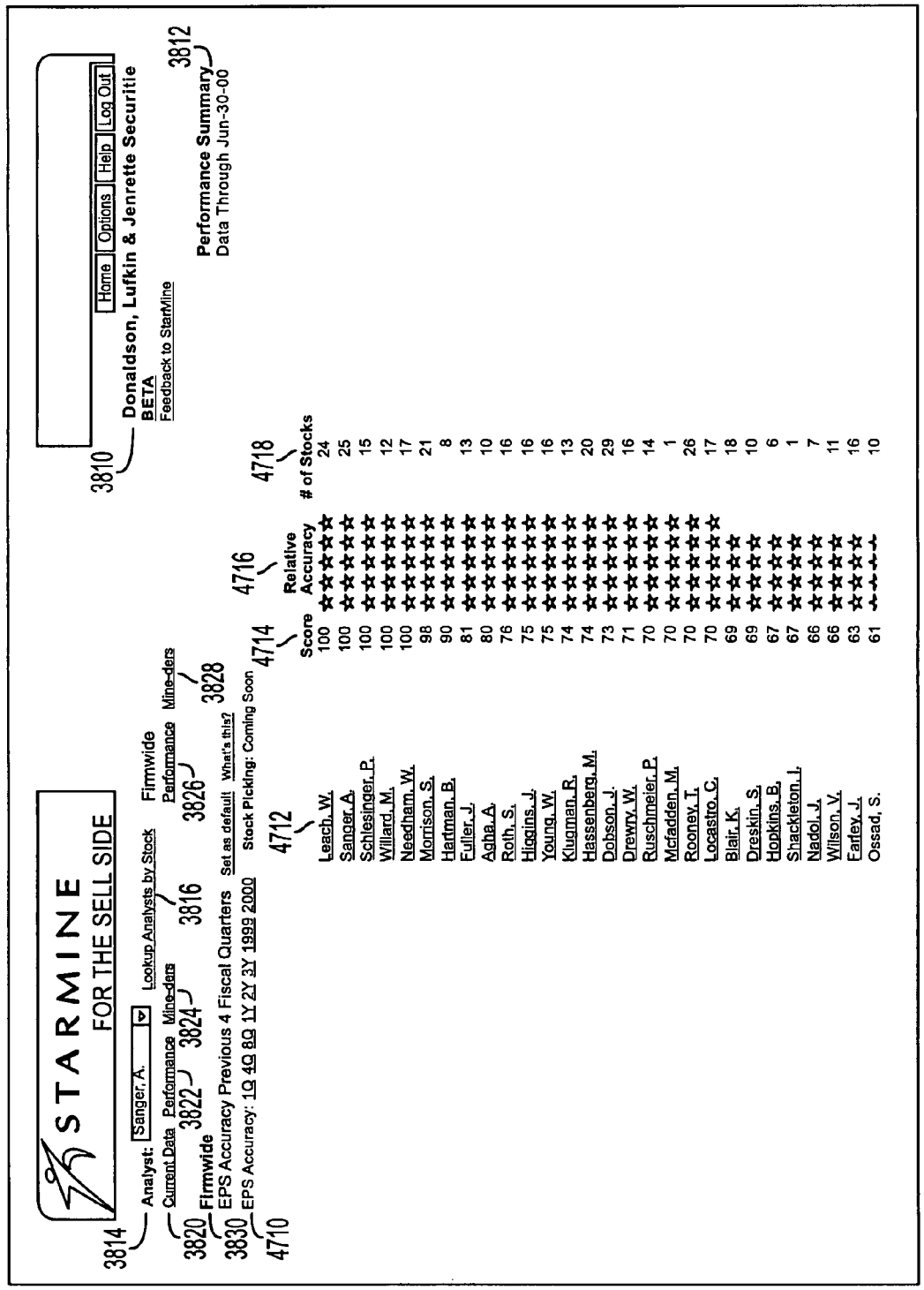

FIGS. 45a and 45b illustrate an example of performance data on a firmwide basis, according to an embodiment of the present invention. This view may be accessed by selecting Firmwide Performance at 3826. Section 4710 enables the user to select a desired period. In this example, the performance data is shown for the previous 4 fiscal quarters. Other periods may be selected, such as last quarter, last 8 quarters, last year, last 2 years, last 3 years, for the year 1999 and for the year 2000. Other periods may also be used. Also, the user may customize this view by setting defaults. For example, by selecting "Set As Default" 4720, the user may set a period as the default period where the default period will be shown when selecting "Firmwide Performance" in the future. This may be useful if the user generally wishes to view 1Y or 3Y summaries, for example, instead of the 4Q default. Column 4712 presents a list of all the analysts associated with the current firm listed in 3810. The score of each analyst may be shown in column 4714. The analyst's relative score may be shown as a star rating in column 4716. The number of stocks that are followed by each analyst may be displayed in column 4718. This enables a research director or other entity to manage and analyze the performance of each analyst. In this example, the analysts are ranked according to relative accuracy. Other views may be available.

Figure 46:
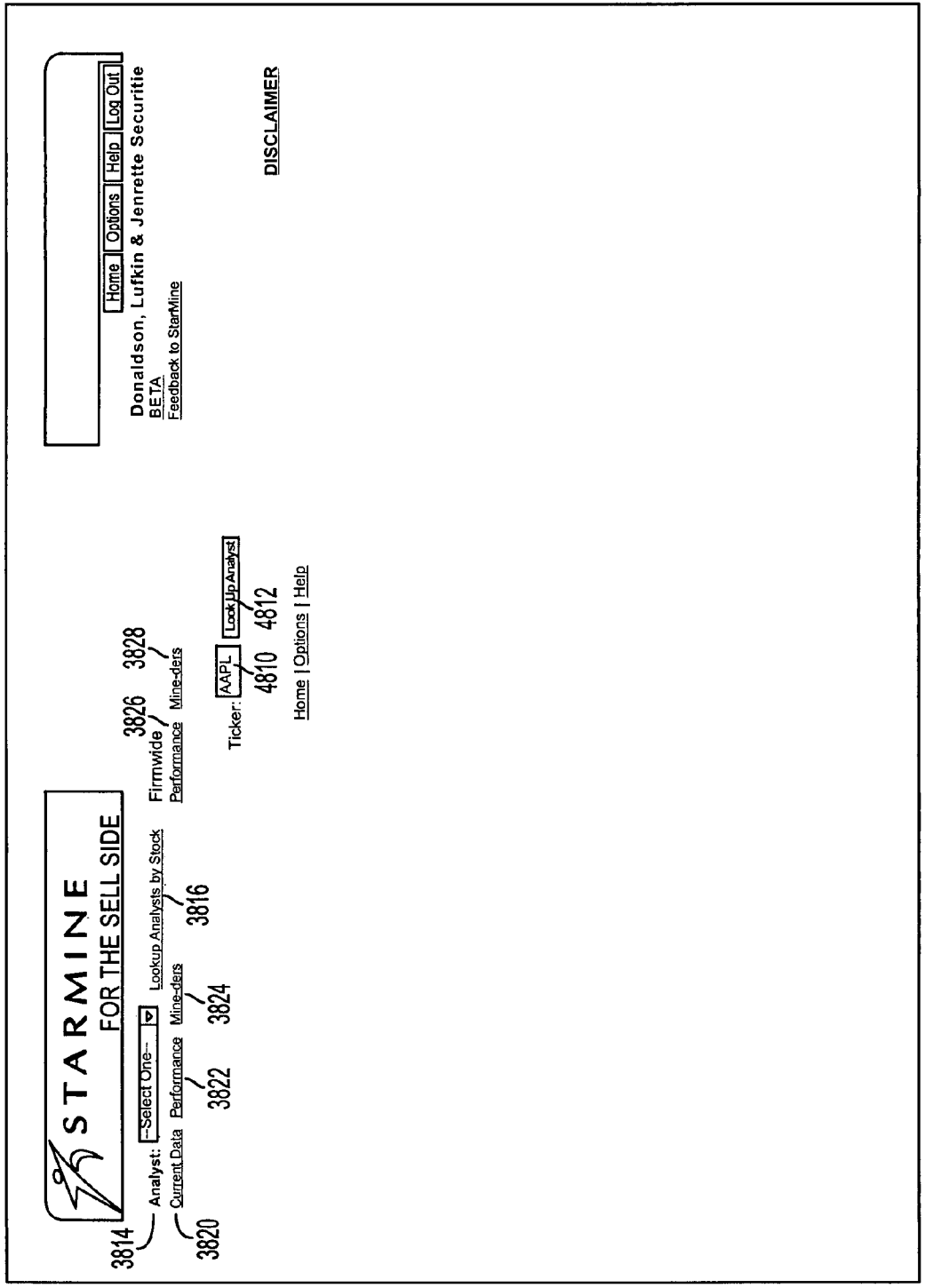
FIG. 46 is an example of screen for entering a ticker according to an embodiment of the present invention.

According to another embodiment of the present invention, a user may lookup an analyst by entering a specific stock ticker. By selecting 3816, a user may enter a specific stock ticker at box 4810, as show in FIG. 46. In addition, by selecting 4812, the user may lookup a specific analyst.

Figure 47:
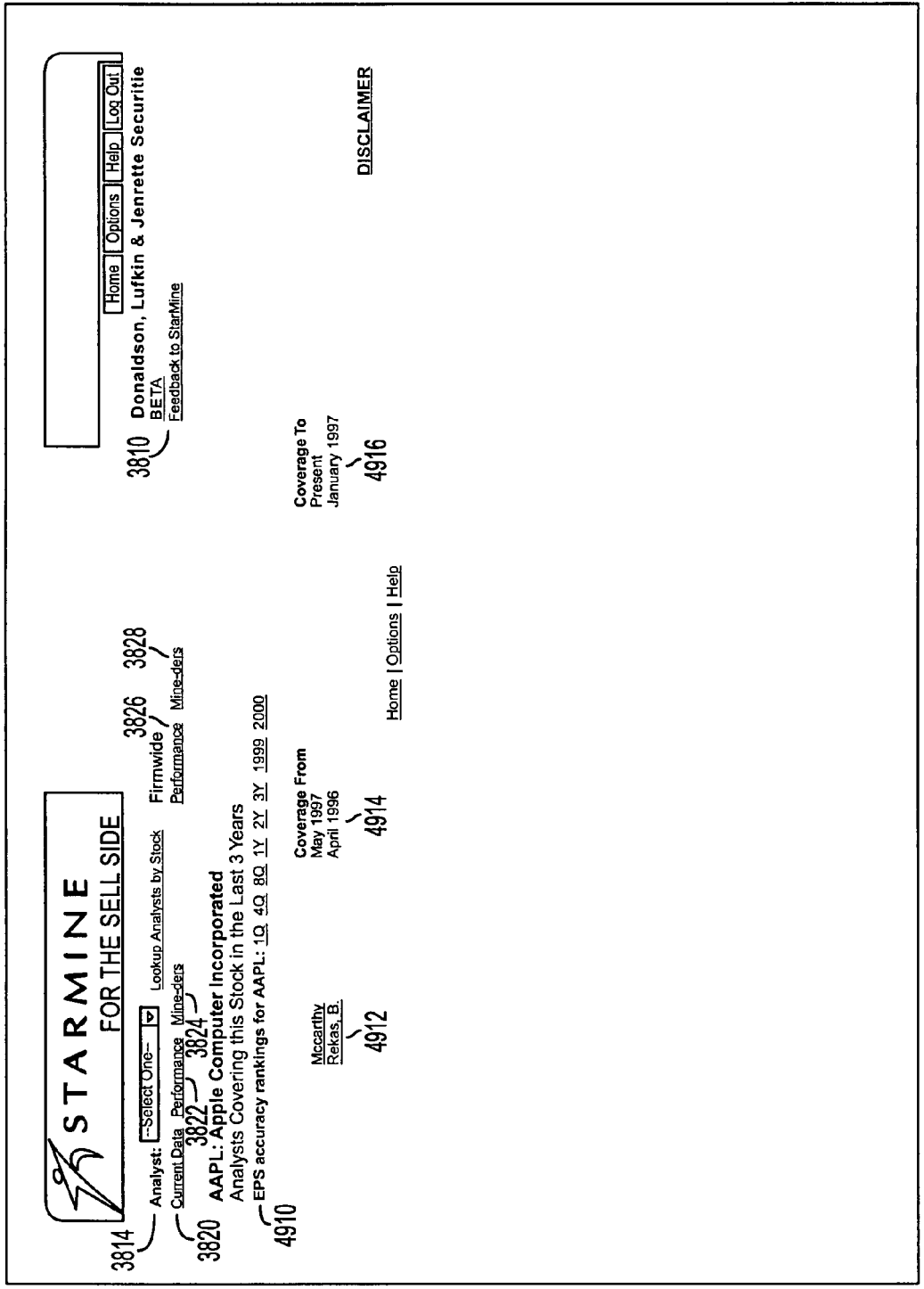
FIG. 47 is an example of a display of analysts of a firm with estimates for a selected stock according to an embodiment of the present invention.

FIG. 47 displays analysts from a specific firm or other entity that follow the specified stock ticker, according to an embodiment of the present invention. Column 4912 may display the analysts who follow the specified stock in the identified firm. A coverage begin date may be displayed under column 4914 and a coverage end date may be displayed in column 4916. An analyst's performance detail data may be viewed by selecting an analyst, similar to that described by way of example in FIG. 42.

Section 4910 enables the user to select a desired period to view analyst ranking for the specified ticker. A period may be selected, such as last quarter, last 4 quarters, last 8 quarters, last year, last 2 years, last 3 years, for the year 1999 and for the year 2000. Other periods may also be used. An analyst ranking by ticker may be displayed by selecting a desired period in section 4910, similar to that described by way of example in FIG. 41.

Figure 48:
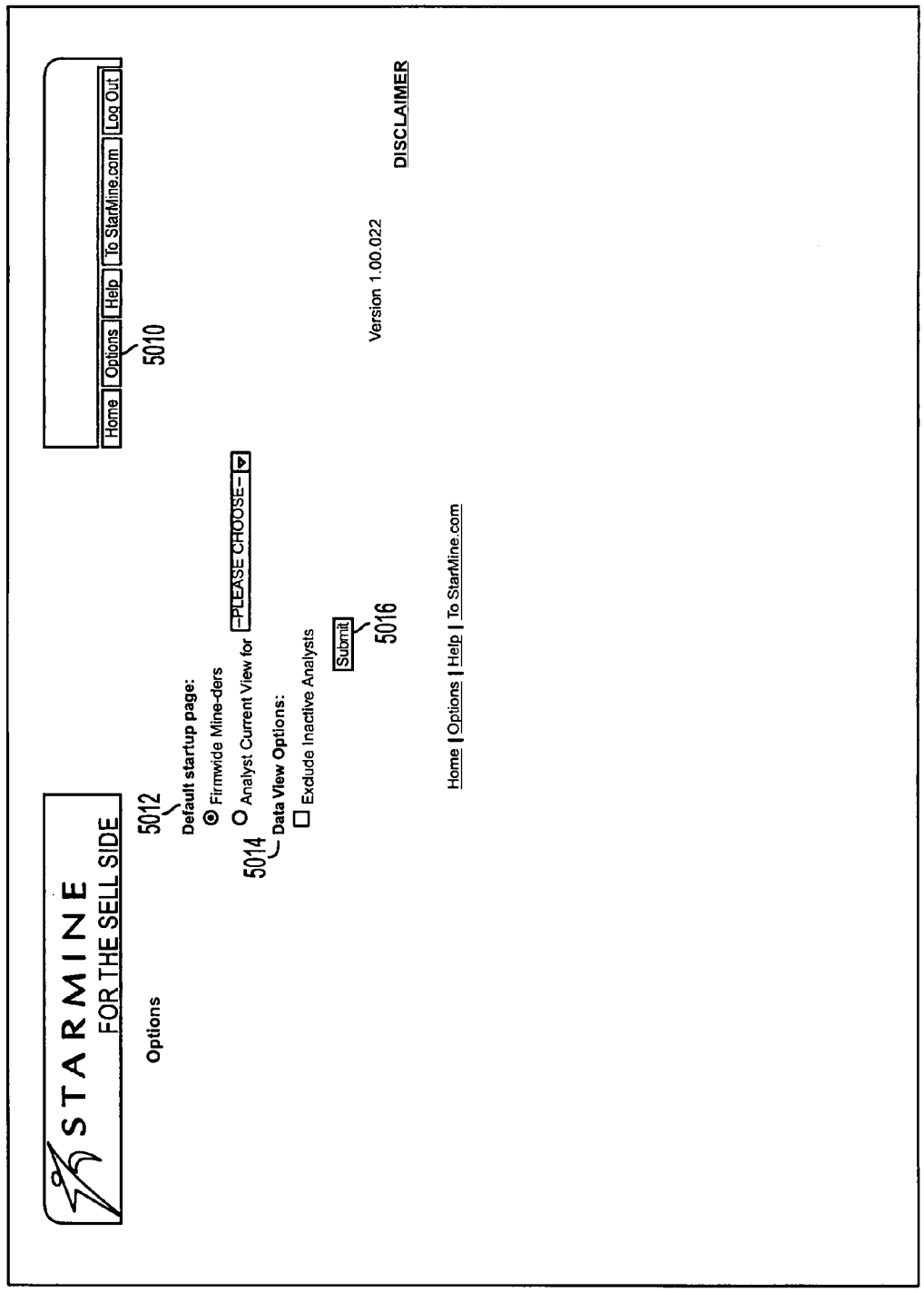
FIG. 48 is an example of an options screen according to an embodiment of the present invention.

FIG. 48 illustrates an example of an option screen in accordance with an embodiment of the present invention. By selecting options bar 5010, the user may specify viewing options. In addition, the user may identify a preferred default view at startup, at 5012. For example, the user may select firmwide mine-ders as the default or analyst current view for a selected analyst. Other default view may be available. Also, data viewing options are available at 5014. For example, the user may exclude all inactive analysts. Other viewing options may be available. The user may then submit the options at selecting button 5016.

In some instances, an analyst may confirm previous estimates instead of modifying an estimate. This type of action may be defined as reiterations. According to an embodiment of the present invention, reiterations may be graphically displayed to indicate that the analyst has confirmed the previous estimates. This feature of the present invention may be used in determining whether an estimate is outdated, for example.

There may be instances where a chief analyst or other source may announce a market call or other predictions. Market calls may indicate price movement and other price trends. Market calls may not occur according to a periodic schedule, but rather market calls may be announced at various times during a fiscal period.

According to an embodiment of the present invention, enhanced composite estimates may be used to project and predict a company's earnings. Enhanced composite estimates may factor in the timeliness and historical accuracy of each analyst following a stock to predict company earnings. Other characteristics may also be considered. Traditionally, many investors use consensus estimates, which include the simple average of all analyst estimates. The consensus places equal weight on each analyst's estimate, regardless of the age of the estimate or whether the analyst is a seasoned veteran with a great track record or a rookie. Thus, the consensus fails to take into consideration varying factors and attributes of analysts and prior historical data. Enhanced composite estimates may be significantly more accurate because these calculations take into account the historical accuracy of analyst, the age of the estimates, the experience of the analyst, the issuing brokerage firm, and other factors. Enhanced composite estimates may also include sophisticated logic to detect a series of analyst revisions that may be indicative of future revisions. Enhanced composite estimates may assist investors identify stocks with high probabilities of earnings surprises and analyst revisions, which are major drivers of stock prices.

Figure 49:
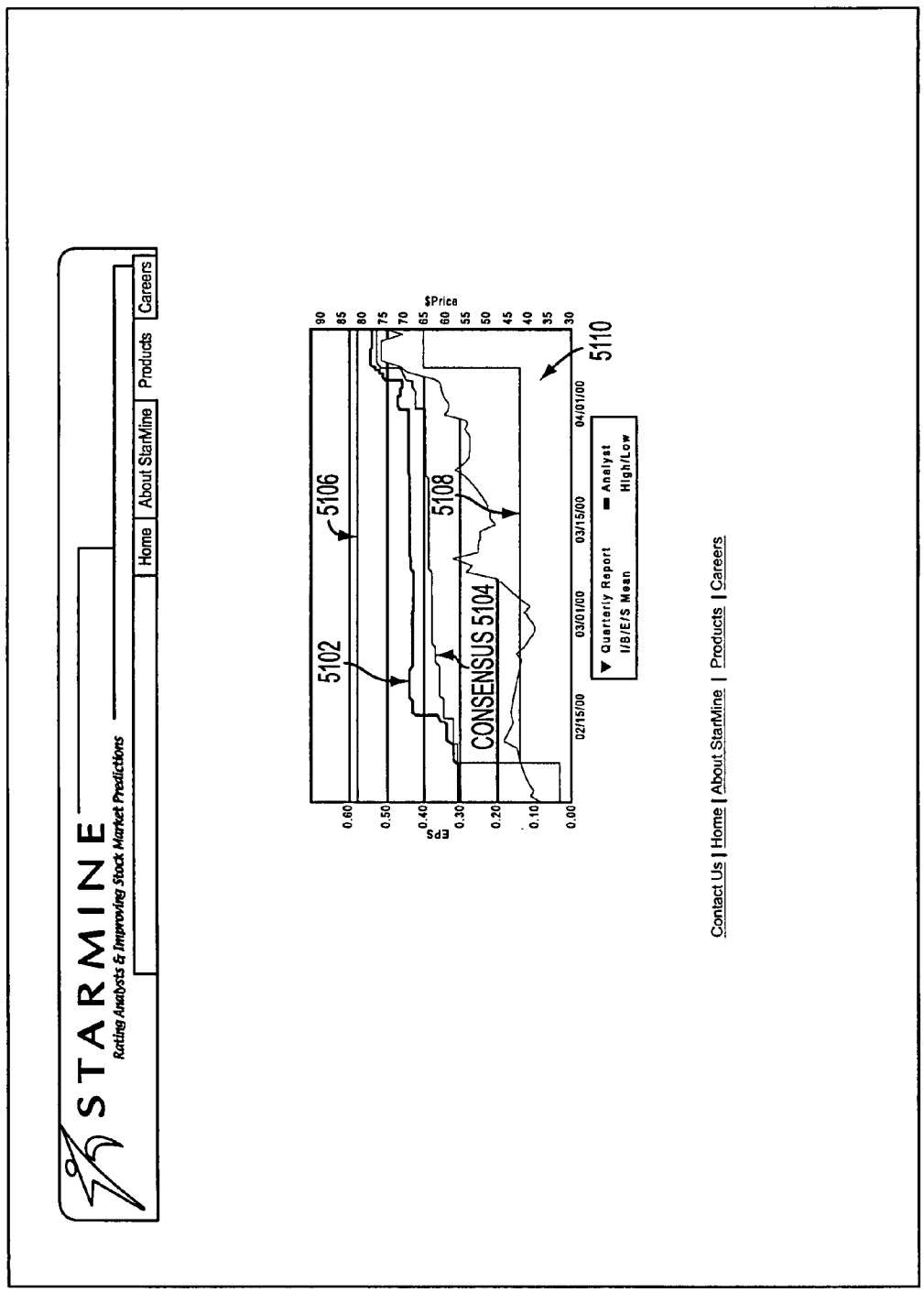
FIG. 49 is an illustration of an enhanced composite estimate as applied to a stock event according to an embodiment of the present invention.

FIG. 49 is an example of an illustration of an enhanced composite estimate as applied to a stock event according to an embodiment of the present invention. According to the present invention, the wider the variance between the enhanced composite estimates and the consensus, the more likely there will be further analyst revisions or an earnings surprise. In this example, the enhanced composite estimates, as shown by 5102, diverges sharply from the consensus, as shown by 5104, around the time period near Feb. 15, 2000. On that date, this stock was trading near $43 when the news was announced that the company would generate sequentially higher first quarter sales due to a strong demand for the company's products. Over the next day, 3 of the 17 analysts covering the stock revised their estimates upward, driving the enhanced composite estimate 21.5% ($0.076) higher than the consensus estimate for the current quarter. By the close of trading on Apr. 12, 2000, when the company announced a positive earnings "surprise," the stock was trading at $76. Investors who bought the stock when the enhanced composite estimate signal appeared would have gained almost $33 (77%) in about two months. As illustrated, enhanced composite estimates may serve as indicators of changes in the consensus and predictors of earnings surprises.

In addition, the enhanced composite estimates 5102 may be compared to other calculated or derived values, such as a high estimate 5106 and a low estimate 5108. Also, stock prices may be displayed simultaneously, as shown by 5110. Stock values and other indicators may be displayed along the right side of the display. Also, EPS values may be displayed on the left side of the display as well. This further provides the user with tools to compare and analyze analyst estimates.

According to another embodiment of the present invention, bold estimates made by analysts (or other sources) may be displayed. A bold estimate may be an estimate that deviates significantly from the consensus on a stock, stock sets, and/or other earnings events. For example, recent bold estimates made by one or more top performing analysts (e.g., five star analysts) may be highlighted by the present invention. In another example, the present invention may display bold estimates by five star (or top performing) analysts for each stock on a stock's Research Summary page.

As discussed above, relative accuracy scores measure the accuracy of each analyst's forecasts as compared against fellow analysts (or sources). For an analyst (or other source) to receive a high score, the analyst (or source) may make estimates that are both significantly different from and more accurate than other analysts' estimates. Top performing analysts (e.g., those that receive five stars) may have deviated from the consensus in the past and have been significantly more accurate than the other analysts. Generally, high-scoring analysts in the past are likely to continue to be high-scoring analysts. Thus, when a five star (or top performing) analyst makes a bold call, this often signals a major opportunity on the stock (or earnings event). Often five star analysts are the first to revise estimates. If other analysts follow these five star analysts, the consensus estimate may continue to move toward the five star analyst's estimate where the stock price often follows. In short, bold estimates by five star (or top performing) analysts may provide guidance to investors and others.

According to another embodiment of the present invention, portfolio returns for one or more analysts may be calculated. A portfolio return may measure how much investors would have made had they built a portfolio around some or all of the analyst's picks. For example, the portfolio return may be calculated based on investing $1000 in each "buy" recommendation, $1500 in each "strong buy" recommendation, and short selling $1000 in each "sell" recommendation. Other values may be assigned to other recommendations. The present invention may rebalance the portfolio at predetermined time intervals (e.g., at the end of every month) and/or on the date of any recommendation change (or other event). The present invention may measure the portfolio return of all or some stocks (or earnings events) an analyst (or source) covers and/or the returns for portfolios based on stocks within specific industries. The present invention may also calculate each analyst's profitability for single stocks and/or stock sets. This adjusted return may measure an analyst's ability to time when to buy and sell a specific stock and/or stock sets. The return may indicate how much investors would have made had they bought the stock when the analyst recommendation was "buy" and shorted the stock when the analyst recommendation was "sell". For example, the present invention may adjust the return to give bonus points for market outperformance while the recommendation was "strong buy" and the risk-free rate while the recommendation was "hold".

Figure 50:
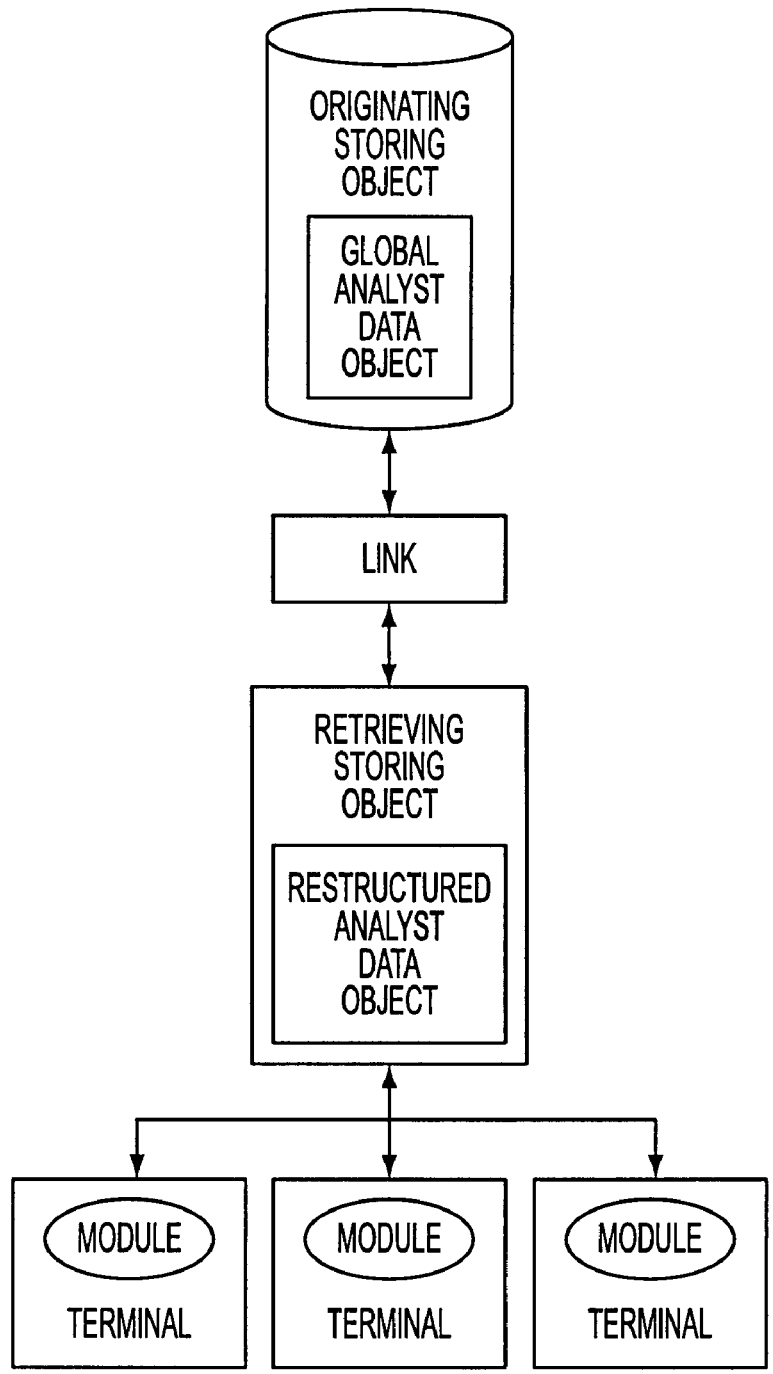
FIG. 50 illustrates a block diagram of a security analyst performance and tracking analysis system in accordance with the present invention.

Various architectural and system implementations of the invention can be used. For example, FIG. 50 is a block diagram illustrating a security analyst performance tracking and analysis system according to one preferred embodiment. In addition, FIG. 50 shows, in a broad sense, the data flow occurring within said system during a typical query for an analyst estimate comparison according to one embodiment.

On an interim basis, which can occur either daily, monthly, or at any other period, a Global Analyst Data Object, containing historical data on analyst estimates, may be transferred or otherwise downloaded, through a telecommunications link or similar method or device, from an Originating Storing Object, such as a commercial database maintained by any one of a number of financial information service providers (FISP) such as IBES, Inc. (IBES) or Fist Call Corporation (First Call), to a Retrieving Storing Object, which will preferably, but not necessarily, take the form of a network server in a computer network such as, for example, a local area network.

The Global Analyst Data Object downloaded from the Originating Storing Object is typically comprised of numerous files and fields relating to historical data relevant to analyst earnings estimates and recommendations. An example of such a historical database is that maintained by financial information services provider IBES. IBES's database, known as the Daily Detail Earnings Estimate History, contains more than ten years of analyst estimate forecasts, compiled from data obtained from more than 200 brokerage houses and more than 2000 individual analysts, for United States companies. These files and fields contain both general and specific information on analyst estimates and related data including, but not limited to, information pertaining to financial instrument type and related identification codes, broker and analyst identification, industry groupings, and detailed information on such variables as the prices of particular securities on specific dates. Importantly, it should be noted that a Global Analyst Data Object may be used which contains analyst data pertaining not only to stocks publicly traded in the United States, but also international stocks and any other type of financial instrument currently in existence or created in the future.

Either during or after the downloading of the Global Analyst Data Object, the database files are manipulated and otherwise processed such that they are restructured according to predetermined data fields, thereby creating a Restructured Analyst Data Object. In this way, each analyst earnings estimate and recommendation is restructured to have a number of predetermined data fields.

As indicated above, the data comprising the Restructured Analyst Data Object will preferably reside on a server in a computer network. Using a computer terminal or other similar input device, a user will be able to access and utilize the application Module comprising the software for the present invention. This Module may or may not reside on the computer terminal operated by the user.

Various architectural and system configurations may be used. Various database techniques may also be used. For example, a predetermined system database may be constructed such that each analyst estimate record in the database contains unique fields related to that estimate. In general, these records may contain a combination of data fields present within a Global Analyst Data Object obtained from the FISP and data fields unique to and created within the system of the present invention. Typically, the fields in this restructured database may include an analyst identifier; an event identifier corresponding to a specific security; an event type and date (e.g., Apple, FY-1995 or Intel, Q2-1997); an estimate date; a raw error indicator which corresponds to an analyst's estimate minus the actual earnings for a particular event; other metrics such as the percent error from an analyst's estimate to either the actual earnings or the consensus error; or other error metrics defined by a user.

The typical system database record may maintain the number of days by which an analyst's earnings estimate precedes a particular earnings event, such as a company's quarterly or annual earnings postings. The accuracy of an estimate made shortly before an earnings event is likely to be more accurate than an earnings estimate made months prior to the earnings event. In this way, users may make meaningful and valuable comparisons between analyst estimates for any number of given time periods preceding a particular earnings event.

Importantly, in addition to the predetermined data fields discussed above, the database of the present invention may also contain and maintain indices for predetermined data relationships and predetermined analyst performance metrics for a plurality of analysts, such as time series estimates and summary measures of those estimates. Accordingly, by utilizing this restructured database, a user will be able to both rank and analyze the performance of a plurality of analysts based upon any metric. Moreover, based on the data contained in the system database, the present invention allows for the rapid visualization of the analyses of analysts' earnings estimates and buy-sell recommendations.

Figure 51:
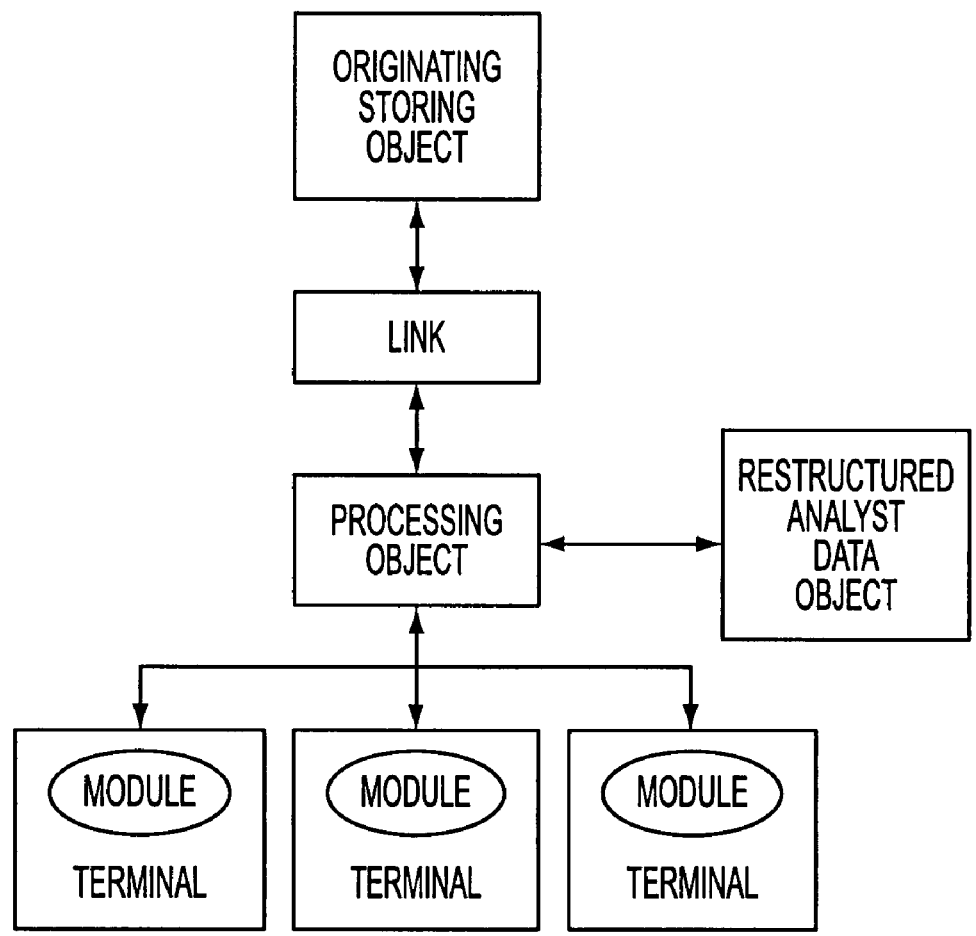
FIGS. 51–53 illustrate system architectures according to various embodiments of the present invention.
Figure 52:
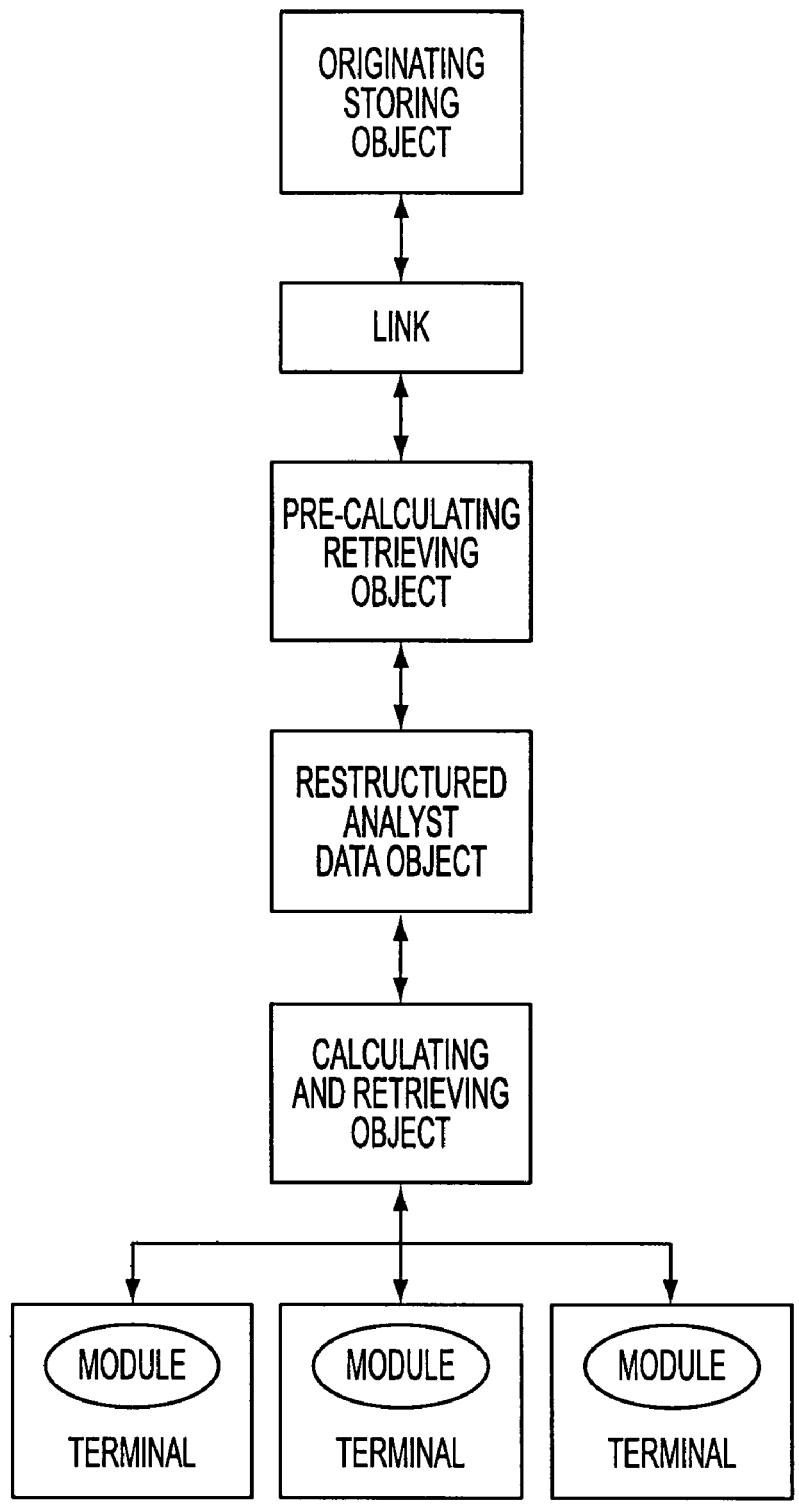
Figure 53:
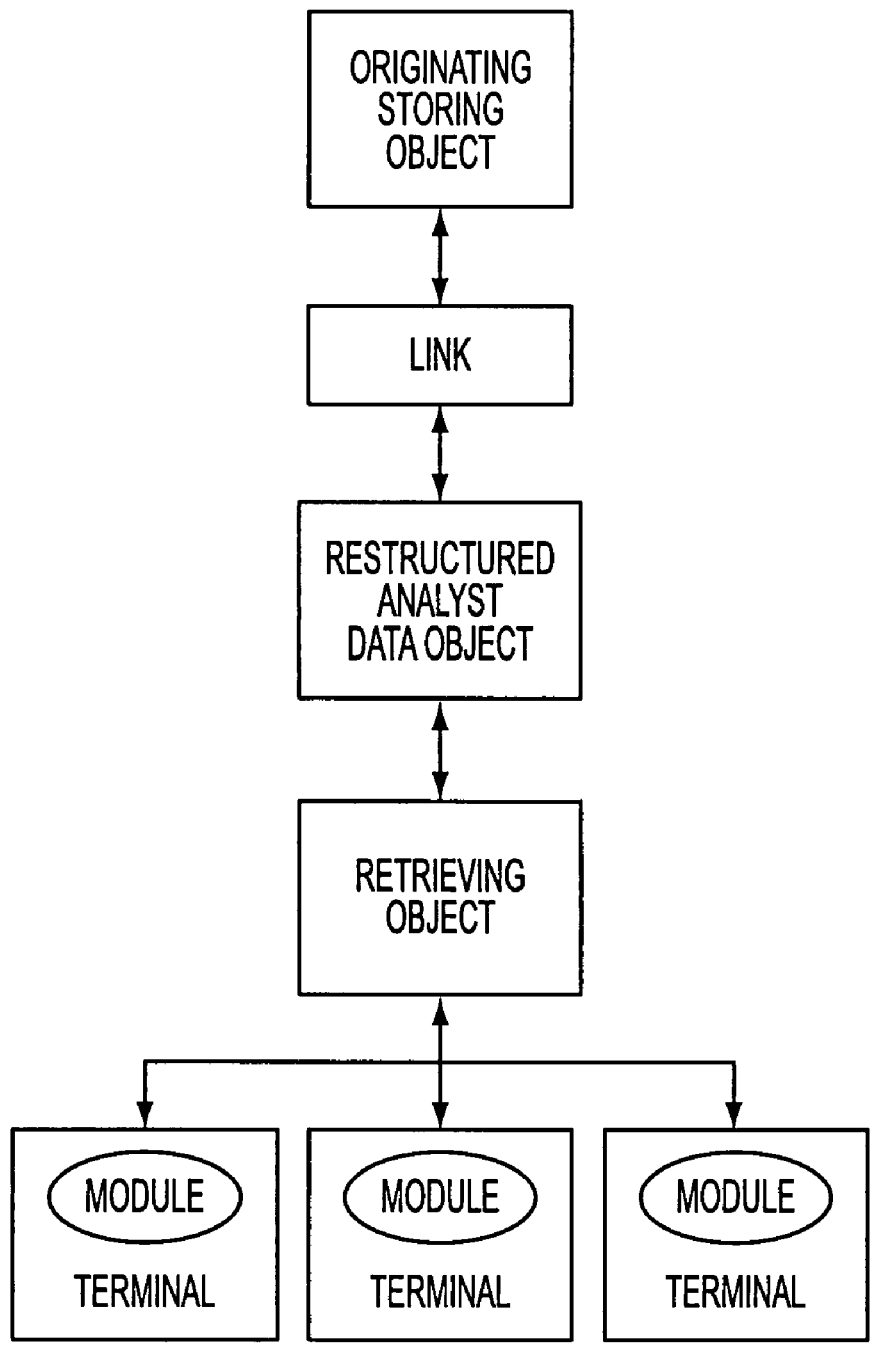

In one embodiment, the architecture of the present invention may comprise various structures consistent with the present invention. Various structures, as depicted in FIGS. 51-53 may be provided. These systems may comprise tiers such as in an Internet based networking environment. The tiers may comprise a Presentation Layer, depicted in FIGS. 51-53 as a plurality of terminals. This tier may be operatively connected to a second tier known as the Application Layer, depicted as the Retrieving Object. Additionally, the Application Layer is preferably operatively connected to a third tier, or Data Layer, which is depicted as the Restructured Analyst Data Object. Other tiers may also be provided as depicted in the Figures.

In one embodiment, historical data accessed from the Originating Storing Object is stored on the Restructured Analyst Data Object in addition to pre-calculated analyst-performance metrics derived from the Originating Storing Object. Because the data acquired directly from the Originating Storing Object may be proprietary of the data provider, the Retrieving Object preferably selectively delivers proprietary data only to those terminals having a license for the proprietary Originating Storing Object data. Also, the Retrieving Object preferably delivers only the pre-calculated analyst performance metrics derived from the Originating Storing Object to those terminals not having a license for the proprietary data. Using such a terminal and application module, a user may access and query the Restructured Analyst Data Object to perform any one of the numerous functions able to be performed by the present invention.

The pre-calculated data may comprise error metrics for securities predictions for earnings estimates and recommendations. In a preferred embodiment, the rows of the database are grouped into contributors, including analysts, brokers, and combinations thereof, and further divided into a predetermined number of time segments. A possible composition for the number of time segments. Each row comprises multiple error metrics calculated over a range of time periods. Error metrics may comprise various metrics including a raw error indicator (analyst estimate minus the actual earnings for a particular event), error percent to actual earnings, percent available (percent of time that an analyst had an estimate or recommendation available in the relevant time frame), error percent to consensus, and the number of days between the estimate of an event and the actual event, for example. Average error metrics may also be stored. Table 1 below provides one embodiment of average error metrics that may be maintained as well as other metrics that may be stored.

TABLE 1

|  | Event | 0–3 | 3–6 | 6–12 | 0–12 | 0–24 | Not pre-calculated (Calculated on-the-fly) | Comparable (across stocks, time periods) |
|---|---|---|---|---|---|---|---|---|
| Avg-Error $ |  | X | X | X | X | X |  |  |
| Avg-Abs Err $ |  | X | X | X | X | X |  |  |
| Avg-Abs Err % ile |  | X | X | X | X | X |  | X |
| Avg-Error % |  | X | X | X | X | X | X |  |
| Avg-Abs Err % |  | X | X | X | X | X | X |  |
| Avg-Rel Error % |  | X | X | X | X | X |  | X |
| Avg-Bias Error % |  | X | X | X | X | X |  | X |
| Actual-Divisor (for % calcs) | X |  |  |  |  |  |  |  |
| Swings |  |  |  |  |  | X |  | X |
| Hit % |  |  |  |  |  | X |  | X |
| Total Estimates |  |  |  |  |  | X |  |  |
| Follow % |  | X | X | X | X | X |  | X |
| LeadLagScore |  |  |  |  |  | X |  | X |
| MTBR |  |  |  |  | X |  |  | X |
| Best Date |  |  |  |  |  | X |  |  |
| Best Error (Rel Err %) |  |  |  |  |  | X |  |  |
| Year first followed | X |  |  |  |  |  |  |  |

The calculations to derive these error metrics are provided in Table 2. Example ranges, analysis of these values and characteristics are provided although other ranges, analysis and characteristics may also be provided.

TABLE 2

|  | Formula | Range | Analyzing | Characteristic |
|---|---|---|---|---|
| Error $ |  | Any | Closer to 0 is better | Error in dollars and cents |
| Abs Error $ |  | 0 to Any | Closer to 0 is better | Absolute Value of Error in $ and cents. When average is taken over interval, negative and positive errors do not cancel out-preserves magnitude of error but not sign. |
| Rel Error Pct |  | Any | Larger negative Numbers are better | Error Compared to the Consensus Error |
| Bias Error Percent | If analyst's estimate is further from the actual than the consensus estimate is, then Biaserror = Relative Error % Else Biaserror = 0 Average Bias ERror % For period t1 … t2 = | Any. Usually a low number | Closer to 0 is better. | Relative Error % only if the Analyst is further from the actual than the consensus. |

Additionally, other metrics including leadlag factor, swings, hits, hit percent, and mean time between revisions may be included as metrics. Table 3 below described these metrics, how they are calculated, analysis for these metrics, and a range for these metrics.

TABLE 3

|  | Formula | Analysis | Range |
|---|---|---|---|
| Leadlag Factor |  | Closer to 1 is better 1 = Always Leads, −1 Always Lags | −1.0 to +1.0 |
| Swings (i.e., number of times in period that analyst "stuck neck out" more than [SwingStdDevs = 1.5] standard deviations away from the | A Swing is defined as an estimate that satisfies this equation Defaults SwingStdDevs = 1.5 and N = 5 | Many swings indicate that analyst is willing to express an opinion independent from the pack. (It does not indicate quality.) A low | Positive Integer, Or 0. |

TABLE 3-continued

| | Formula | Analysis | Range |
|---|---|---|---|
| consensus as measured [n = 5] days after estimate date T.) | | number of swings may indicate an analyst that follows the pack. | |
| Hits | A Hit is a Swing that is closer to the actual than the consensus. If Then Hit Else MIss | — | Positive Integer or 0 |
| Hit Percent | X 100% | 100% indicates all HIts 0% indicates all misses NA indicates no Swings | 0–100% |
| MTBR-Mean Time Between Revisions | | Average in our current database is 89.1 days | 0–365 days |

These metrics are understood as follows:

Error $—The difference between and the Actual. Expressed in dollars.

Abs Err $—The absolute value of Error $ at a point in time.

Bias Error Percentage—If Consensus >Actual, then Bias Error equals Relative Error %, else it is 0. If Consensus <Actual, then Bias Error equals Relative Error %, else it is 0.

Actual-Divisor (Applies to Err%, ABS(Err%), and Rel-Err%)—To facilitate cross-stock and cross-period comparison of error, we provide metrics that normalize estimates & error by the size of the actual earnings. Of course, for small actual values, errors become exaggerated. To avoid this, we limit the divisor to be no less than 0.40 cents for fiscal year events and no less than 0.10 for fiscal quarter events.

Relative Error Percentage—The difference between the analysts error and the consensus error, divided by the Actual-Divisor.

Swings—Often, major revisions (N Std Dev away from consensus) occur simultaneously for multiple analysts. For example, this may be the case when a company reports a large earning surprise or issues a warning about upcoming growth. "Swings," which are bold estimates that differ greatly from the consensus, are differentiated from major revisions that occur concurrently with, or near to, major revisions from other analysts. To achieve this, the system may measure whether an analyst estimate or revision is N standard deviations away from the consensus N (typically 5) days after the day the analyst's estimate was made. Swings may be measured over the 24 months prior to the report date. Unlike other error metrics which are calculated by sampling (continued) estimates over an interval and computing the corresponding average error, Swings may be determined by considering only the actual estimates or revisions. The default number of Std Dev is 1.5.

Hit Percent—A hit is a swing that proves to be closer to the actual than the consensus at N days after the date of the swing.

Total Estimates—The total number of estimates made by the analyst in the prior 24 months for the event. Confirmations are not included. An estimate pre-existing exactly 24 months prior to the report are counted in the total.

Follow Percent—In each time frame (0 to 3, 3 to 6, 6 to 12, 0 to 12, 0 to 24 months) we calculate the total availability of the analysts estimates during that time. Follow Pct equals the days the analyst estimate was available in the timeframe divided by the total number of days in the timeframe.

MTBR—Mean Time between Revisions—Measures frequency of analyst revision in the year prior to the report date. Equals the number of days in which there was an active estimate in the year prior to the report date divided by the Total Estimates.

Best Date—The day in which the analyst's error (RelErr%) was lowest in the 24 month prior to the report date for that event.

Best Error—The value of the analyst's lowest RelErr% at the corresponding Best Date.

Further, a lead lag score may be provided. In calculating the lead lag score, Table 4 represents calculations with the following understanding:

$C_0$ represents the consensus on the day of the estimate in question, $C_1$ represents the consensus on the n-th day prior to the day of the estimate in question, and $C_2$ represents the consensus on the n-th day following the day of the estimate in question. These conditions are considered in this order to determine if an estimate is leading, lagging, or neither:

TABLE 4

| # | Condition | Formula | Picture | Classified as |
|---|---|---|---|---|
| 1 | Change in consensus, from n days prior to n days flowing estimate, must be at least Min %, (default = 5%). Else "neither" | >Min % | | Else Neither |
| 2 | Consensus change prior to the estimate must not be different in direction from change after the estimate. | (C2 > C1) AND (C2 >= C0) OR (C2 < C1) AND (C2 <= C0) | | Else Neither |
| 3 | Number of Estimates/Revs Between [t − n to t + n] minus [# estimates at t] >=2 | | | Else Neither |
| 4 | If the Number of Estimates prior to the Estimate Date in the time frame are greater than the number of estimates after the report date in the time frame. Then this estimate is a lagging estimate | | | Lagging |

TABLE 4-continued

| # | Condition | Formula | Picture | Classified as |
|---|---|---|---|---|
| 5 | If the Number of Estimates prior to the Estimate Date in the time frame are less than the number of estimates after the report date in the time frame. Then this estimate is a Leading estimate | | | Leading |
| 6 | If the Number of Estimates prior to the Estimate Date in the time frame are equal to the number of estimates after the report date in the time frame. Then this estimate is neither a leading nor lagging estimate. | | | Neither |

For each analyst, each new estimate or revision made within 24 months of a report date for a fiscal period is classified either as Leading, Lagging or Neither according to the logic above. The LeadLagFactor is the number of Leading estimates minus the number of Lagging over the total estimates. If all estimates were lagging, the LeadLagFactor may be assigned a value of −1.0. If all estimates were leading, the LeadLagFactor may be assigned a value of +1.0. If all estimates were "neither" or if the number of Leading Estimates equals the number of Lagging estimates, the LeadLagFactor may be assigned a value of 0.0. Estimates already current at 24 months prior to the report date may not be included.

Figure 54:
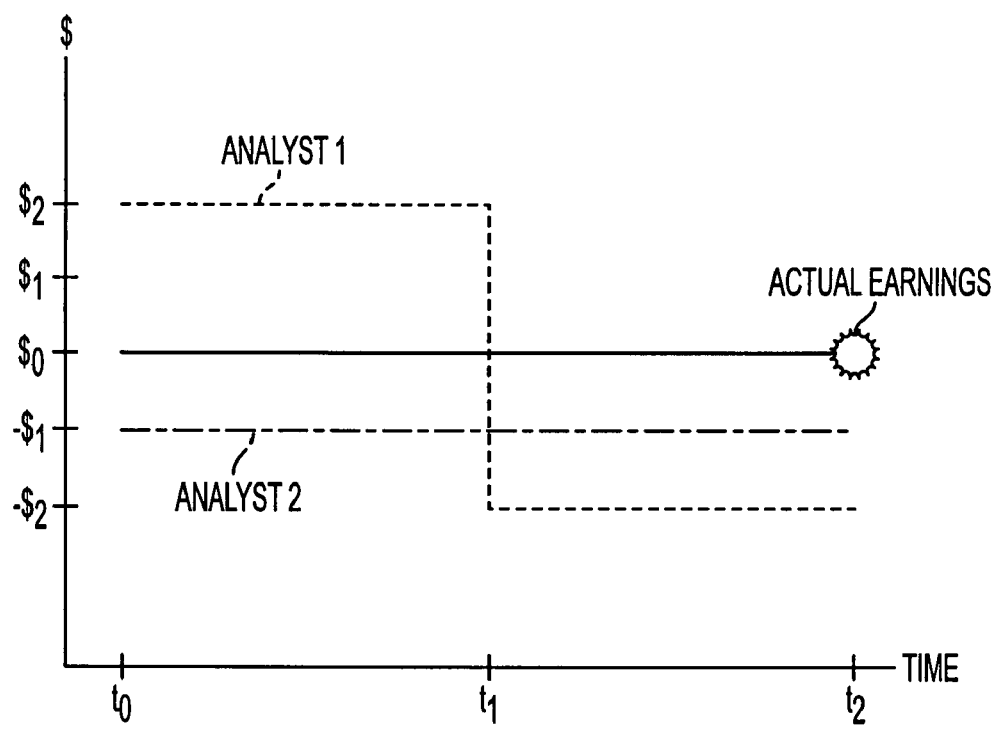
FIGS. 54–56 illustrate graphs of comparative performance by two analysts with an actual outcome according to an embodiment of the present invention.
Figure 55:
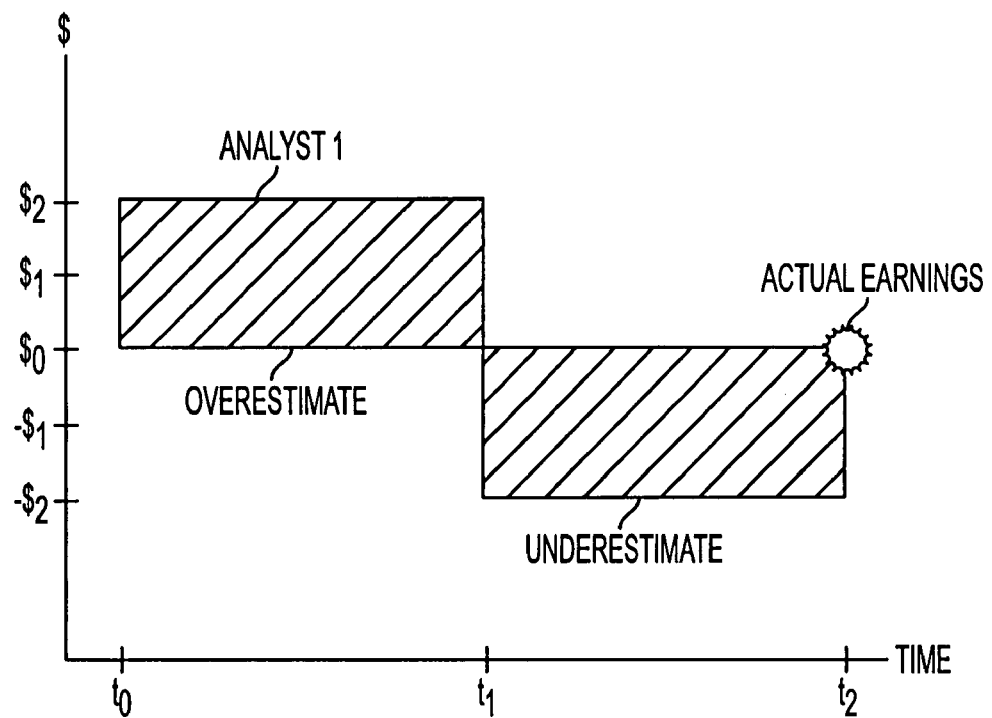
Figure 56:
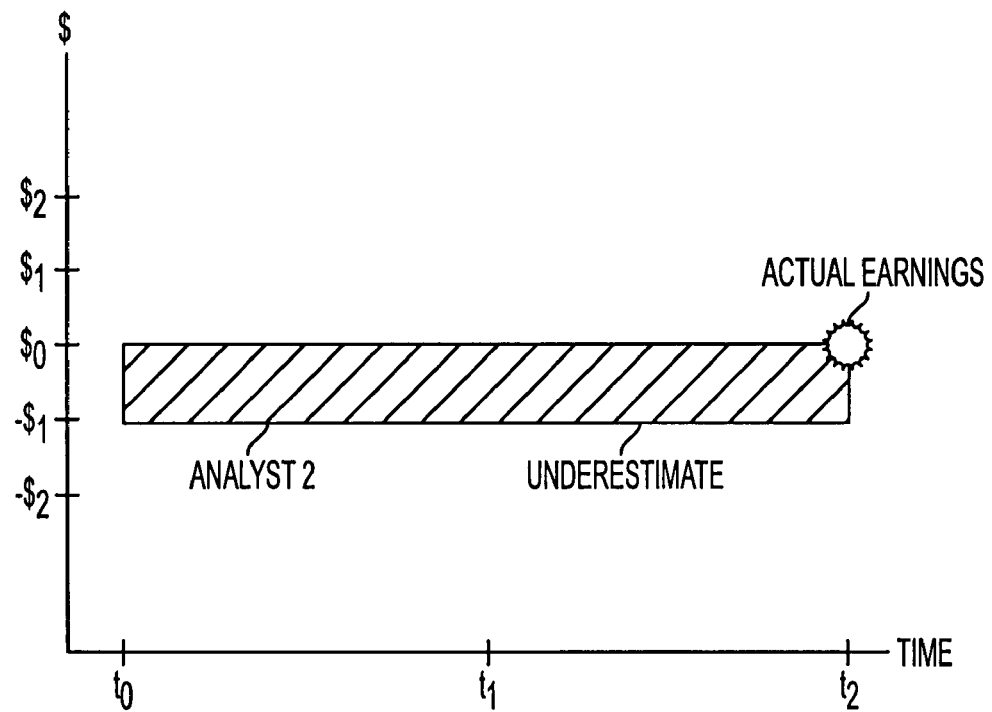

FIGS. 54–56 depict an example of one purpose between the two different types of error calculation. In FIG. 54, two analysts have made predictions concerning the earnings of a particular security. Their predictions, in dollars, are shown on the y-axis where $\$_0$ is the actual earnings, whereas the time at which the analysts made their predictions is shown along the x-axis. The difference between each of the depicted adjacent markings on the y-axis is equal to $, and the difference between each of the depicted x-axis markings is equal to T. The first analyst initially ($t_0$) predicted above the actual earnings by $\$_2$, and at time $t_1$, modified the prediction to an estimate below (−$\$_2$) the actual earning. The second analyst predicted earnings slightly below the actual earnings for the entire period shown.

Turning to FIG. 55, which highlights the error associated with the first analyst's predictions, it is shown that the first analyst has an average error equal to zero because the extent of the overestimate is approximately equal to the extent of the underestimate. This raw error metric is preferably calculated as follows:

$$\sum_{t0}^{tn} (\text{Estimate} - \text{Actual})$$

By substituting the values shown in FIG. 32, the overestimate is found to be ($\$_2-\$_0$)*($t_1-t_0$) or 2$T and the underestimate is found to be (−$\$_2-\$_0$)*($t_2-t_1$) or −2$T. Accordingly, the first analyst would receive a raw error of 0 and would accordingly be given no adjustment factor. In determining the weighting factor, however, the following equation which represents the absolute error metric, is preferably used:

$$\sum_{t0}^{tn} |\text{Estimate} - \text{Actual}|$$

Again substituting the values for the first analyst, an absolute error of 4$T is found. Applying the same analysis to the second analyst leads to a raw error of −2$T which could in turn be used to calculate an adjustment factor. Similarly, because the second analyst consistently underestimated the actual earnings, the second analyst would have an absolute error of −2$T.

Because the absolute error of the second analyst is half as great as the absolute error of the first analyst, the second analyst is preferably assigned a weighting factor greater than the weighting factor of the first analyst.

Because analysts start making predictions on a given security at different times, it is possible that a particular analyst will not have made predictions about a particular security for the entire duration over which an error analysis is being performed. In a preferred embodiment, it is possible to make proportional adjustments to various error analysis based on the percentage of time that a given analyst has been tracking a security.

Similarly, because analysts start making predictions on earnings at different times, it is similarly possible that certain analysts will not have made earnings estimates at a time when an unanticipated event lead to a significant error. In a preferred embodiment, the effect of such unanticipated events can be filtered by comparing the analysts predictions to a consensus estimate. Such a comparison is termed a relative error metric. The following equation provides an example of a relative error metric:

$$\sum_{t0}^{tn} \frac{(|\text{Estimate} - \text{Actual}| - |\text{Consensus} - \text{Actual}|)}{\text{Actual}}$$

The relative error metric shows how a particular analyst performed in relation to the other analysts who were tracking a particular security over the analyzed period of time. The purpose of utilizing the actual earnings in the denominator of a preferred embodiment is to enable errors to be normalized so that comparisons can be made across different securities. Because small actual earnings can lead to exaggerated errors, it is possible to establish a minimum actual value, for purposes of this error metric, to prevent such exaggerated errors. For example, if the actual earnings were 0, then any analyst tracking the security would have an infinite error, so a value of, for example, $0.40 could be used to provide useful information from the analysis.

In another embodiment of the invention, a user may rank, measure, and analyze the historical accuracy of a single or plurality of analysts' buy-sell recommendations in various ways. As an initial matter, a user may control and otherwise define how recommendation descriptions used by a plurality of analysts are normalized and otherwise translated into scaled recommendation numbers.

Specifically, depending on the employer of an individual analyst, said analyst, when either upgrading or downgrading a particular security, will use varying descriptions to make his recommendation. For example, analysts at an investment firm may issue recommendations using the following descriptions, predetermined by the firm: strong buy, buy, neutral, source of finds, or sell. In contrast, analysts at a different investment firm may issue recommendations using the following descriptions, also predetermined by the firm: priority list, recommended list, trading buy, market outperform, market perform, and market underperform. FISPs such as First Call translate and otherwise normalize the recommendation descriptions of the numerous analysts to a scale ranging from 1 to 5, with the following descriptions: 1 (buy), 2 (buy/hold), 3 (hold), 4 (hold/sell), and 5 (sell). The FISPs then calculate an average recommendation by calculating the mean of all analysts' current recommendations as translated to this 1 to 5 scale.

In the present invention, relatively recent recommendation upgrades or downgrades may be assigned a relatively high weighting factor while older recommendations may receive a weight of zero. By using these factors, an improved custom composite recommendation may be determined which more accurately reflects the action (e.g., buy, sell, hold etc.) that a user should take with respect to a security. In addition, a user may control the recommendation normalization process, if so desired, to replace the normalization performed by an FISP.

Moreover, using either the FISP generated recommendation scale or user defined scale, a user will have the ability to measure the historical profitability of a single or plurality of analysts' recommendations. For example, a user may create a graph illustrating the average percent error of an analyst's recommendation as compared to the average recommendation.

Users will also have the ability to create and test portfolio creation rules. Specifically, a user may choose a security and then set up purchase and/or selling instructions that the system will make automatically. For example, a user can instruct the system to purchase a security when a specific analyst issues a recommendation of "2," double his investment if the recommendation is upgraded to "1," and sell all or a certain percentage of the security if and when the analyst downgrades his recommendation to "3" or lower.

Figure 57:
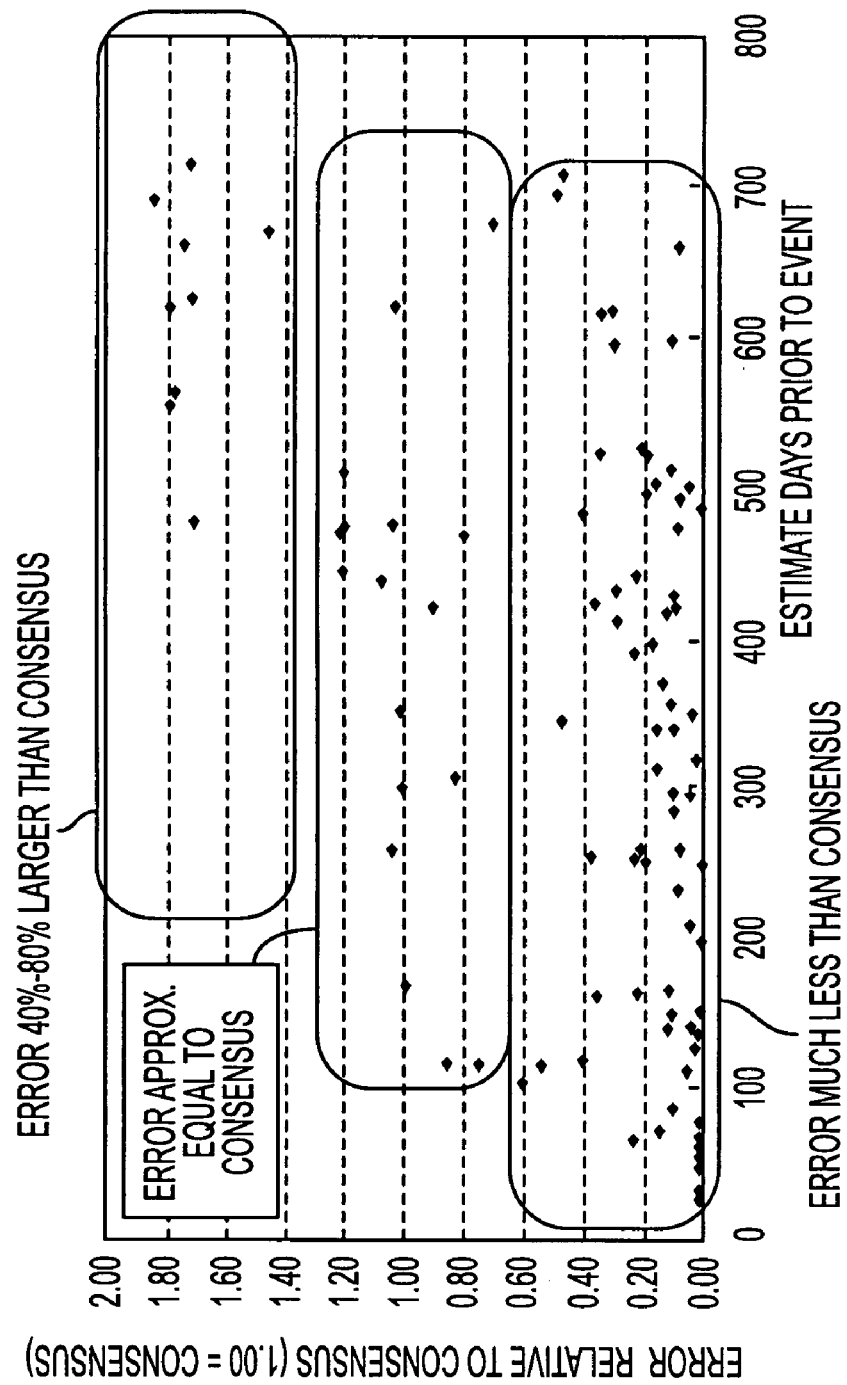
FIG. 57 illustrates a scatterplot graph according to an embodiment of the present invention.

FIG. 57 provides an example of a scatterplot graph created with the present invention. This scatterplot is generated using the following equation:

$$\sum_{t0}^{tn} BiasError$$

where bias error is equal to relative error if relative error is greater than the consensus error. If the relative error is less than the consensus error, then the bias error is assigned a value of zero over the selected time period. The consensus error is calculated the same as raw error is calculated for an individual analyst, except that the consensus estimate is used instead of the analyst's estimate. The bias error is useful in determining how consistently a given analyst or group of analysts outperforms the consensus for a particular security.

Another option available in a preferred embodiment is the ability to exclude one or more analysts. For example, if a particular analyst had an extreme error during a period of analysis that a user is evaluating, then the consensus error might be too reflective of that individual analyst's error. Accordingly, a majority of analysts may have bias errors approximately equal to zero which indicates that they are outperforming the consensus estimate. If a user wants to filter out an analyst's estimate for this or any other reason, it is possible to exclude the analyst's estimate from a particular metric analysis.

In a preferred embodiment, there are additional metrics which may be used to evaluate how effectively an analyst acquires and reacts to information. One metric that serves to accomplish this task is the leadlag Factor. Preferably, the leadlag Factor is calculated as follows:

$$\frac{(Leads - Lags)}{TotalEstimates}$$

where leads is the number of times that an analyst makes an estimate revision before the majority of the analysts following a particular security, lags is the number of times that an analyst makes an estimate revision after the majority of the analysts following a particular security, and total estimates represents the number of predictions that the analyst has made. In a preferred embodiment, a user may select a leadlag factor based on a number of different variables, including which securities, which analysts, which time periods, or any combination thereof.

Another metric that is useful in predicting how an analyst acquires and reacts to information is the hit percent. A hit percent is an evaluation of the number of times that an analyst successfully revises earnings. In a preferred embodiment, a swing is preferably an estimate that is outside a predetermined standard deviation of the mean of the consensus estimate. In a most preferred embodiment, a predetermined standard deviation of the consensus estimate is approximately 1.5. A hit is preferably a swing in which the analyst's estimate is closer to the actual earnings than the consensus estimate. A hit percent can then be determined by dividing the number of hits by the number of swings, and multiplying the result by 100%.

As discussed above, the system may provide the user with the option of viewing a large amount of information in a variety of different formats.

Other embodiments and uses of the invention will be apparent to those skilled in the art from consideration of the specification and practice of the invention disclosed herein. Accordingly, the specification and examples set forth above should be considered exemplary only. The scope of the invention is only limited by the claims appended hereto.

What is claimed is:

1. A system for monitoring analysts' estimates, comprising:
    at least one data repository configured to store, on a per analyst basis, current estimate data for a plurality of analysts, wherein the current estimate data stored in the at least one data repository includes at least an estimate amount and when the estimate was made; and
    a computer communicatively coupled to the at least one data repository, wherein the computer is configured to:
    analyze the current estimate data to determine when one or more alert conditions are satisfied;

identify at least one of the plurality of analysts associated with the one or more satisfied alert conditions; and issue an alert indicating that the one or more alert conditions have been satisfied for the at least one identified analyst, wherein a terminal device in communication with the computer is configured to display the issued alert on a display device via a graphical user interface.

2. The system of claim 1, wherein at least one of the alert conditions is satisfied if the current estimate data for at least one of the plurality of analysts is older than a predetermined amount of time.

3. The system of claim 1, wherein at least one of the alert conditions is satisfied if the current estimate data for at least one of the plurality of analysts is older than a date associated with a cluster of estimate revisions.

4. The system of claim 1, wherein at least one of the alert conditions includes one or more criteria that devine a cluster of estimate revisions, and wherein the computer is further configured to:

receive a definition of the one or more criteria that define the cluster of estimate revisions from a user of the terminal device;

analyze the current estimate data to determine when the criteria that define the cluster of estimate revisions are saisfied, wherein the cluster of estimate revisions is associated with a date; and issue the alert if the current estimate data for at least one of the plurality of analysts is older than the date associated with the cluster of estimate revisions.

5. The system of claim 4, wherein the computer is further configured to:

identify a period of time associated with the at least one alert condition that includes the criteria defining the cluster of estimate revisions, wherein the at least one alert condition is satisfied if the current estimate data for at least one of the plurality of analysts is more than the identified period of time older than the date associated with the cluster of estimate revisions.

6. The system of claim 1, wherein computer is further configured to:

analyze the current estimate data to determine a summary metric of the current estimate data for the plurality of analysts; and identify a value associated with the determined summary metric, wherein at least one of the alert conditions is satisfied if the difference between the determined summary metric and the current estimate data for at least one of the plurality of analysts equals or exceeds the identified value.

7. The system of claim 6, wherein the summary metric comprises a measure of central tendency of the current estimate data for the plurality of analysts, wherein the measure of central tendency comprises at least one of a mean, median, or mode of the current estimate data for the plurality of analysts.

8. The system of claim 6, wherein the summary metric is qualified by at least one of a time period, a particular security, or a group of securities.

9. The system of claim 6, wherein the identified value is more than "n" standard deviations away from the summary metric of the current estimate data for the plurality of analysts, wherein "n" is an integer.

10. The system of claim 6, wherein the identified value is more than a predetermined number of currency units away from the summary metric of the current estimate data for the plurality of analysts.

11. The system of claim 6, wherein the identified value is more than a predetermined percentage away from the summary metric of the current estimate data for the plurality of analysts.

12. The system of claim 1, wherein the terminal device in communication with the computer is further configured to:

simultaneously display, via the graphical user interface, information relating to the identified analyst, the current estimate data for the identified analyst, and a visual alert indicator in association with the current estimate data for the identified analyst.

13. The system of claim 12, wherein the terminal device in communication with the computer is further configured to:

display, via the graphical user interface, data associated with the one or more satisfied alert conditions.

14. The system of claim 13, wherein the data associated with the one or more satisfied alert conditions comprises an indication of the satisfied alert conditions.

15. The system of claim 13, wherein the data associated with the one or more satisfied alert conditions comprises data relating to when the one or more alert conditions were satisfied.

16. The system of claim 13, wherein the data associated with the one or more satisfied alert conditions comprises an indication of the satisfied alert conditions and data relating to when the one or more alert conditions were satisfied.

17. The system of claim 1, wherein the terminal device in communication with the computer is further configured to:

display, via the graphical user interface, the current estimate data for a list of two or more of the plurality of analysts, wherein each of the analysts in the list are associated with at least one of the satisfied alert conditions.

18. The system of claim 17, wherein the list of analysts includes at least one of analysts associated with a particular firm or analysts with current estimate data in a particular industry.

19. The system of claim 1, wherein the terminal device in communication with the computer is further configured to:

display, via the graphical user interface, the current estimate data for a list of two or more of the plurality of analysts', wherein each of the analysts in the list are associated with at least one of the satisfied alert conditions; and display, via the graphical user interface, data associated with the at least one of the satisfied alert conditions.

20. The system of claim 1, wherein the terminal device in communication with the computer is further configured to display, via the graphical user interface, all of the satisfied alert conditions associated with the identified analyst.

21. The system of claim 1, wherein the terminal device in communication with the computer is further configured to display, via the graphical user interface, one or more of the satisfied alert conditions associated with the identified analyst.

22. The system of claim 1, wherein the computer is further configured to receive a selection of a time period from a user of the terminal device, and wherein the terminal device in communication with the computer is further configured to display, via the graphical user interface, all of the satisfied alert conditions associated with the identified analyst for the user-selected time period.

23. The system of claim 1, wherein the computer is further configured to receive a selection of a time period from a user of the terminal device, and wherein the terminal device in communication with the computer is further configured to display, via the graphical user interface, one or more of the satisfied alert conditions associated with the identified analyst for the user-selected time period.

24. The system of claim 1, wherein the computer is further configured to receive a definition of the alert conditions from a user of the terminal device.

25. The system of claim 1, wherein the computer is further configured to receive a definition of an action to be taken when one or more of the alert conditions are satisfied from a user of the terminal device.

26. The system of claim 25, wherein the action comprises the computer transmitting a message corresponding to the issued alert to a predetermined device.

27. The system of claim 26, wherein the computer is configured to transmit the message by at least one of e-mail, phone, fax, or pager.

28. The system of claim 1, wherein the computer is further configured to transmit a message to a predetermined recipient based on the identified analyst.

29. The system of claim 28, wherein the predetermined recipient is the identified analyst.

30. The system of claim 28, wherein the predetermined recipient is someone associated with the identified analyst.

31. The system of claim 1, wherein the computer is further configured to receive a frequency for analyzing the current estimate data to determine when the one or more alert conditions are satisfied from a user of the terminal device.

32. The system of claim 1, wherein the computer is further configured to receive a frequency for issuing the alert indicating that the one or more alert conditions have been satisfied for the identified analyst from a user of the terminal device.

33. The system of claim 1, wherein the current estimate data relates to an estimate of a security's earnings for a fiscal period.

34. The system of claim 33, wherein the fiscal period comprises at least one of a fiscal quarter, a plurality of fiscal quarters, a fiscal year, or a plurality of fiscal years.

35. The system of claim 1, wherein the current estimate data comprises a financial projection.

36. The system of claim 1, wherein the computer is further configured to receive a change or confirmation of the current estimate data from at least one of the plurality of analysts in response to the issued alert.

37. The system of claim 36, wherein an alert indicator changes when the at least one of the plurality of analysts changes or confirms the current estimated data in response to the issued alert.

38. The system of claim 36, wherein a different visual representation of an alert indicator is provided depending on an action taken in response to the issued alert.

* * * * *